(12) United States Patent
Connolly et al.

(10) Patent No.: US 11,402,013 B2
(45) Date of Patent: *Aug. 2, 2022

(54) SYSTEM, METHOD, AND APPARATUS FOR OPERATING A HIGH EFFICIENCY, HIGH OUTPUT TRANSMISSION

(71) Applicant: Eaton Cummins Automated Transmission Technologies, LLC, Galesburg, MI (US)

(72) Inventors: Thomas Connolly, Portage, MI (US); Joseph Paul Furner, Ann Arbor, MI (US); Sipei Chen, Novi, MI (US); Jeff Hawarden, Rossendale (GB); Ian Daniel McKenzie, Kalamazoo, MI (US); Christopher DeBoer, Kalamazoo, MI (US)

(73) Assignee: Eaton Cummins Automated Transmission Tech., LLC, Galesburgh, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/084,126

(22) Filed: Oct. 29, 2020

(65) Prior Publication Data

US 2021/0048099 A1 Feb. 18, 2021

Related U.S. Application Data

(63) Continuation of application No. 16/596,422, filed on Oct. 8, 2019, now Pat. No. 10,859,156, which is a (Continued)

(51) Int. Cl.
*F16H 39/01* (2006.01)
*B60W 30/19* (2012.01)
(Continued)

(52) U.S. Cl.
CPC ......... *F16H 59/0204* (2013.01); *B60W 10/02* (2013.01); *B60W 10/11* (2013.01);
(Continued)

(58) Field of Classification Search
CPC ...... F16H 59/0204; F16H 59/38; F16H 59/40; F16H 59/72; F16H 3/091; F16H 3/64;
(Continued)

(56) References Cited

U.S. PATENT DOCUMENTS 10,563,753 B2 * 2/2020 Kawale ................. F16H 37/046

FOREIGN PATENT DOCUMENTS

| CN | 204405336 U | * | 6/2015 | .......... G01M 17/007 |
| DE | 10251627 A1 | * | 5/2004 | .......... F16H 61/702 |

(Continued)

*Primary Examiner* — Tisha D Lewis
(74) *Attorney, Agent, or Firm* — Walter Haverfield LLP; James J. Pingor

(57) ABSTRACT

A transmission includes an input shaft coupled to a prime mover, a countershaft, main shaft, and an output shaft, with gears between the countershaft and the main shaft. A shift actuator selectively couples the input shaft to the main shaft by rotatably coupling gears between the countershaft and the main shaft. The shift actuator is mounted on an exterior wall of a housing including the countershaft and the main shaft. A controller controls the shift actuator utilizing an actuating pulse and an opposing pulse.

13 Claims, 70 Drawing Sheets

Related U.S. Application Data continuation of application No. 15/663,201, filed on Jul. 28, 2017, now Pat. No. 10,563,753.

(60) Provisional application No. 62/465,021, filed on Feb. 28, 2017, provisional application No. 62/438,201, filed on Dec. 22, 2016.

(51) Int. Cl.

| | | |
|---|---|---|
| *F16H 59/02* | (2006.01) | |
| *F16H 37/04* | (2006.01) | |
| *G08B 13/00* | (2006.01) | |
| *G08B 27/00* | (2006.01) | |
| *F16H 3/64* | (2006.01) | |
| *F16H 57/02* | (2012.01) | |
| *F16H 61/06* | (2006.01) | |
| *F16H 61/08* | (2006.01) | |
| *H04B 10/077* | (2013.01) | |
| *H04J 3/12* | (2006.01) | |
| *B60W 10/02* | (2006.01) | |
| *B60W 10/11* | (2012.01) | |
| *B60W 50/00* | (2006.01) | |
| *F16D 25/12* | (2006.01) | |
| *F16H 3/091* | (2006.01) | |
| *F16H 61/00* | (2006.01) | |
| *F16H 61/02* | (2006.01) | |
| *F16H 57/021* | (2012.01) | |
| *F16H 57/04* | (2010.01) | |
| *F16H 61/04* | (2006.01) | |
| *F16H 63/00* | (2006.01) | |
| *F16H 59/72* | (2006.01) | |
| *F16H 63/24* | (2006.01) | |
| *F16H 61/30* | (2006.01) | |
| *F16H 57/032* | (2012.01) | |
| *F16H 61/28* | (2006.01) | |
| *F16H 63/30* | (2006.01) | |
| *F16H 61/682* | (2006.01) | |
| *F16H 3/16* | (2006.01) | |
| *F16H 3/78* | (2006.01) | |
| *F16H 59/40* | (2006.01) | |
| *F16H 61/14* | (2006.01) | |
| *F16H 61/70* | (2006.01) | |
| *F16H 59/38* | (2006.01) | |

(52) U.S. Cl.
CPC ............ *B60W 30/19* (2013.01); *B60W 50/00* (2013.01); *F16D 25/126* (2013.01); *F16H 3/091* (2013.01); *F16H 3/64* (2013.01); *F16H 37/046* (2013.01); *F16H 57/02004* (2013.01); *F16H 61/0021* (2013.01); *F16H 61/0213* (2013.01); *F16H 61/06* (2013.01); *F16H 61/08* (2013.01); *G08B 13/00* (2013.01); *G08B 27/00* (2013.01); *H04B 10/0775* (2013.01); *H04J 3/125* (2013.01); *B60W 2050/0058* (2013.01); *B60W 2510/0275* (2013.01); *B60W 2510/0283* (2013.01); *B60W 2510/107* (2013.01); *B60W 2710/021* (2013.01); *B60W 2710/022* (2013.01); *B60W 2710/025* (2013.01); *B60W 2710/1005* (2013.01); *F16H 3/16* (2013.01); *F16H 3/78* (2013.01); *F16H 57/021* (2013.01); *F16H 57/032* (2013.01); *F16H 57/043* (2013.01); *F16H 57/0423* (2013.01); *F16H 57/0441* (2013.01); *F16H 57/0471* (2013.01); *F16H 57/0478* (2013.01); *F16H 57/0484* (2013.01); *F16H 57/0494* (2013.01); *F16H 59/38* (2013.01); *F16H 59/40* (2013.01); *F16H 59/72* (2013.01); *F16H 61/04* (2013.01); *F16H 61/143* (2013.01); *F16H 61/682* (2013.01); *F16H 61/705* (2013.01); *F16H 63/24* (2013.01); *F16H 2057/0206* (2013.01); *F16H 2059/725* (2013.01); *F16H 2061/2853* (2013.01); *F16H 2061/308* (2013.01); *F16H 2063/005* (2013.01); *F16H 2063/3093* (2013.01)

(58) Field of Classification Search
CPC . F16H 3/16; F16H 3/78; F16H 37/046; F16H 57/02004; F16H 57/021; F16H 57/032; F16H 57/0423; F16H 57/043; F16H 57/0441; F16H 57/0471; F16H 57/0478; F16H 57/0484; F16H 57/0494; F16H 61/0021; F16H 61/0213; F16H 61/06; F16H 61/08; F16H 61/04; F16H 61/143; F16H 61/682; F16H 61/705; F16H 63/24; F16H 2057/0206; F16H 2059/725; F16H 2061/2853; F16H 2061/308; F16H 2063/005; F16H 2063/3093; F16H 39/01; B60W 10/02; B60W 10/11; B60W 30/19; B60W 50/00; B60W 2050/0058; B60W 2510/0275; B60W 2510/0283; B60W 2510/107; B60W 2710/021; B60W 2710/022; B60W 2710/025; B60W 2710/1005; G08B 13/00; G08B 27/00; H04B 10/0775; H04J 3/125
See application file for complete search history.

(56) References Cited

FOREIGN PATENT DOCUMENTS

| WO | WO-9932808 A1 * | 7/1999 | ......... F16H 63/3023 |
|---|---|---|---|
| WO | WO-2010059107 A1 * | 5/2010 | ............. F15B 11/06 |

\* cited by examiner

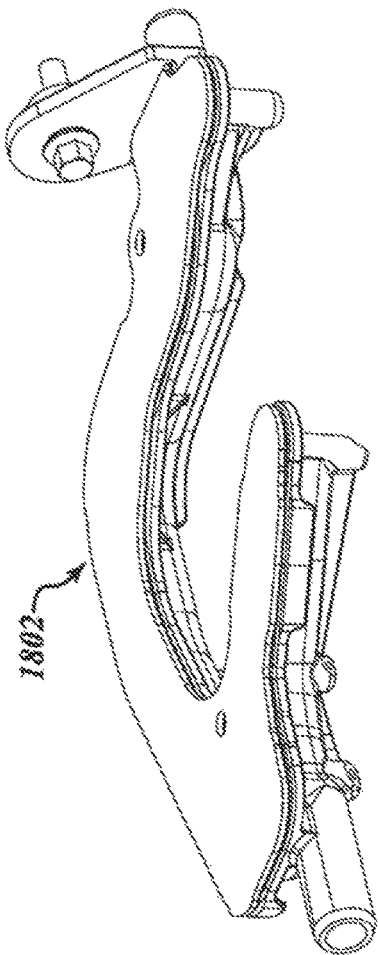
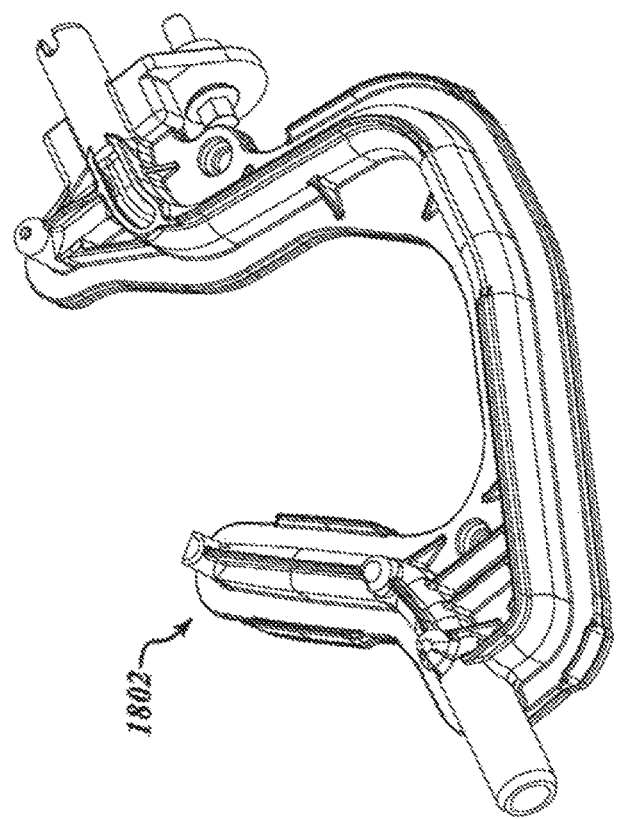

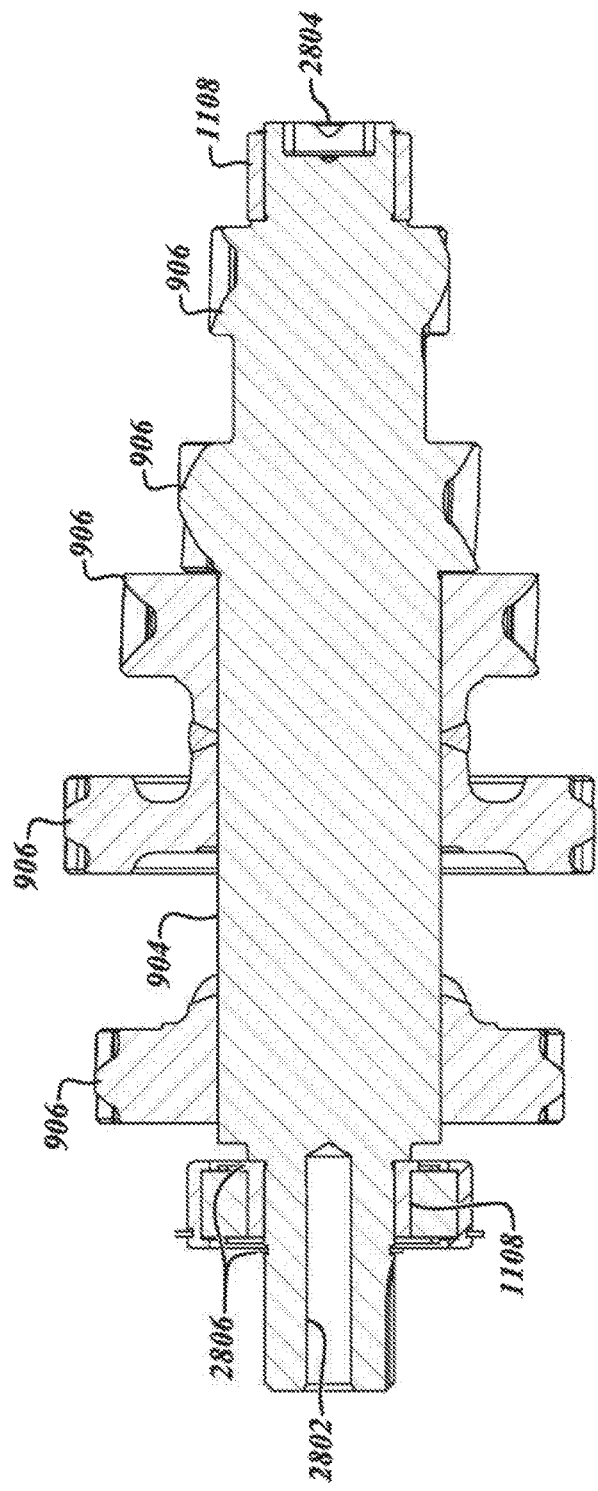
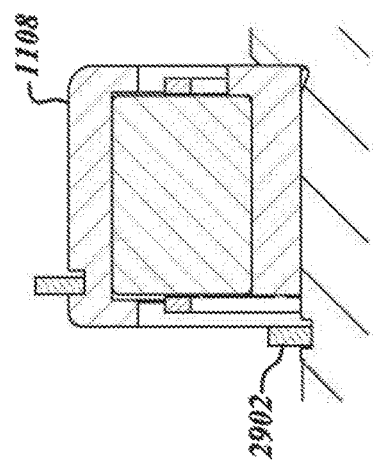
FIG. 30
FIG. 31
FIG. 32

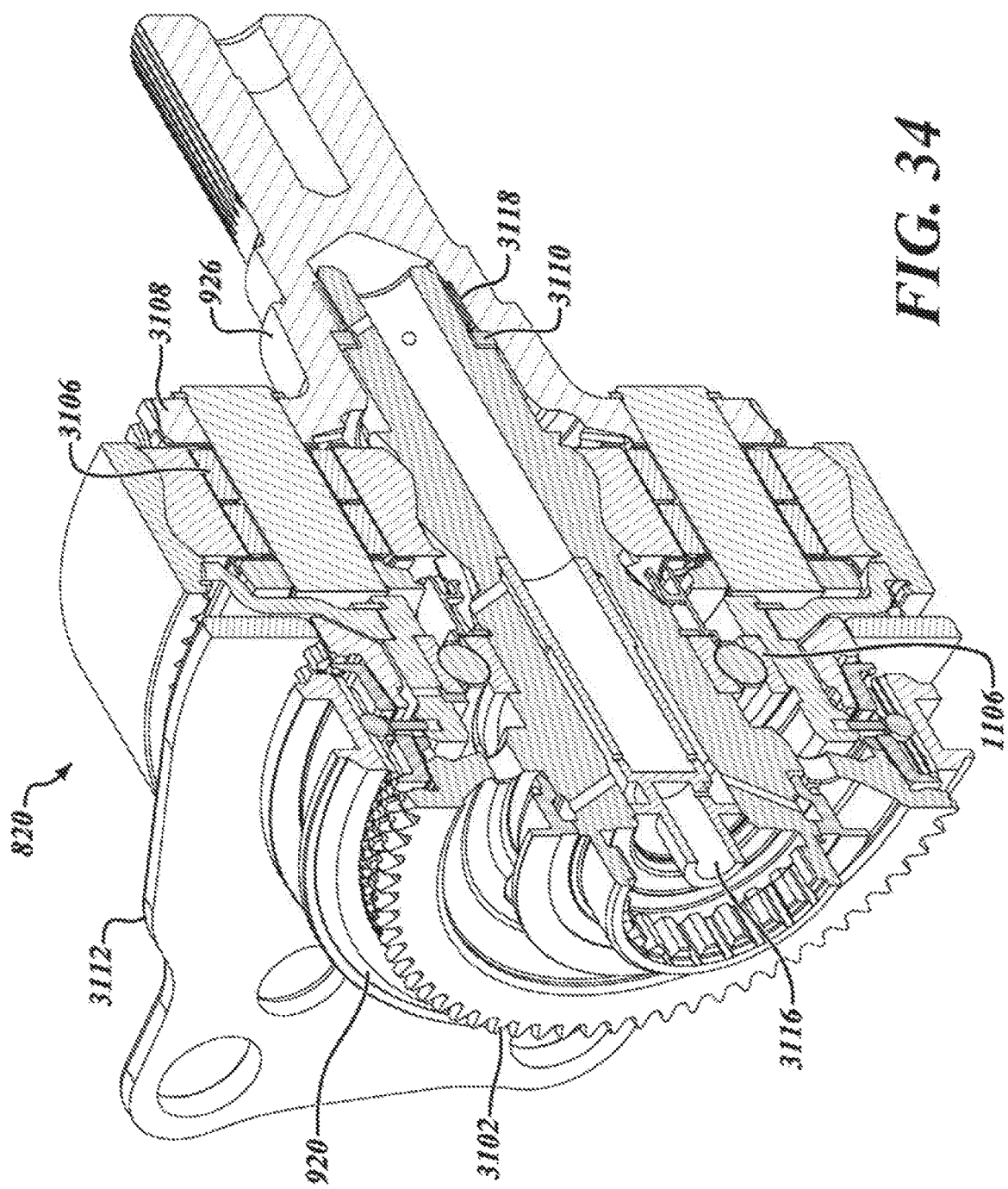

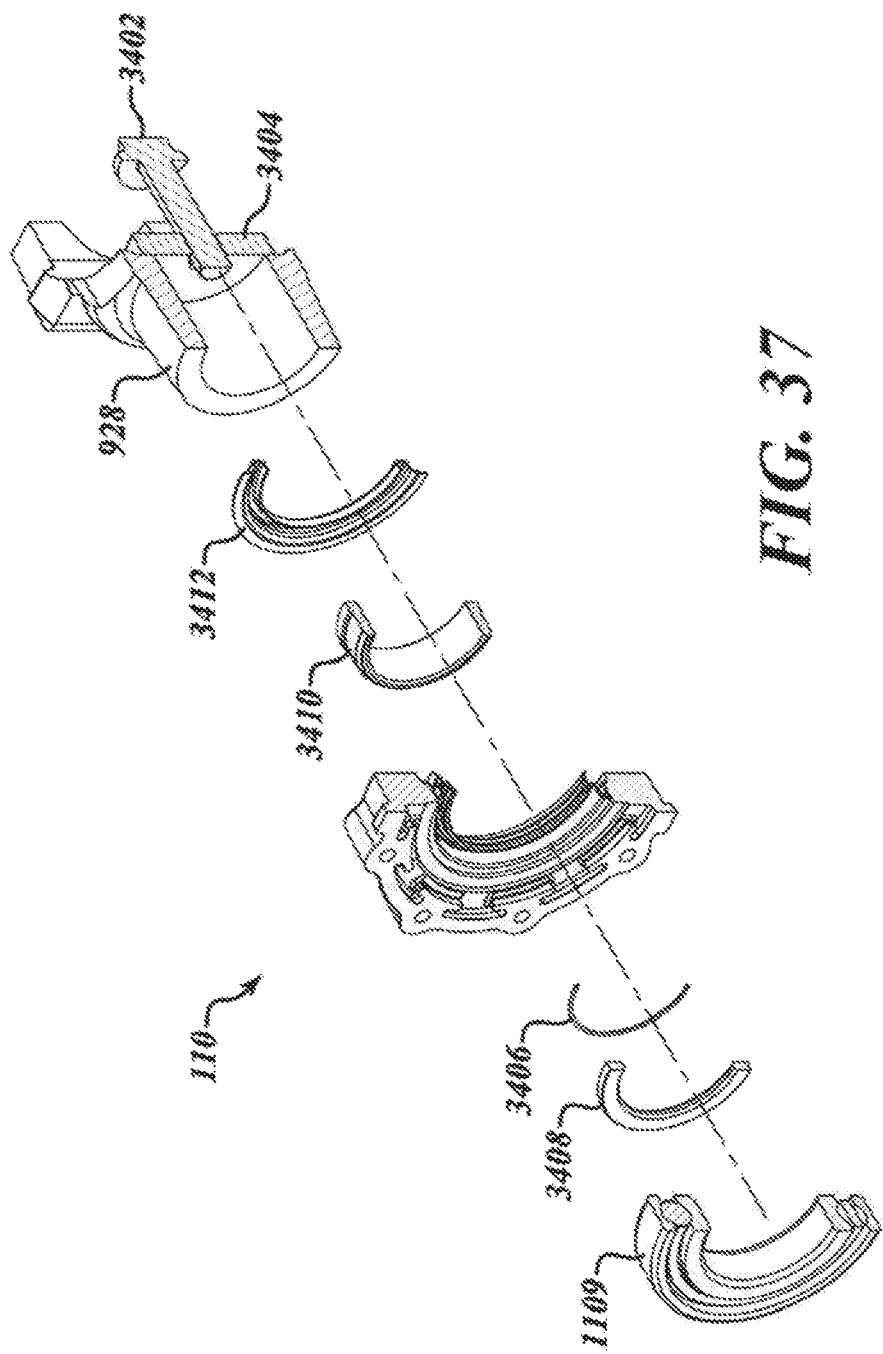

SYSTEM, METHOD, AND APPARATUS FOR OPERATING A HIGH EFFICIENCY, HIGH OUTPUT TRANSMISSION

CROSS REFERENCE TO RELATED APPLICATIONS

This application is a continuation of and claims priority to U.S. patent application Ser. No. 16/596,422 filed Oct. 8, 2019, entitled "SYSTEM, METHOD, AND APPARATUS FOR OPERATING A HIGH EFFICIENCY, HIGH OUTPUT TRANSMISSION," which claims priority to U.S. patent application Ser. No. 15/663,201 filed Jul. 28, 2017, entitled "SYSTEM, METHOD, AND APPARATUS FOR OPERATING A HIGH EFFICIENCY, HIGH OUTPUT TRANSMISSION," which claims priority to the following U.S. Provisional Patent Applications: Ser. No. 62/438,201, filed Dec. 22, 2016, entitled "HIGH EFFICIENCY, HIGH OUTPUT TRANSMISSION"; and Ser. No. 62/465,021, filed Feb. 28, 2017, entitled "SYSTEM, METHOD, AND APPARATUS FOR CONTROLLING A HIGH OUTPUT, HIGH EFFICIENCY TRANSMISSION", each of which is incorporated herein by reference in their entirety.

BACKGROUND

Field

Without limitation to a particular field of technology, the present disclosure is directed to transmissions configured for coupling to a prime mover, and more particularly to transmissions for vehicle applications, including truck applications.

Transmissions serve a critical function in translating power provided by a prime mover to a final load. The transmission serves to provide speed ratio changing between the prime mover output (e.g. a rotating shaft) and a load driving input (e.g. a rotating shaft coupled to wheels, a pump, or other device responsive to the driving shaft). The ability to provide selectable speed ratios allows the transmission to amplify torque, keep the prime mover and load speeds within ranges desired for those devices, and to selectively disconnect the prime mover from the load at certain operating conditions.

Transmissions are subjected to a number of conflicting constraints and operating requirements. For example, the transmission must be able to provide the desired range of torque multiplication while still handling the input torque requirements of the system. Additionally, from the view of the overall system, the transmission represents an overhead device—the space occupied by the transmission, the weight, and interface requirements of the transmission are all overhead aspects to the designer of the system. Transmission systems are highly complex, and they take a long time to design, integrate, and test; accordingly, the transmission is also often required to meet the expectations of the system integrator relative to previous or historical transmissions. For example, a reduction of the space occupied by a transmission may be desirable in the long run, but for a given system design it may be more desirable that an occupied space be identical to a previous generation transmission, or as close as possible.

Previously known transmission systems suffer from one or more drawbacks within a system as described following. To manage noise, robustness, and structural integrity concerns, previously known high output transmission systems use steel for the housing of the transmission. Additionally, previously known high output transmissions utilize a large countershaft with high strength spur gears to manage the high loads through the transmission. Previously known gear sets have relatively few design degrees of freedom, meaning that any shortcomings in the design need to be taken up in the surrounding transmission elements. For example, thrust loads through the transmission, noise generated by gears, and installation issues such as complex gear timing issues, require a robust and potentially overdesigned system in the housing, bearings, and/or installation procedures. Previously known high output transmissions, such as for trucks, typically include multiple interfaces to the surrounding system (e.g. electrical, air, hydraulic, and/or coolant), each one requiring expense of design and integration, and each introducing a failure point into the system. Previously known high output transmissions include a cooler to protect the parts and fluids of the transmission from overheating in response to the heat generated in the transmission. Previously known high output transmissions utilize concentric clutches which require complex actuation and service. Accordingly, there remains a need for improvements in the design of high output transmissions, particularly truck transmissions.

SUMMARY

An example transmission includes an input shaft configured to couple to a prime mover, a countershaft having a first number of gears mounted thereon, a main shaft having a second number of gears mounted thereon, a shifting actuator that selectively couples the input shaft to the main shaft by rotatably coupling at least one of the first number of gears to the countershaft and/or coupling the second number of gears to the main shaft, where the shifting actuator is mounted on an exterior wall of a housing, and where the countershaft and the main shaft are at least partially positioned within the housing.

Certain further embodiments of an example transmission are described following. An example transmission includes an integrated actuator housing, where the shifting actuator is operationally coupled to the integrated actuator housing, and where the shifting actuator is accessible by removing the integrated actuator housing; a number of shifting actuators operationally coupled to the integrated housing actuator, where the number of shifting actuators are accessible by removing the integrated actuator housing; where the shifting actuator is mechanically coupled to the integrated actuator housing; and/or where a number of shifting actuators are mechanically coupled to the integrated housing actuator. An example transmission includes a clutch actuator accessible by removing the integrated actuator housing; where the clutch actuator is a linear clutch actuator; the example transmission further including a clutch actuator housing; where the linear clutch actuator is positioned at least partially within the clutch actuator housing; and where the clutch actuator housing coupled to the integrated actuator housing and/or included as a portion of the integrated actuator housing; where the integrated housing actuator includes a single external power access, and/or where the single external power access includes an air supply port. An example transmission includes the integrated actuator housing defining power connections between actuators operationally coupled to the integrated actuator housing; where the integrated actuator housing is mounted on a vertically upper side of the transmission; where the shifting actuators are accessible without decoupling the input shaft from the prime mover; where the integrated actuator housing is accessible without decoupling the input shaft from the prime mover; where the linear clutch actuator is pneumatically activated; where the linear clutch actuator has a first extended position and a second retracted position, and where the linear clutch actuator includes a near zero dead air volume in the second retracted position; where the dead air volume includes an air volume on a supply side of the linear clutch actuator that is present when the linear clutch actuator is retracted; and/or where the linear clutch actuator has a first extended position and a second retracted position, and where the second retracted position is stable over a selected service life of a clutch operationally coupled to the linear clutch actuator.

An example transmission includes a driveline having an input shaft, a main shaft, and a countershaft that selectively couples the input shaft to the main shaft, a housing element with at least part of the driveline positioned in the housing, where the housing element includes aluminum, and where the transmission is a high output transmission. Certain further embodiments of an example transmission are described following. An example transmission includes the transmission having no cooler; where the countershaft selectively couples the input shaft to the main shaft using helical gear meshes, and/or where the helical gear meshes provide thrust management; where the housing does not takes thrust loads from the driveline; where the helical gear meshes further provide thrust management such that a bearing at a low speed differential position in the transmission takes thrust loads from the driveline; and/or where the bearing taking thrust at a low speed differential position is a bearing operationally coupled to the input shaft and the main shaft. An example transmission further includes a planetary gear assembly coupled to a second main shaft, where the planetary gear assembly includes helical gears; where the planetary gear assembly provides a thrust load in response to power transfer through the planetary gear assembly; where the first main shaft is rotationally coupled to the second main shaft; where the transmission does not include taper bearings in the driveline; where the countershaft is a high speed countershaft; where the transmission includes a number of high speed countershafts; and where a first gear ratio between the input shaft and the countershaft, a second gear ratio between the countershaft and the main shaft, have a ratio where the second gear ratio is greater than the first gear ratio by at least 1.25:1, at least 1.5:1, at least 1.75:1, at least 2:1, at least 2.25:1, at least 2.5:1, at least 2.75:1, at least 3:1, at least 3.25:1, at least 3.5:1, at least 3.75:1, at least 4:1, at least 4.25:1, at least 4.5:1, at least 4.75:1, at least 5:1, at least 6:1, at least 7:1, at least 8:1, at least 9:1, and/or at least 10:1.

An example transmission includes a driveline having an input shaft, a main shaft, and a countershaft that selectively couples the input shaft to the main shaft, and a low loss lubrication system. Certain further embodiments of an example transmission are described following. An example transmission includes the low loss lubrication system having a dry sump; the low loss lubrication system having a lubrication pump assembly positioned within the transmission; the low loss lubrication system including a lubrication pump rotationally coupled to the countershaft, and/or where the countershaft is a high speed countershaft; a lubrication sleeve positioned at least partially within the main shaft, and/or where the lubrication sleeve is an unsealed lubrication sleeve.

An example transmission includes a driveline having an input shaft, a main shaft, and a countershaft that selectively couples the input shaft to the main shaft, a countershaft that includes a number of gears mounted thereon, and a power take-off (PTO) access positioned in proximity to at least one of the number of gears. Certain further embodiments of an example transmission are described following. An example transmission includes the PTO access being an 8-bolt PTO access; the transmission including an aluminum housing; the transmission further having a first end engaging a prime mover and a second end having an output shaft, and a second PTO access positioned at the second end; where the transmission is an automated manual transmission; and/or a second countershaft, where the PTO access is positioned in proximity to the countershaft or the second countershaft.

An example transmission includes an input shaft configured to couple to a prime mover, a countershaft having a first number of gears mounted thereon, a main shaft having a second number of gears mounted thereon, where the first number of gears and the second number of gears are helical gears, and where the transmission is a high output transmission. Certain further embodiment of an example transmission are described following. An example transmission includes an aluminum housing, where the main shaft and the countershaft are at least partially positioned in the housing; a bearing pressed into the housing, where the helical gears manage thrust loads such that the bearing pressed into the housing does not experience thrust loads; where the first number of gears and second number of gears include a shortened tooth height and/or a flattened top geometry.

An example clutch assembly includes a clutch disc configured to engage a prime mover, a pressure plate having a clutch biasing element, where the clutch engagement member couples to a clutch actuation element at an engagement position, and where a clutch adjustment member maintains a consistent engagement position as a face of the clutch disc experiences wear. Certain further embodiments of an example clutch assembly are described following. An example clutch assembly includes the clutch adjustment member having a cam ring operable to rotate in response to clutch disc wear; a pressure plate defining the clutch biasing element and the clutch adjustment member; the pressure plate further defining access holes for the clutch adjustment member; the clutch assembly further including an anti-rotation member operationally coupled to the clutch adjustment member to enforce one-way movement of the clutch adjustment member; and/or the pressure plate further defining at least one access channel for the anti-rotation member.

Architectures for high output, high efficiency, low noise and otherwise improved automated transmissions are disclosed herein, including methods, systems, and components for automated truck transmissions. Such methods and systems may include, among other things, a pair of high speed, twin countershafts. Architectures for 18-speed (including 3×3×2 architectures with three gear boxes) and 12-speed (including 3×2×2 architectures with three gear boxes) are disclosed. In embodiments, such methods and systems include methods and systems for thrust load cancellation, including cancellation of loads across a helical or sun gear used in at least one gear box of the transmission. In embodiments, enclosures, such as for the clutch and various gears are configured such that enclosure bearings are isolated from thrust loads, among other things allowing for use of lightweight materials, such as die cast aluminum, for various components of the transmission, without compromising performance or durability. A low-loss lubrication system may be provided for various components of the transmission.

In embodiments, clutch actuation (including for a linear clutch actuator that may actuate movement of a use a horseshoe, or off-axis, clutch actuator) and gear shift actuation for an automated truck transmission are handled through an integrated electrical and mechanical assembly, which may be mounted in a mounted transmission module (MTM) on the transmission, and which may use a common, integrated air supply for pneumatic actuation of clutch and gear systems, optionally employing integrated conduits, rather than hoses, to reduce the free volume of air and thereby enhance the efficiency, reliability and performance of the gear and clutch actuation systems. The MTM may include a linear clutch actuator, position sensor and valve banks for gear and clutch actuation.

Gear systems, including substantially circular gears and helical gears, may be optimized to reduce noise and provide smooth shifting. Circular gears may have substantially flat teeth, may be wormwheel-ground to provide smooth surfaces, and may be provided with profiles optimized to provide optimized sliding velocity of engagement during gear shifts. The transmission may power power-take off (PTO) interfaces, optionally including multiple PTO interfaces.

An example method includes an operation to provide a first opposing pulse, the first opposing pulse including a first predetermined amount of air above an ambient amount of air in a first closed volume, where pressure in the first closed volume opposes movement of a shift actuator in a shift direction, an operation to provide a first actuating pulse, the first actuating pulse including a second predetermined amount of air above an ambient amount of air in a second closed volume, where pressure in the second closed volume promotes movement of the shift actuator in the shift direction, and an operation to release pressure in the first closed volume and the second closed volume in response to determining a shift completion event.

Certain further operations of the example method are described following, any one or more of which may be included in certain embodiments. The example method further includes: an operation to provide the first actuating pulse as two split pulses, where a first one of the two split pulses is smaller than a first one of the two pulses; where a second one of the two split pulses includes an amount of air substantially equal to the first predetermined amount of air; and/or where the first one of the two split pulses includes an amount such as: between one-tenth and one-fourth of a total amount of air provided by the two split pulses, less than 40% of a total amount of air provided by the two split pulses, less than 33% of a total amount of air provided by the two split pulses, less than 25% of a total amount of air provided by the two split pulses and/or less than 20% of a total amount of air provided by the two split pulses. The example method further includes: the first opposing pulse is performed at least 100 milliseconds (msec) before the first actuating pulse; the first actuating pulse is performed within a 200 msec window; an operation to determine that a synchronizer engagement is imminent, and to provide the first opposing pulse in response to the imminent synchronizer engagement; providing the second predetermined amount of air by determining the second predetermined amount of air in response to a velocity of a shift actuator and a target velocity of a shift actuator; an operation to determine that a synchronizer is in an unblocked condition, and to provide a second opposing pulse in response to the synchronizer being in the unblocked condition; where determining that a synchronizer is in an unblocked condition includes an operation such as: determining that a speed differential between engaging shafts is lower than an unblocking threshold value, determining that a speed differential between engaging shafts is within a predetermined unblocking range value, determining that a synchronizer engagement time value has elapsed, and/or determining that a shift actuator position value indicates the unblocking condition. The example method further includes: an operation to determine that a synchronizer is in an unblocked condition, and to provide a second opposing pulse in response to the synchronizer being in the unblocked condition; where determining that the synchronizer is in an unblocked condition includes at least one operation such as: determining that a speed differential between engaging shafts is lower than an unblocking threshold value, determining that a speed differential between engaging shafts is within a predetermined unblocking range value, determining that a synchronizer engagement time value has elapsed, and/or determining that a shift actuator position value indicates the unblocking condition. The example method further includes: where the first actuating pulse includes a pulse-width-modulated operation; an operation to determine a shift actuator position value, and to modify a duration of the first actuating pulse in response to the shift actuator position value; an operation to determine a shift actuator position value, and to modulate the first actuating pulse in response to the shift actuator position value; where the shift actuator position value includes at least one of: a quantitative position description of the shift actuator; a quantitative velocity description of the shift actuator; and/or a shift state description value corresponding to the shift actuator; where the shift state description value includes at least one of: a neutral position; a neutral departure position; a synchronizer engagement approach position; a synching position; a synchronizer unblock position; an engaged position; and/or a disengaging position.

Certain further operations of the example method are described following, any one or more of which may be included in certain embodiments. The example method further includes where the first actuating pulse includes a shaped air provision trajectory; where the first actuating pulse includes at least one operation to open and close a binary pneumatic valve; an operation to determine at least one shaft speed value, and to determine the predetermined first air amount in response to the at least one shaft speed value; an operation to determine an air supply pressure value, and to determine the predetermined first air amount in response to the air supply pressure value; an operation to determine at least one temperature value, and to determine the predetermined first air amount in response to the at least one temperature value; an operation to determine the predetermined first air amount in response to at least one of: at least one shaft speed value, an air supply pressure value, and/or at least one temperature value; an operation to determine at least one shaft speed value, and to determine a timing of the predetermined first air amount in response to the at least one shaft speed value; an operation to determine an air supply pressure value, and to determine a timing of the predetermined first air amount in response to the air supply pressure value; an operation to determine at least one temperature value, and to determine a timing of the predetermined first air amount in response to the at least one temperature value; an operation to determine a timing of the predetermined first air amount in response to at least one value such as: at least one shaft speed value, an air supply pressure value, and/or at least one temperature value; an operation to determine a reflected driveline inertia value, and to determine the predetermined first air amount in response to the reflected driveline inertia value; an operation to determine a reflected driveline inertia value, and to determine a timing of the predetermined first air amount in response to the reflected driveline inertia value; determining the predetermined first air amount in response to at least one value such as: at least one shaft speed value, an air supply pressure value, at least one temperature value, and/or a reflected driveline inertia value.

Certain further operations of the example method are described following, any one or more of which may be included in certain embodiments. An operation to determine a timing of the predetermined first air amount in response to at least one value such as: at least one shaft speed value, an air supply pressure value, at least one temperature value, and/or a reflected driveline inertia value; an operation to determine a shift actuator position value, and to adjust at least one of the first actuating pulse and the first opposing pulse in response to the shift actuator position value; where adjusting includes interrupting the first actuating pulse and/or the first opposing pulse to synchronize pressure decay in the first closed volume and the second closed volume; an operation to determine a shift actuator position value, and adjusting the first actuating pulse and/or the second opposing pulse in response to the shift actuator position value, and/or where adjusting includes interrupting the first actuating pulse and the second opposing pulse to synchronize pressure decay in the first closed volume and the second closed volume; where modulating the first actuation pulse includes reducing the second predetermined amount of air in response to the shift actuator position value being a shift state description value, and/or reducing the first actuating pulse in response to the shift state description value; where reducing the first actuating pulse includes limiting an air pressure build-up in the second closed volume; where first shift actuator position value includes a shift state description, and where modulating includes reducing the second predetermined amount of air in response to the shift state description indicating a synching position; where reducing the first actuating pulse includes limiting an air pressure build-up in the second closed volume; where providing the first actuating pulse is commenced before the providing the first opposing pulse is commenced.

Certain further operations of the example method are described following, any one or more of which may be included in certain embodiments. The example method further includes an operation to provide a third opposing pulse, the third opposing pulse including a third predetermined amount of air above an ambient amount of air in a third closed volume, where pressure in the third closed volume opposes movement of a second shift actuator in a shift direction, an operation to provide a second actuating pulse, the second actuating pulse including a fourth predetermined amount of air above an ambient amount of air in a fourth closed volume, where pressure in the fourth closed volume promotes movement of the second shift actuator in the shift direction, and an operation to release pressure in the third closed volume and the fourth closed volume in response to determining a second shift completion event; and/or where the first opposing pulse, the third opposing pulse, the first actuating pulse, and the second actuating pulse are performed such that not more than one actuating valve is open simultaneously.

Another example method includes an operation to engage a friction brake to a countershaft of a transmission, to track an engaged time of the friction brake, to determine a target release time for the friction brake, to determine a release delay for the friction brake in response to the engaged time, and to command a release of the friction brake in response to the release delay and the target release time.

Certain further aspects of the example method are described following, any one or more of which may be included in certain embodiments. The example method further includes determining the release delay by determining a pressure decay value in a friction brake actuation volume; where determining the pressure decay value includes an operation to determine a pressure in the friction brake actuation volume; where determining the pressure decay value includes utilizing a pre-determined relationship between engaged time and pressure decay in the friction brake actuation volume; an operation to determine a speed differential between the countershaft and an engaging shaft, and to determine the target release time further in response to the speed differential; where the engaging shaft includes at least one shaft such as: an output shaft, a main shaft, and/or an input shaft; an operation to determine a lumped driveline stiffness value, and to determine the target release time further in response to the lumped driveline stiffness value; an operation to determine a target gear ratio value, and to determine the target release time further in response to the target gear ratio value; an operation to determine a friction brake disengagement dynamic value, and to determine the target release time further in response to the friction brake disengagement dynamic value; an operation to determine a vehicle speed effect, and to determine the target release time further in response to the vehicle speed effect; where the vehicle speed effect includes at least one effect such as: a current vehicle speed, an estimated vehicle speed at a gear engagement time, a vehicle acceleration rate, and/or a vehicle deceleration rate.

An example apparatus includes a backlash indication circuit that identifies an imminent backlash crossing event at a first gear mesh, and a means for reducing engagement force experienced by the first gear mesh in response to the backlash crossing event. Certain non-limiting examples of the means for reducing engagement force experienced by the first gear mesh in response to the backlash crossing event are described following. An example means for reducing engagement force experienced by the first gear mesh further includes means for performing at least one operation such as: disengaging the first gear mesh during at least a portion of the backlash crossing event, disengaging a clutch during at least a portion of the backlash crossing event, and slipping a clutch during at least a portion of the backlash crossing event. An example apparatus includes the backlash indication circuit further identifying the imminent backlash crossing event by determining that a gear shift occurring at a second gear mesh is likely to induce the backlash crossing event at the first gear mesh, and where the means for reducing engagement force experienced by the first gear mesh further includes a means for disengaging the first gear mesh during at least of portion of the gear shift. An example apparatus includes the means for reducing engagement force experienced by the first gear mesh further including a first gear mesh pre-load circuit that provides a disengagement pulse command, where the apparatus further includes a shift actuator responsive to the disengagement pulse command; where the first gear mesh pre-load circuit further provides the disengagement pulse command before the backlash crossing event occurs; where the disengagement pulse command includes a fifth predetermined amount of air above an ambient amount of air in a fifth closed volume, and where pressure in the fifth closed volume promotes movement of the shift actuator in the disengagement direction; where the disengagement pulse command further includes a sixth predetermined amount of air above an ambient amount of air in a sixth closed volume, where pressure in the sixth closed volume opposes movement of the shift actuator in the disengagement direction; where the first gear pre-load circuit further determines the fifth predetermined amount of air and the sixth predetermined amount of air such that the shift actuator is urged into a neutral position in response to a release of engagement force; where the first gear pre-load circuit further provides the disengagement pulse command before a first backlash crossing of the backlash crossing event; and/or where the first gear pre-load circuit further provides the disengagement pulse command before a subsequent backlash crossing of the backlash crossing event. An example apparatus includes the backlash indication circuit further identifies the imminent backlash crossing event by performing at least one operation such as: determining that an imminent rotational direction of the first gear mesh in a transmission is an opposite rotational direction to an established rotational direction of the first gear mesh, determining that a speed change between a first shaft comprising gears on one side of the first gear mesh and a second shaft comprising gears on an opposing side of the first gear mesh is likely to induce the backlash crossing event, determining that a gear shift occurring at a second gear mesh is likely to induce the backlash crossing event at the first gear mesh, determining that a transmission input torque value is at an imminent zero crossing event, and/or determining that a vehicle operating condition is likely to induce the backlash crossing event.

An example system includes and/or interacts with a prime mover providing motive torque, and the system includes a torque transfer path operatively coupling the motive torque to drive wheels, the torque transfer path including: a clutch that selectively decouples the prime mover from an input shaft of the torque transfer path, where the input shaft is operationally downstream of the clutch; a first gear mesh and a second gear mesh, each gear mesh having an engaged and a neutral position, and where both gear meshes in the engaged position couple the input shaft to the drive wheels, and where either gear mesh in the neutral position decouples the input shaft from the drive wheels; a first shift actuator that selectively operates the first gear mesh between the engaged and neutral position; a second shift actuator that selectively operates the second gear mesh between the engaged and neutral position; and a controller including: a vehicle state circuit that interprets at least one vehicle operating condition; a neutral enforcement circuit that provides a first neutral command to the first shift actuator and a second neutral command to the second shift actuator, in response to the vehicle operating condition indicating that vehicle motion is not intended.

Certain example aspects of the example system are described following, any one or more of which may be included in certain embodiments. An example system further includes the at least one vehicle operation condition including at least one value such as: an engine crank state value, a gear selection value, a vehicle idling state value, and/or a clutch calibration state value; the vehicle state circuit further determining a vehicle stopped condition, and where the neutral enforcement circuit further provides the first neutral command and the second neutral command in response to the vehicle stopped condition;
the controller further including a shift rail actuator diagnostic circuit that diagnoses proper operation of at least one shift rail position sensor in response to a vehicle speed value; the vehicle state circuit further interpreting at least one failure condition, and providing a vehicle stopping distance mitigation value in response to the at least one failure condition; the controller further including a clutch override circuit that provides a forced clutch engagement command in response to the vehicle stopping distance mitigation value; where the clutch override circuit further provides a forced clutch engagement command in response to the vehicle stopping distance mitigation value, and further in response to at least one value such as: a motive torque value representative of the motive torque, an engine speed value representative of a speed of the prime mover, an accelerator position value representative of an accelerator pedal position, a service brake position value representative of a position of a service brake position, a vehicle speed value representative of a speed of the drive wheels, and/or a service brake diagnostic value.

Another example system includes a clutch that selectively decouples a prime mover from an input shaft of a transmission, a progressive actuator operationally coupled to the clutch, where a position of the progressive actuator corresponds to a position of the clutch, and a controller including: a clutch characterization circuit that interprets a clutch torque profile, the clutch torque profile providing a relation between a position of the clutch and a clutch torque value, a clutch control circuit that commands a position of the progressive actuator in response to a clutch torque reference value and the clutch torque profile, and where the clutch characterization circuit further interprets a position of the progressive actuator and an indicated clutch torque, and updates the clutch torque profile in response to the position of the progressive actuator and the indicated clutch torque.

Certain further aspects of the example system are described following, any one or more of which may be included in certain embodiments. An example system includes the clutch torque profile including a first clutch engagement position value, and where the clutch control circuit further utilizes the first clutch engagement position value as a maximum zero torque position; where the clutch characterization circuit further interprets the clutch torque profile by performing a clutch first engagement position test, the clutch first engagement position test including: determining that an input shaft speed is zero, the clutch control circuit positioning the clutch at the first engagement position value, and comparing an acceleration of the input shaft speed to a first expected acceleration value of the input shaft speed; the clutch characterization circuit further performing the clutch first engagement position test a number of times; the clutch first engagement position test further including a friction brake control circuit that commands a friction brake to bring the input shaft speed to zero; where the clutch torque profile includes a second clutch engagement position value, and wherein the clutch control circuit further utilizes the second clutch engagement position value as a minimum significant engagement torque position; where the clutch characterization circuit further interprets the clutch torque profile by performing a clutch second engagement position test, the clutch second engagement position test including: determining that an input shaft speed is zero, the clutch control circuit positioning the clutch at the second engagement position value, and comparing an acceleration of the input shaft speed to a second expected acceleration value of the input shaft speed; where the clutch characterization circuit further performs the clutch second engagement position test a number of times; where the clutch second engagement position test further includes a friction brake control circuit that commands a friction brake to bring the input shaft speed to zero; where the clutch torque profile includes a first clutch engagement position value and a second clutch engagement position value, and/or where the clutch control circuit further utilizes the first clutch engagement position value as a maximum zero torque position and utilizes the second clutch engagement position value as a minimum significant engagement torque position. An example system further includes the clutch torque profile further including a clutch torque curve including a number of clutch position values corresponding to a number of clutch torque values, where each of the clutch position values is greater than the second clutch engagement position value; where the clutch characterization circuit further interprets the clutch torque profile by performing a clutch second engagement position test, the clutch second engagement position test including determining that an input shaft speed is zero, the clutch control circuit positioning the clutch at the second engagement position value, and comparing an acceleration of the input shaft speed to a second expected acceleration value of the input shaft speed, and adjusting the clutch torque curve in response to a change in the clutch second engagement position; where the clutch characterization circuit further determines that the clutch is operating in a wear-through mode in response to at least one of the first engagement position value and the second engagement position value changing at a rate greater than a clutch wear-through rate value; and/or where the controller further includes a clutch wear circuit that determines a clutch wear value in response to a clutch temperature value, a clutch power throughput value, and/or a clutch slip condition, and where the clutch characterization circuit further updates the clutch torque profile in response to the clutch wear value.

An example method includes an operation to interpret a clutch temperature value, to interpret a clutch power throughput value, to interpret that a clutch is in a slip condition, and, in response to the clutch temperature value, the clutch power throughput value, and the clutch slip condition, to determine a clutch wear value.

Certain further operations for the example method are described following, any one or more of which may be included in certain embodiments. An example method includes determining the clutch wear value includes accumulating a clutch wear index, the clutch wear index determined in response to the clutch temperature value, the clutch power throughput value, and the clutch slip condition; determining that a clutch is in a wear-through mode in response to the clutch wear index exceeding a wear-through threshold value; providing a clutch diagnostic value in response to the clutch wear index; and/or where providing the clutch diagnostic value includes at least one operation such as: providing a clutch wear fault value, incrementing a clutch wear fault value, communicating the clutch diagnostic value to a data link, and/or providing the clutch diagnostic value to a non-transient memory location accessible to a service tool.

An example system includes a clutch that selectively decouples a prime mover from an input shaft of a transmission, a progressive actuator operationally coupled to the clutch, where a position of the progressive actuator corresponds to a position of the clutch, and a means for providing a consistent lock-up time of the clutch, the lock-up time comprising a time commencing with a clutch torque request time and ending with a clutch lock-up event. Certain non-limiting examples of the means for providing a consistent lock-up time of the clutch are described following. An example means for providing the consistent lock-up time of the clutch includes a controller having a clutch control circuit, where the clutch control circuit commands a position of the progressive actuator in response to a clutch torque reference value and the clutch torque profile to achieve the consistent lock-up time of the clutch; where the progressive actuator includes a linear clutch actuator; and/or where the linear clutch actuator includes a near zero dead air volume. An example means for providing the consistent lock-up time of the clutch further includes a controller having a launch characterization circuit, the launch characterization circuit structured to interpret at least one launch parameter such as: a vehicle grade value, a vehicle mass value, and/or a driveline configuration value; and/or where the driveline configuration value includes at least one value such as: a target engagement gear description, a reflected driveline inertia value, and/or a vehicle speed value. An example means for providing the consistent lock-up time of the clutch further includes a controller having a clutch control circuit, where the clutch control circuit commands a position of the progressive actuator in response to a clutch torque reference value, the clutch torque profile, and at least one launch parameter to achieve the consistent lock-up time of the clutch; and/or where the clutch control circuit further commands the position of the progressive actuator in response to a clutch slip feedback value. An example means for providing the consistent lock-up time of the clutch further includes a controller having a clutch control circuit, where the clutch control circuit commands a position of the progressive actuator in response to a clutch torque reference value, the clutch torque profile, and/or a clutch slip feedback value. An example system further includes the clutch torque request time including at least one request condition such as: a service brake pedal release event, a service brake pedal decrease event, a gear engagement request event, and/or a prime mover torque increase event; and/or where the clutch lock-up event includes a clutch slip value being lower than a clutch lock-up slip threshold value.

An example method includes an operation to interpreting a motive torque value, a vehicle grade value, and a vehicle acceleration value; to determine a first correlation including a first correlation between the motive torque value and the vehicle grade value, to determine a second correlation between the motive torque value and the vehicle acceleration value, and to determine a third correlation between the vehicle grade value and the vehicle acceleration value, an operation to adapt an estimated vehicle mass value, an estimated vehicle drag value, and an estimated vehicle effective inertia value in response to the first correlation, the second correlation, and the third correlation, an operation to determine an adaptation consistency value, and in response to the adaptation consistency value, to adjust an adaptation rate of the adapting, and an operation to iteratively perform the preceding operations to provide an updated estimated vehicle mass value.

Certain further operations of the example method are described following, any one or more of which may be included in certain embodiments. An example method includes adapting by one of slowing or halting adapting of the estimated values in response to the first correlation, the second correlation, and the third correlation having an unexpected correlation configuration; adapting by increasing or continuing adapting the estimated values in response to the first correlation, the second correlation, and the third correlation having an expected correlation configuration; where the expected correlation configuration includes a positive correlation for the first correlation and the second correlation, and a negative correlation for the third correlation; where the expected correlation configuration further includes a linearity value corresponding to each of the first correlation, the second correlation, and the third correlation; where the adapting includes one of slowing or halting adapting the estimated values in response to the first correlation, the second correlation, and the third correlation having an unexpected correlation configuration; where the unexpected correlation includes a negative correlation for the first correlation and/or the second correlation, and/or a positive correlation for the third correlation. An example method includes adjusting the adaptation rate by increasing or holding an adjustment step size in the estimated vehicle mass value, the estimated vehicle effective inertia value, and/or the estimated vehicle drag value in response to the adaptation performing at least one operation such as: monotonically changing each estimated value, and/or and monotonically changing at least one estimated value and holding the other estimated value(s) at a same value; where adjusting the adaptation rate includes decreasing an adjustment step size in estimated vehicle mass value, the estimated vehicle effective inertia value, and/or the estimated vehicle drag value in response to the adaptation changing a direction of adaptation in at least one of the estimated values; and/or where the adjusting the adaptation rate is performed in response to the changing the direction being a change greater than a threshold change.

An example method includes an operation to determine that a shift rail position sensor corresponding to a shift actuator controlling a reverse gear is failed, to determine that a gear selection is active requiring operations of the shift actuator, and in response to the gear selection and the failed shift rail position sensor, performing in order: commanding the shift actuator to a neutral position, confirming the neutral position by commanding a second shift actuator to engage a second gear, wherein the second shift actuator is not capable of engaging the second gear unless the shift actuator is in the neutral position, and confirming the second shift actuator has engaged the second gear, and commanding the shift actuator into the gear position in response to the gear selection.

Certain further operations of the example method are described following, any one or more of which may be included in certain embodiments. An example method includes determining the shift rail position sensor is failed by determining the shift rail position sensor is failed out of range; where determining the shift rail position sensor is failed includes determining the shift rail position sensor is failed in range; and/or where determining the shift rail position sensor is failed in range includes, in order: commanding the shift actuator to the neutral position, commanding the shift actuator to an engaged position, determining if the shift actuator engaged position is detected, in response to the shift actuator engaged position not being detected, confirming the neutral position by: commanding the shift actuator to the neutral position, commanding a second shift actuator to engage a second gear, where the second shift actuator is not capable of engaging the second gear unless the shift actuator is in the neutral positon, and confirming the second shift actuator has engaged the second gear, and determining the shift rail position sensor is failed in range in response to the neutral position being confirmed, and determining a shift rail operated by the shift actuator is stuck in response to the neutral position not being confirmed.

An example system includes a transmission having a solenoid operated actuator, and a controller including: a solenoid temperature circuit that determines an operating temperature of the solenoid, a solenoid control circuit that operates the solenoid in response to the operating temperature of the solenoid, where the operating includes providing an electrical current to the solenoid, such that a target temperature of the solenoid is not exceeded.

Certain further aspects of the example system are described following, any one or more of which may be included in certain embodiments. An example system includes the solenoid temperature circuit further determining the operating temperature of the solenoid in response to an electrical current value of the solenoid and an electrical resistance value of the solenoid; the solenoid temperature circuit further determining the operating temperature of the solenoid in response to a thermal model of the solenoid; the solenoid operated actuator including a reduced nominal capability solenoid; the solenoid operated actuator including at least one actuator such as: a clutch actuator, a valve actuator, a shift rail actuator, and a friction brake actuator; and/or where the solenoid control circuit further operates the solenoid by modulating at least one parameter such as: a voltage provided to the solenoid, a cooldown time for the solenoid, and/or a duty cycle of the solenoid.

An example system includes a transmission having at a pneumatic clutch actuator, a clutch position sensor configured to provide a clutch actuator position value, and a controller including: a clutch control circuit that provides a clutch actuator command, where the pneumatic clutch actuator is responsive to the clutch actuator command, and a clutch actuator diagnostic circuit that determines that a clutch actuator leak is present in response to the clutch actuator command and the clutch actuator position value.

Certain further aspects of the example system are described following, any one or more of which may be included in certain embodiments. An example system includes the clutch actuator diagnostic circuit further determining the clutch actuator leak is present in response to the clutch actuator position value being below a threshold position value for a predetermined time period after the clutch actuator command is active; where the clutch actuator diagnostic circuit further determines the clutch actuator leak is present in response to the clutch actuator position value being below a clutch actuator position trajectory value, the clutch actuator position trajectory value including a number of clutch actuator position values corresponding to a plurality of time values; and the system further including a source pressure sensor configured to provide a source pressure value, and where the clutch actuator diagnostic circuit further determines the clutch actuator leak is present in response to the source pressure value.

An example system further includes a transmission having at least one gear mesh operatively coupled by a shift actuator, and a controller including a shift characterization circuit that determines that a transmission shift operation is experiencing a tooth butt event, the system further including a means for clearing the tooth butt event. Certain non-limiting examples of the means for clearing the tooth butt event are described following. An example means for clearing the tooth butt event includes the controller further including a shift control circuit, where the shift control circuit provides a reduced rail pressure in a shift rail during at least a portion of the tooth butt event, where the shift rail is in operationally coupled to the shift actuator. An example means for clearing the tooth butt event includes the controller including a clutch control circuit, where the clutch control circuit modulates an input shaft speed in response to the tooth butt event, and/or where the clutch control circuit further modulates the input shaft speed by commanding a clutch slip event in response to the tooth butt event. An example means for clearing the tooth butt event includes the controller including a friction brake control circuit, where the friction brake control circuit modulates a countershaft speed in response to the tooth butt event. An example means for clearing the tooth butt event includes a means for controlling a differential speed between shafts operationally coupled to the gear mesh to a selected differential speed range, where the selected differential speed range includes at least one speed range value such as: less than a 200 rpm difference; less than a 100 rpm difference; less than a 50 rpm difference; about a 50 rpm difference; between 10 rpm and 100 rpm difference; between 10 rpm and 200 rpm difference; and/or between 10 rpm and 50 rpm difference.

An example system includes a clutch that selectively decouples a prime mover from an input shaft of a transmission, a progressive actuator operationally coupled to the clutch, where a position of the progressive actuator corresponds to a position of the clutch, and a means for disengaging the clutch to provide a reduced driveline oscillation, improved driver comfort, and/or reduced part wear. Certain non-limiting examples of the means for disengaging the clutch are described following. An example means for disengaging the clutch includes a controller having a clutch control circuit that modulates a clutch command in response to at least one vehicle operating condition, and where the progressive actuator is responsive to the clutch command; where the at least one vehicle operating condition such as: a service brake position value, a service brake pressure value, a differential speed value between two shafts in a transmission including the clutch and progressive actuator, and/or an engine torque value; and/or where the clutch control circuit further modulates the clutch command to provide a selected clutch slip amount.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures:

FIG. 19 depicts an example bushing lubrication tube.
FIG. 20 depicts an example bushing lubrication tube.
FIG. 30 depicts a cutaway view of an example countershaft.
FIG. 31 depicts a detail of an example roller bearing.
FIG. 32 depicts a detail of an example roller bearing.
FIG. 34 depicts a cutaway of an example planetary gear assembly.
FIG. 37 depicts an example output shaft assembly portion.

DETAILED DESCRIPTION

Figure 1:
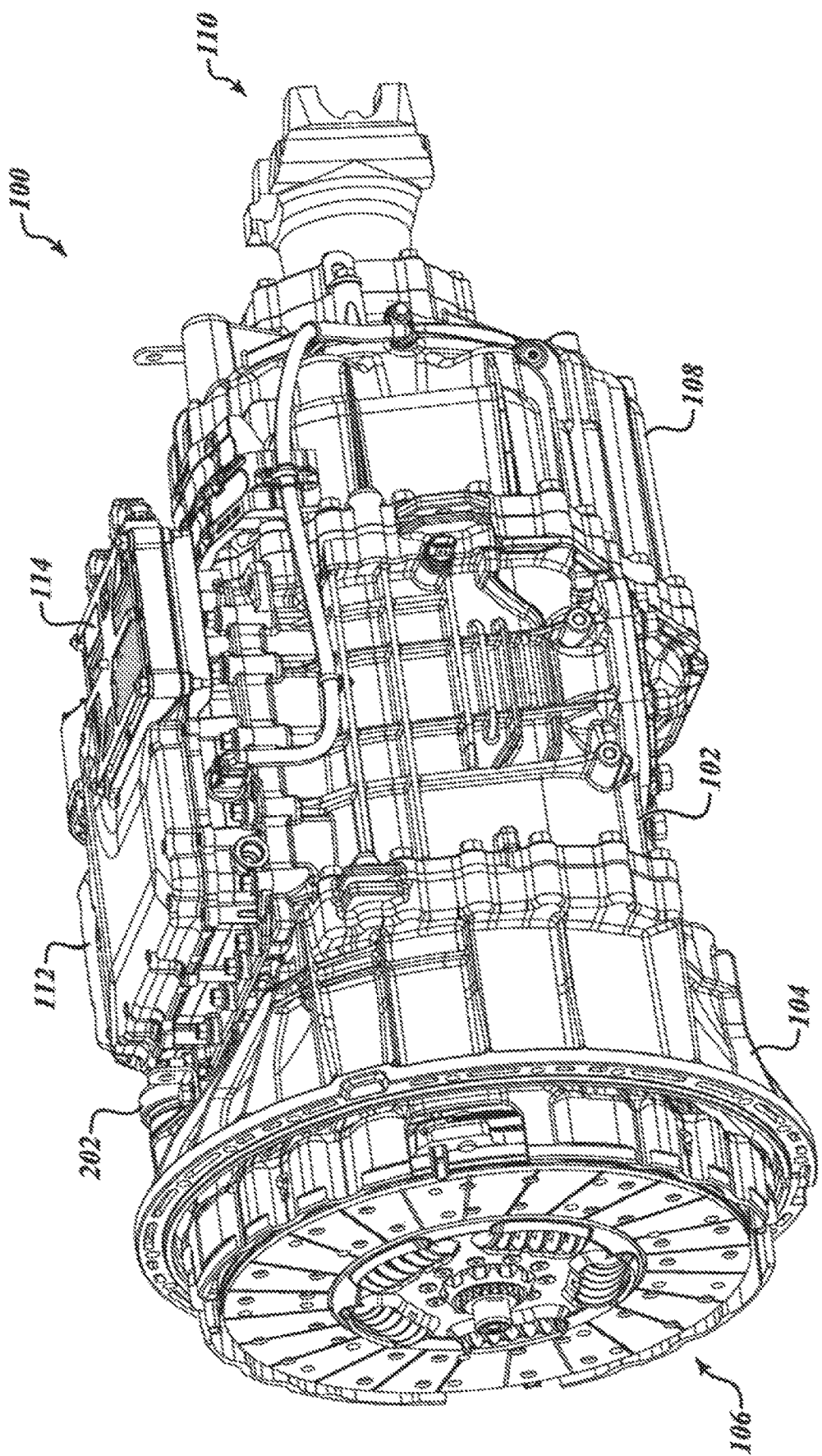
FIG. 1 depicts an example transmission.

Referencing FIG. 1, an example transmission 100 having one or more aspects of the present disclosure is depicted. The example transmission 100 includes a main housing 102, the main housing 102 defines the outer shape of portions of the transmission 100 and in certain embodiments the main housing 102 includes one or more components made of aluminum. The example main housing 102 is coupled to a clutch housing 104, wherein the clutch housing 104 includes or is operationally coupled to a clutch 106. The example transmission 100 further includes a rear housing 108. The rear housing 108 provides aspects of the transmission 100 enclosure at the rear, including in certain embodiments a planetary or helical gear set disposed within the rear housing 108, having structural engagement with an output shaft assembly 110.

The example transmission 100 includes an integrated actuator housing 112 coupled to the main housing 102. The integrated actuator housing 112 in the example of FIG. 1 is coupled to the top of the transmission 100, and the main housing 102 includes an opening (not shown) at the position where the integrated actuator housing 112 coupled to the main housing 102. In the example transmission 100 the opening in the main housing 102 provides access for actuators operationally coupled to the integrated actuator housing 112, including for example a clutch actuator and/or one or more gear shifting actuators. Example transmission 100 further includes a transmission control module 114 (TCM), where the example TCM 114 couples directly to the integrated actuator housing 112.

The arrangement of the aspects of the transmission 100 depicted in FIG. 1 is an example and nonlimiting arrangement. Other arrangements of various aspects are contemplated herein, although in certain embodiments one or more of the arrangements depicted in FIG. 1 may be advantageous as described throughout the present disclosure. Particular arrangements and aspects of the transmission 100 may be included in certain embodiments, including one or more of the aspects arranged as depicted, and one or more of the aspects arranged in a different manner as would be understood to one of skill in the art contemplating a particular application and/or installation.

The description of spatial arrangements in the present disclosure, for example front, rear, top, bottom, above, below, and the like are provided for convenience of description and for clarity in describing the relationship of components. The description of a particular spatial arrangement and/or relationship is nonlimiting to embodiments of a transmission 100 consistent with the present disclosure, in a particular transmission 100 may be arranged in any manner understood in the art. For example, and without limitation, a particular transmission 100 may be installed such that a "rear" position may be facing a front, side, or other direction as installed on a vehicle and/or application. Additionally or alternatively, the transmission 100 may be rotated and or tilted about any axis, for example and without limitation at an azimuthal angle relative to a driveline (e.g. the rotational angle of the clutch 106), and/or a tilting from front to back such as to accommodate an angled driveline. Accordingly, one or more components may be arranged relatively as described herein, and a component described as above another component may nevertheless be the vertically lower component as installed in a particular vehicle or application. Further, components for certain embodiments may be arranged in a relative manner different than that depicted herein, resulting in a component described as above another component being vertically lower for those certain embodiments or resulting in a component described as to the rear of another being positioned forward of the other, depending on the frame of reference of the observer. For example, an example transmission 100 includes two countershafts (not shown) and a first particular feature engaging an upper countershaft may be described and depicted as above a second particular feature engaging a lower countershaft; it is nevertheless contemplated herein that an arrangement with the first particular feature engaging the lower countershaft in the second particular feature engaging the upper countershaft is consistent with at least certain embodiments of the present disclosure, except where context indicates otherwise.

Figure 2:
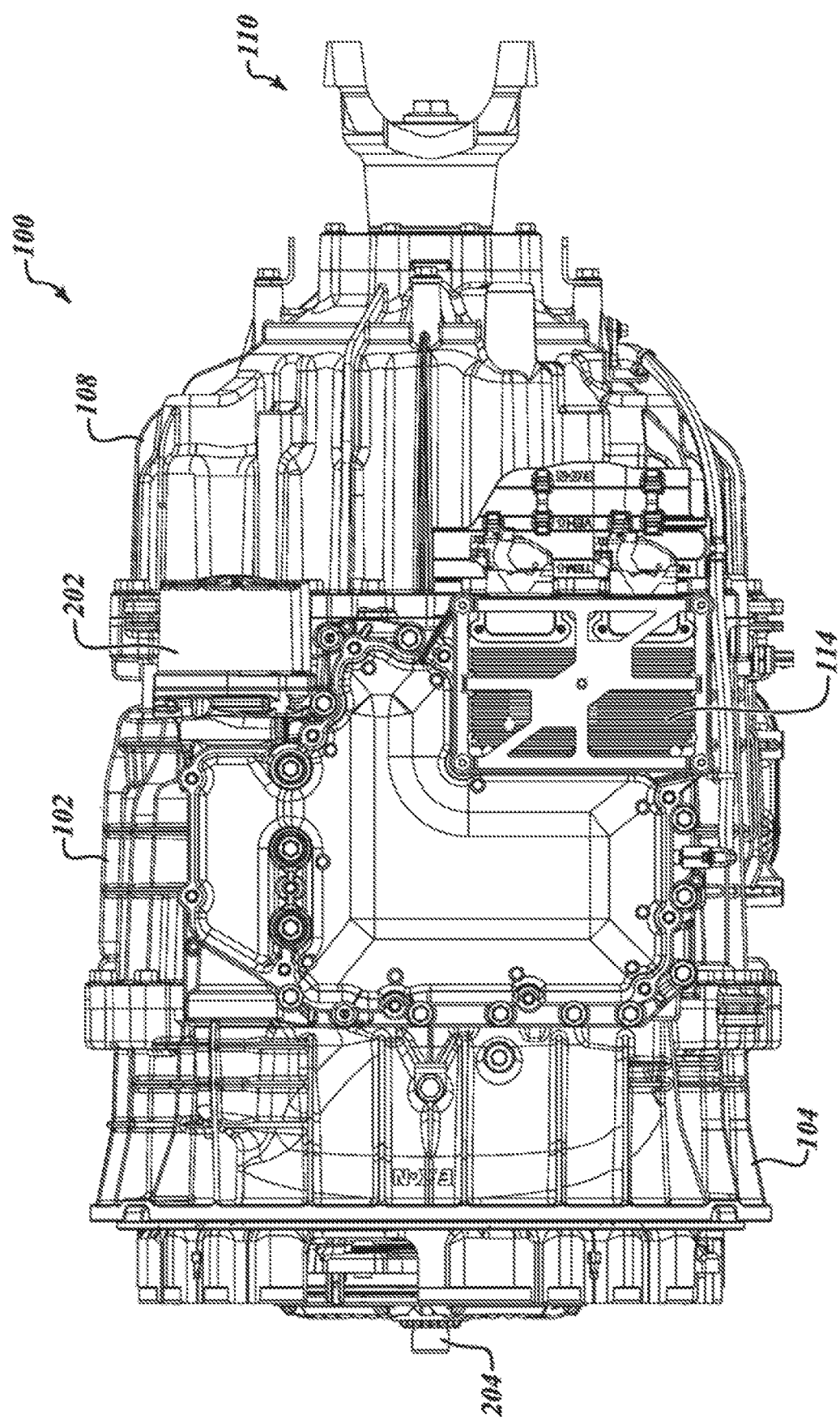
FIG. 2 depicts an example transmission.

Referencing FIG. 2, a transmission 100 is depicted in a top view, wherein the transmission 100 depicted in FIG. 2 is consistent with the transmission 100 depicted in FIG. 1. In the top view of the transmission 100, the rear housing 108, the clutch housing 104, and the main housing 102 remain visible. Additionally, the integrated actuator housing 112 and TCM 114 are visible at the top of the main housing 102. The example transmission 100 further includes a clutch actuator housing 202 that provides accommodation for a clutch actuator assembly (not shown in FIG. 2). Clutch actuator housing 202 is depicted as a portion of the integrated actuator housing 112 and positioned at the top of the transmission 100. The example clutch actuator housing 202 and clutch actuator assembly, as evidenced by the position of the clutch actuator housing 202, engages an upper countershaft at the rear side; however, a lubrication pump assembly may engage one or more countershafts at any axial position along the transmission 100. Further details of an example lubrication pump assembly are described in other portions of the present disclosure.

The example transmission 100 of FIG. 2 further depicts the output shaft assembly 110 at a rear of the transmission, in the example depicted as a standard driveline output shaft assembly 110; however, any output shaft assembly 110 design for the particular application is contemplated herein. The transmission 100 further depicts an input shaft 204, in the example the input shaft 204 extends through the clutch 106 on the outside of the transmission 100, in engages a prime mover shaft, such as tail shaft. An example input shaft 204 includes a spline engagement with a prime mover shaft, although any coupling arrangement understood in the art is contemplated herein.

The example transmission 100 depicted in FIG. 2 includes a single air input line (not shown), which in the example is pneumatically coupled to the integrated actuator housing 112. In certain embodiments, the transmission 100 includes a clutch actuator and one or more shift actuators, wherein the clutch actuator and the shift actuator(s) are powered by a single or common air input supply line as depicted in the example of FIG. 2. Additionally or alternatively, each of the actuators may be powered by separate power inputs, and/or alternative power sources, such as, but not limited to, a hydraulic and/or an electric source.

Figure 3:
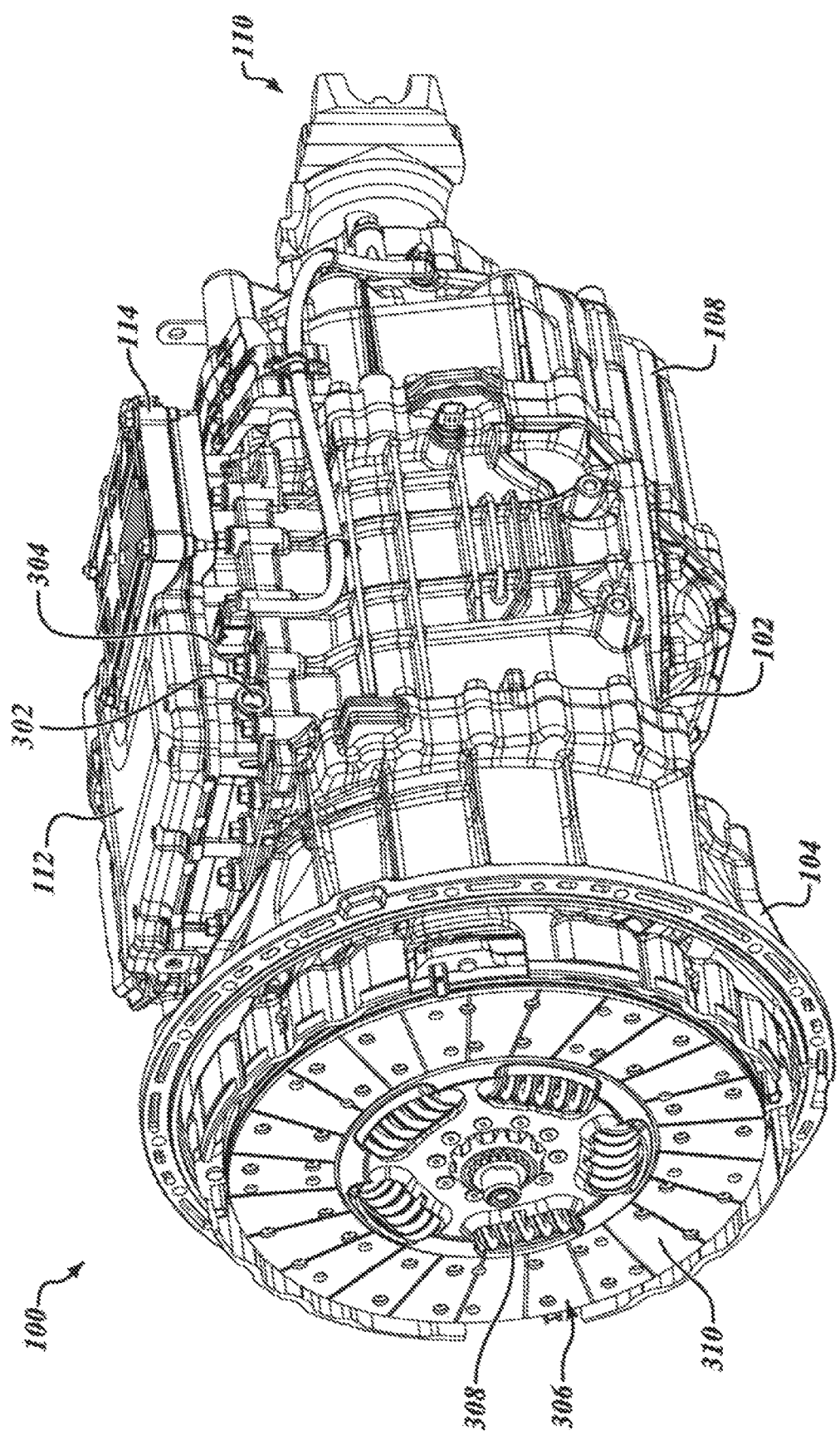
FIG. 3 depicts an example transmission.

Referencing FIG. 3, a transmission 100 arranged in a similar orientation to the representation depicted in FIG. 1 is illustrated to more clearly show certain aspects of the transmission 100. The example transmission 100 includes the integrated actuator housing 112, wherein an air input port 302 provides pneumatic access for the air input supply to engage the clutch actuator and the shift actuator(s). The example transmission 100 includes only a single power input to operate all actuators, and in further embodiments the single power input is included as an air input port 302. In embodiments, a single air supply is provided for pneumatic actuation of the clutch actuator (such as a linear clutch actuator (LCA) and each of the gear shift actuators (e.g., actuators for front, main and rear gear boxes). In embodiments, the air supply is handled within the integrated actuator housing via a set of conduits that accept air from the air input supply and deliver the air to power movement of each of the actuators. The conduits may be integrated (e.g., machined, cast, etc.) into the housing/structure of the integrated actuator housing, such that air is delivered without requiring separate hoses or the like, between the air input supply and the respective actuators for clutch and gear movement. Among other benefits, this removes potential points of failure (such as leaky hoses or poor connections to hoses) and allows very precise control (because, among other reasons, the volume of air is smaller and more precisely defined that for a hose-based system). It should be understood that a given integrated actuator housing 112 includes the number and type of power access points for the particular arrangement, such as an electrical and/or hydraulic input, and/or more than one input of a given type, such as pneumatic. Additionally or alternatively, in certain embodiments the transmission 100 includes one or more power inputs positioned in locations distinct from the location of the air input port 302 in the example of FIG. 4.

The example transmission 100 depicted in FIG. 3 further shows a sensor port 304. In the example of FIG. 3, sensor port 304 couples a controller on the TCM 114 to a speed sensor on the output shaft assembly 110 of the transmission 100. Referencing FIG. 4, a sensor coupler 404 operationally couples a sensor (e.g. a speed sensor of any type, such as a hall effect, variable reluctance, tachograph, or the like) to the sensor connector 304, for example to provide an output shaft speed value to the TCM 114. Additionally, the transmission 100 includes an oil pressure sensor 406. In embodiments, a given transmission 100 may include any number of sensors of any type desired, including having no speed sensor and/or other sensors. In certain embodiments, the type and source of information may vary with the control features and diagnostics present in the system. Additionally or alternatively, any given sensed value may instead be determined from other values known in the system (e.g. a virtual sensor, model, or other construction or derivation of a given value from other sensors or other known information), and/or any given sensed value may be determined from a datalink communication or alternate source rather than or in addition to a direct sensor coupled to a controller. The controller may be in communication with any sensor and/or actuator anywhere on the transmission 100 and/or within a system including or integrated with the transmission 100, such as a driveline, vehicle, or other application, as well as with remote systems, such as through one or more communications networks, such as Bluetooth™, cellular, WiFi, or the like, including to remote systems deployed in the cloud, such as for telematics and similar applications, among others.

Figure 4:
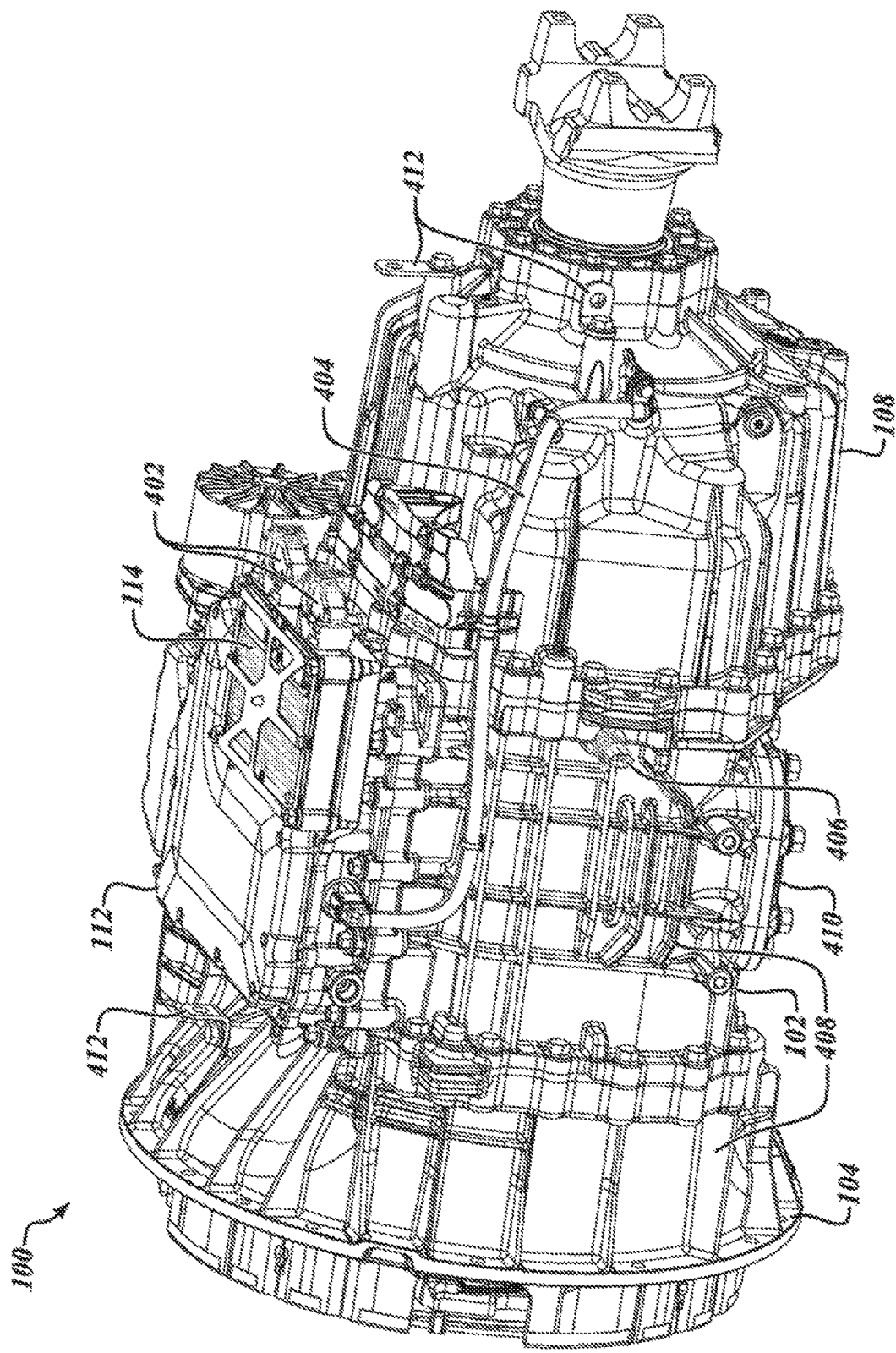
FIG. 4 depicts an example transmission.

The example transmission 100 includes a pair of electrical connectors 402 (reference FIG. 4), depicted as two standard 20-pin connectors in the example depicted in FIG. 4, although any electrical interface may be utilized. An example TCM 114 includes an electrical connection between the TCM 114 and the integrated actuator housing 112, for example wherein the TCM 114 plugs into the integrated actuator housing 112 providing electrical datalink communication (e.g. between a controller present on the integrated actuator and the controller on the TCM 114—not shown) and/or direct actuator control of actuators in the integrated actuator housing 112. In certain embodiments, a single controller may be present which performs all operations on the transmission 100, and/or the functions of the transmission 100 may be divided among one or more controllers distinct from the controller arrangement depicted in FIG. 4. For example and without limitation, a vehicle controller, application controller, engine controller, or another controller present in the transmission 100 or overall system may include one or more functions of the transmission 100.

The example transmission 100 further includes a clutch 106. The example clutch 106 includes a clutch face 306 and one or more torsional springs 308. Example clutch face 306 includes a number of frictional plates 310, and the clutch face 306 presses against an opposing face from a prime mover (not shown), for example a flywheel of the engine. The torsional springs 308 of the example clutch face 306 provide rotational damping of the clutch 106 to transient forces while maintaining steady state alignment of the clutch 106. The clutch face 306 may alternatively be any type of clutch face understood in the art, including for example a single frictional surface rather than frictional plates 310. In the example clutch face 306, the frictional plates 310 are included as a portion of the clutch face 306. The divisions between the clutch plates are provided as grooved divisions of the clutch face 306 base material to provide desired performance (e.g. frictional performance, debris management, and/or heat transfer functions), but any clutch face 306 configuration including alternate groove patterns and/or no presence of grooves is contemplated herein. The material of the example clutch face 306 may be any material understood in the art, including at least a ceramic material and/or organic clutch material. In embodiments, as depicted in more detail below, the clutch 106 may be positioned off-axis relative to the prime mover, is disposed around (such as via a yoke, horseshoe or similar configuration) the prime mover (e.g., a shaft), is pivotably anchored on one side (such as by a hinge or similar mechanism that allows it to pivot in the desired direction of movement of the clutch 106, and is actuated by the linear clutch actuator (which may also be positioned off-axis, opposite the anchoring side, so that linear actuation causes the clutch to pivot in the desired direction).

Referencing FIG. 4, an example transmission 100 is depicted from a side view, with the output shaft assembly 110 positioned at the left side of FIG. 4, in the clutch housing 104 positioned at the right side of FIG. 4. The transmission 100 depicted in FIG. 4 includes numerous features that may be present in certain embodiments. For example, numerous fins 408 and/or projections are present that provide selected stress characteristics, management of stress in the housing, and or selected heat transfer characteristics. The example transmission 100 further depicts a power take off device (PTO) interface 410 that allows access for a PTO installation to engage the transmission on a lower side. Additionally or alternatively the transmission 100 may include a second PTO interface on the rear of the transmission (not shown), for example to allow PTO engagement at the rear of the transmission 100. A rear PTO engagement may be provided with a hole (which may be plugged for a non-PTO installation) or other access facility, where the PTO may be engaged, for example, with a quill shaft engaging one of the countershafts of the transmission 100 on a first end and providing an engagement surface, such as a spline, on a second end extending from the transmission 100. The example transmission of FIG. 4 additionally depicts a number of lift points 412, which are optionally present, and which may be arranged as shown or in any other arrangement or position.

Figure 5:
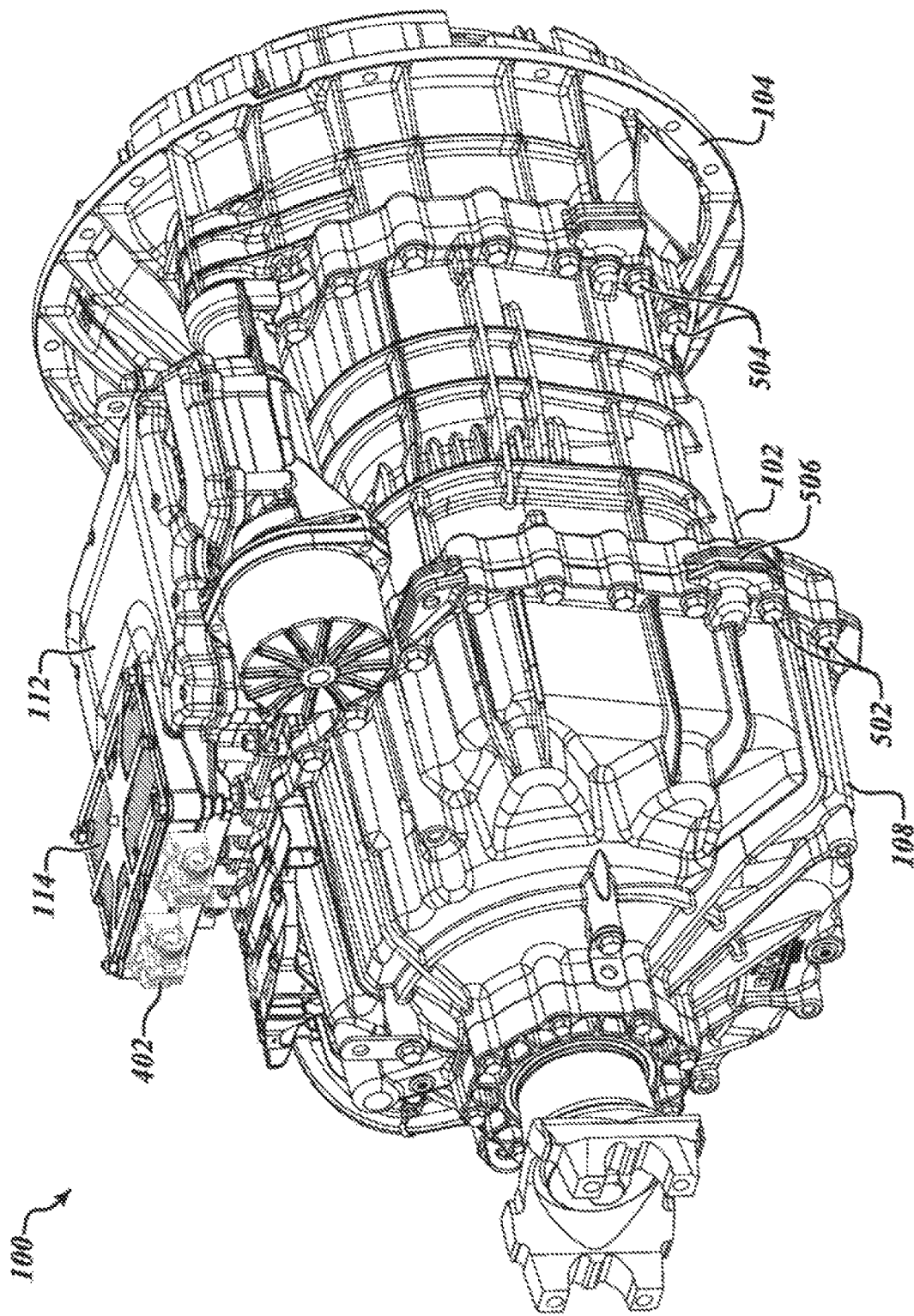
FIG. 5 depicts an example transmission.

Referencing FIG. 5, another view of an example transmission 100 is provided depicting a clear view of the clutch actuator housing 202, the integrated actuator housing 112, in the TCM 114. The example transmission 100 further includes a number of couplings 502 between the main housing 102 and a rear housing 108, and a number of couplings 504 between the main housing 102 and the clutch housing 104. In certain embodiments the selection of housing elements (102, 104, 108) that includes the driveline portions of the transmission 100 may be distinct from the selection of housing elements (102, 104, 108) as depicted in FIG. 5. For example, certain housing elements may be combined, divided, and/or provided at distinct separation points from those depicted in FIG. 5. Several considerations that may be included in determining the selection of housing elements include the strength of materials utilized in manufacturing housings, the power throughput of the transmission 100, the torque (maximum and/or transient) throughput of the transmission 100, manufacturability considerations (including at least positioning the housing and devices within the housing during manufacture, materials selected for the housing, and/or manufacturing cost and repeatability considerations), and the cost and/or reliability concerns associated with each housing interface (for example the interface 506 between the main housing 102 and the rear housing 108).

Figure 6:
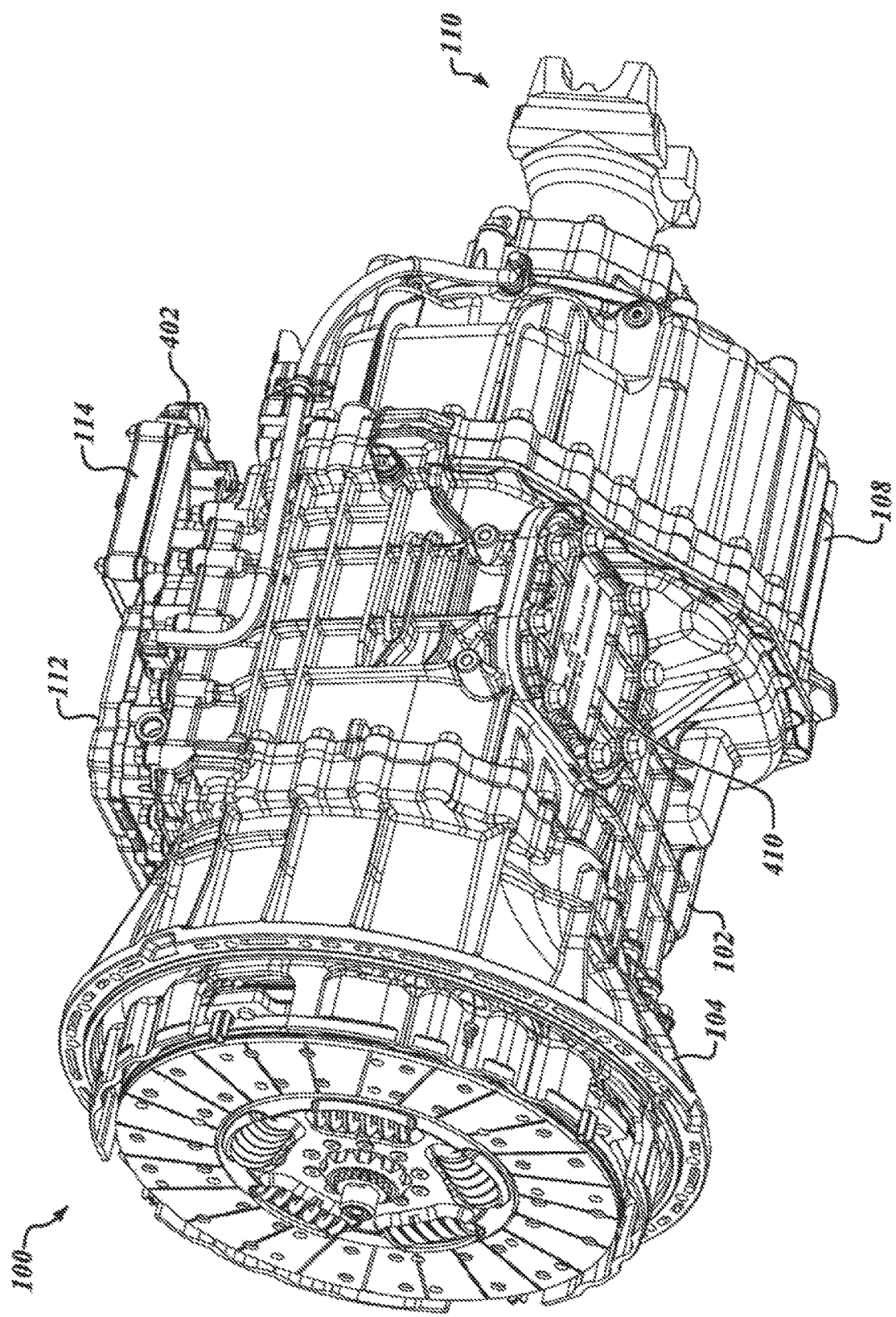
FIG. 6 depicts an example transmission.
Figure 7:
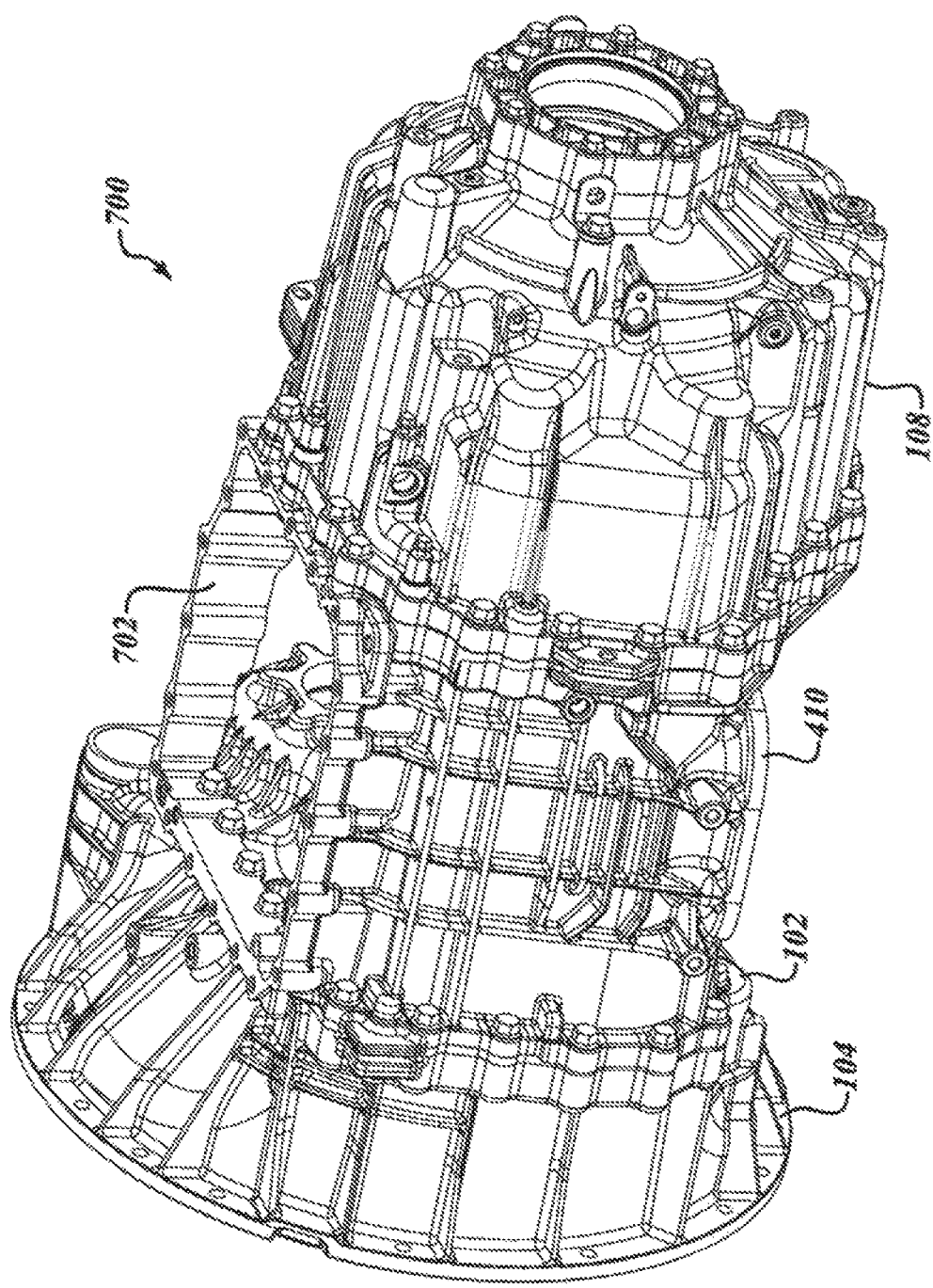
FIG. 7 depicts an example transmission.

Referencing FIG. 6, another view of an example transmission 100 is provided depicting a clear view of the PTO interface 410. The example PTO interface 410 is an 8 bolt interface provided on a lower side of the transmission 100. Referencing FIG. 7 a schematic view of a transmission housing 700 is depicted. The housing 700 includes an actuator engagement opening 702 positioned at the top of the transmission. The actuator engagement opening 702 is sized to accommodate attachment of the integrated actuator housing 112, and to allow actuation elements to be positioned into the transmission 100. The position, size, shape, and other elements of an actuator engagement opening 702, where present, may be selected according to the particular features of actuators for the system. The example transmission 100, actuator engagement opening 702, and integrated actuator housing 112, are readily accessible with access to the top of the transmission 100, and can be installed, serviced, maintained, or otherwise accessed or manipulated without removal of the transmission 100 from the application or vehicle, and/or without disassembly of the transmission 100. The example housing 700 further includes a clutch actuator engagement opening 704, sized to accommodate attachment of the clutch housing portion of the integrated actuator housing 112, and to allow the clutch actuator to be positioned into the transmission 100. In the example housing 700, shift actuators (not shown) are positioned into the transmission 100 through the actuator engagement opening 702, and a clutch actuator is positioned into the transmission 100 through the clutch actuator engagement opening 704, and it can be seen that a single step installation of the integrated actuator housing 112 provides an insulation of all primary actuators for the transmission 100, as well as providing a convenient single location for access to all primary actuators.

Figure 8:
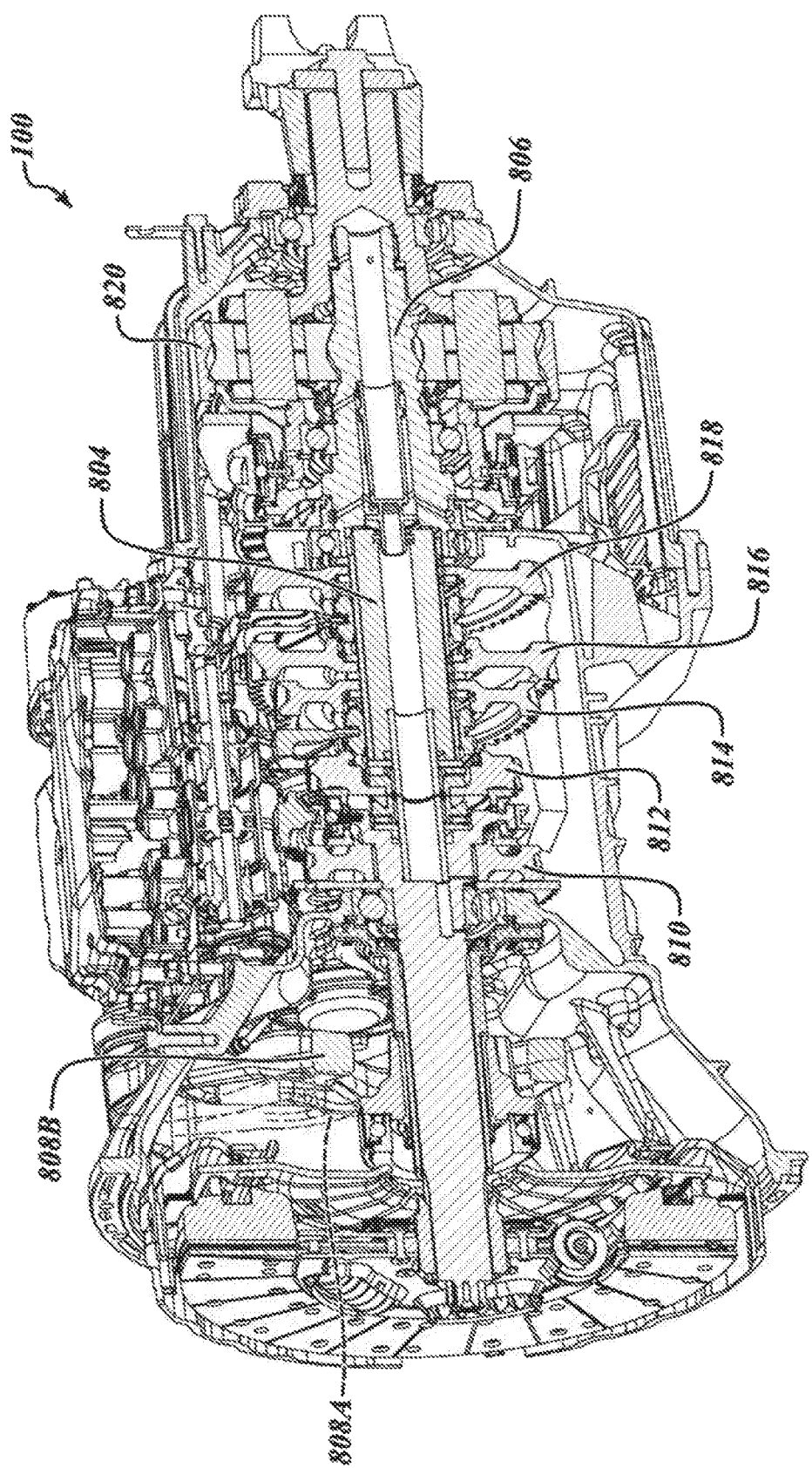
FIG. 8 depicts a cutaway view of an example transmission.

Referencing FIG. 8, an example transmission 100 is depicted schematically in a cutaway view. The cutaway plane in the example of FIG. 8 is a vertical plane through the transmission 100. The example transmission 100 is capable of providing power throughput from a prime mover interfacing with the clutch 106 to the input shaft 204, from the input shaft 204 to a first main shaft portion 804, to a second main shaft portion 806 operationally coupled to the first main shaft portion 804, and from the second main shaft portion 806 to the output shaft assembly 110. Example transmission 100 is operable to adjust torque multiplication ratios throughout the transmission, to engage and disengage the clutch 106 from the prime mover (not shown), and/or to position the transmission 100 into a neutral position wherein, even if the clutch 106 is engaged to the prime mover, torque is not transmitted from the clutch 106 to the output shaft assembly 110.

With further reference to FIG. 8, a clutch engagement yoke 808 is depicted in a first position 808A consistent with, in certain embodiments, the clutch 106 being engaged with the prime mover (i.e. the clutch 106 in a forward position). For purposes of clarity of the description, the clutch engagement yoke 808 is simultaneously depicted in a second position 808B consistent with, in certain embodiments, the clutch 106 being disengaged with the prime mover (i.e. the clutch 106 in a withdrawn position). The example clutch engagement yoke 808 is operationally coupled at a first end to a clutch actuator, which in the example of FIG. 8 engages the clutch engagement yoke at the upper end of the clutch engagement yoke 808. The example clutch engagement yoke 808 is fixed at a second end, providing a pivot point for the clutch engagement yoke 808 to move between the first position 808A and the second position 808B. A clutch engagement yoke 808 of the example in FIG. 8 enables convenient actuation of the clutch 106 with a linear actuator, however in certain embodiments of the present disclosure any type of clutch actuation may be utilized, including a concentric clutch actuator (not shown) and/or another type of linear clutch actuation device.

The example transmission 100 further includes an input shaft gear 810 selectively coupled to the input shaft 204. The inclusion of the input shaft gear 810, where present, allows for additional distinct gear ratios provided by the input shaft 204, for example a gear ratio where torque is transmitted to the input shaft gear 810, where torque is transmitted directly to the first main shaft portion 804 (e.g. with both the input shaft 204 and the first main shaft portion 804 coupled to a first forward gear 812). In certain embodiments, the shared first forward gear 812 between the input shaft 204 and the first main shaft portion 804 may be termed a "splitter gear," although any specific naming convention for the first forward gear 812 is not limiting to the present disclosure.

The example transmission 100 further includes a number of gears selectively coupled to the first main shaft portion 804. In the example of FIG. 8, the first forward gear 812, a second forward gear 814, and third forward gear 816 are depicted, and a first reverse gear 818 is further shown. In the example, the first forward gear 812 is couplable to either of the input shaft 204 and/or the first main shaft portion 804. When the input shaft 204 is coupled to the first forward gear 812 and the first main shaft portion 804 is not, a gear ratio between the input shaft 204 and the first main shaft portion 804 is provided. When the input shaft 204 is coupled to the first forward gear 812 and the first main shaft portion 804 is also coupled to the first forward gear 812, the input shaft 204 and first main shaft portion 804 turn at the same angular speed. The number and selection of gears depends upon the desired number of gear ratios from the transmission, and the depicted number of gears is not limiting to the present disclosure.

The example transmission 100 further includes a planetary gear assembly 820 that couples the second main shaft portion 806 to the output shaft assembly 110 through at least two selectable gear ratios between the second main shaft portion 806 and the output shaft assembly 110. The example transmission 100 further includes at least one countershaft, the countershaft having an aligning gear with each of the gears coupleable to the input shaft 204 in the first main shaft portion 804. The countershaft(s) thereby selectively transmit power between the input shaft 204 in the first main shaft portion 804, depending upon which gears are rotationally fixed to the input shaft 204 and/or the first main shaft portion 804. Further details of the countershaft(s) are described following, for example in the portion of the disclosure referencing FIG. 9.

It can be seen that the transmission 100 in the example of FIG. 8 provides for up to 12 forward gear ratios (2×3×2) and up to four reverse gear ratios (2×1×2). A particular embodiment may include distinct gear arrangements from those depicted, and/or may not use all available gear ratios. In embodiments, an eighteen speed automatic truck transmission may be provided, such as by providing three forward gears, three main gears, and two planetary gears, referred to herein as a three-by-three-by-two architecture. Similarly, a twelve-speed automatic truck transmission can be provided by providing three forward gears, two main gears, and two planetary gears, or other combinations.

Figure 9:
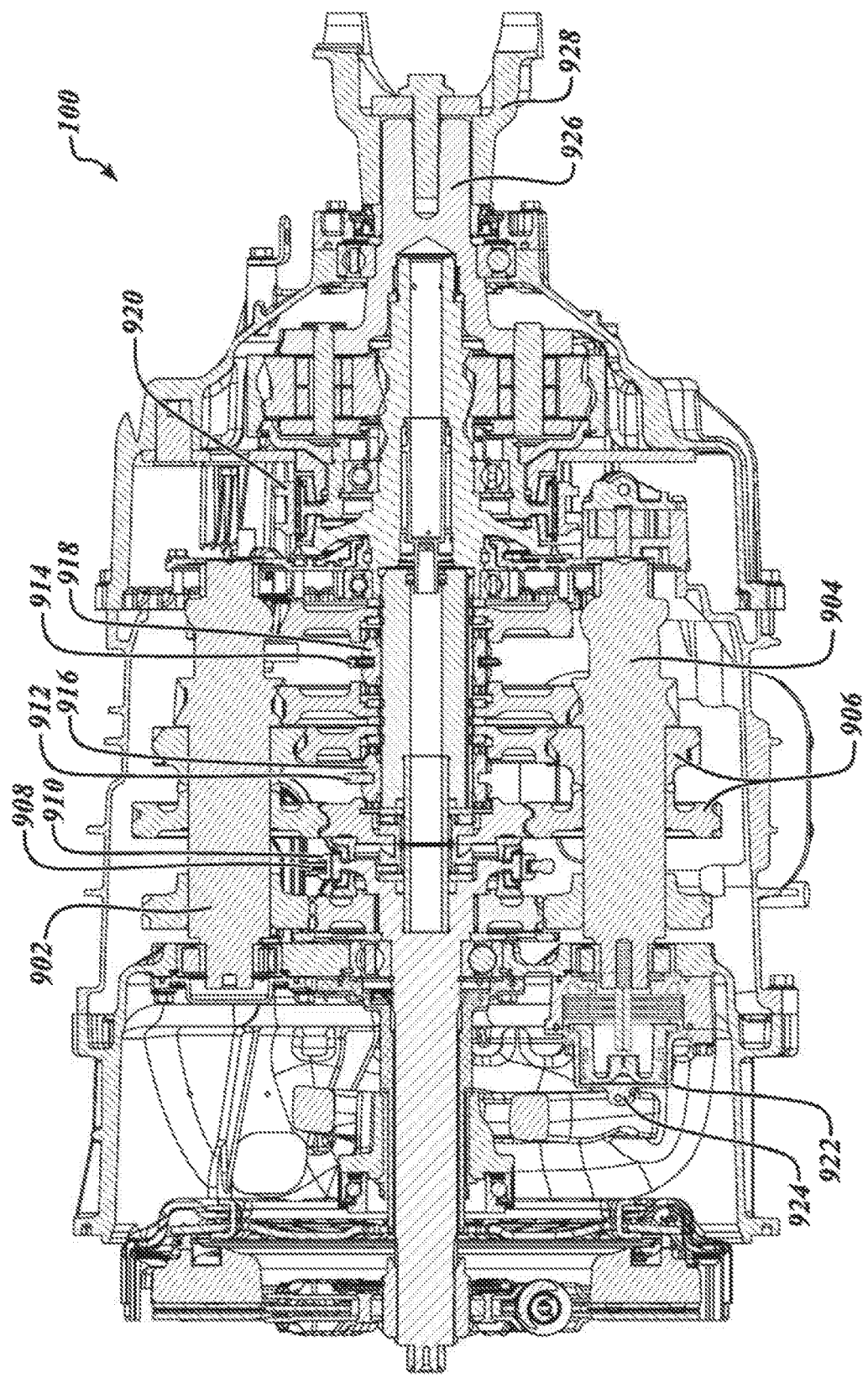
FIG. 9 depicts a cutaway view of an example transmission.

Referencing FIG. 9, an example transmission 100 is depicted schematically in a cutaway view. The example of FIG. 9 depicts a cutaway through a plane intersecting to twin countershafts 902, 904. The example countershafts 902, 904 are positioned at 180° on each side of the first main shaft portion 804. In certain embodiments the transmission 100 may include only a single countershaft, and/or more than two countershafts. The positioning and angle of the countershafts 902, 904 depicted in FIG. 9 is a nonlimiting example, and the countershafts 902, 904 may be adjusted as desired for the application. Each of the example countershafts 902, 904 includes a gear layer 906 meshing with a corresponding gear on the input shaft 204 and/or the first main shaft portion 804 respectively. The example transmission 100 includes the gears 906 rotationally fixed to the countershafts 902, 904, with the corresponding gears on the input shaft 204 and/or the first main shaft portion 804 being selectively rotationally fixed to the input shaft 204 and/or the first main shaft portion 804. Additionally or alternatively, gears 906 may be selectively rotationally fixed to the countershafts 902, 904, with one or more of the corresponding gears on the input shaft 204 and/or the first main shaft portion 804 being rotationally fixed to the input shaft 204 and/or the first main shaft portion 804. The descriptions of actuators for shifting presented herein utilize the convention that the gears 906 are rotationally fixed to the countershafts 902, 904, and changes to which gears are rotationally fixed or selectively rotationally fixed would lead to corresponding changes in actuation.

Example transmission 100 includes a first actuator 908, for example a shift fork, that moves (e.g., side to side and/or up or down) under actuation, to selectively rotationally couple the input shaft 204 to one of the countershafts 902, 904, or to the first main shaft portion 804. The first actuator 908 interacts with a gear coupler 910, and in certain embodiments the gear coupler 910 includes a synchronizing component as understood in the art. The first actuator 908 is further operable to position the gear coupler 910 into an intermediate position wherein the input shaft 204 is rotationally decoupled from both the countershafts 902, 904 and the first main shaft portion 804—for example placing the transmission 100 into a neutral operating state. In certain embodiments the first actuator 908 is a portion of, and is controlled by an integrated actuator assembly 1300 (e.g. reference FIG. 13) positioned within the integrated actuator housing 112.

Example transmission 100 further includes a second actuator 912 that, under actuation, such as moving side to side and/or up or down, selectively rotationally couples one of the first forward gear 812 and the second forward gear 814 to the first main shaft portion 804, thereby rotationally coupling the countershafts 902, 904 to the first main shaft portion 804. The example transmission 100 further includes a third actuator 914 that, under actuation, selectively rotationally couples one of the third forward gear 816 and the reverse gear 818 to the first main shaft portion 804, thereby rotationally coupling countershafts 902, 904 to the first main shaft portion 804. In certain embodiments, the second actuator 912 in the third actuator 914 are operable to be positioned into an intermediate position wherein the first main shaft portion 804 is rotationally decoupled from both the countershafts 902, 904—for example placing the transmission 100 into a neutral operating state. In certain embodiments, at least one of the second actuator 912 and the third actuator 914 are positioned into the intermediate position at any given time, preventing coupling of the countershafts 902, 904 to the first main shaft portion 804 at two different speed ratios simultaneously. In certain embodiments the second actuator 912 and the third actuator 914 are portions of or are integrated with, and are controlled by, the integrated actuator assembly 1300 positioned within the integrated actuator housing 112.

In the example transmission 100, the second actuator 912 interacts with a second gear coupler 916, and the third actuator 914 interacts with a third gear coupler 918, where each of the second and third gear couplers 916, 918 may include a synchronizing component. According to the arrangement depicted in FIG. 9, the first, second, and third actuators 908, 912, 914 are operable to provide a number of distinct forward gear options, reflecting different combinations of gear ratios (e.g., six, twelve, or eighteen gears), and a number (e.g., two) of distinct reverse gear ratios. The planetary gear assembly 820 may include a clutch (such as a sliding clutch 920) configured to position the planetary gear assembly 820 and provide two distinct ratios between the second main shaft portion 806, and the output shaft assembly 110. Therefore, according to the arrangement depicted in FIG. 9, the transmission 100 is operable to provide twelve distinct forward gear ratios, and four distinct reverse gear ratios. In certain embodiments, one or more of the available gear ratios may not be utilized, and a selection of the number of forward gears, number of reverse gears, and number of actuators may be distinct from the arrangement depicted in FIG. 9.

The example transmission 100 provides for a direct drive arrangement, for example where the first actuator 908 couples the input shaft 204 to the first main shaft portion 804 (gear coupler 910 to the right in the orientation depicted in FIG. 9), and where the second actuator 912 couples the first main shaft portion 804 the first forward gear. Direct drive operation transfers power through the planetary gear assembly 820, with the sliding clutch 920 providing either gear reduction (e.g. sliding clutch 920 positioned to the right in the orientation depicted in FIG. 9) or full direct drive of the transmission 100 (e.g. sliding clutch 920 positioned to the left in the orientation depicted in FIG. 9). In certain embodiments, direct drive may be a "highest" gear ratio of the transmission 100, and/or the transmission may include one or more overdrive gears. The determination of the number of gears, how many gears are forward and/or reverse, and the ratios of each gear, including whether and how many overdrive gears may be present, and how many gear ratio combinations are selectable, are configurable features that depend upon desired response characteristics for a particular application. An example transmission 100 includes the integrated actuator assembly 1300 operably coupled to the sliding clutch 920, for example with a shift fork (not shown) mounted on a shift rail.

The example transmission 100 depicts the PTO interface 410 positioned in proximity to the lower countershaft 904. In certain embodiments, the transmission 100 includes a main housing 102 where the main housing 102 is made of aluminum, and/or is a cast component. It will be understood that material constraints and component stress management indicate that certain features of an aluminum housing will be larger, thicker, or otherwise modified relative to a steel housing. For example bolt bosses of the PTO interface 410 can be deeper and project further into the main housing 102 for a PTO interface 410 designed in an aluminum housing relative to a similar installation designed in a steel housing. Cast components, in certain embodiments and depending upon casting process used, impose certain constraints upon component design. For example, for certain casting processes it can be beneficial to constrain a component to have a monotonically increasing outer profile or housing shape. Example transmission 100 includes gear ratio and sizing selections, as well as selection of the PTO interface 410 position, such that a gear of the lower countershaft 904 having a greatest radial extent from a centerline the gear train is positioned in proximity to the PTO interface 410. An example transmission 100 includes the PTO device accessing the transmission 100 at the PTO interface 410 being powered by the first forward gear 812 (e.g. the splitter gear) through the corresponding countershaft gear.

In certain embodiments, the transmission 100 allows for engagement of a PTO device (not shown) directly with a gear engaging in lower countershaft 904, without having to use in idler gear or similar mechanical configuration to extend power transfer from the lower countershaft 904. It can also be seen that the example transmission 100 includes a geometric profile of the gears in the gear train, such that an easily castable main housing 102 can be positioned over the gears after the gear train is assembled, and/or the gear train can be assembled into the main housing 102 in a straightforward manner. Further, it can be seen that the example transmission 100 includes provisioning for bolt bosses of the PTO interface 410, even where deeper bolt bosses are provided, such as an application having an aluminum main housing 102.

Example transmission 100 further includes a controllable braking device 922 selectively coupleable to at least one of the countershafts 902, 904. In the example depicted in FIG. 9, the braking device 922 is selectively coupleable to the lower countershaft 904, however a braking device 922 may be coupleable to either countershaft 902, 904, and/or more than one braking device may be present in coupleable to each countershaft present. The braking device 922 provides capability to slow the countershaft and/or driveline, to stop the countershaft and/or driveline, and/or to provide stationary hold capability to the driveline. An example braking device 922 includes a braking device actuator 924 (a pneumatic input in the example of FIG. 9) which may be controllable pneumatically by an integrated actuator assembly 1300 positioned in the integrated actuator housing 112. Additionally or alternatively, any other actuating means and controller is contemplated herein, including at least an electrical and/or hydraulically operated actuator, and/or any other driveline braking device, is further contemplated herein. Additionally or alternatively, any other type of braking device may be included within the transmission 100 and/or positioned upstream or downstream of the transmission 100, for example a hydraulic retarder and/or an electric braking device (not shown), which may be controllable by an actuator in the integrated actuator assembly 1300 positioned in the integrated actuator housing 112, by the TCM 114, and/or by another control device in the system (not shown).

The example transmission 100 includes the output shaft assembly 110. The example output shaft assembly 110 includes an output shaft 926, wherein the output shaft is rotationally coupled to the planetary gear assembly 820. The output shaft assembly 110 further includes a driveline adapter 928 coupled to the output shaft 926, and configured to engage a downstream device (not shown) in the driveline. The driveline adapter 928 may be any type of device known in the art, and the specific depiction of the driveline adapter 928 is nonlimiting. The selection of a driveline adapter 928 will depend in part on the application, the type of downstream device, and other considerations known in the art.

Figure 10:
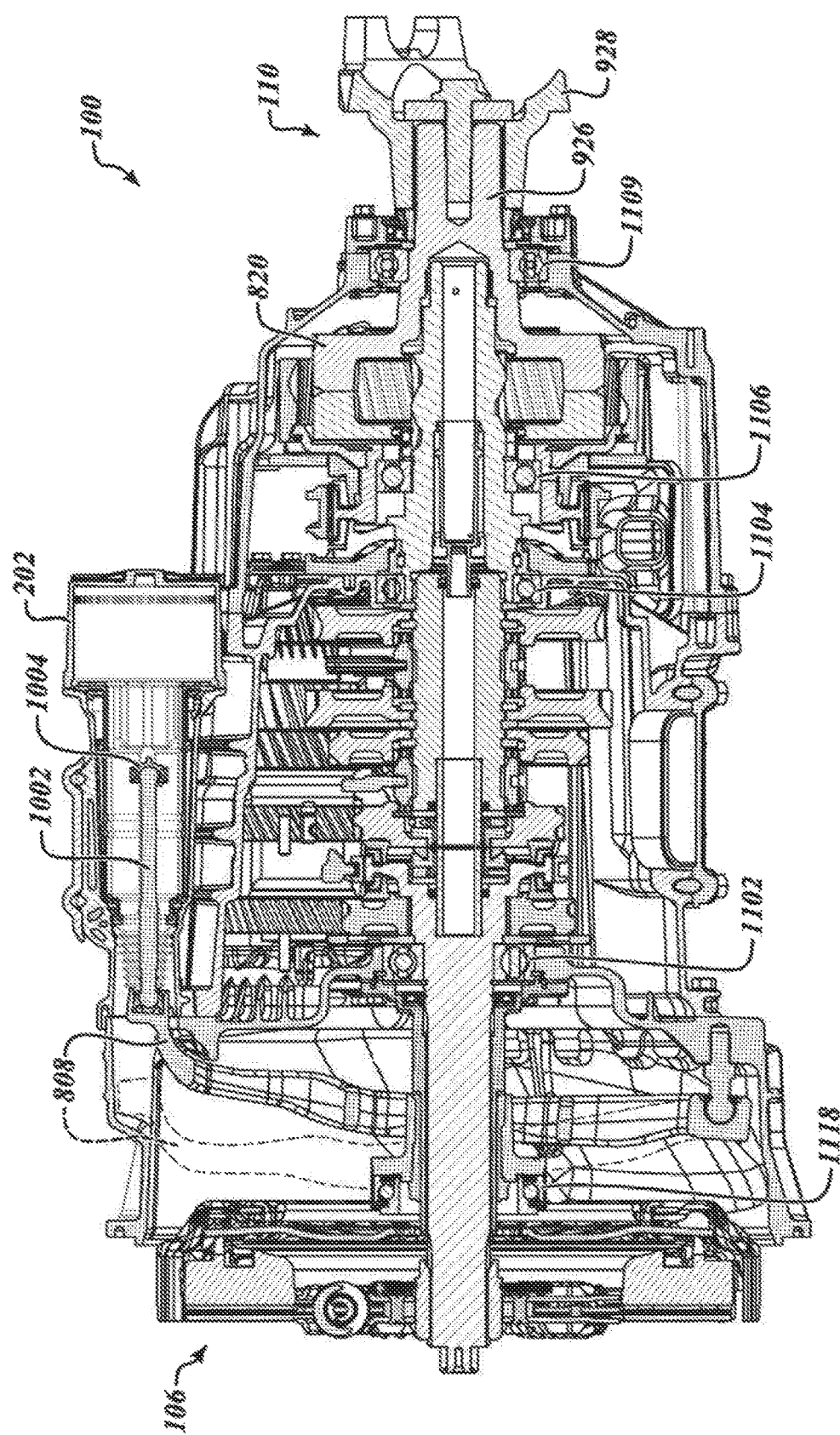
FIG. 10 depicts a cutaway view of an example transmission.

Referencing FIG. 10, an example transmission 100 is depicted schematically in a cutaway view. The cutaway plane and the example of FIG. 10 is a plane intersecting a clutch actuator 1002 in the driveline (e.g. including the input shaft four, the first and second main shaft portions 804, 806, in the output shaft assembly 110). The depiction in FIG. 10 illustrates the clutch engagement yoke 808 in both the first position 808A in the second position 808B. The example transmission 100 includes a linear clutch actuator 1002, positioned within the clutch actuator housing 202 and extending to the clutch engagement yoke 808. In the example of FIG. 10, the clutch actuator 1002 is pneumatically operated and applies a pushing force to the clutch engagement yoke 808, and returns a retracted position in response to force from the clutch engagement yoke 808. Example clutch actuator 1002 provides a normally engaged clutch 106, such that if the clutch actuator 1002 is not actively engaging the clutch engagement yoke 808, the clutch 106 extends and engages. The example clutch actuator 1002 is a pneumatic, linear clutch actuator (LCA), that pushes to engage, however any type of clutch actuator is contemplated herein, for example and without limitation a pull to engage actuator (e.g. utilizing a catapult or other mechanical arrangement), hydraulic and/or electrical actuation, and/or engaging with a normally engaged or normally disengaged clutch 106. In certain embodiments, the clutch actuator 1002 includes a near zero dead air volume in the retracted position. Example support features to maintain near zero dead air volume for the clutch actuator 1002 are described as follows. In certain embodiments, the utilization of a linear actuator, the inclusion of a near zero dead air volume, and the positioning of the clutch actuator housing 202 as a part of the integrated actuator housing 112 support various enhancements of one or more of accessibility to the clutch actuator housing 202, accessibility to the clutch actuator 1002, improvements to the control and/or repeatability of clutch actuation, reduction of points of failure, and/or diagnosing or determining the precise position of the clutch face 306 (including as the clutch 106 wears over time). In certain embodiments, a near zero dead air volume includes a volume 1004 behind the clutch actuator 1002 on a supply side, wherein the volume 1004 is small enough such that provided air immediately begins putting an actuation force onto the clutch actuator 1002, and/or such that a consistent initial air volume each times begins a consistent movement on the clutch actuator 1002. Example air volumes that are near zero include, without limitation, the clutch actuator 1002 positioned against an air feed tube (e.g. as depicted in the example of FIG. 10), a volume small enough such that clutch actuation begins after application of supply pressure within a selected response time (e.g. 5 msec, 10 msec, 20 msec, 40 msec, 100 msec, and/or 200 msec), and/or a volume less than a specified volume difference behind the clutch actuator 1002 on the feed side between the clutch actuator 1002 in a current rest position and the clutch actuator 1002 in a predetermined rest position (e.g. fully positioned against a stop), where the specified volume is approximately zero, less than 0.1 cc, less than 0.5 cc, and/or less than 1 cc. The provided examples for a near zero volume are illustrative and not limiting. One of skill in the art, having the benefit of the present disclosure and information ordinarily available when contemplating a particular embodiment, can readily determine a near zero volume for a contemplated application. Certain considerations to determine a near zero dead air volume include, without limitation, the pressure and/or rate of supplied actuation air, the desired response time for the clutch actuator 1002, computing resources available on the TCM 114 or elsewhere in the system, and/or the physical responsiveness of the clutch actuator 1002 to supplied air.

The example transmission 100 depicted in FIG. 10 includes a first ball bearing 1102 positioned in the clutch housing 104 (and/or pressed into the clutch housing 104) and coupled to the input shaft 204, a second ball bearing 1104 positioned in the main housing 102 (and/or pressed into the main housing 102) and coupled to the second main shaft portion 806, and a third ball bearing 1106 positioned in front of the planetary gear assembly 820 and coupled to the second main shaft portion 806. Additionally or alternatively, the example transmission 100 includes a fourth ball bearing 1109 positioned at an interface between the rear housing 108 and the output shaft assembly 110 (e.g. pressed into the rear housing 108), and coupled to the output shaft 926. An example transmission 100 further includes a release bearing 1118 coupled to the clutch 106 and providing a portion of an assembly between the clutch engagement yoke 808 and a clutch assembly to provide for release of the clutch 106 in response to actuation of the clutch engagement yoke 808.

Figure 11:
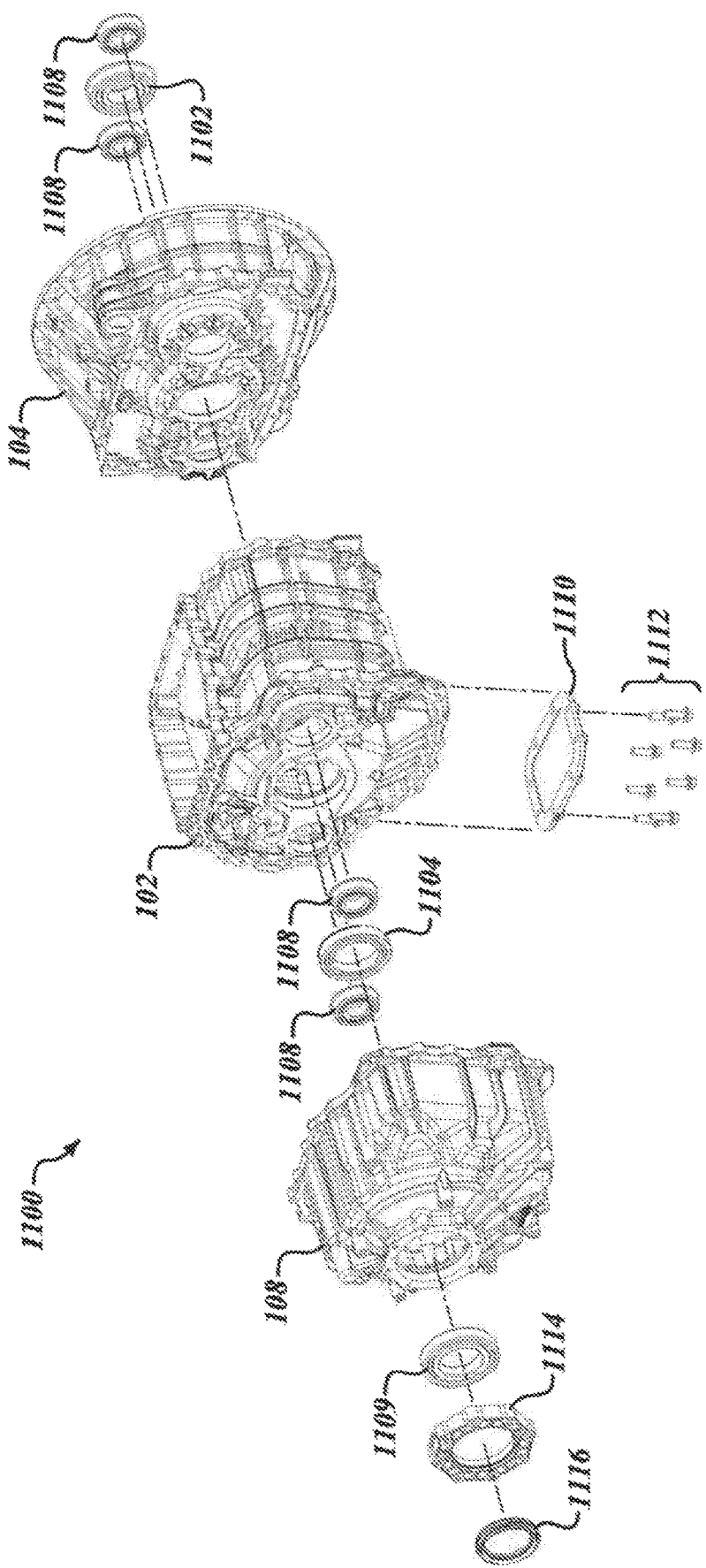
FIG. 11 depicts an exploded view of an example transmission.

Referencing FIG. 11, certain elements of an example housing assembly 1100 are depicted schematically and in exploded view. The example housing assembly 1100 depicts the clutch housing 104, the main housing 102, and the rear housing 108. Example housing assembly 1100 includes the first ball bearing 1102 positioned in the clutch housing 104 and engaging the input shaft 204, the second ball bearing 1104 positioned in the main housing 102 and engaging the second main shaft portion 806, and the fourth ball bearing 1109 positioned in the rear housing 108 and engaging the output shaft 926 at an interface between the rear housing 108 and the output shaft assembly 110. The ball bearings 1102, 1104, and 1109 provide for robust alignment of the transmission driveline, for example to ensure alignment with upstream and downstream driveline components. Additionally or alternatively, the ball bearings 1102, 1104, and 1109 are pressed into respective housing elements to provide for ease of manufacture and/or assembly of the transmission 100. The number and arrangement of ball bearings in a particular transmission 100 is a design choice, and any provided number and arrangement of ball bearings is contemplated herein.

The example housing assembly 1100 further includes a number of roller bearings 1108, which may be pressed into respective housing elements, in the example a roller bearing engages each end of the countershafts 902, 904. In a further example, a forward end of the countershafts 902, 904 each engages one of the roller bearings 1108 at an interface between the clutch housing 104 and the main housing 102, and a rearward end of the countershafts 902, 904 each engages one of the roller bearings 1108 at an interface between the main housing 102 in the rear housing 108. The type, number, and location of bearings engaging the countershafts 902, 904 are design choices, and any provided number, type, and location of bearings are contemplated herein.

In embodiments, one or more bearings, including for various gears of the transmission, may be configured to reduce or cancel thrust loads that occur when the drive shaft for the vehicle is engaged.

Example housing assembly 1100 further includes a cover plate 1110 for the PTO interface 410, and associated fasteners 1112 (e.g. bolts in the example housing assembly 1100). A cover plate 1110 may be utilized where a PTO device does not engage PTO interface 410, such as where no PTO device is present and/or where a PTO device engages a transmission from a rear location or other location. In certain embodiments, for example where transmission 100 does not include the PTO interface 410, the cover plate 1110 may be omitted. Additionally or alternatively, the transmission 100 included in a system planned to have a PTO device engaging the PTO interface 410 may likewise omit the cover plate 1110, and/or include a cover plate 1110 that is removed by an original equipment manufacturer (OEM) or other installer of a PTO device.

The example housing assembly 1100 further includes a bearing cover 1114, where the bearing cover 1114 protects and retains the fourth ball bearing 1109. Additionally, in certain embodiments, the example housing assembly 1100 further includes a seal 1116, for example to retain lubricating oil for the output shaft 926 and/or the fourth ball bearing 1109 within the transmission 100. The presence and type of seal 1116 depend upon the characteristics and type of lubrication system, and may be of any type.

Figure 12:
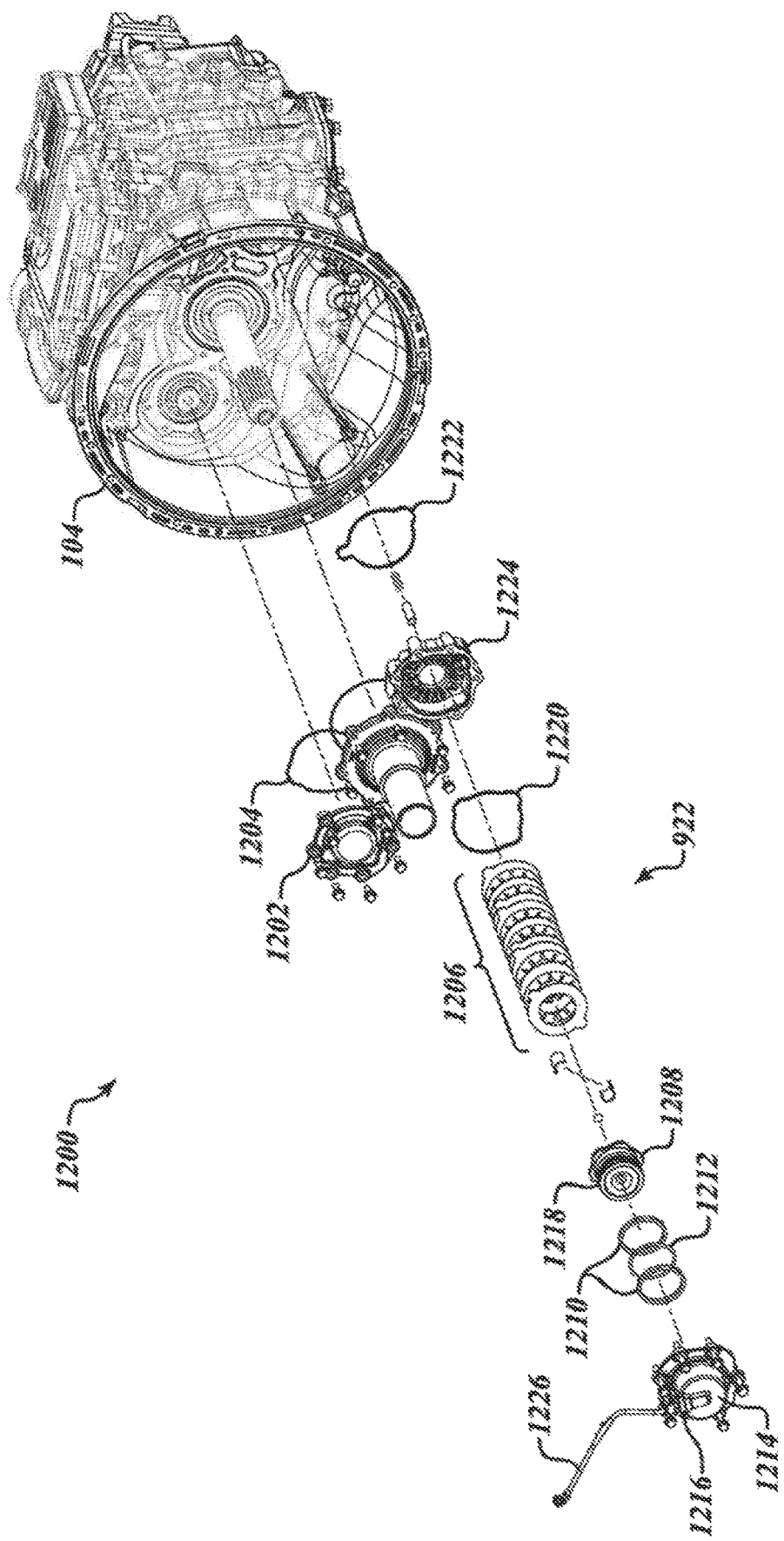
FIG. 12 depicts an exploded view of an example friction brake.

Referencing FIG. 12, an exploded view 1200 of portions of an open clutch housing 104 consistent with certain embodiments of the present disclosure is schematically depicted. The view 1200 depicts a first cover 1202 corresponding to, in the example, the upper countershaft 902. The view 1200 further depicts a first cover seal 1204, wherein the first cover seal 1204 provides for sealing between the first cover 1202 and the clutch housing 104. The view 1200 further depicts a braking device 922 in exploded view. The example braking device 922 includes a braking disc assembly 1206. The example braking device 922 includes a braking device actuator 924 depicted as a portion thereof. The example braking device actuator 924 includes a braking piston 1208, piston seals 1210, a piston wear ring 1212, and a braking cover seal 1214. The example braking cover seal 1214 includes an actuation control input 1216, for example a pneumatic port coupled to the integrated actuator assembly 1300 positioned in the integrated actuator housing 112, such as through an air tubing 1226. Any type of actuation coupling, and/or control are contemplated herein, including at least hydraulic and/or electrical actuation. In certain embodiments, the piston seals 1210 and piston wearing 1212 are positioned in grooves 1218 provided along a bore of the braking piston 1208. The view 1200 further depicts a second cover seal 1220 and a third cover seal 1222, as well as a braking cover adapter 1224. In the example of the view 1200, the second cover seal 1220 provides sealing between the braking cover adapter 1224 and the clutch housing 104, and the third cover seal 1222 provides sealing between the braking cover adapter 1224 and the braking cover seal 1214.

Figure 13:
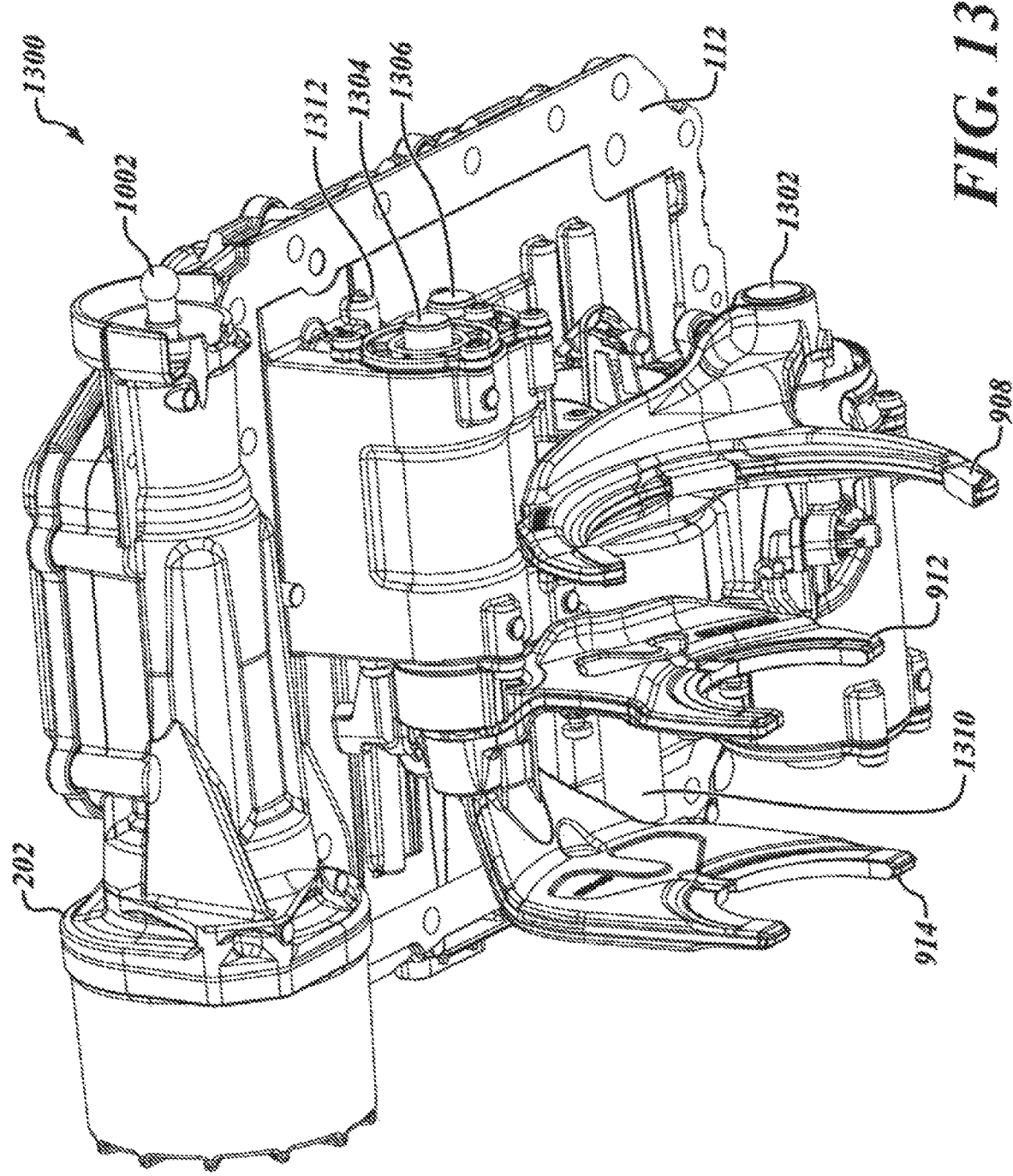
FIG. 13 depicts an example integrated actuation assembly.

Referencing FIG. 13, an example integrated actuator assembly 1300 includes an integrated actuator housing 112 and a clutch actuator housing 202. The example integrated actuator assembly 1300 depicts an example first actuator 908 operationally coupled to a first shift rail 1302 (e.g. a pneumatic rail), an example second actuator 912 coupled to a second shift rail 1304, and an example third actuator 914 coupled to a third shift rail 1306. The shape, position, and shift rail positions of the actuators 908, 912, 914 are selectable to meet the geometry, actuation force requirements, and the like of a particular application. The example integrated actuator assembly 1300 further includes the clutch actuator 1002 positioned in the clutch actuator housing 202 and operationally coupled to the integrated actuator assembly 1300. The TCM 114 is depicted as mounted on the integrated actuator assembly 1300, although the TCM 114 may be positioned elsewhere in a particular transmission 100. A seal 1308 is provided between the integrated actuator housing 112 and the TCM 114 in the example arrangement. Additional actuation engagement points 1310, 1312 are provided, for example to operationally couple the sliding clutch 920 and/or the actuator control input 1216 to the integrated actuator assembly 1300. The position and arrangement of additional actuation engagement points 1310 are non-limiting and may be arranged in any manner. The arrangement depicted in FIG. 13 allows for centralized actuation of active elements of a transmission 100, while allowing ready access to all actuators for installation, service, maintenance, or other purposes.

Figure 14:
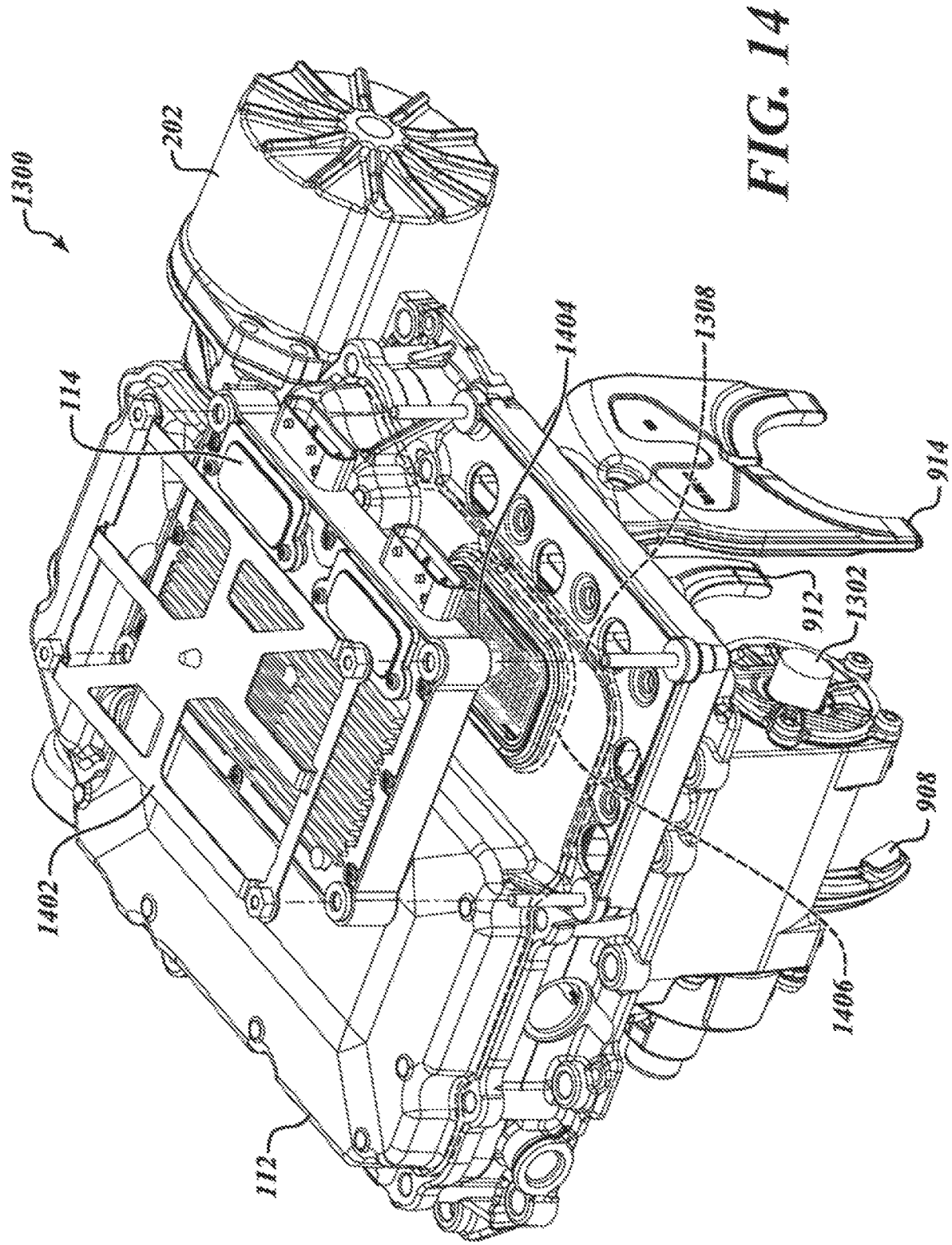
FIG. 14 depicts an example transmission control module.

Referencing FIG. 14, a topside view of the integrated actuator assembly 1300 is provided. The integrated actuator assembly 1300 depicts a TCM cover 1402, which protects and engages the TCM 114 to the integrated actuator housing 112. A connector 1404 is depicted between the TCM 114 and the integrated actuator housing, with a TCM connector seal 1406 also provided. The arrangement and engagement of the TCM 114 is a non-limiting example.

Figure 15:
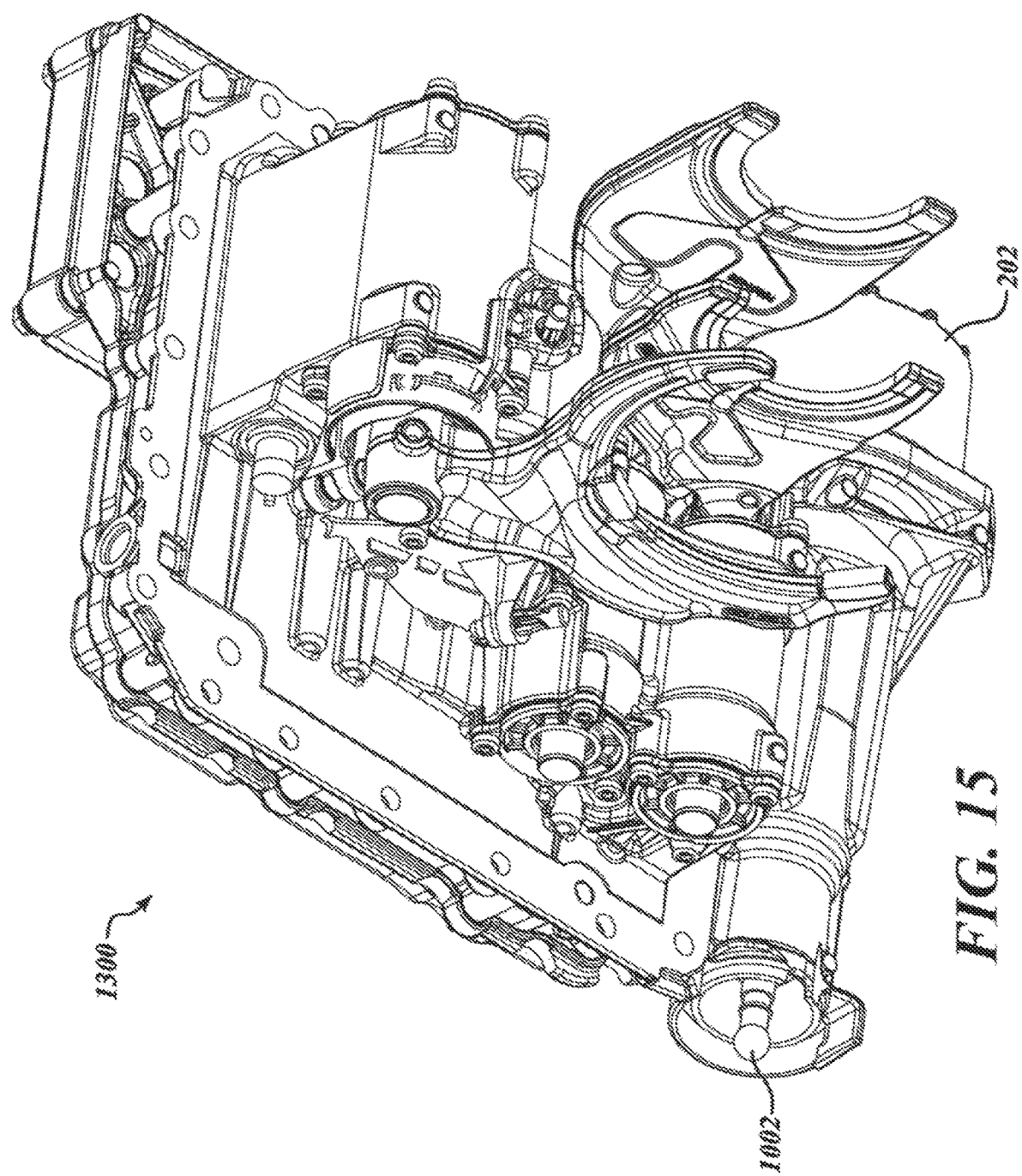
FIG. 15 depicts an example integrated actuation assembly.

Referencing FIG. 15, another view of the example integrated actuator assembly 1300 is shown to provide another angle to view details of the assembly. In certain embodiments, all shift rails 1302, 1304, 1306, the clutch actuator 1002, and the additional actuation engagement points 1310, 1312 are operated from a single power source coupled to the transmission 100 from the surrounding system or application, and in a further example coupled to a single air power source. The selection of a power source, including the power source type (e.g. pneumatic, electrical, and/or hydraulic) as well as the number of power sources, may be distinct from those depicted in the example. In certain embodiments, additional shift rails and/or actuators may be present, for example to provide for additional gear shifting operations and/or to actuate other devices.

Figure 16:
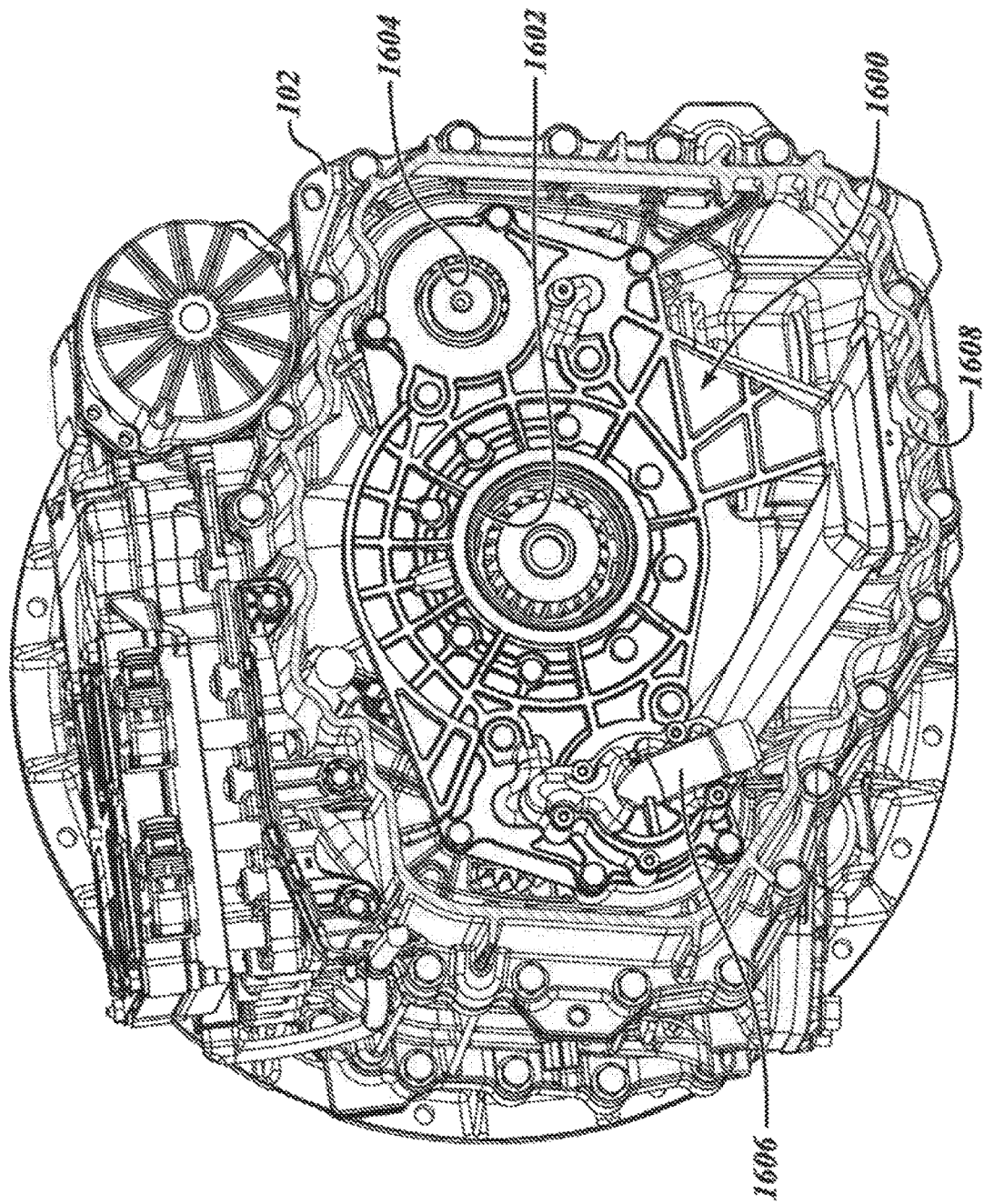
FIG. 16 depicts an example lubrication pump assembly.

Referencing FIG. 16, an example lubrication pump assembly 1600 is depicted. The example lubrication pump assembly 1600 is positioned in-line within the transmission rear housing 108 and against the interface to the main housing 102. The lubrication pump assembly 1600 defines a first hole 1602 therein to accommodate the main driveline passing therethrough, a second hole 1604 therein to accommodate a countershaft (the upper countershaft 902 in the example), and includes a countershaft interface assembly 1606 that engages one of the countershafts (the lower countershaft 904 in the example). The lubrication pump assembly draws from an oil sump 1608 at the bottom of the transmission 100. In the example transmission 100, the oil sump 1608 is a dry sump—for example the gears and rotating portions of the transmission do not rotate within the oil in the sump. One of skill in the art will recognize that maintaining a dry sump reduces the losses in rotating elements, as they are rotating in air rather than a viscous fluid, but increases the challenges in ensuring that moving parts within the transmission maintain proper lubrication. Oil may drain to the sump 1608 and be drawn from the sump by the lubrication pump assembly 1600. In certain embodiments, the sump 1608 is positioned in the rear housing 108, but may be positioned in the main housing 102 (e.g. with the lubrication pump assembly 1600 positioned within the main housing, and/or fluidly coupled to the main housing), and/or both housings 108, 102, for example with a fluid connection between the housings 108, 102.

Figure 17:
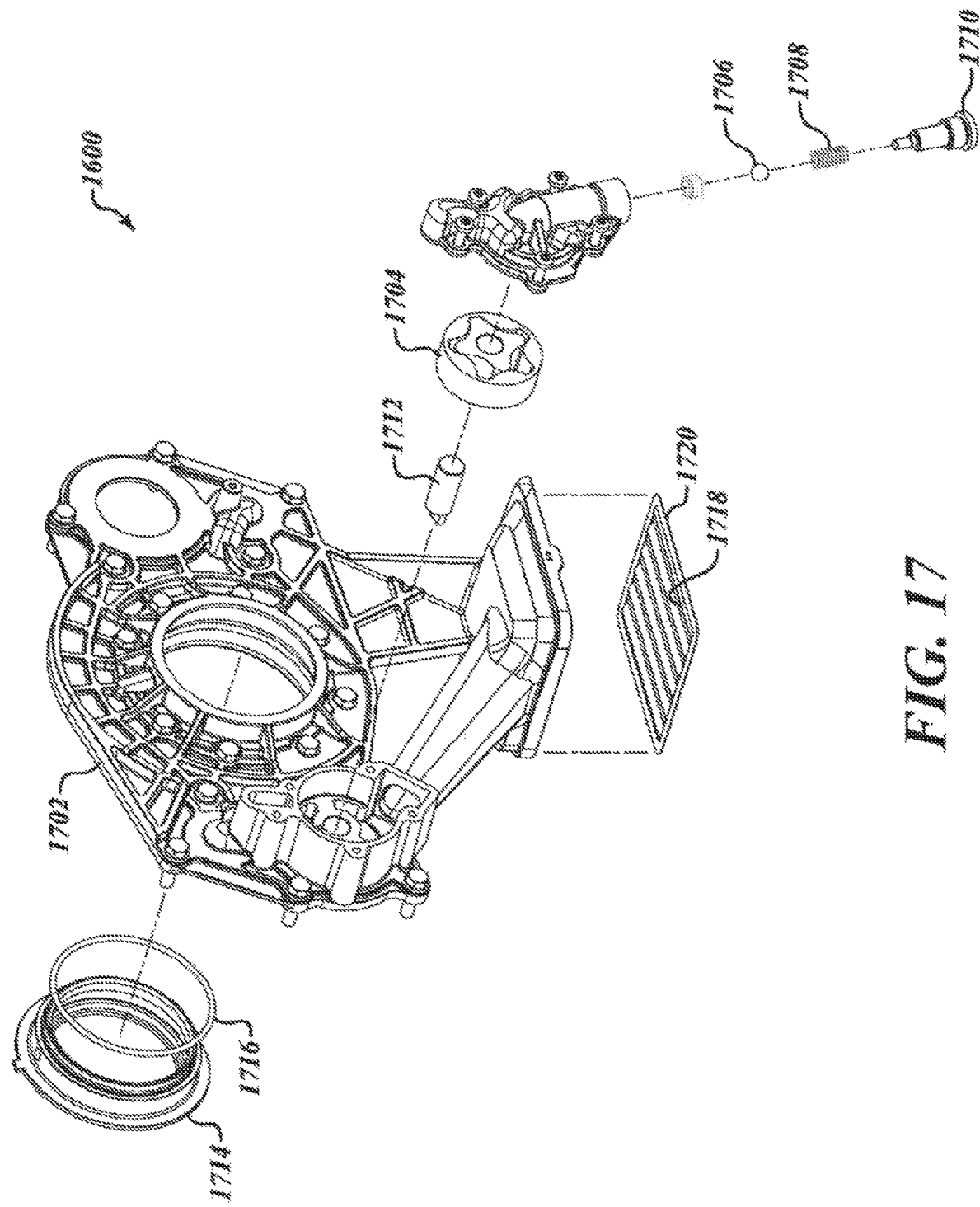
FIG. 17 depicts an exploded view of an example lubrication pump assembly.

Referencing FIG. 17, an example lubrication pump assembly 1600 is depicted in exploded view. The example lubrication pump assembly 1600 includes a lubrication pump housing 1702 that couples the lubrication pump assembly 1600 to the transmission 100, and provides structure and certain flow passages to the lubrication pump assembly. The example lubrication pump assembly 1600 further includes a pump element 1704, in the example provided as a gear pump, and a relief valve provided as a check ball 1706, a biasing member 1708, and a plug 1710 retaining the relief valve. The lubrication pump assembly 1600 further includes a driving element 1712 that couples the pump element 1704 to the engaged countershaft. Additionally, the example lubrication pump assembly 1600 includes a spacer 1714 and a lubrication driveline seal 1716. The example lubrication pump includes an oil pickup screen 1718 and a screen retainer 1720. The arrangement of the example lubrication pump assembly 1600 provides for an active lubrication system driven from a countershaft, which operates from a dry sump and includes pressure relief. The arrangement, position, pump type, and other aspects of the example lubrication pump assembly 1600 are non-limiting examples.

Figure 18:
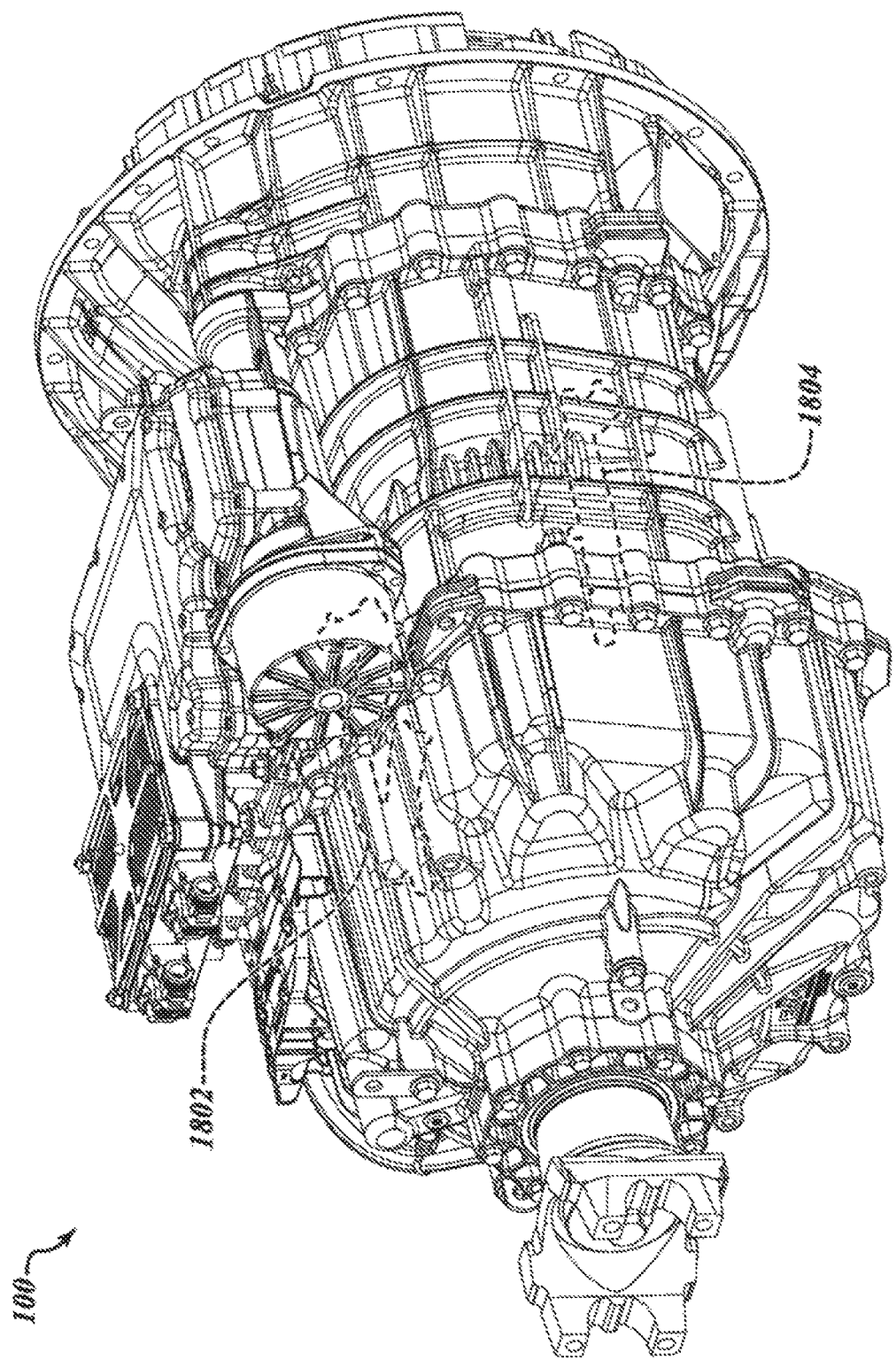
FIG. 18 depicts example bushing lubrication tubes in the context of an example transmission.

Referencing FIG. 18, an example transmission 100 is depicted. The example transmission 100 includes lubrication tubes provided therein that route lubrication from the lubrication pump assembly 1600 to moving parts within the transmission 100. The first lubrication tube 1802 is depicted schematically to provide a reference for the approximate position within the transmission 100 where a first lubrication tube 1802 is positioned. The second lubrication tube 1804 is depicted schematically to provide a reference for the approximate position within the transmission 100 where a second lubrication tube 1804 is positioned. The actual shape, position, and routing of any lubrication tubes 1802, 1804 within a given transmission will depend upon the location and arrangement of the lubrication pump assembly 1600, the parts to be lubricated, the shape and size of the transmission housing elements, and the like. Accordingly, the first lubrication tube 1802 and second lubrication tube 1804 depicted herein are non-limiting examples of lubrication tube arrangements.

Figure 21:
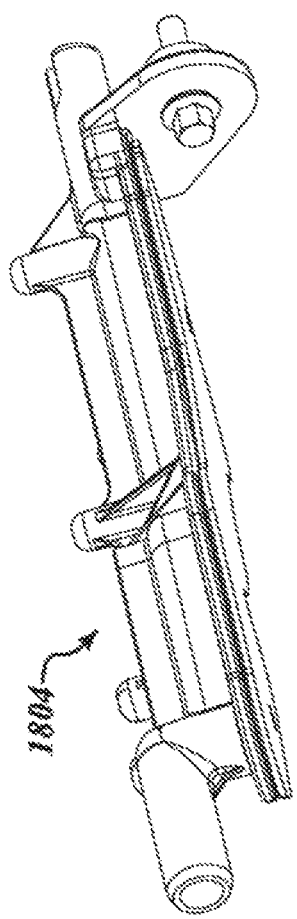
FIG. 21 depicts an example bushing lubrication tube.
Figure 22:
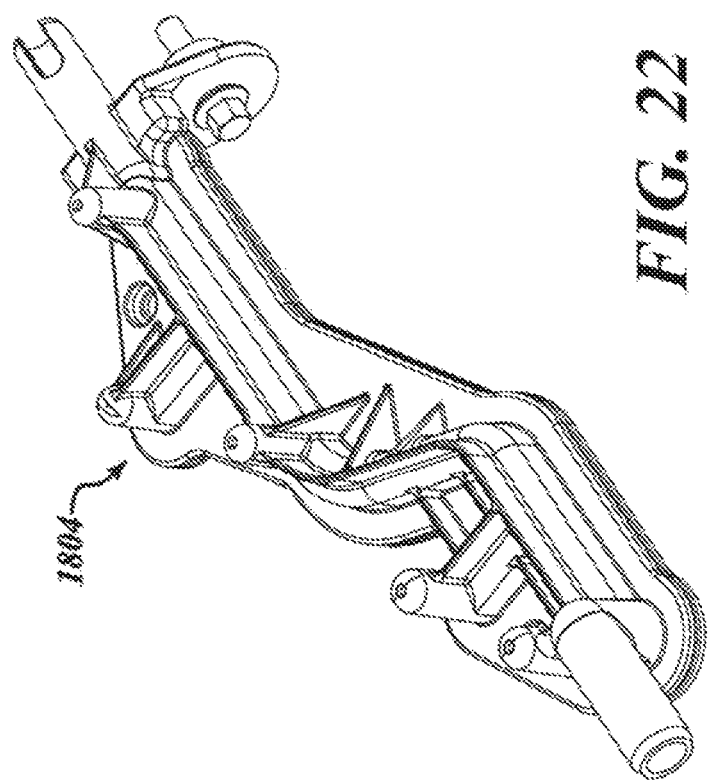
FIG. 22 depicts an example bushing lubrication tube.

Referencing FIG. 19, the first lubrication tube 1802 is depicted in a top view and in a bottom view (reference FIG. 20). Referencing FIG. 21, a second lubrication tube 1804 is depicted in a side view and a top view (reference FIG. 22). The lubrication tubes 1802, 1804 provide for lubrication to all bearings, sleeves, and other elements of the transmission 100 requiring lubrication, and contribute to a lubrication system having a centralized lubrication pump assembly 1600 with short lubrication runs, no external hoses to support the lubrication system, and low lubrication pump losses.

Figure 23:
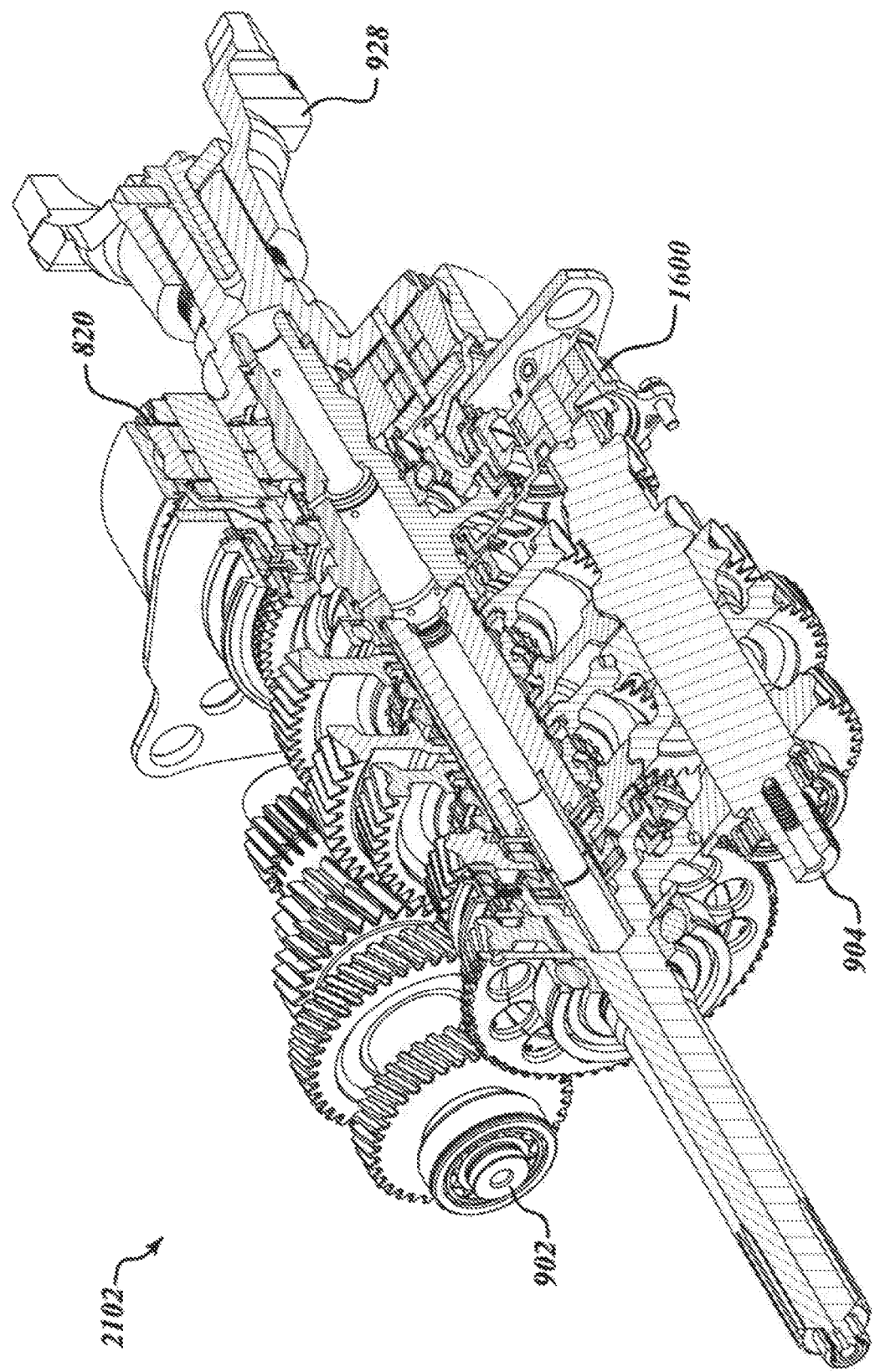
FIG. 23 depicts a cutaway view of an example driveline assembly.

Referencing FIG. 23, an example main driveline assembly 2102 is depicted schematically, with an angled cutaway view to illustrate certain portions of the main driveline. The main driveline assembly 2102 includes the input shaft 204, the first mainshaft portion 804, the second mainshaft portion 806, and the output shaft 926. The main driveline assembly 2102 further includes an upper countershaft 902 and a lower countershaft 904. In the example of FIG. 23, the lower countershaft 904 engages a braking device (e.g. reference FIG. 12) at a forward end, and a lubrication pump device (e.g. reference FIGS. 16 and 17) at a second end. The main driveline assembly 2102 further includes the planetary gear assembly 820 and the driveline adapter 928. The example main driveline assembly 2102 includes helical gears on the main power transfer path—for example on the countershaft, input shaft, and first mainshaft portion gears.

Figure 24:
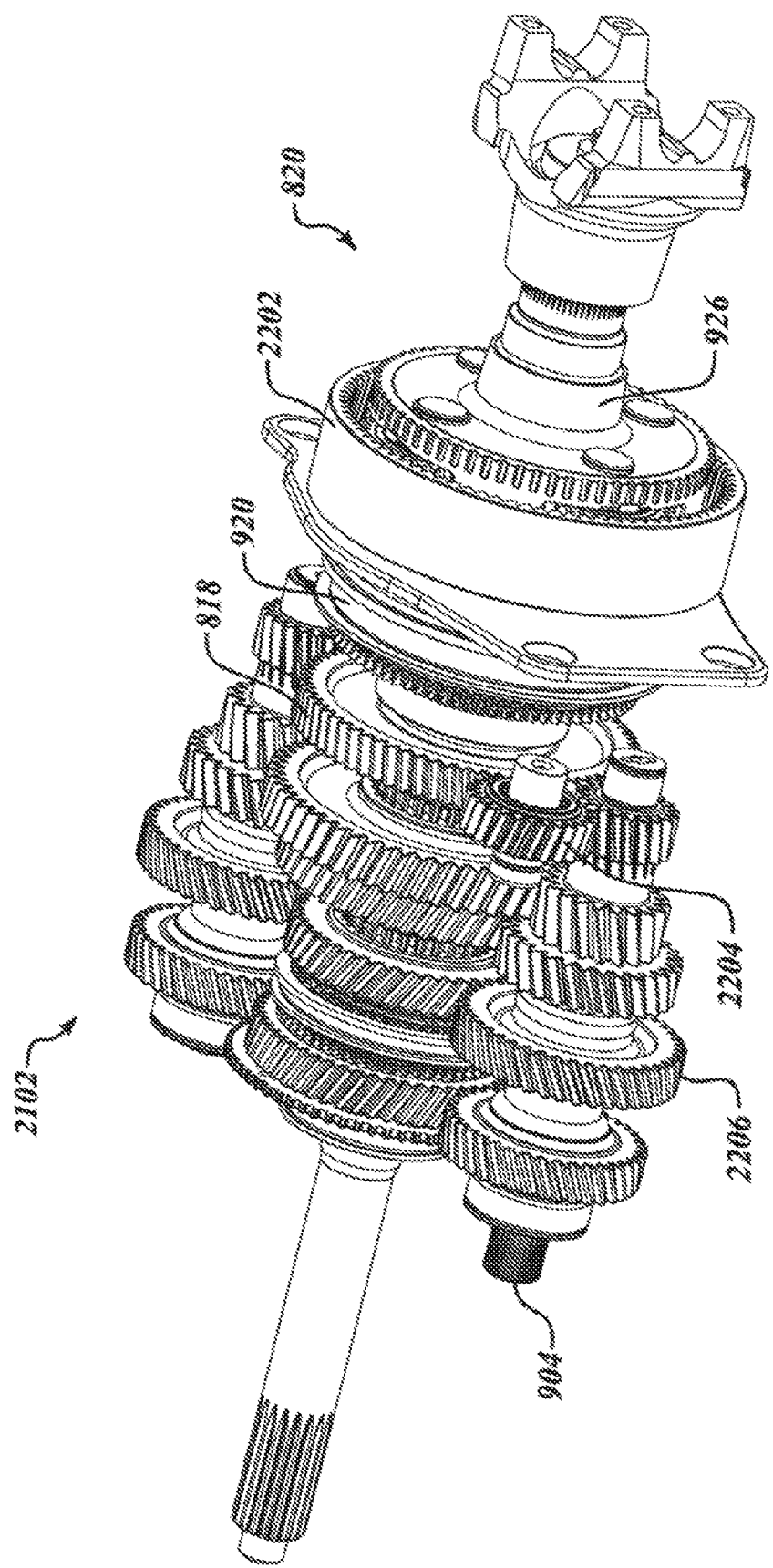
FIG. 24 depicts an example driveline assembly.
Figure 25:
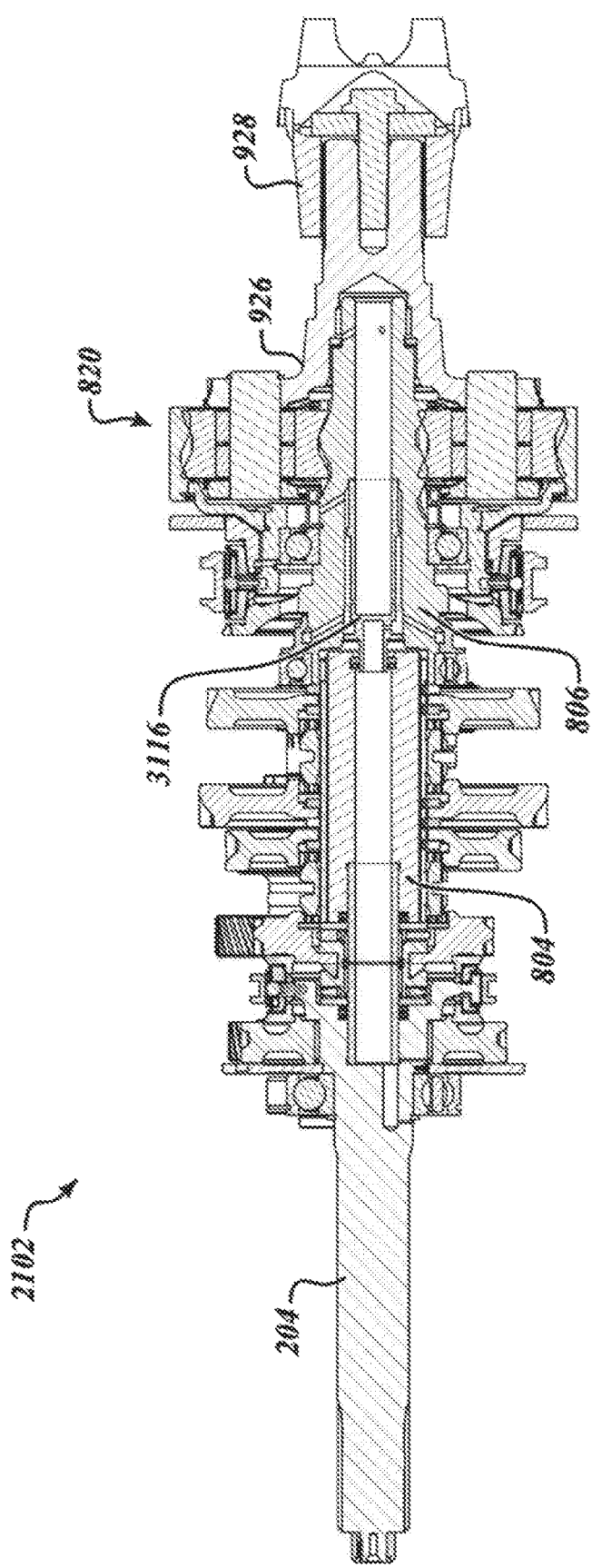
FIG. 25 depicts a cutaway view of an example driveline assembly.

Referencing FIG. 24, an example main driveline assembly 2102 is depicted schematically, with no cutaway on the assembly. The planetary gear assembly 820 in the example includes a ring gear 2202 coupled to the output shaft 926. The sliding clutch 920 engages a sun gear with planetary gears, changing the gear ratio of the planetary gear assembly 820. Additionally in the view of FIG. 24, an idler gear 2204 couples one or both countershafts 902, 904 to the reverse gear 818. The main driveline assembly 2102 as depicted in FIGS. 23 and 24 is a non-limiting illustration of an example driveline assembly, and other arrangements are contemplated herein. It can be seen in the example arrangement of FIGS. 21 and 22 that torque transfer throughout the transmission 100 occurs across helical gears, is shared between two countershafts reducing the torque loads on each countershaft, and provides for a projecting gear 2206 that extends radially outward at a greater extent from the countershaft 904 to facilitate radial engagement of PTO device. The example arrangement can be seen to be readily manufacturable within a cast housing. Additional features and/or benefits of an example main driveline assembly 2102 are described throughout the present specification. A given embodiment may have certain ones of the example features and benefits. Referencing FIG. 25, an example main driveline assembly 2102 is depicted schematically in a cutaway view. In certain embodiments, the main driveline assembly 2102 is consistent with other depictions of an example transmission, and the view of FIG. 25 provides a different view of the main driveline assembly 2102 to further illuminate example details.

Figure 26:
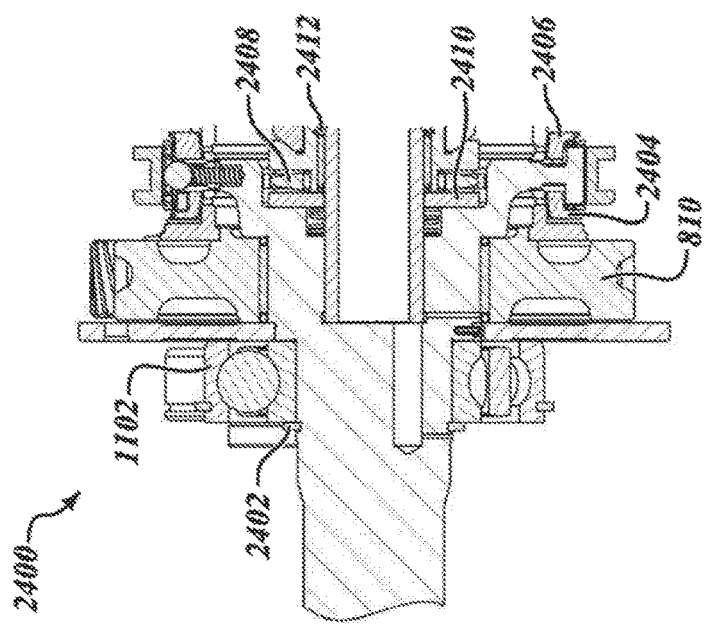
FIG. 26 depicts a cutaway view of an example input shaft assembly.

Referencing FIG. 26, an example input shaft assembly 2400 is depicted in cutaway view. The example input shaft assembly 2400 includes a snap ring 2402 that retains the first ball bearing 1102. The example input shaft assembly 2400 further depicts a first synchronizer ring 2404 that engages an input shaft gear 810, and a second synchronizer ring 2406 that engages a first forward gear 812. It can be seen in the example of FIG. 26 that engagement with the input shaft gear 810 rotationally couples the input shaft 204 to the countershafts 902, 904, and engagement with the first forward gear 812 couples the input shaft 204 to the first mainshaft portion 804 (e.g. when the first main shaft portion 804 is also coupled to the first forward gear 812) and/or the countershafts (e.g. when the first mainshaft portion 804 is not rotationally coupled to the first forward gear 812). The example input shaft assembly 2400 further includes a thrust bearing 2408, a thrust bearing washer 2410, and a roller needle bearing 2412. The example input shaft assembly 2400 does not include any taper bearings.

Figure 27:
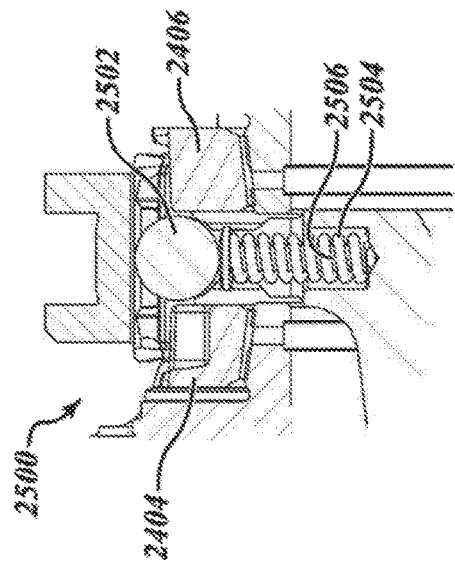
FIG. 27 depicts a cutaway view of an example actuator assembly.

Referencing FIG. 27, a close up view of an example first actuator 908 assembly 2500 is depicted schematically. The example assembly 2500 includes a synchronizer roller 2502 and the first and second synchronizer rings 2404, 2406. A synchronizer biasing member 2504 and synchronizer plunger 2506 position the synchronizer roller 2502 relative to the first actuator 908, while allowing flexibility during movement caused by shifting operations.

Figure 28:
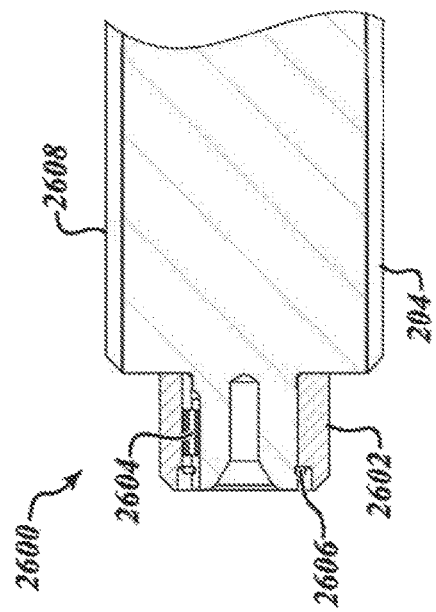
FIG. 28 depicts a cutaway view of an example input shaft end.

Referencing FIG. 28, an example first end 2600 of the input shaft 204 is depicted, which in the example of FIG. 28 is the end of the input shaft 204 positioned toward the prime mover. The example end 2600 includes a journal bearing 2602, with a coiled pin 2604 or similar fastener and a snap ring 2606 cooperating to ensure a desired position of the journal bearing 2602 is maintained. The example features of the input shaft 204 are a non-limiting example, and other configurations at the first end 2600 of the input shaft are contemplated herein. The outer surface 2608 of at least a portion of the input shaft 204 is splined, for example to rotationally engage the clutch 106 to the input shaft, thereby transferring torque from a prime mover output (e.g. a flywheel) to the input shaft 204.

Figure 29:
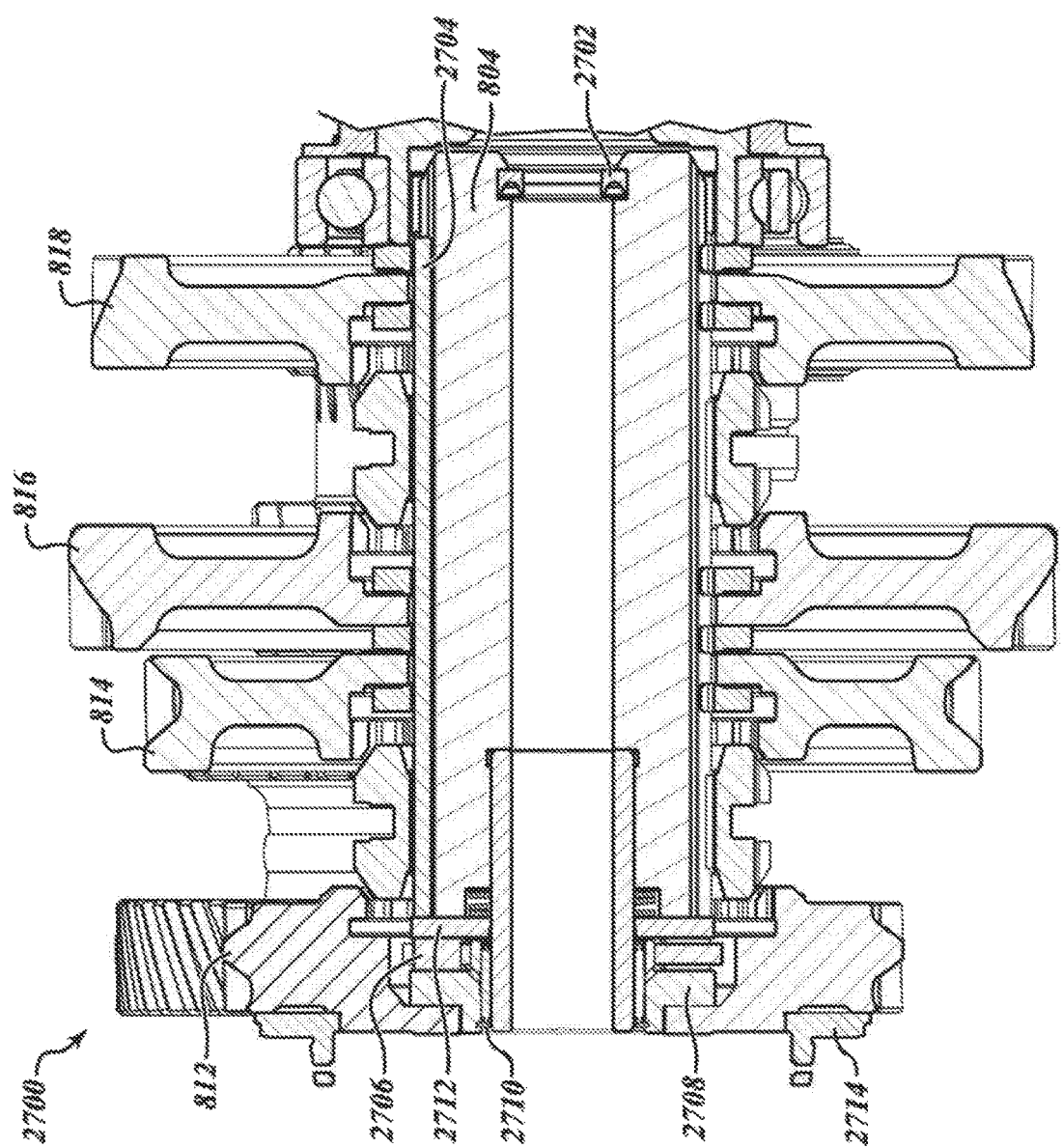
FIG. 29 depicts a cutaway view of an example main shaft portion.

Referencing FIG. 29, an example first main shaft portion assembly 2700 is depicted. In certain embodiments, the first main shaft portion 804 may be termed "the main shaft," the second main shaft portion 806 may be termed a "sun gear shaft" or similar term, and the output shaft assembly 110 including the output shaft 926 and driveline adapter 928 may be termed collectively the "output shaft." The naming convention utilized for parts in the transmission 100 is not limiting to the present disclosure, and any naming of parts performing various functions described herein is contemplated within the present disclosure. The example first main shaft portion assembly 2700 includes a seal 2702, which may be a cup seal, positioned within the first main shaft portion 804 to at least partially seal lubricating oil in the first main shaft portion 804. The example first main shaft portion assembly 2700 further includes the gears 812, 814, 816, 818 selectively coupled to the main shaft portion 804. The naming of gears herein—for example the first forward gear 812, is not related to the "gear" the transmission 100 is operating in—for example "first gear." The gear the transmission 100 operates in is determined by design according to the desired final output ratios of the transmission 100, and the transmission 100 operating in first gear may imply a number of gear connections within the transmission 100 to provide the implementation of an operational "first gear" for a vehicle or other application. Typically, gear progression occurs from a first gear to a highest gear, with the first gear providing the highest torque amplification (e.g. prime mover torque multiplied by the total gear ratio experienced at the output shaft 926, and/or further adjusted downstream of the transmission 100 before the load, such as at a rear axle), and the highest gear providing the lowest torque amplification (including an "amplification" ratio less than 1:1, for example in an overdrive gear). Any arrangement of gears and gear progressions are contemplated herein, and not limiting to the present disclosure. In certain embodiments, the transmission 100 operates in direct drive (e.g. all shafts 204, 804, 926 spinning at the same speed) and/or in partial direct drive operation (e.g. shafts 204, 804 spinning at the same speed, and shaft 926 having gear reduction from the planetary gear assembly 820).

The example first main shaft portion assembly 2700 further includes a mainshaft key 2704, which may be utilized, for example, to ensure alignment and/or positioning of the first main shaft portion 804. An example first main shaft portion assembly 2700 further includes a main shaft thrust bearing 2706 configured to accept thrust loads on the first main shaft portion 804, and a race bearing 2708 configured to accept radial loads on the first main shaft portion 804. In certain embodiments, the first main shaft portion assembly 2700 does not include any taper bearings. An example first main shaft portion assembly 2700 includes a main shaft snap ring 2710 and a thrust washer 2712, which cooperate to retain the bearings 2706 and 2708. The second actuator 912 and third actuator 914 (sliding clutches in the example of FIG. 29) are operated by shift forks from the integrated actuator assembly 1300 to provide for gear selection on the first main shaft portion 804. The example first main shaft portion assembly 2700 further includes a synchronizer flange 2714 utilized, in certain embodiments, to couple the input shaft 204 with the first forward gear 812 and/or first main shaft portion 804.

Referencing FIG. 30, an example countershaft 904, the lower countershaft in certain examples of the transmission 100, is depicted in a detailed view. The example countershaft 904 includes the gears 906 that are rotationally fixed, in certain embodiments, to the countershaft 904, and that mesh with the gears of the first main shaft portion 804 and/or input shaft 204. The example countershaft 904 includes a first engagement feature 2802 at a first end for interfacing with a friction brake. In certain embodiments, the friction brake may be termed an "inertia brake," "inertial brake," or the like, although the present disclosure is not limiting to any terminology or type of brake except where context specifically indicates. The friction brake may be any type of braking mechanism known in the art, including at least an electro-magnetic brake and/or a hydraulic brake, and may include any braking actuation understood in the art. Additionally or alternatively, any brake may engage the lower countershaft 904, the upper countershaft 902, or both. Where a different number of countershafts 902, 904 than two countershafts are present, any one or more of the countershafts may be engagable by a brake.

The example countershaft 902 further includes a second engagement feature 2804 configured to interface with a lubrication pump assembly 1600, for example by a driving element 1712 that keys in to a slot or notch on the countershaft 902. Any other engagement mechanism between at least one of the countershafts 902, 904 is contemplated herein, including a friction contact and/or clutch, a belt or chain driving a pump, and/or any other device known in the art.

The example countershaft 902 further includes a roller bearing 1108 positioned at each respective end of the countershaft 902. Referencing FIG. 31, a close-up detail of example roller bearings 1108 is depicted, with the first end roller bearing 1108 depicted in FIG. 31, and the second end roller bearing 1108 depicted in FIG. 32. The example roller bearing details in FIGS. 31 and 32 depict NUP style cylindrical roller bearings (e.g. having an integral collar in inner race, and a loose collar mounted to the inner race), although any type of cylindrical roller bearing may also be utilized, and in certain embodiments a different type of bearing altogether (e.g. a journal bearing, needle bearing, or other type of bearing) may be utilized depending upon the expected loads, required service life, and other aspects of a particular system. The example countershaft 902 further includes a countershaft snap ring 2902 positioned and configured to retain each respective bearing 1108, and one or more countershaft thrust washers 2806 (two, in the example of FIG. 30) positioned on each side of the first end roller bearing 1108. The number and placement of countershaft thrust washers 2806 are non-limiting, with certain embodiments optionally excluding one or more countershaft thrust washers 2806, and/or including countershaft thrust washers 2806 associated with the second end roller bearing 1108 according to the loads observed and/or expected in a given transmission 100.

Figure 33:
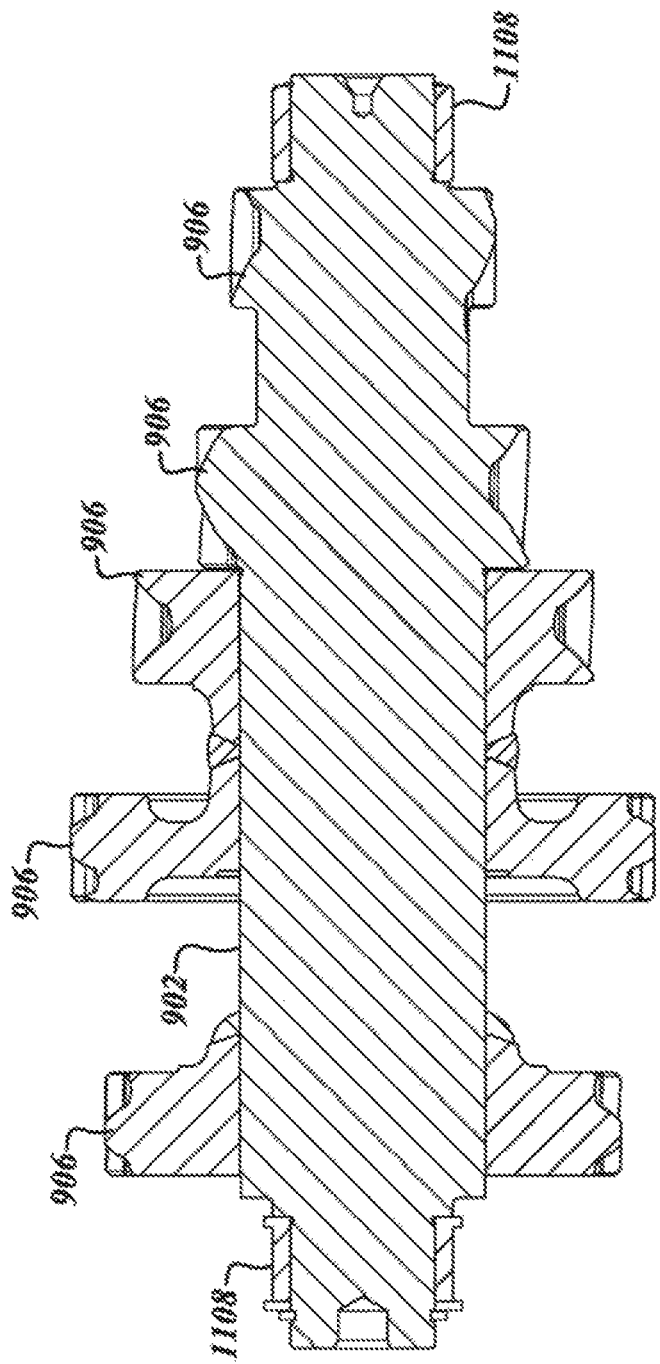
FIG. 33 depicts a cutaway view of an example countershaft.

Referencing FIG. 33, an example countershaft 902 is depicted. In the example of FIG. 33, the countershaft 902 corresponds to an upper countershaft in certain embodiments of the transmission 100, and is substantially similar to the lower countershaft 904 in several aspects. The example countershaft 902 does not include engagement features 2802, 2804 for a friction brake and/or a lubrication pump assembly 1600. In certain embodiments, the upper countershaft 902 may engage one or more of the friction brake and/or lubrication pump assembly 1600, either instead of or in addition to the engagement of the lower countershaft 904.

Referencing FIG. 34, an example planetary gear assembly 820 is depicted in cutaway view. The example planetary gear assembly 820 includes the second main shaft portion 806 coupled to a sun gear 3102, and the sliding clutch 920 that locks up the sun gear 3102, such that the second main shaft portion 806 directly drives the output shaft 926 (e.g. the sliding clutch 920 in forward position in the example of FIG. 34). In the locked up position, the planetary gears 3106 revolve around the sun gear 3102, without any rotation in one example. The sliding clutch 920 selectively couples the sun gear 3102 to planetary gears 3106 (e.g. in a rearward position), which additionally rotate within a ring gear 2202 in addition to revolving, providing gear reduction between the second main shaft portion 806 and the output shaft 926. The example planetary gear assembly 820 includes a synchronization flange 3108 to transfer rotation from the planetary gears 3106 about the drive axis to the output shaft 926. The example planetary gear assembly 820 includes a fixed plate 3112 grounded to transmission 100 enclosures (e.g. a rear housing 108) to fix sun gear 3102 rotation to the planetary gear 3106 rotations, although alternate arrangements for a planetary gear assembly 820 are contemplated herein. In certain embodiments, the third ball bearing 1106 and a thrust washer 3110 take thrust loads, where present. The alignment of ball bearings 1102, 1104, 1106, 1109 for example two on the second main shaft portion 806, and one on the input shaft 204, where the input shaft 204 further includes a ball bearing upstream on a prime mover engagement shaft (not shown—e.g. an engine crankshaft), enforces alignment of the driveline through the transmission, allowing the first main shaft portion 804 to float radially while avoiding fulcrum effects and the bearings and consequential additional loads on the transmission gears. The example planetary gear assembly 820 depicts a needle bearing 3118 positioned between the second main shaft portion 806 and the output shaft 926, and a thrust washer 3114 positioned on the second main shaft portion 806 side of the needle bearing 3118. The described type and position of bearings, thrust management devices, and the like, as well as the retaining mechanisms for those devices (e.g. the contours of the inner geometry of the second main shaft portion 806 and the output shaft 926 in the example of FIG. 34) are non-limiting examples, and any arrangement understood in the art is contemplated herein. The example second main shaft portion 806 further includes a lubrication tube 3116, having holes therein to provide lubrication flow to bearings in fluid communication with the second main shaft portion 806, and a close tolerance rather than a seal between the lubrication tube 3116 (and/or lubrication sleeve) and the second main shaft portion 806. The utilization of a close tolerance rather than a seal, in certain embodiments, utilizes resulting leakage as a controlled feature of the lubrication system, reducing losses from both constrained lubrication flow paths and friction from a seal.

Figure 35:
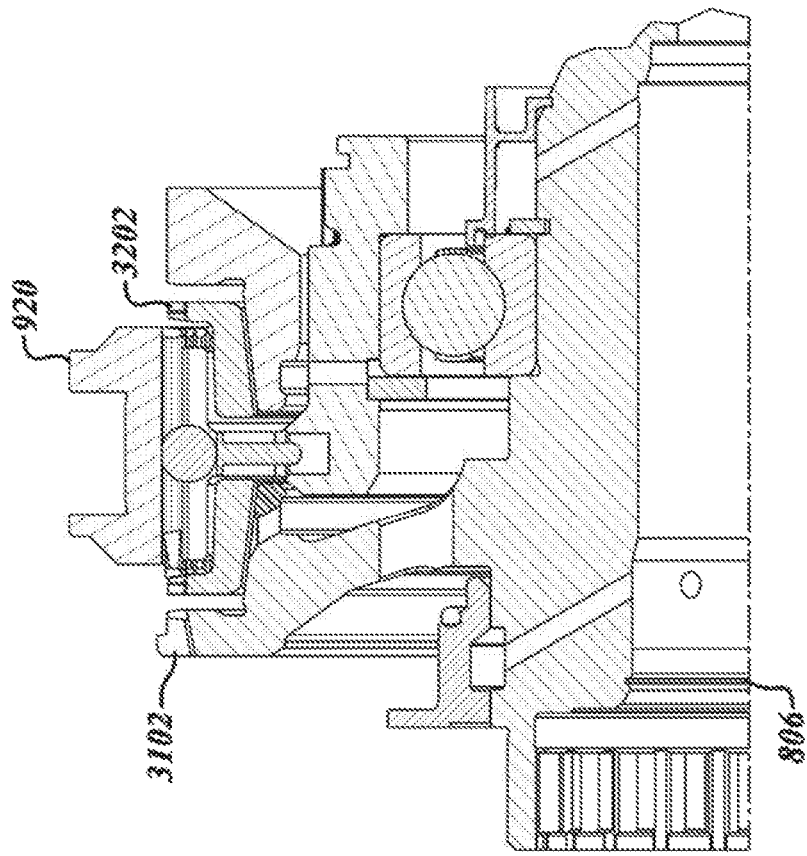
FIG. 35 depicts a detail view of an example sliding clutch.

Referencing FIG. 35, a detail view of the sliding clutch 920 and portions of the planetary gear assembly 820 are shown in cutaway view. The sliding clutch 920 engages a planetary synchronizer 3202 in a rearward position, coupling the sun gear 3102 to the planetary gears 3106, for example through the fixed plate 3112, which rotate within the ring gear 2202 and provide gear reduction to the output shaft 926. The sliding clutch 920 in the forward position locks up the sun gear 3102 rotation to the output shaft 926, providing for direct drive. In the example of FIG. 35, the second main shaft portion 806 is splined to the first main shaft portion 804, although alternative arrangements are contemplated in the present disclosure.

Figure 36:
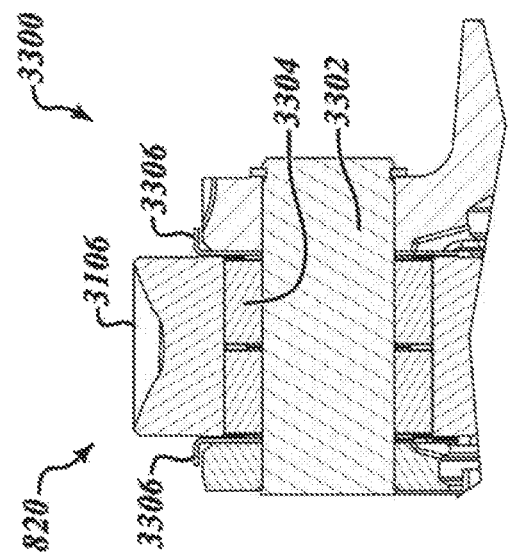
FIG. 36 depicts a detail view of an example output synchronization assembly.

Referencing FIG. 36, a detail view of an example output synchronization assembly 3300 is depicted. The output synchronization assembly 3300 includes the synchronization flange 3108 coupled to the planetary gear assembly 820 to bodily rotate with the planetary gear assembly 820. As the planetary gears 3106 rotate within the ring gear 2202, gear reduction through the planetary gear assembly 820 is provided. As the planetary gears 3106 are fixed to the ring gear 2202, direct drive through the planetary gear assembly 820 is provided. A snap ring (not shown) may be provided to retain planetary gear bearings 3302, and a needle roller bearing 3304 may be provided between each planetary gear bearing 3302 and the respective planetary gear 3106. In the example output synchronization assembly 3300, a thrust washer 3306 is provided at each axial end of the planetary gear bearings 3302.

Referencing FIG. 37, a portion of an output shaft assembly 110 is depicted in a combined cutaway and exploded view. The example output shaft assembly 110 includes the driveline adapter 928 and a coupling fastener 3402 (e.g. threaded appropriately to maintain position and/or having a retainer plate 3404). The example output shaft assembly 110 further includes the fourth ball bearing 1109 coupled to the output shaft 926, and an O-ring 3406 (e.g. for sealing) and/or a thrust washer 3408 coupled to the fourth ball bearing 1109. The example output shaft assembly 110 further includes a hub seal 3410 and a slinger assembly 3412, for example to provide lubrication to the output shaft assembly and/or the fourth ball bearing 1109.

Figure 38:
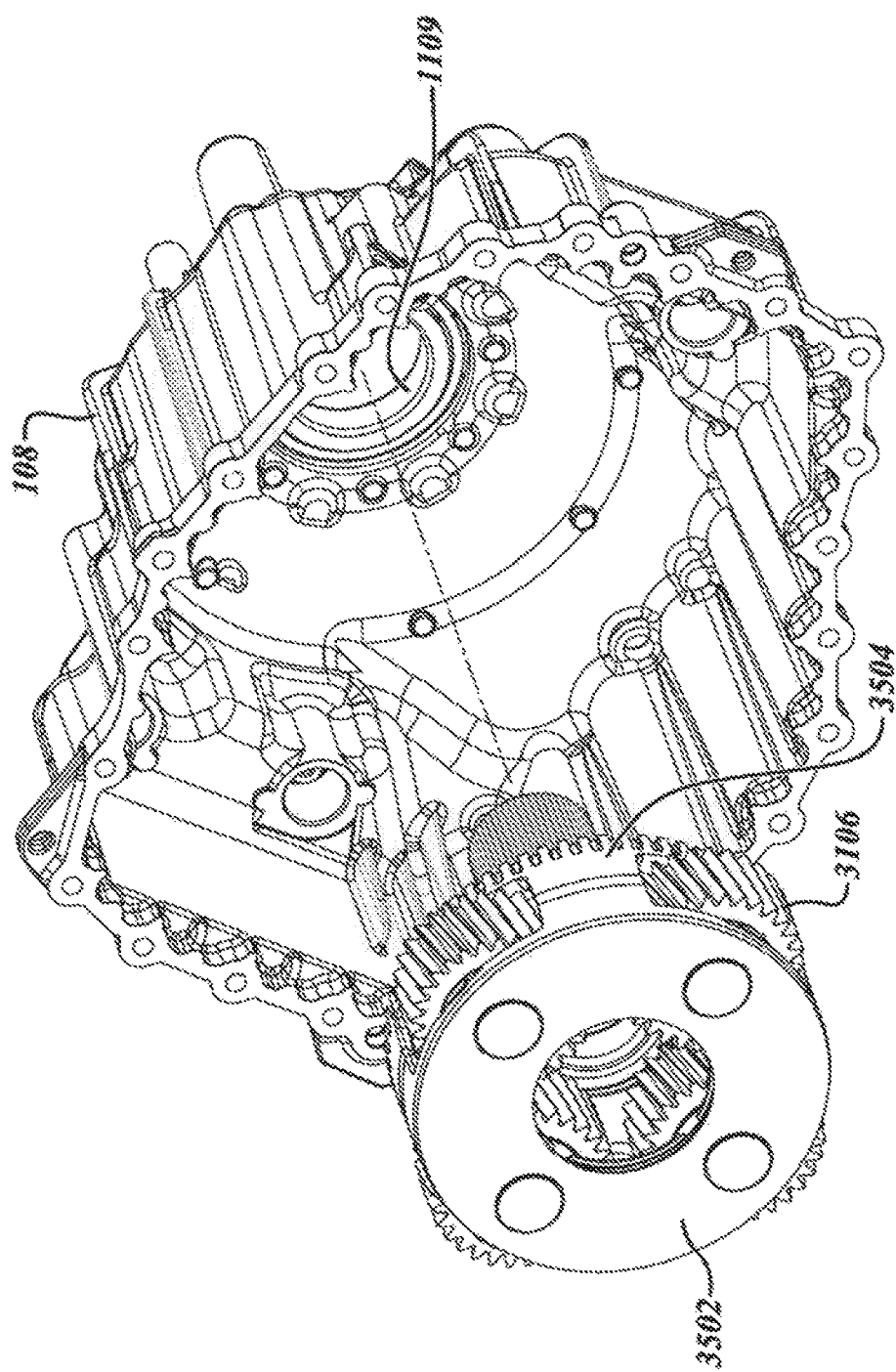
FIG. 38 depicts an example planetary gear assembly portion.
Figure 39:
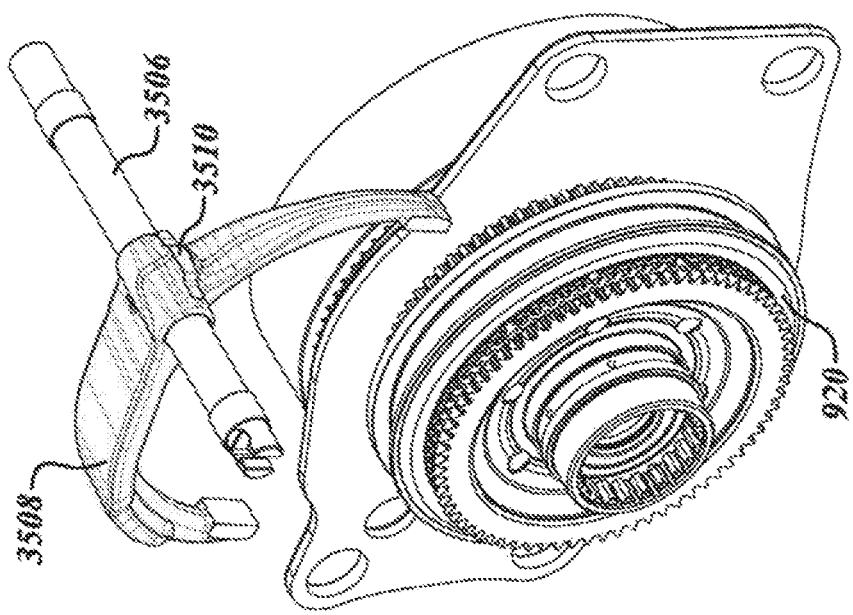
FIG. 39 depicts an example shift actuator in proximity to a sliding clutch.

Referencing FIG. 38, an example of a portion of planetary gear assembly 820 is depicted in proximity to a rear housing 108. The planetary gear assembly 820 depicts the planetary gears 3106 rotating on planetary gear bearings 3302 and positioned between a front disc 3502 and a toothed rear disc 3504. Referencing FIG. 39, a shift rail 3506 (e.g. operationally coupled to one of the additional actuation engagement points 1310, 1312 of the integrated actuator assembly 1300) is operationally coupled to a fourth actuator 3508 (e.g. a shift fork) that operates the sliding clutch 920 to selectively lock up the planetary assembly 820 (providing direct drive) and/or to allow the planetary gears 3106 to rotate within the ring gear 2202 and provide gear reduction across the planetary assembly 820. The example planetary gear assembly 820 depicts a roll pin 3510 coupling the fourth actuator 3508 to the shift rail 3506, although any coupling mechanism understood in the art is contemplated herein.

Figure 40:
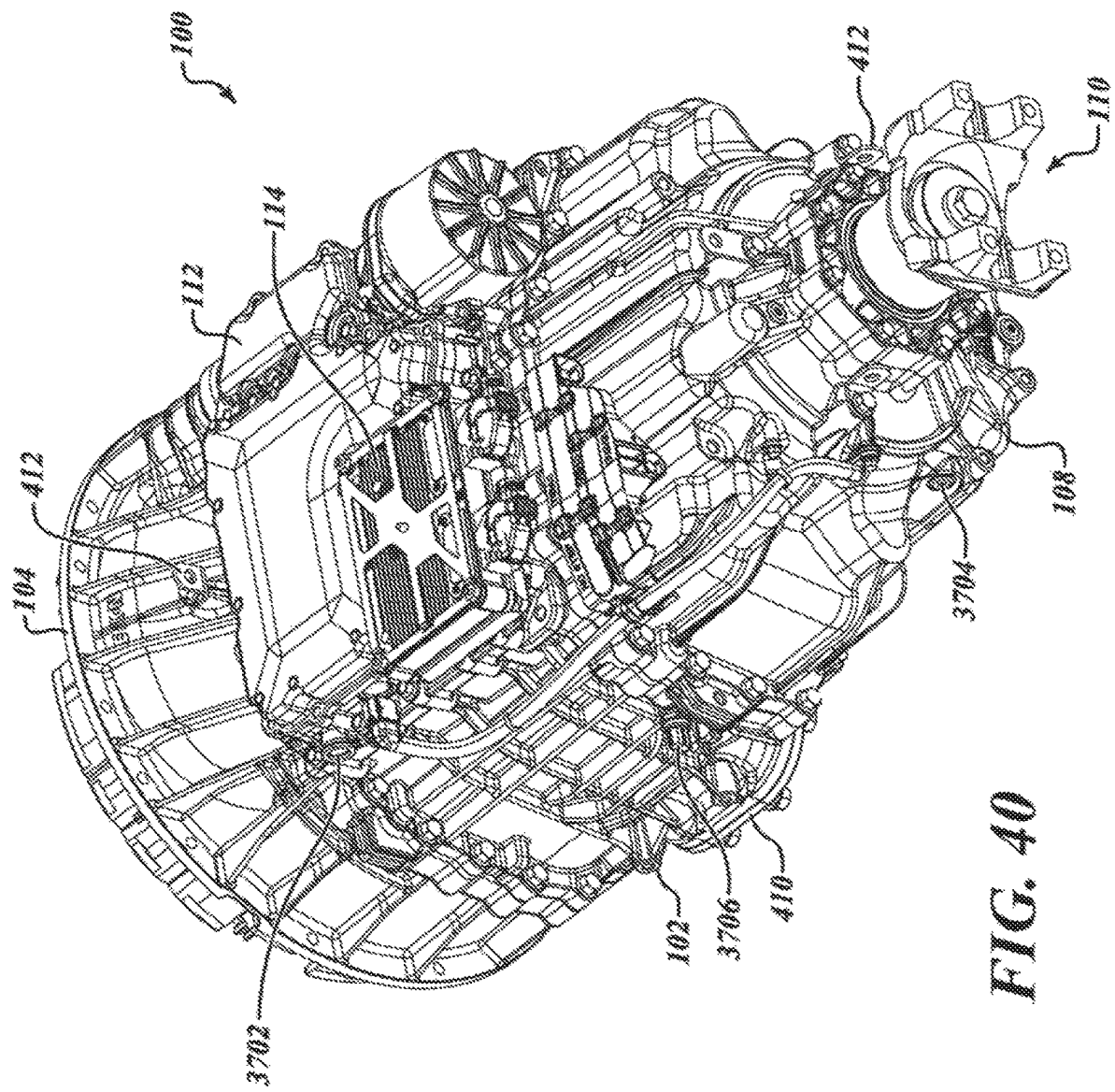
FIG. 40 depicts an example transmission.

Referencing FIG. 40, an example transmission 100 is depicted having features consistent with certain embodiments of the present disclosure. The example transmission includes the integrated actuator housing 112 positioned at the top of the transmission 100, with the TCM 114 mounted thereupon. The transmission 100 includes a number of lift points 412 positioned thereupon. The transmission 100 includes a single power interface 3702 for actuation, for example for a pneumatic input (e.g. an air input port 302) from a vehicle air supply or other source, which in certain embodiments provides for a single connection to power all shifting and clutch actuators on the transmission 100. The example transmission 100 further includes the output shaft assembly 110, configured for certain driveline arrangements, including a driveline adapter 928 coupled to an output shaft with a retainer plate 3404 and coupling fastener 3402. The example transmission includes a sensor port 304 configured to provide access for a sensor, for example an output shaft speed sensor, and a sensor access 3704 allowing for a sensor to be positioned within the transmission 100, for example within the rear housing 108 in proximity to a rotating component in the rear housing 108 such as the output shaft 926. The example transmission 100 further includes the clutch housing 104, optionally integrated with the integrated actuator housing 112, and also mounted on the top of the transmission 100 in the example of FIG. 40. The transmission 100 further includes a second sensor access 3706, for example providing a location to mount an oil pressure sensor 406. In one example, the oil pressure sensor 406 couples to a lubrication pump assembly 1600, providing ready access to determine oil pressure for the transmission 100. The example transmission 100 further depicts an 8-bolt PTO interface 410 at the bottom of the transmission 100. In certain embodiments, the transmission 100 does not include a cooling system (not shown), or a cooling interface, to a vehicle or application in which the transmission 100 is installed. Alternatively, an example transmission 100 includes a cooling system (not shown), which may be a contained coolings system (e.g. transmission 100 includes a radiator or other heat rejection device, and is not integrated with a cooling system outside the body of the transmission 100), and/or an integrated cooling system utilizing cooling fluid, heat rejection, or other cooling support aspects of a vehicle or application. In certain embodiments, one or more housing elements 102, 104, 108 are made of aluminum, and/or one or more housing elements are made of cast aluminum. The example transmission 100 includes a minimal number of external hoses and/or lines dedicated for transmission operation, for example zero external hoses and/or lines, a single external line provided as a sensor coupler 404, a single external line coupling an oil sensor coupler (not shown) that couples an oil pressure sensor 406 to the TCM 114, and/or combinations of these.

It can be seen that the example transmission 100 depicted in FIG. 40 provides an easily manipulable and integratable transmission 100, which can readily be positioned in a driveline with a minimal number of connections—for example a single power interface, a wiring harness connection at the electrical connectors 402, and may require no coolant or other fluid interfaces. In certain embodiments, the transmission 100 is similarly sized to previously known and available transmissions for similar applications, and in certain embodiments the transmission is smaller or larger than previously known and available transmissions for similar applications. In certain embodiments, the transmission 100 includes housing elements 102, 104, 108 that provide additional space beyond that required to accommodate the internal aspects of the transmission (gears, shafts, actuators, lubrication system, etc.), for example to match the transmission 100 to an expected integration size and/or to utilize one or more housing elements 102, 104, 108 in multiple configurations of the transmission 100 (e.g. to include additional gear layers on the input shaft 204 and/or first main shaft portion 804). The modular construction of the housing elements 102, 104, 108, gears, shafts, lubrication pump assembly 1300, and other aspects of the transmission 100 similarly promote re-usability of certain aspects of the transmission 100 across multiple configurations, while other aspects (e.g. clutch housing 104, main housing 102, and/or rear housing 108) are readily tailored to specific needs of a given application or configuration. The example transmission 100 further provides for ready access to components, such as the actuators and/or clutch bearings, which in previously known and available transmissions require more complex access to install, service, integrate, and/or maintain those components. In certain embodiments the transmission 100 is a high output transmission; additionally or alternatively, the transmission 100 is a high efficiency transmission.

The term high output, as utilized herein, is to be understood broadly. Non-limiting examples of a high output transmission include a transmission capable of operating at more than 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, and/or more than 3000 foot-pounds of input torque at a specified location (e.g. at a clutch face, input shaft, or other location in the transmission). Additional or alternative non-limiting examples include a transmission capable of providing power throughput of more than 200, 250, 300, 350, 400, 450, 500, 550, 600, 650, 700, 1000, 1500, 2000, 2500, 3000, and/or more than 5000 horsepower, wherein power throughput includes the power processed by the transmission averaged over a period of time, such as 1 second, 10 seconds, 30 seconds, 1 minute, 1 hour, and/or 1 day of operation. Non-limiting examples of a high output transmission include a transmission installed in an application that is a vehicle having a gross vehicle weight exceeding 8500, 14,000, 16,000, 19,500, 26,000, 33,000, up to 80,000, up to 110,000, and/or exceeding 110,000 pounds. Non-limiting examples of a high output transmission include a transmission installed in an application that is a vehicle of at least Class 3, at least Class 4, at least Class 5, at least Class 6, at least Class 7, and/or at least Class 8. One of skill in the art, having the benefit of the disclosures herein, will understand that certain features of example transmissions in the present disclosure may be beneficial in certain demanding applications, while the same or other features of example transmissions may be beneficial in other demanding applications. Accordingly, any described features may be included or excluded from certain embodiments and be contemplated within the present disclosure. Additionally, described examples of a high output transmission are non-limiting, and in certain embodiments a transmission may be a high output transmission for the purposes of one application, vehicle, power rating, and/or torque rating, but not for the purposes of other applications, vehicles, power ratings, and/or torque ratings.

The term "high efficiency," as used herein, is to be understood broadly. A high efficiency transmission is a transmission having a relatively high output value and/or high benefit level, in response to a given input value and/or cost level. In certain embodiments, the high output value (and/or benefit level) is higher than that ordinarily present in previously known transmissions, the given input level (and/or cost level) is lower than ordinarily present in previously known transmissions, and/or a difference or ratio between the high output value (and/or benefit level) and the given input level (and/or cost level) is greater than that ordinarily present in previously known transmissions. In certain embodiments, the output value and/or the input level are within ranges observed in previously known transmissions, but the transmission is nevertheless a high efficiency transmission—for example because the difference or ratio between the high output value and the given input level is high, and/or because other benefits of certain embodiments of the present disclosure are additionally evident in the example transmission. A "high output value" should be understood to encompass a relatively high level of the benefit—for example a lower weight transmission has a higher output value where the weight is considered as the output side of efficiency. A "low input value" should be understood to encompass a relatively low cost or input amount—for example a lower weight transmission has a lower cost value where the weight is considered as the input side of the efficiency. Example and non-limiting output values include a transmission torque level (input, output, or overall gear ratio), a number of available gear ratios, a noise reduction amount, a power loss description, a reliability, durability and/or robustness value, ease of maintenance, quality of service, ease of integration, and/or ease of installation, a responsiveness value (e.g. clutch engagement and/or shifting), a consistency value (e.g. repeatability of operations, consistent driver feel, high degree of matching to a previously known configuration), transmission induced down time values, and/or a service life value. Example and non-limiting input values include a transmission cost, transmission weight, transmission noise level, engineering design time, manufacturing ease and/or cost, installation and/or integration time (e.g. time for the installation, and/or engineering work to prepare the installation plan and/or configure other parts of a vehicle or application to accommodate the transmission), a total cost of ownership value, scheduled maintenance values, average maintenance and/or repair values (e.g. time and/or cost), transmission induced down time values, and/or application constraints (e.g. torque or power limits—absolute, time averaged, and/or in certain gear configurations). The described examples of a high efficiency transmission are non-limiting examples, and any high efficiency descriptions known to one of skill in the art, having the benefit of the disclosures herein, are contemplated within the present disclosure. One of skill in the art, having the benefit of the disclosures herein and information ordinarily known about a contemplated application or installation, such as the functions and priorities related to performance, cost, manufacturing, integration, and total cost of ownership for the application or installation, can readily configure a high efficiency transmission.

It can be further seen that the example transmission 100 provides, in certain embodiments, a reduction in overall bearing and gear loads throughout the transmission 100, for example through the utilization of high speed countershafts, helical gearing to improve and/or optimize sliding speeds and gear loading, and/or gear tooth shaping to configure gear tooth contact area, structural integrity, and control of sliding speed profiles and deflection of gear teeth. In certain embodiments, the use of high speed countershafts allows smaller and/or lighter components, including at least rotating components (e.g. shafts and gears), bearings, and lubrication systems. In certain embodiments, the utilization of helical gears and/or shaped gear teeth allows for reduction in sliding losses (e.g. increased power transfer efficiency and reduction in heat generated) while also allowing a transmission 100 to meet noise constraints. In certain embodiments, the configuration to allow for noise control allows for certain aspects of the transmission 100 to be configured for other desirable purposes that otherwise would increase the noise emissions from the transmission 100, such as the use of aluminum housings, configuring for ease of access to shift and/or clutch actuators, the use of a linear clutch actuator, and/or positioning of access to major transmission features, such as actuators, at the top of the transmission which may put them in proximity to a passenger compartment or other noise sensitive area in an application or vehicle. In certain embodiments, the use of helical gearing allows a degree of freedom on thrust (axial) loads, directing thrust loads to selected positions in the transmission 100 such as a support bearing and/or a bearing positioned between shafts having low speed differentials, and/or away from housing enclosures or bearings.

In certain embodiments, the utilization of high speed countershafts additionally or alternatively reduces speed differences between shafts, at least at selected operating conditions, and supports the management of thrust loads in the transmission 100. In certain embodiments, helical gears on a planetary gear assembly provides for a reduced length of countershafts (e.g. countershafts do not need to extend to the output shaft), a reduction in a number of countershafts (e.g. additional countershafts for power transfer between a main shaft and the output shaft are not required). Additionally or alternatively, helical gears on a planetary gear assembly are load balanced, in certain embodiments, to remove gear loading from enclosures and/or bearings coupled to enclosures. In certain embodiments, features of the transmission 100, including but not limited to thrust load management features, provide for load management with the use of efficient bearings, for example, with a reduced number of or elimination of tapered bearings in the transmission 100. In certain embodiments, features of the transmission 100 include a high efficiency lubrication system, for example utilization of a smaller lubrication pump (e.g. short lubrication runs within the transmission 100, reduction or elimination of spinning shaft slip rings in the transmission 100, and/or higher pump speed powered by a high speed countershaft), the use of a dry sump lubrication system, and/or the use of a centrally located lubrication pump assembly. In certain embodiments, the transmission 100 provides for lower power transfer losses than previously known transmissions, and/or provides for similar or improved power losses in an overdrive transmission relative to previously known transmission systems using direct drive, allowing for other aspects of a system or application to operate at lower speeds upstream of the transmission (e.g. prime mover speed) and/or higher speeds downstream of the transmission (e.g. a load component such as a driveline, rear axle, wheels, and/or pump shaft) as desired to meet operational goals of those aspects.

In certain embodiments, the transmission 100 utilizes a clutch and shifts gears utilizing actuators that move gear shifting elements or actuators (e.g utilizing shift forks and sliding clutches, with synchronizer elements). An example and non-limiting application for embodiments of the transmission is an automated transmission, and/or a manual automated transmission. Certain aspects and features of the present disclosure are applicable to automatic transmissions, manual transmissions, or other transmission configurations. Certain features, groups of features, and sub-groups of features, may have applicability to any transmission type, and/or may have specific value to certain transmission types, as will be understood to one of skill in the art having the benefit of the present disclosure.

Figure 41:
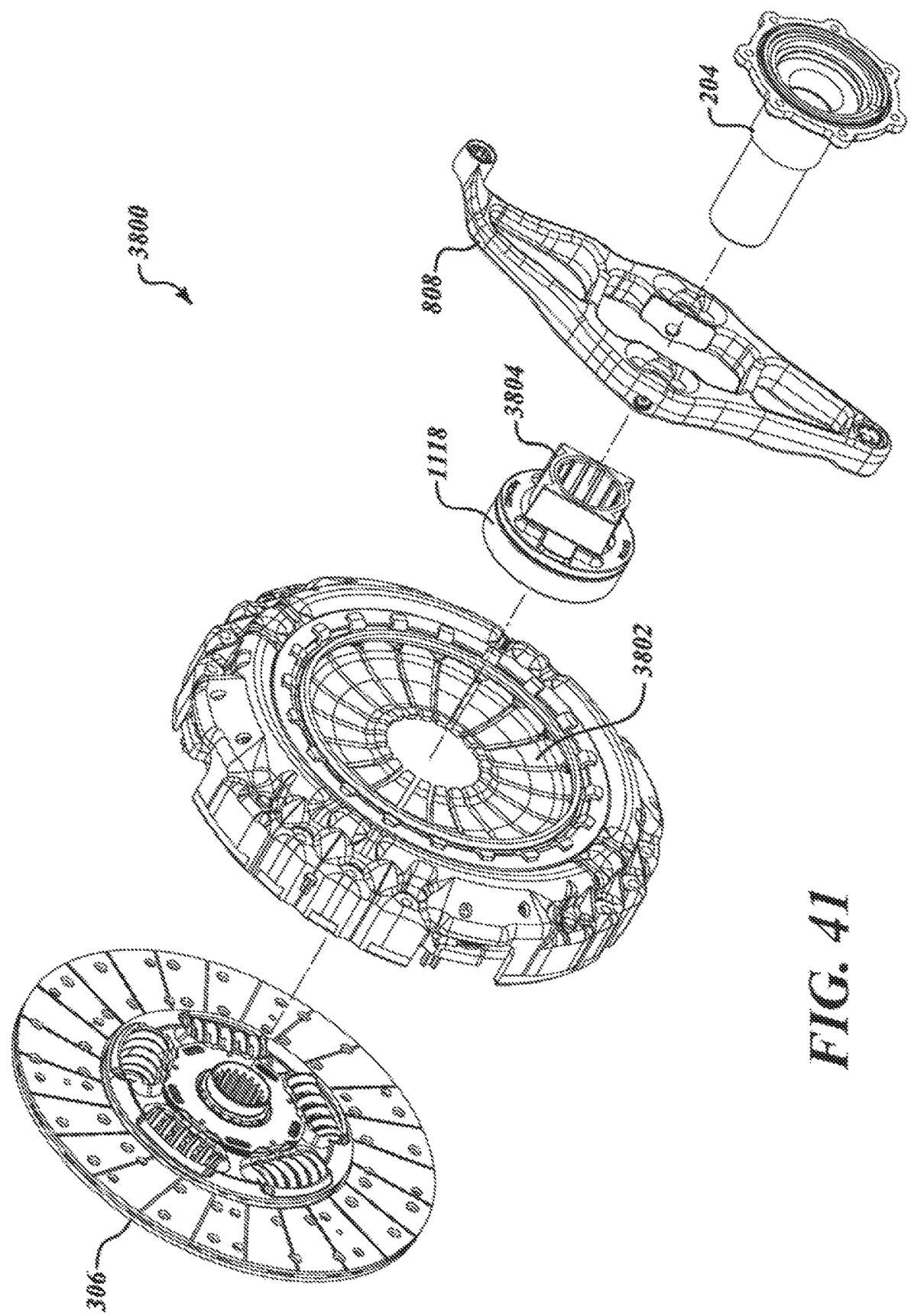
FIG. 41 depicts an example exploded clutch assembly.

Referencing FIG. 41, an example clutch operation assembly 3800 is depicted illustrating certain aspects of a clutch assembly and operational portions of the transmission 100 interacting with the clutch assembly. The example clutch operation assembly 3800 provides a clutch 106 that is responsive to a linear clutch actuator 1002, and that adjusts a position of the clutch 106 such that, as the clutch face wears 306, the engagement point of the linear clutch actuator 1002 remains constant for a selectable amount of wear on the clutch face 306. The inclusion of a clutch operation assembly 3800 responsive to a linear clutch actuator 1002, and/or that provides for a constant engagement point for a linear or concentric clutch actuator, are optional configurations that are included in certain embodiments of the transmission 100, and may not be included in other embodiments of the transmission 100. Any clutch operation assembly 3800 known in the art is contemplated herein, including alternate arrangements to provide for engagement with a linear clutch actuator 1002, and/or alternate arrangements to provide for maintenance of an engagement point for a clutch actuator over a selectable amount of wear on the clutch face 306. In certain embodiments, the liner actuator 1002 is additionally or alternatively self-adjusting, allowing for the actuating volume for the actuator to remain consistent as the clutch, clutch engagement yoke 808, linear actuator 1002, and/or other aspects of the system wear and/or change over the life cycle of the transmission 100. In certain embodiments, the actuating volume is consistently maintained as a near-zero actuating volume. In certain embodiments, the consistency of the actuating volume and/or a maintained near-zero actuating volume provides for improved response time and improved control accuracy throughout the life cycle of the transmission 100, and provides for qualitative improvements in clutch operation such as capabilities to utilize the clutch rapidly during shifts (e.g., to mitigate tooth butt events and/or reduce backlash impact on gear meshes).

The example clutch operation assembly 3800 includes the input shaft 204 and the release bearing 1118, and the clutch face 306 that engages the prime mover. The example clutch operation assembly 3800 further includes a diaphragm spring 3802 that biases the clutch face 306 to an engaged position (toward the prime mover and away from the transmission 100), and upon actuation by the clutch engagement yoke 808 (e.g. the clutch engagement yoke 808 pushed forward by the clutch actuator 1002) withdraws the clutch face 306 from the engaged position. Any other actuation mechanism for a clutch is contemplated herein. The clutch operation assembly 3800 further includes a bearing housing 3804 that engages and retains the release bearing 1118, and further includes a landing face on the release bearing 1118 that engages the clutch engagement yoke 808.

Figure 42:
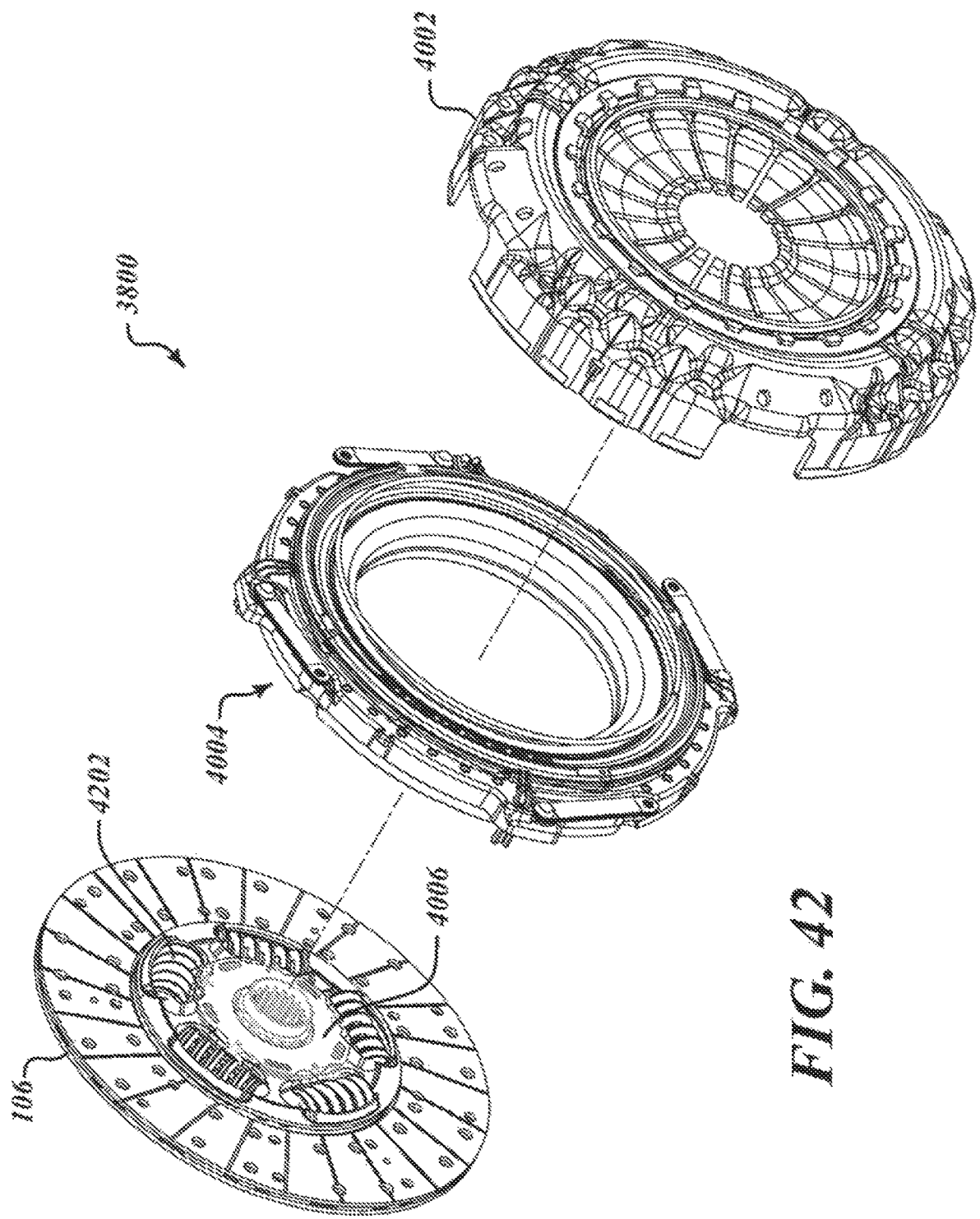
FIG. 42 depicts an example exploded clutch assembly.
Figure 44:
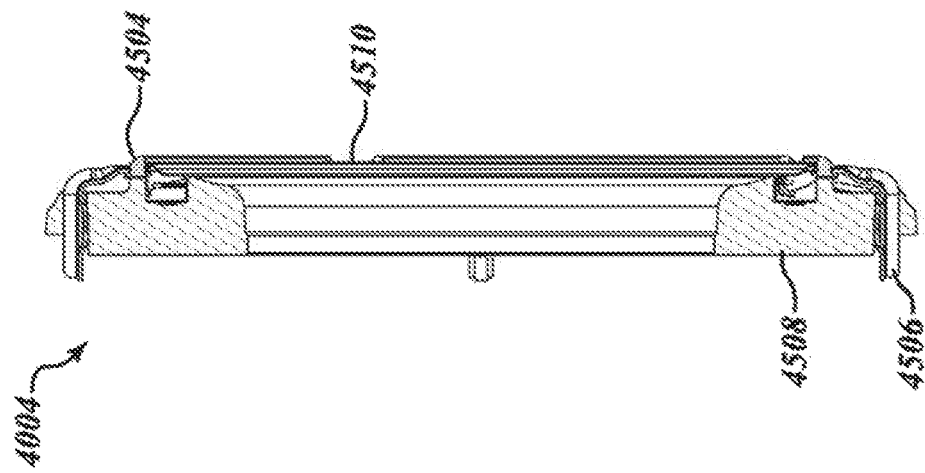
FIG. 44 depicts an example pressure plate assembly.
Figure 43:
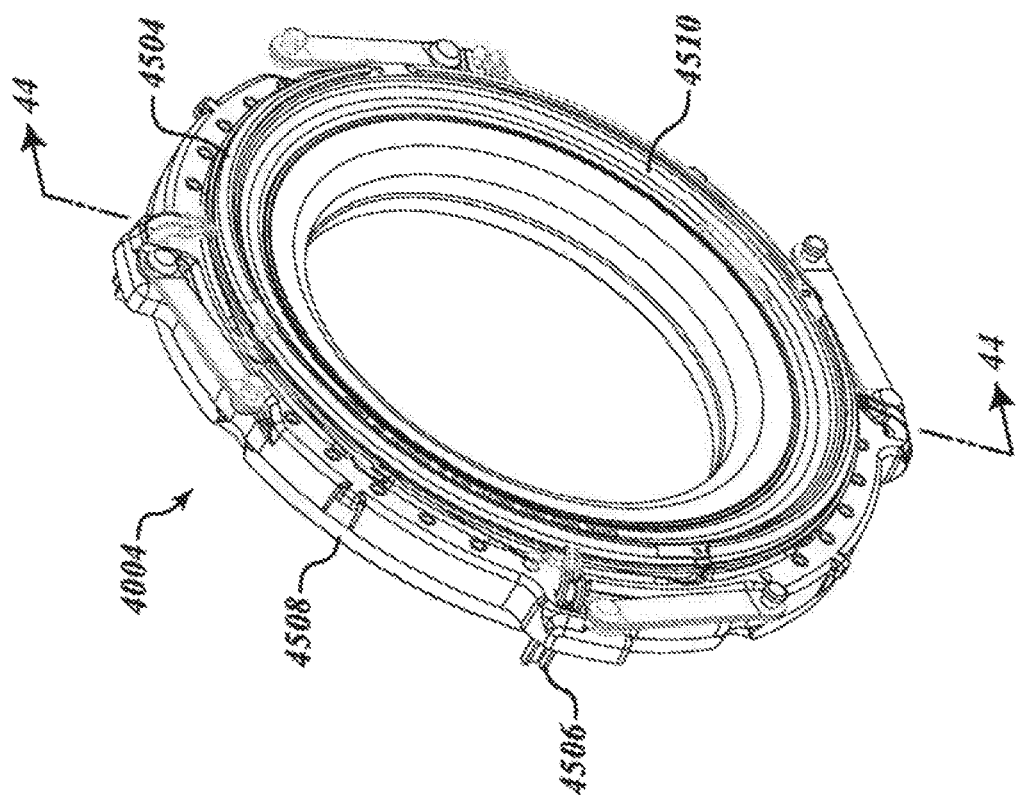
FIG. 43 depicts an example pressure plate assembly.

Referencing FIG. 42, a portion of the clutch operation assembly 3800 is depicted in exploded view. The clutch operation assembly 3800 includes the clutch 106, having torsion springs 4202 and a pre-damper assembly 4006 coupled thereto. The clutch operation assembly 3800 includes a pressure plate assembly 4004 and the diaphragm spring assembly bracket 4002. Referencing FIG. 43, a detail view of the example pressure plate assembly 4004 is depicted in a perspective view (FIG. 43) and a side cutaway view (FIG. 44). The example pressure plate assembly 4004 includes a cam ring 4504 and control fingers 4506 coupled to a pressure plate 4508. The cam ring 4504 rotates and cooperates with the control fingers 4506 to position the clutch 106 such that, as the clutch face wears 306, the release bearing 1118 maintains a same position relative to the clutch engagement yoke 808. Accordingly, even as the clutch face 306 wears, the clutch actuator 1002 returns to the same position within the clutch actuator housing 104. After a selected amount of wear, the control fingers 4506 prevent further adjustment, and the clutch actuator 1002 will no longer return all the way to the starting point. Accordingly, a high degree of responsiveness and repeatability for clutch engagement is provided in the example transmission 100, while allowing for diagnostics and/or detection of clutch face 306 wear, where the clutch is still operable but the clutch actuator 1002 return position responds to clutch face 306 wear. The example pressure plate assembly 4004 includes a torsion spring (not shown) coupled to the cam ring 4504 to urge rotation of the cam ring 4504 as the clutch face 306 wears, and a cam baffle 4510 having teeth thereon to prevent counter-rotation of the cam ring 4504.

Various example embodiments of the present disclosure are described following. Any examples are non-limiting, and may be divided or combined, in whole or part. The example embodiments may include any aspects of embodiments throughout the present disclosure.

Certain embodiments of a high efficiency transmission are described following. The description of certain characteristics as promoting transmission efficiency are provided as illustrative examples. Efficiency promoting characteristics may be included in a particular embodiment, while other characteristics may not be present. Efficiency promoting characteristics may be combined, used in part where applicable, and sub-groupings of any one or more of the described efficiency characteristics may be included in certain embodiments. The description of any feature or characteristic as an efficiency-promoting feature is not limiting to any other feature of the present disclosure also promoting efficiency, and in certain embodiments it will be understood that a feature may promote efficiency in certain contexts and/or applications, and decrease efficiency in other contexts and/or applications.

An example transmission 100 includes one or more housing elements 102, 104, 108 that are made at least partially of aluminum. In certain embodiments, housing elements 102, 104, 108 may be cast aluminum. The use of aluminum introduces numerous challenges to the performance of a transmission 100, and in certain embodiments introduces more challenges where the transmission 100 is a high output transmission. For example, and without limitation, aluminum is typically not as strong as steel for a given volume of material, is softer than steel, and has different stress characteristics making it less robust to stress in certain applications. Changes to the stress capability of the housing material have consequences throughout the transmission—for example bolt bosses generally must be deeper for equivalent robustness, and housing enclosures have to be thicker and/or have stress management features for equivalent stresses experienced at the housing. Aluminum also does not insulate noise as well as offset materials, such as steel.

The example transmission 100 includes a power thrust management arrangement that neutralizes, cancels, reduces, and/or redirects the primary power thrust loads experienced within the transmission. In certain embodiments, the power thrust management arrangement redirects thrust loads away from housings and/or transmission enclosures, allowing for reduced strength of the housings with sufficient durability and robustness for a high output transmission. An example power thrust management arrangement includes helical gears in the power transfer line throughout the transmission 100—for example the countershaft 902, 904 gear meshes—where the helical gear angles are selected to neutralize, reduce, and/or redirect primary power thrust loads experienced within the transmission 100. The adjustments of thrust loads may be, in certain embodiments, improved or optimized for certain operating conditions—for example gear ratios likely to be engaged a higher load conditions, gear ratios likely to be involved in higher speed differential operations across thrust bearings, and the like. A gear engagement on the input shaft 204 side of the transmission 100 with the countershaft 902, 904 has one or more corresponding gear engagements on the first main shaft portion 804 side of the transmission 100 (depending upon the available gear ratios and gear shifting plan), and the thrust management aspects of the helical gears include selected helix angles for the various gear meshes to adjust the thrust profile and thrust duty cycle of the transmission 100. Certain considerations in determining the helical gear geometries include, without limitation: the load duty cycle for the application, installation, or vehicle (loads and/or speeds, as well as operating time), the gear ratios at each mesh and the duty cycle of opposing gear mesh engagement scenarios, and noise and efficiency characteristics of the helical gear ratio selections. One of skill in the art, having the benefit of the present disclosure and information ordinarily available about a contemplated system, can readily determine helical gear ratios to perform desired power thrust management operations in a transmission 100. In certain embodiments, thrust loads are redirected to a thrust management device, such as a thrust bearing, which is positioned between rotating shafts having a lowest speed differential (e.g. the input shaft 204 to first main shaft portion 804). In certain embodiments, the transmission 100 does not include tapered bearings.

An example transmission 100 includes a low loss lubrication system. Losses, in the present instance, refer to overall power consumption from the lubrication system, regardless of the source of the power consumption, and including at least pumping work performed by the lubrication system, viscous losses of moving parts in the transmission 100, and/or parasitic losses in the lubrication system. The example low loss lubrication system includes a dry sump, wherein the rotating portions of the transmission 100 (e.g. gears, shafts, and countershafts) are not positioned, completely and/or partially, within lubricating fluid in the sump. An example lubrication pump assembly 1600, drawing lubrication fluid for the pump from the rear housing 108, provides a non-limiting example of a lubrication system having a dry sump. An example low loss lubrication system further includes a centralized lubrication pump, such that lubrication paths within the transmission 100 have a shortened length, and/or a reduced or optimized overall length of the lubrication channels. An example lubrication pump assembly 1600, integrated within the transmission 100 and coupled to a countershaft or other rotating element of the transmission 100, provides a non-limiting example of a centralized lubrication system. In certain embodiments, utilization of centralized lubrication tubes 1802 and/or 1804 provide for reduced-length runs of lubrication channels. Additionally or alternatively, an example transmission 100 includes a lubrication tube positioned inside the first main shaft portion and/or second main shaft portion, having holes therein to provide a portion of the lubrication paths to one or more bearings, and additionally or alternatively does not include seals on the lubrication tube. In certain further embodiments, a low loss lubrication system includes a lubrication pump driven by a high speed countershaft, where the high speed of the countershaft provides for a higher lubrication pump speed, thereby allowing for a smaller lubrication pump to perform lubrication pumping operations, reducing both pumping losses and/or weight of the lubrication pump and/or associated lubrication pump assembly 1600.

An example transmission 100 includes one or more high speed countershafts 902, 904. The term "high speed" with reference to countershafts, as utilized herein, is to be understood broadly. In certain embodiments, a high speed countershaft rotates at a similar speed to the input shaft 204 and/or the first main shaft portion 804, for example at the same speed, within +/−5%, +/−10%, +/−15%, +/−20%, +/−25%, and/or within +/−50% of the speed of the input shaft 204 and/or first main shaft portion 804. In certain embodiments, a high speed countershaft has a higher relative speed than a countershaft in an offset transmission for a similar application, where similarity of application may be determined from such considerations as power rating, torque rating, torque multiplication capability, and/or final load output and/or duty cycle. A speed that is a high relative speed to an offset transmission includes, without limitation, a speed that is at least 10% higher, 20% higher, 25% higher, 50% higher, 100% higher, up to 200% higher, and greater than 200% higher. In certain embodiments, utilization of high speed countershafts 902, 904, allows for smaller devices operating in response to the rotational speed of the countershafts—for example a lubrication pump driven by a countershaft 902, 904. In certain embodiments, a PTO device driven by one of the countershafts can utilize the higher countershaft speed for improved performance. In certain embodiments, utilization of high speed countershafts 902, 904 allows for reductions of gear and bearing components, as the countershaft operates at a speed closer to the input shaft and/or first main shaft portion speed than in a previously known transmission, providing for lower loads on meshing gears and bearings, and/or providing for more rapid gear shifts with lower losses (less time to shift, and/or less braking to bring the countershaft speed closer to the engaging speed, for example on an upshift). In certain embodiments, lower loads on the countershafts, due to the high speed configuration and/or a twin configuration sharing loads, allows for the countershaft to be a lower size and/or weight. In certain embodiments, the twin countershafts provide for noise reduction, for example from reduced size of engaging components and/or lower engagement forces. Additionally or alternatively, lower rotational inertia from the countershafts has a lower effect on clutch speed during shifts—for example through transfer of countershaft inertia to the clutch before clutch re-engagement, allowing for a faster and lower loss (e.g. lower braking applied to slow the system back down) shifting event.

In certain embodiments, a gear ratio at the front of the transmission 100 is lower relative to a gear ratio at the rear of the transmission 100. In certain embodiments, providing greater torque amplification at the rear of the transmission (e.g. from the countershaft(s) to the second main input shaft portion 804) than at the front of the transmission 100 (e.g. from the input shaft 204 to the countershaft(s)) provides for more efficient (e.g. lower losses) power transfer than more evenly stepping up torque amplification. For example, a total ratio of 4:1 provided as a first step of 1:1 and a second step of 4:1 for most example transmissions 100 provides for a lower loss power transfer than a first step of 2:1 and a second step of 2:1, while providing the same overall torque amplification. In certain embodiments, a rear:front amplification ratio is greater than 1.5:1, greater than 2:1, greater than 2.5;1, greater than 3:1, greater than 3.5:1, greater than 4:1, greater than 4.5:1, and/or greater than 5:1. For example, where an overall torque amplification ratio of 5:1 is desired, an example transmission includes a front transfer of 1.25:1 and a rear transfer of 4:1. The described ratios and embodiments are non-limiting examples. One of skill in the art, having the benefit of the disclosures herein, will readily appreciate that, in certain embodiments, high speed countershafts facilitate lower front torque amplification ratios—for example at a torque amplification ratio near unity (1), gear teeth count between the countershaft and the input shaft are also near unity, and accordingly gear sizes can be kept low if the countershaft turns at a high rate of speed. In certain embodiments, a high speed countershaft facilitates selection of gear sizes to meet other constraints such as providing an interface to a PTO device, providing for gear geometries within a transmission 100 to facilitate manufacture and assembly within a cast housing, and/or to keep gear outer diameters in a normal range. Gear sizes provided within a normal range—i.e. not constrained to be large on either the input shaft 204 and/or the countershaft 902, 904 by torque amplification requirements—allow for controlling torsional forces on the shafts and gear fixing mechanisms (e.g. welds and/or synchronizer devices) low and/or controlling a final geometric footprint of the housing (e.g. the main housing 102) to provide for a compact and/or easily integrated transmission 100.

In certain embodiments, a twin countershaft arrangement provides for balanced forces on the input shaft 204 and/or first main shaft portion 804, and lower cost bearings at one or more gear locations on the input shaft 204 and/or first main shaft portion 804 are provided—for example a journal bearing, bushing, a washer, and/or a race bearing. In certain embodiments, a needle bearing is provided at one or more gear locations on the input shaft 204 and/or the main shaft portion 804, for example on a gear expected to take a radial load, including, for example, a gear on the input shaft 204 close to the power intake for the transmission 100, and/or a gear coupled to the countershaft for powering a PTO device.

In certain embodiments, helical gearing on the countershafts 902, 904 and meshing gears thereto provides for high efficiency operation for the transmission 100. For example, helical gearing provides for thrust management control of the power transfer in the transmission, allowing for lower weight and cost components, such as bearings. Additionally or alternatively, thrust management control of the gears allows for reduced housing weight and/or strength for a given power or torque throughput. Additionally or alternatively, helical gear engagement allows for reduced noise generation, allowing for greater engagement force between gears for a given noise level. Additionally or alternatively, helical gears are easier to press and time relative to, for example, spur gears—allowing for a reduced manufacturing cost, improved manufacturability, and/or more reliable gear mesh. Additionally or alternatively, helical gears provide a greater contact surface for gear teeth, allowing for lower contact pressure for a given contact force, and/or lower face width for the gear teeth while providing gear teeth that are readily able to bear contact loads.

In certain embodiments, a transmission 100 is provided without tapered bearings in the drive line. In certain embodiments, a transmission 100 has a reduced number of tapered bearings in the drive line relative to an offset transmission in a similar application. Tapered bearings are typically utilized to control both thrust loads and radial loads. In certain embodiments, a transmission 100 includes features to control thrust loads, such that tapered bearings are not present. Taper rollers on a bearing require shimming and bearing clearance settings. In certain embodiments, tapered bearings reduce power transfer efficiency and generate additional heat in the transmission. In certain embodiments, main bearings in an example transmission 100 are positioned (e.g. pressed) in the housing elements 102, 104, 108, and shafts in the driveline are passed therethrough. An example transmission 100 is assembled positioned vertically, with shafts passed through the pressed bearings, and where no bearing clearances and/or shims need to be made, the main housing 102 is coupled to the clutch housing 104 during vertical assembly, and the rear housing 108 is coupled to the main housing 102 to complete the housing portion of the vertical assembly. In certain embodiments, an example transmission 100 may be constructed horizontally or in another arrangement, and/or vertically with the rear housing 108 down.

In certain embodiments, power transfer gears in the transmission 100 (e.g. at the countershaft meshes) gear teeth have a reduced height and/or have a flattened geometry at the top (e.g. reference FIG. 24—teeth have a flattened top profile). The use of shortened teeth provides for lower sliding velocities on gear teeth (e.g. increased power transfer efficiency) while allowing the teeth to engage in a high power transfer efficiency operation. The shortened gear teeth, where present, additionally experience lower deflection than occurs at the top of previously used gear teeth geometries, providing greater control of one noise source and improved service life of the gear teeth. In certain embodiments, the use of helical gears with a flattened tooth geometry allows for further noise control of flattened gear teeth and/or high power transfer loads. In certain embodiments, a low tolerance and/or high quality manufacturing operation for the gear teeth, such as the use of a wormwheel to machine gear teeth, provides for a realized geometry of the gear teeth matching a design sufficiently to meet noise and power transfer efficiency targets. In certain embodiments, a worm wheel is utilized having a roughing and finishing grit applied in one pass, allowing gear tooth construction to be completed in a single pass of the wormwheel and leave a selected finish on the gear tooth.

In certain embodiments, the transmission 100 includes thrust loads cancelled across a ball bearing, to control thrust loads such that no bearings pressed into a housing enclosure take a thrust load, to control thrust loads such that one or more housing elements do not experience thrust loads, to control thrust loads such that a bearing positioned between low speed differential shafts of the transmission (e.g. between an input shaft 204 and a first main shaft portion 804) take the thrust loads, and/or such that thrust loads are cancelled and/or reduced by helical gears in power transfer gear meshes. In certain embodiments, bearings pressed into a housing element, and/or one or more housing elements directly, are exposed only to radial loads from power transfer in the transmission 100.

In certain embodiments, a transmission 100 includes a PTO interface 410 configured to allow engagement of a PTO device to one of the countershafts from a radial position, for example at a bottom of the transmission 100. An example transmission 100 includes gear configurations such that a radially extending gear from one of the countershafts 902, 904 is positioned for access to the extending gear such that a gear to power a PTO device can be engaged to the extending gear. Additionally or alternatively, a corresponding gear on one of the input shaft 204 and/or first main shaft portion 804 includes a needle bearing that accepts radial loads from the PTO engagement. In certain embodiments, the countershafts 902, 904 do not include a PTO engagement gear (e.g. at the rear of the countershaft), and the transmission 100 is configured such that driveline intent gears can be utilized directly for PTO engagement. Accordingly, the size and weight of the countershafts is reduced relative to embodiments having a dedicated PTO gear provided on one or more countershafts. In certain embodiments, a second PTO access (not shown) is provided in the rear housing, such that a PTO device can alternatively or additionally engage at the rear of the transmission. Accordingly, in certain embodiments, a transmission 100 is configurable for multiple PTO engagement options (e.g. selectable at time of construction or ordering of a transmission), including a 8-bolt PTO access, and/or is constructed to allow multiple PTO engagement options after construction (e.g. both PTO access options provided, such as with a plug on the rear over the rear PTO access, and an installer/integrator can utilize either or both PTO access options).

An example transmission 100 includes only a single actuator connection to power actuators in the transmission, for example an air input port 302 provided on the integrated actuator housing 112. A reduction in the number of connections reduces integration and design effort, reduces leak paths in the installation, and reduces the number of parts to be integrated into, and/or fail in the installed system. In certain embodiments, no external plumbing (e.g. lubrication, coolant, and/or other fluid lines) is present on the transmission 100. In certain embodiments, the transmission 100 is a coolerless design, providing less systems to fail, making the transmission 100 more robust to a cooling system failure of the application or vehicle, reducing installation connections and integration design requirements, reducing leak paths and/or failure modes in the transmission and installed application or vehicle, and reducing the size and weight footprint of the transmission 100. It will be recognized that certain aspects of example transmissions 100 throughout the present disclosure support a coolerless transmission design, including at least transmission power transfer efficiency improvements (e.g. generating less heat within the transmission to be dissipated) and/or aluminum components (e.g. aluminum and common aluminum alloys are better thermal conductors than most steel components). In certain embodiments, heat fins can be included on housing elements 102, 104, 108 in addition to those depicted in the illustrative embodiments of the present disclosure, where additional heat rejection is desirable for a particular application. In certain embodiments, an example transmission 100 includes a cooler (not shown).

In certain embodiments, a transmission 100 includes an organic clutch face 306. An organic clutch face provides for consistent and repeatable torque engagement, but can be susceptible to damage from overheating. It will be recognized that certain aspects of example transmissions 100 throughout the present disclosure support utilization of an organic clutch face 306. For example, the linear clutch actuator 1002, and clutch adjustment for clutch face wear providing highly controllable and repeatable clutch engagement, allow for close control of the clutch engagement and maintenance of clutch life. Additionally or alternatively, components of the transmission 100 providing for fast and smooth shift engagements reduce the likelihood of clutch utilization to clean up shift events—for example the utilization of high speed countershafts, lower rotational inertia countershafts, helical gears, efficient bearings (e.g. management of shaft speed transients relative to tapered bearing embodiments), and/or compact, short-run actuations for gear switching with an integrated actuator assembly. In certain embodiments, elements of the transmission 100 for fast and smooth shift engagements improve repeatability of shift events, resulting in a more consistent driver feel for a vehicle having an example transmission 100, and additionally or alternatively the use of an organic clutch face 306 enhances the ability to achieve repeatable shift events that provide a consistent driver feel.

In certain embodiments, a transmission 100 is configurable for a number of gear ratios, such as an 18-speed configuration. An example 18-speed configuration adds another gear engaging the input shaft 204 with a corresponding gear on the countershaft(s). The compact length of the example transmissions 100 described herein, combined with the modular configuration of housing elements 102, 104, 108 allow for the ready addition of gears to any of the shafts, and accommodation of additional gears within a single housing configuration, and/or isolated changes to one or more housing elements, while other housing elements accommodate multiple gear configurations. An example 18-speed configuration is a 3×3×2 configuration (e.g. 3 gear ratios available at the input shaft 204, 3 forward gear ratios on the first main shaft portion 804, and 2 gear ratios available at the second main shaft portion 806). Additionally or alternatively, other arrangements to achieve 18 gears, or other gear configurations having more or less than 12 or 18 gears are contemplated herein.

In certain embodiments, certain features of an example transmission 100 enable servicing certain aspects of the transmission 100 in a manner that reduces cost and service time relative to previously known transmissions, as well as enabling servicing of certain aspects of the transmission 100 without performing certain operations that require expensive equipment and/or introduce additional risk (e.g. "dropping the transmission," and/or disassembling main portions of the transmission 100).

Figures 45, 46:
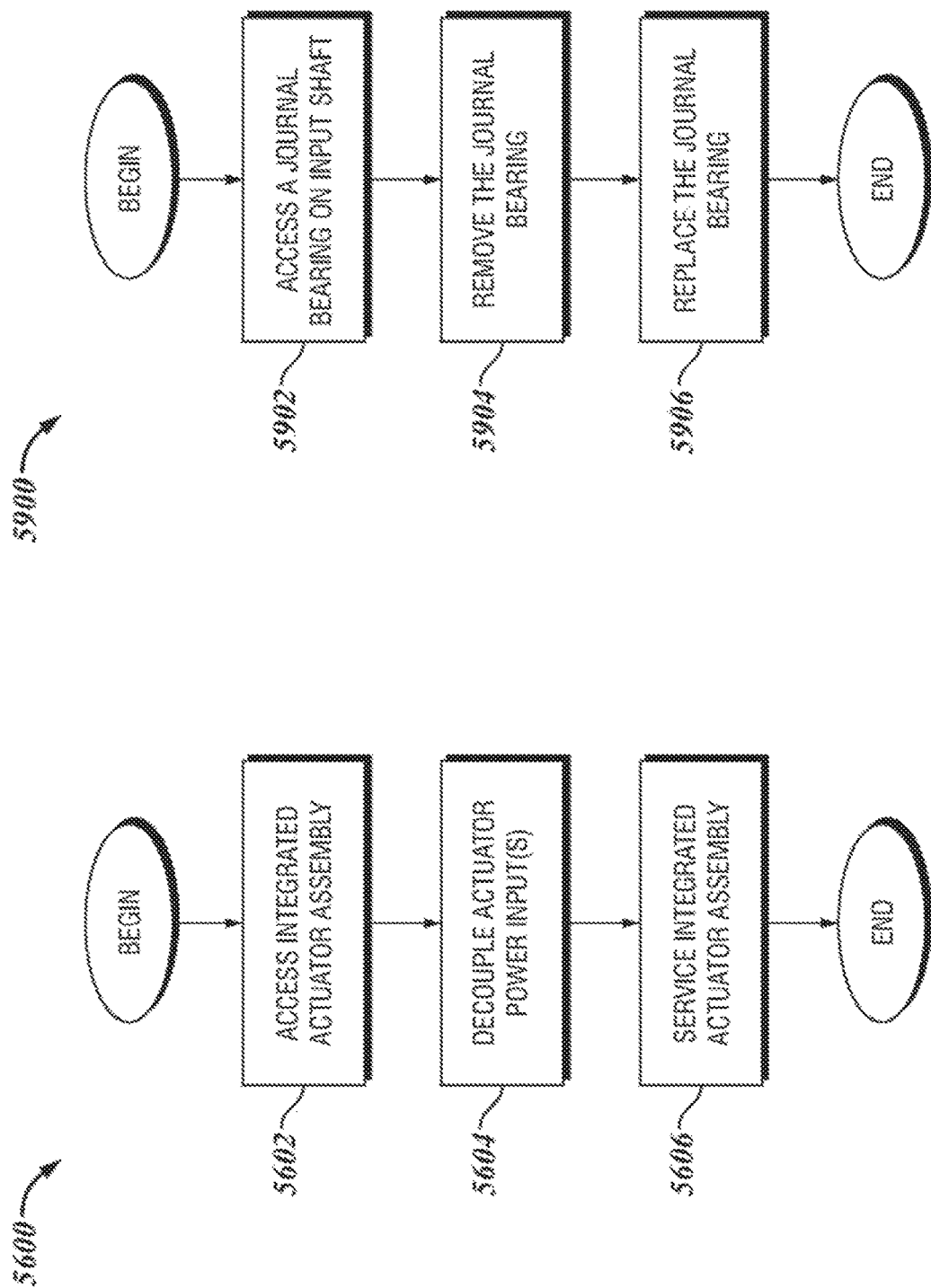
FIG. 45 is a schematic flow diagram of a service event.
FIG. 46 is a schematic flow diagram of a service event.

An example service event 5600 (reference FIG. 45) includes an operation 5602 to access an integrated actuator assembly, by directly accessing the integrated actuator assembly from an external location to the transmission. In certain embodiments, the integrated actuator assembly is positioned at the top of the main housing 102, and is accessed in single unit having all shift and clutch actuators positioned therein. In certain embodiments, one or more actuators may be positioned outside of the integrated actuator assembly, and a number of actuators may be positioned within or coupled to the integrated actuator assembly. Direct access to an integrated actuator assembly provides, in certain embodiments, the ability to install, service, and/or maintain actuators without dropping the transmission, disassembling main elements of the transmission (including at least de-coupling one or more housings, the clutch, any bearings, any gears, and/or one or more shafts). Additionally or alternatively, the example service event 5600 includes an operation 5604 to decouple only a single actuator power input, although in certain embodiments more than one actuator power input may be present and accessed. The example service event 5600 includes an operation 5606 to service the integrated actuator assembly, such as but not limited to fixing, replacing, adjusting, and/or removing the integrated actuator assembly. The term "service event," as utilized herein, should be understood to include at least servicing, maintaining, integrating, installing, diagnosing, and/or accessing a part to provide access to other parts in the transmission 100 or system (e.g. vehicle or application) in which the transmission is installed.

An example service event 5900 (reference FIG. 46) includes an operation 5902 to access a journal bearing 2602 positioned at an engagement end of the input shaft 204. The engagement end of the input shaft 204 engages the prime mover, for example at a ball bearing in the prime mover (not shown), and the engagement end of the input shaft 204 can experience wear. The inclusion of a journal bearing 2602, in certain embodiments, provides for ready access to replace this wear part without removal and/or replacement of the input shaft 204. The example service event 5900 further includes an operation 5904 to remove the journal bearing 2602, and an operation 5906 to replace the journal bearing 2602 (for example, after fixing the journal bearing 2602 and/or replacing it with a different part). The example service event 5900 describes a journal bearing 2602 positioned on the input shaft 204, however the journal bearing 2602 may be any type of wear protection device, including any type of bearing, bushing, and/or sleeve.

Figure 47:
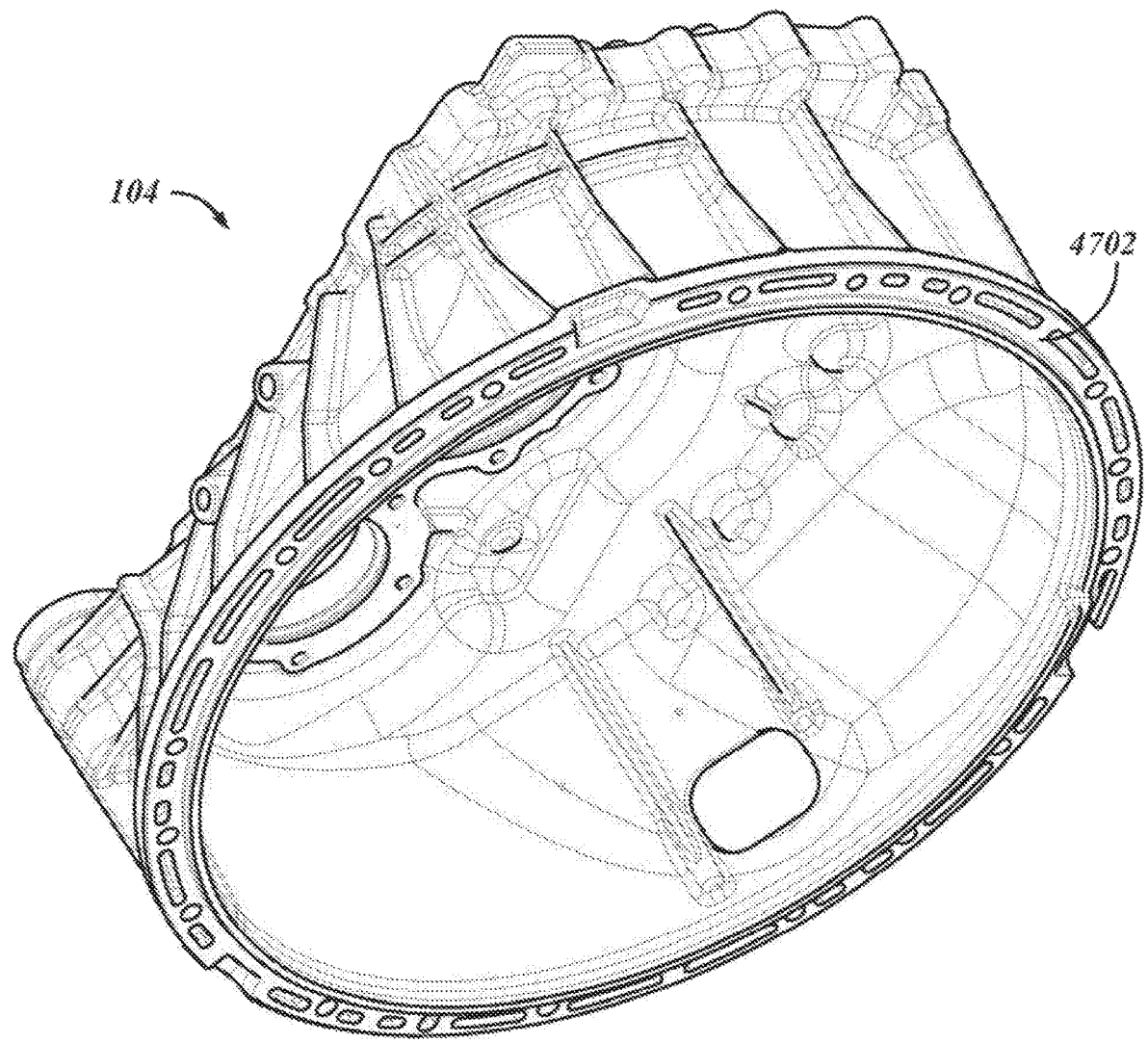
FIG. 47 depicts an example clutch housing.

Referencing FIG. 47, a perspective view of an example clutch housing 104 consistent with certain embodiments of the present disclosure is depicted. The clutch housing 104 includes an interface portion 4702 that allows for coupling to a prime mover. The modularity of the clutch housing 104 allows for ready configuration and integration for specific changes, for example providing an extended or split input shaft to add a gear layer to the input shaft without significantly altering the footprint of the transmission 100, or requiring redesign of other aspects of the transmission 100, while maintaining consistent interfaces to the prime mover.

Figure 48:
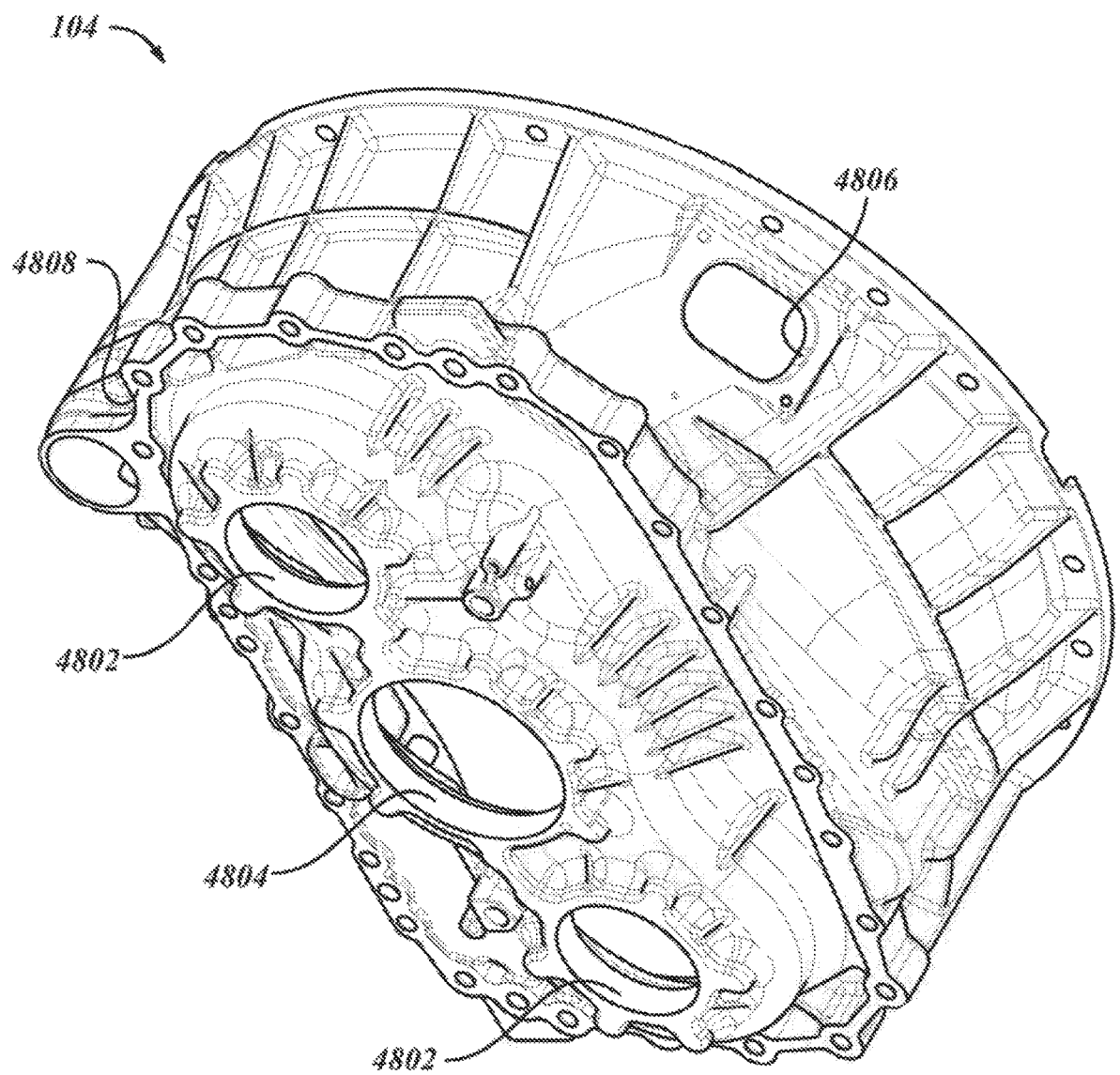
FIG. 48 depicts an example clutch housing.

Referencing FIG. 48, another perspective view of an example clutch housing 104 consistent with certain embodiments of the present disclosure is depicted. The clutch housing 104 includes a second interface portion 4808 that allows for coupling to a main housing 102. The modularity of the clutch housing 104 allows for ready configuration and integration for specific changes, for example providing an extended or split input shaft to add a gear layer to the input shaft without significantly altering the footprint of the transmission 100, or requiring redesign of other aspects of the transmission 100, while maintaining consistent interfaces to the main housing 102. The example clutch housing 104 further includes holes 4802 for countershafts in a bulkhead (or enclosure) formed on the main housing 102 side of the clutch housing 104, and a hole 4804 for passage of the input shaft therethrough. The integral bulkhead holes 4802, 4804 provide for mounting of bearings and shafts, and for ready assembly of the transmission 100.

Figure 49:
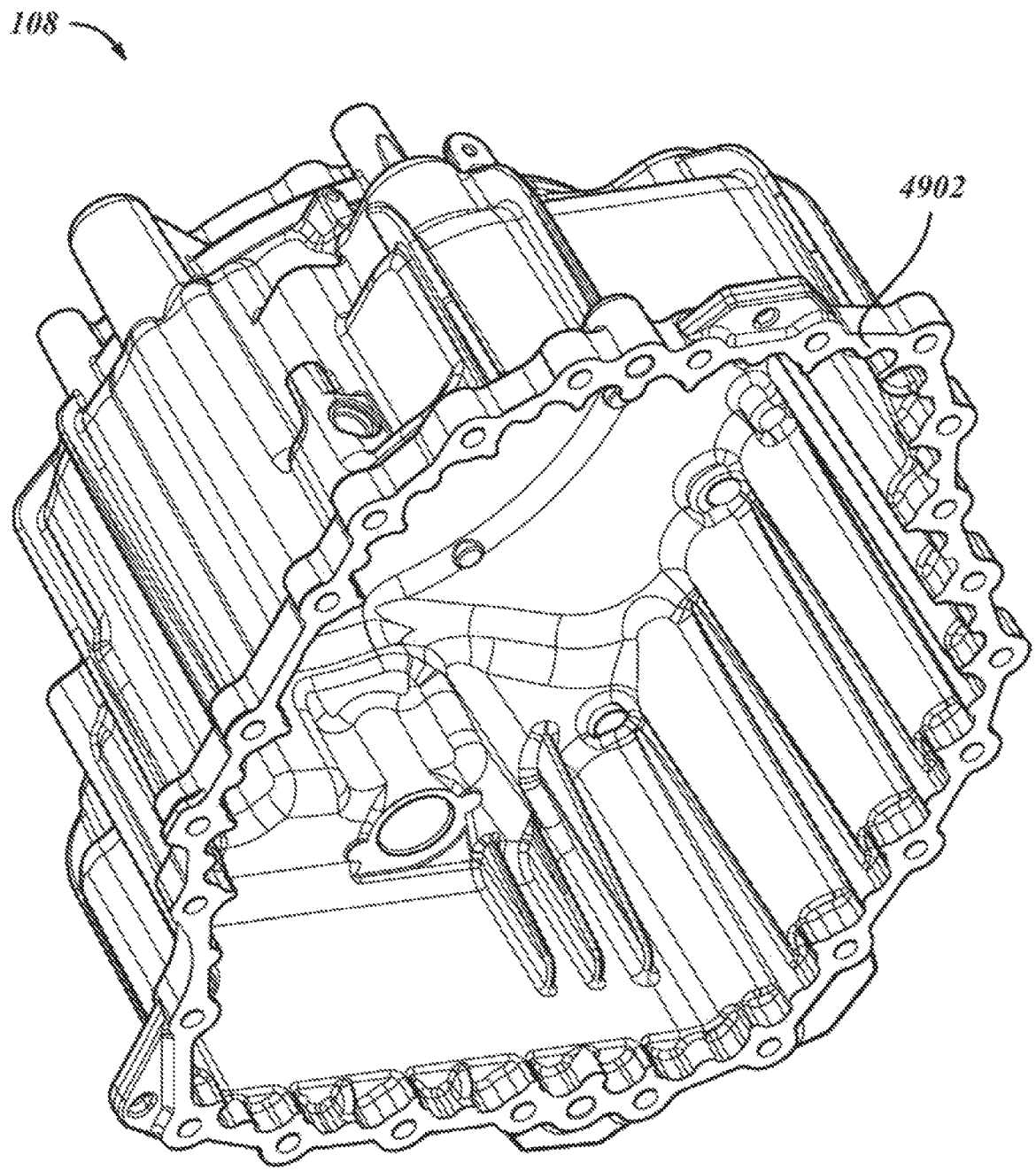
FIG. 49 depicts an example rear housing.
Figure 50:
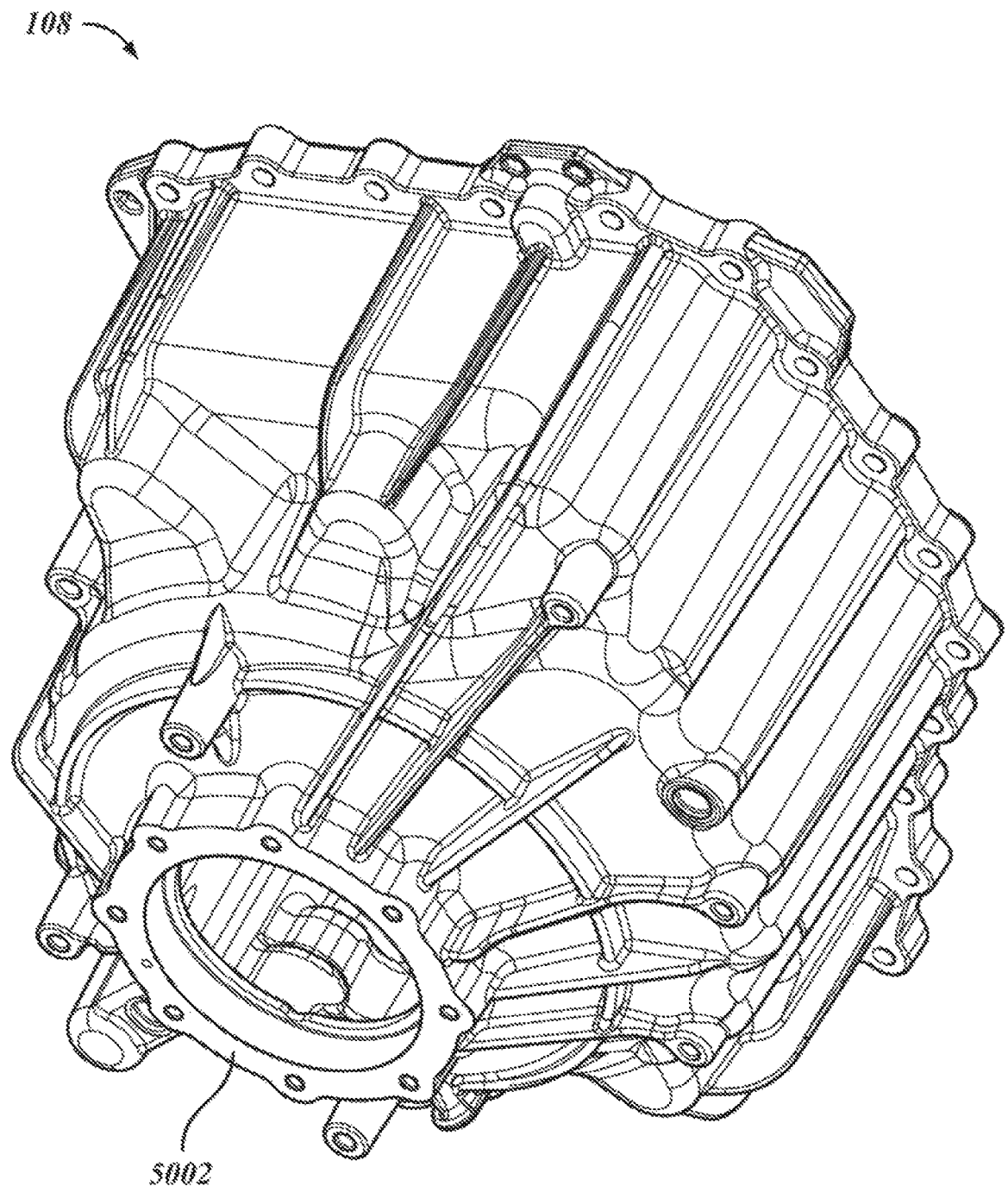
FIG. 50 depicts an example rear housing.
Figure 51:
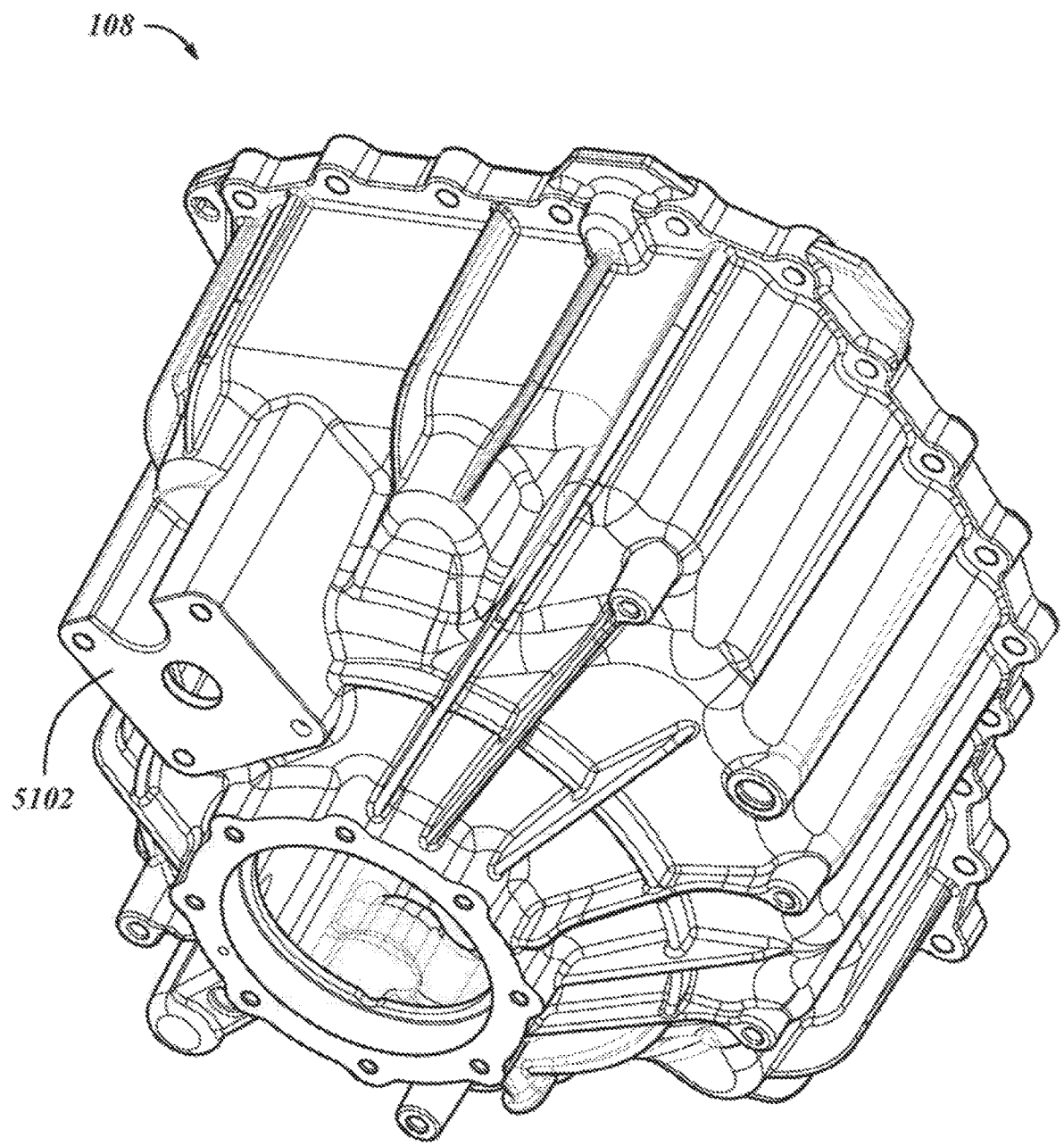
FIG. 51 depicts an example rear housing.

Referencing FIG. 49, a perspective view of an example rear housing 108 consistent with certain embodiments of the present disclosure is depicted. The rear housing 108 includes an interface portion 4902 that allows for coupling to a main housing 102. The modularity of the rear housing 108 allows for ready configuration and integration for specific changes, for example providing a rear PTO interface 5102 (see the disclosure referencing FIG. 51) or other alterations to the rear housing 108, without significantly altering the footprint of the transmission 100, or requiring redesign of other aspects of the transmission 100. Referencing FIG. 50, another perspective view of the rear housing 108 is depicted. The rear housing 108 includes a driveline interface 5002, for example to couple with a driveshaft or other downstream component. Referencing FIG. 51, a perspective view of another example rear housing 108 is depicted, providing a rear PTO interface 5102.

Figure 52:
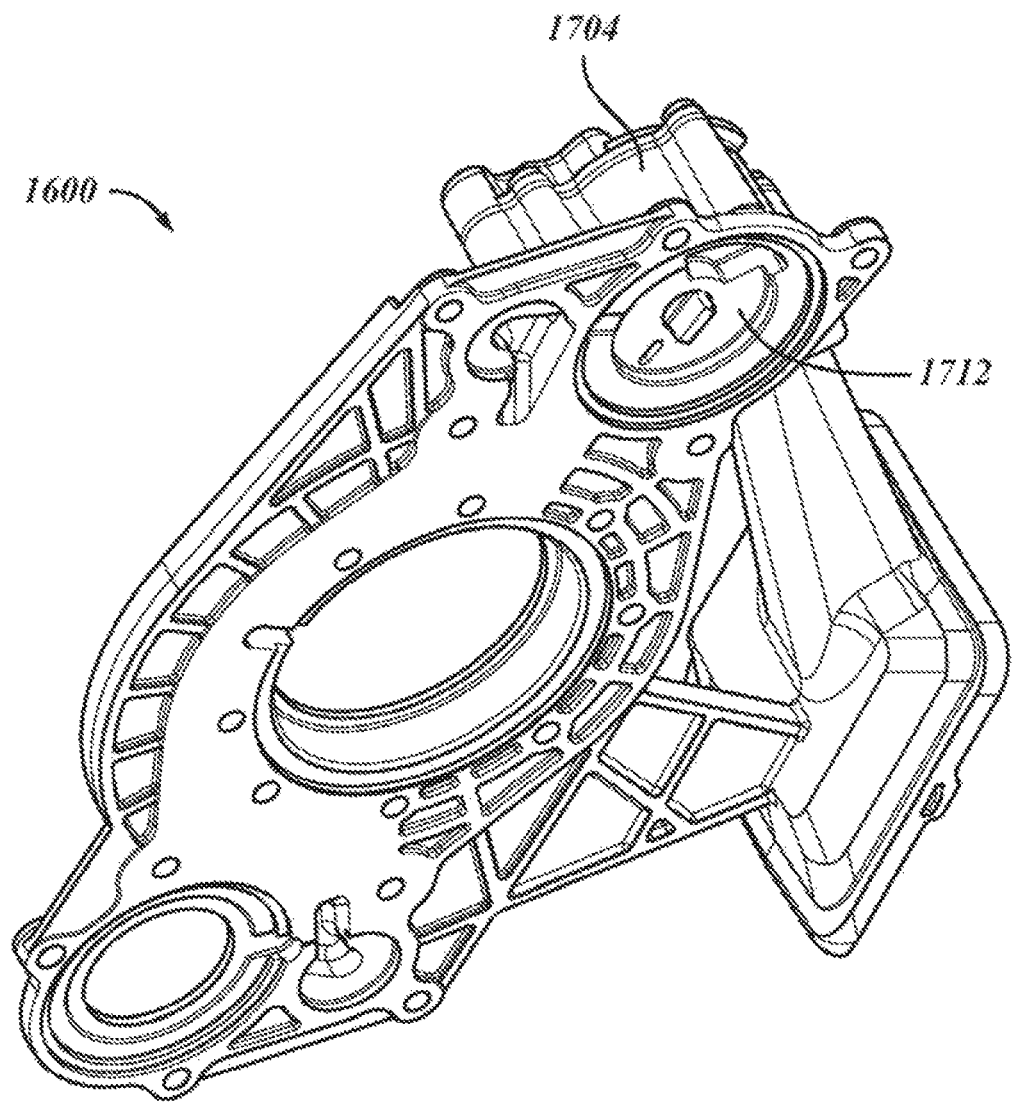
FIG. 52 depicts an example lubrication pump assembly.
Figure 53:
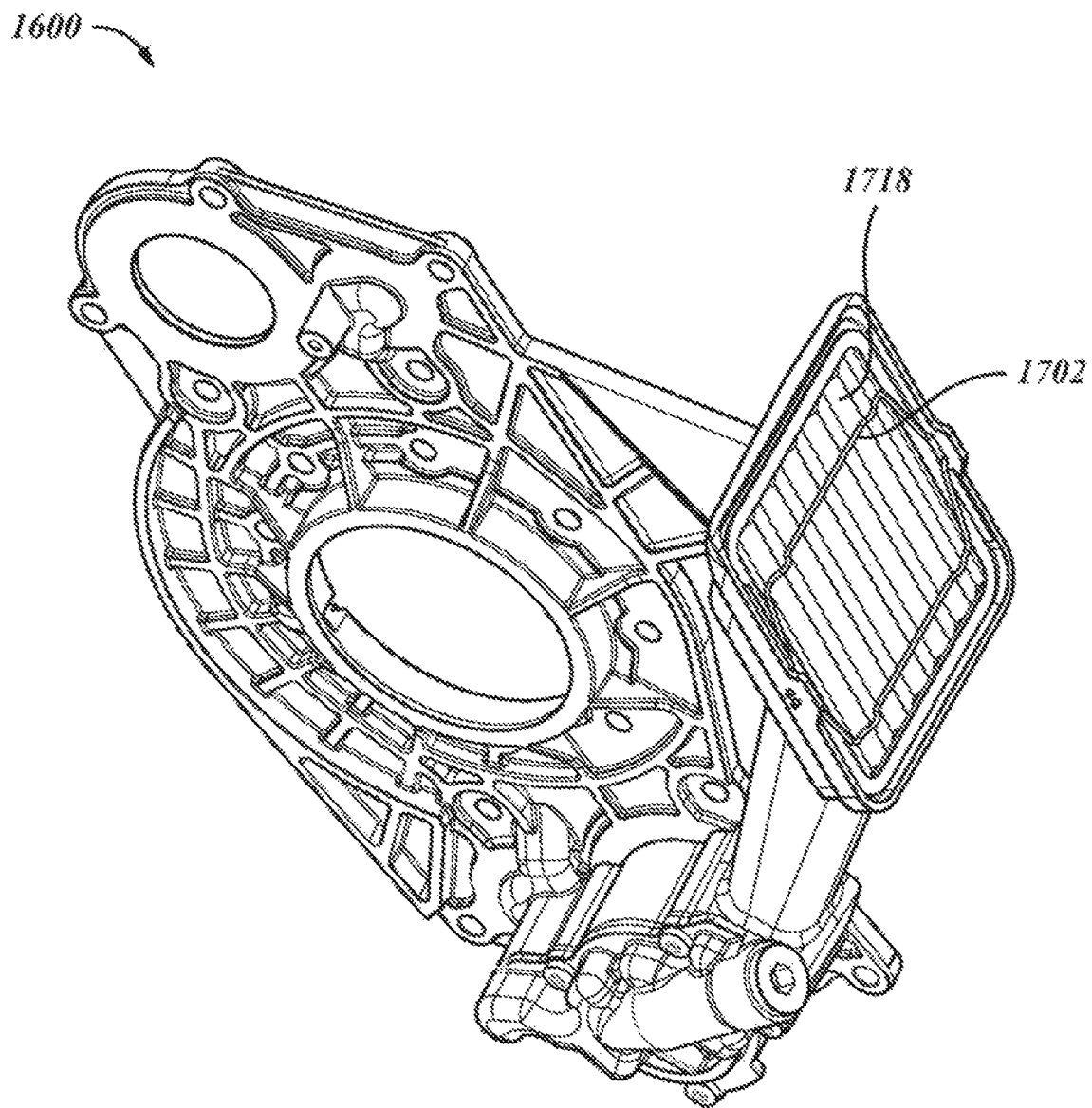
FIG. 53 depicts an example lubrication pump assembly.

Referencing FIG. 52, a perspective view of an example lubrication pump assembly 1600 consistent with certain embodiments of the present disclosure is depicted. The driving element 1712, coupling the lubrication pump 1704 to one of the countershafts, is visible in the perspective view of FIG. 52. The modularity of the lubrication pump assembly 1600 allows for ready configuration and integration for specific changes, for example providing an alternate pump sizing or gear ratio, while maintaining consistent interfaces to the rest of the transmission 100. Referencing FIG. 53, another perspective view of an example lubrication pump assembly 1600 is depicted. An oil pickup screen 1718 and screen retainer 1720 is visible in the view of FIG. 53.

Figure 54:
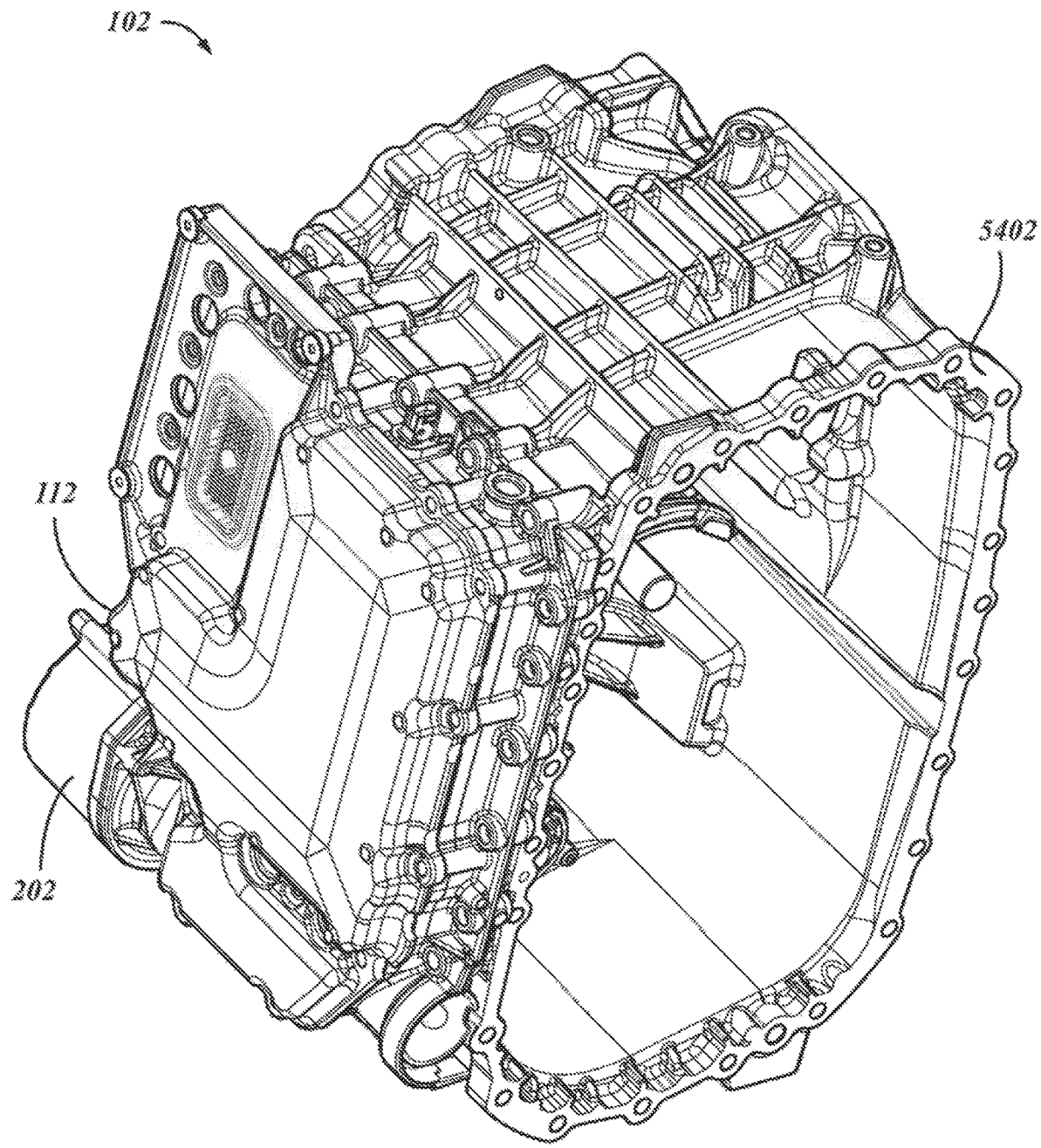
FIG. 54 depicts an example main housing.
Figure 55:
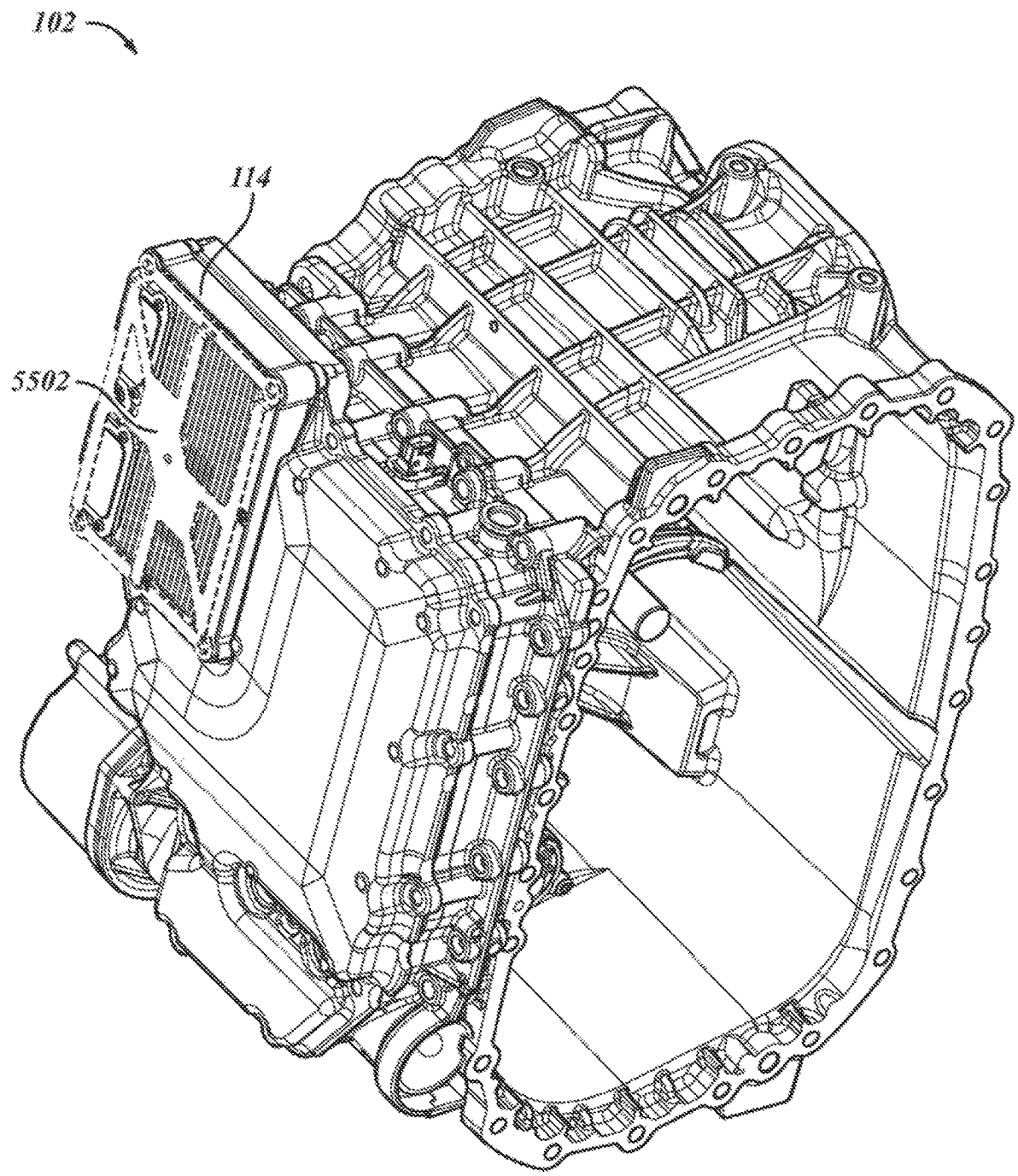
FIG. 55 depicts an example main housing.
Figure 56:
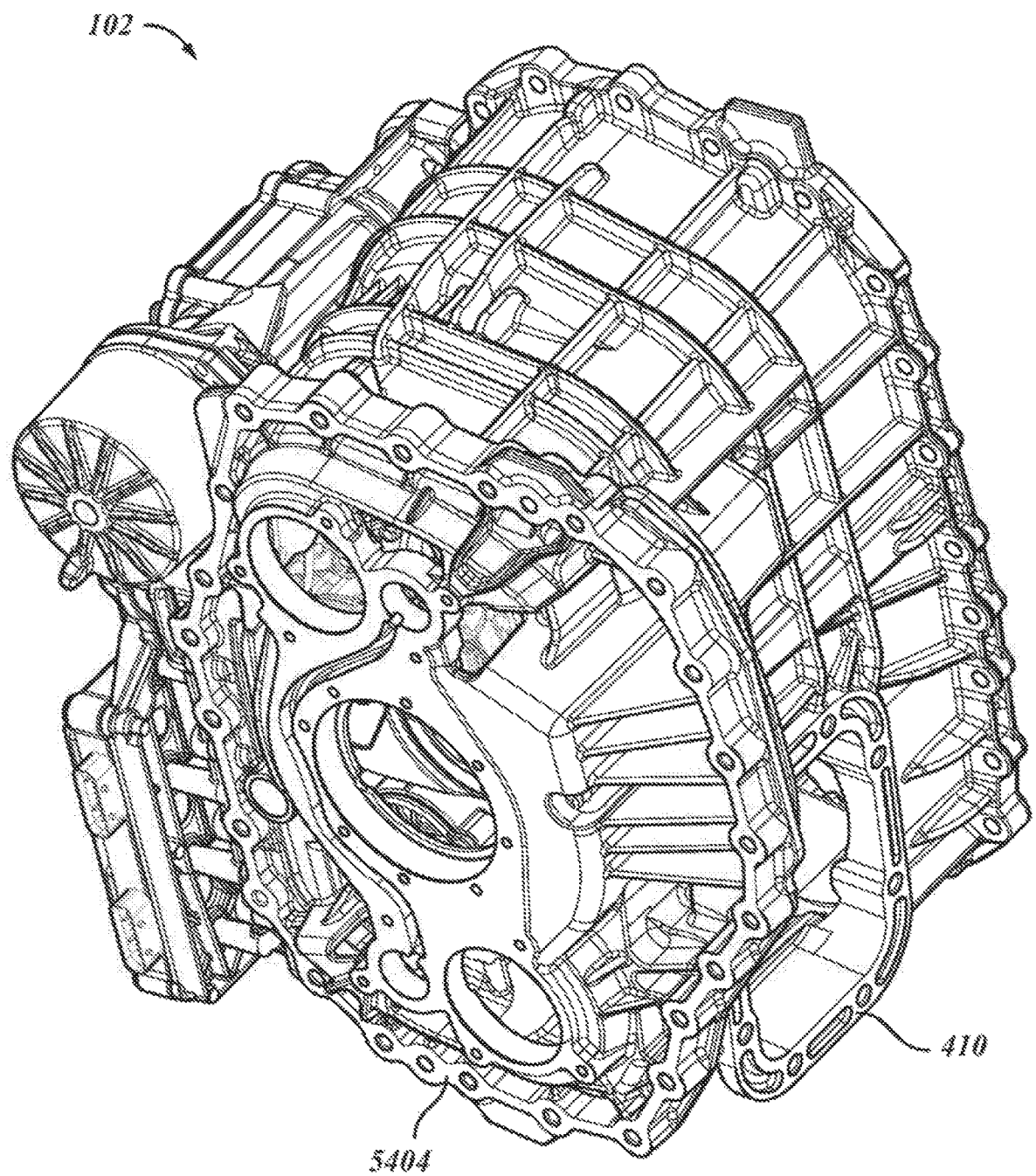
FIG. 56 depicts an example main housing.
Figure 57:
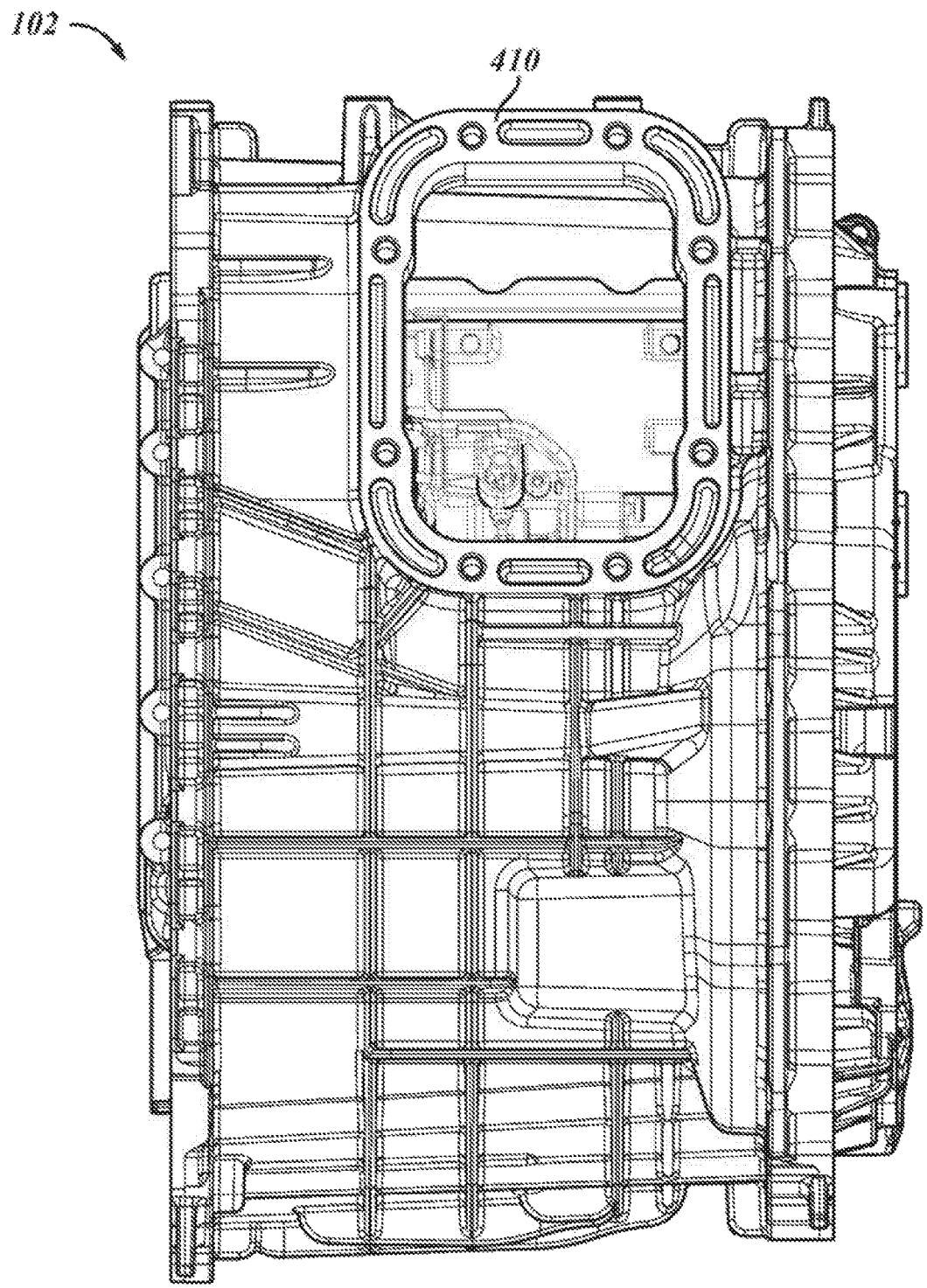
FIG. 57 depicts an example main housing.

Referencing FIG. 54, a perspective view of an example main housing 102 consistent with certain embodiments of the present disclosure is depicted. The example of FIG. 54 has a connector for a transmission control module, but the transmission control module is not installed. The main housing 102 includes interfaces 5402, 5404 (see the portion of the disclosure referencing FIG. 56) providing consistent interfaces to the rear housing 108 and clutch housing 104. A clutch actuator housing 202, which may be coupled to or integral with an integrated actuator housing 112 is visible in the view of FIG. 54. Referencing FIG. 55, a transmission control module 114 (TCM), and a TCM retainer 5502 (e.g., a TCM cover 1402) are depicted as installed on a transmission 100. Referencing FIG. 56, an 8-bolt PTO interface 410 is depicted, which may be optionally not present or capped, without affecting the footprint or interfaces of the main housing 102. Referencing FIG. 57, a bottom view of an example main housing 102 is depicted, providing a clear view of an example 8-bolt PTO interface 410. Referencing FIG. 58, a perspective view of an example main housing 102 is depicted, including an actuator interface 5802 whereupon actuators for shifting, clutch control, and/or a friction brake can be installed. Accordingly, the main housing 102 can accommodate various actuation assemblies, including an integrated actuation assembly, without changing the footprint or interfaces of the main housing 102 with the rest of the transmission 100.

Figure 58:
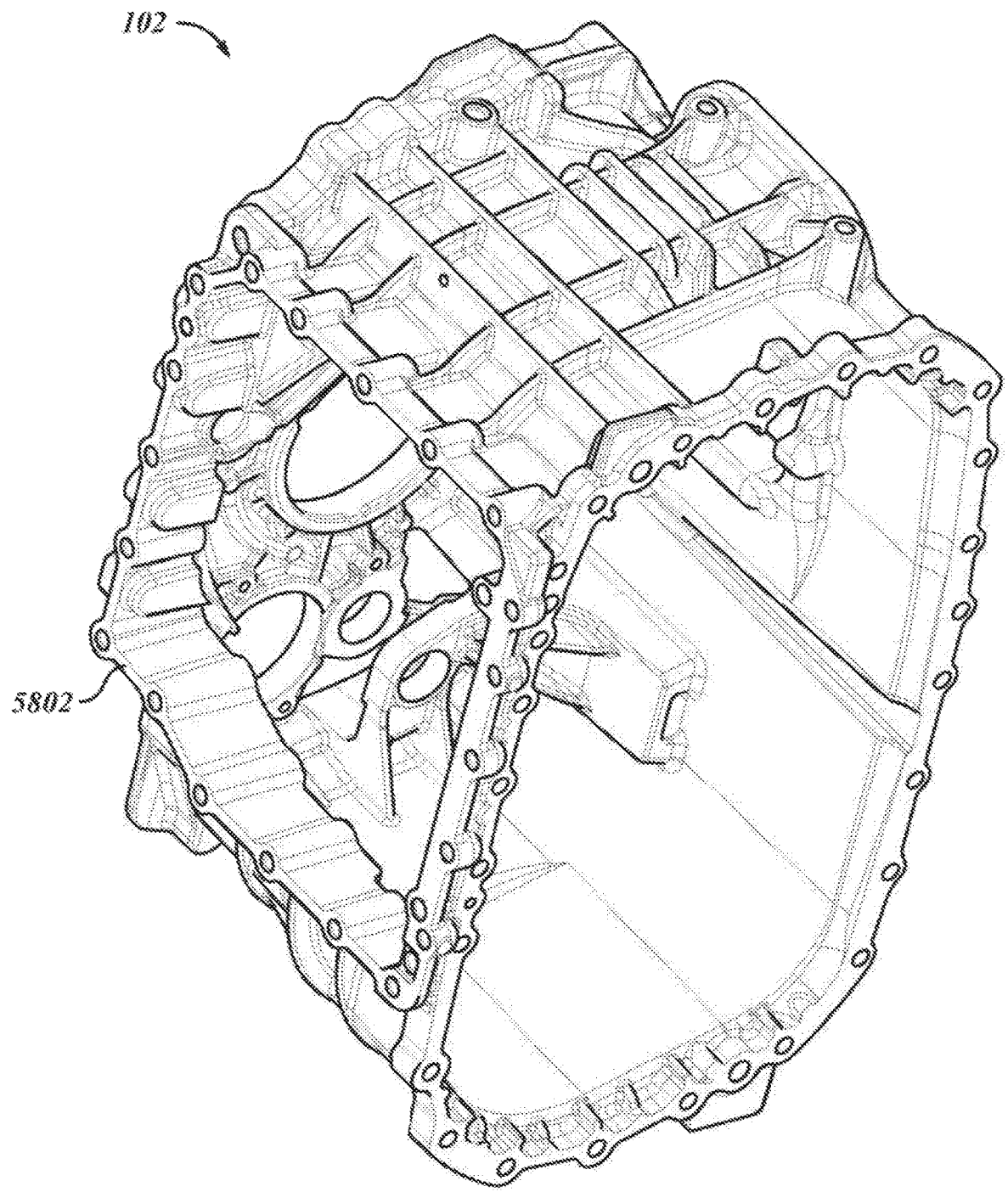
FIG. 58 depicts an example main housing.

Embodiments depicted in FIGS. 59-93, and all related descriptions thereto, are compatible in certain aspects to embodiments depicted in FIGS. 1-58 and all related descriptions thereto. Accordingly, each aspect described in FIGS. 1-58 is contemplated as included, at least in one example, with any compatible embodiments described in FIGS. 59-93. For purposes of illustration of certain disclosed features or principles, certain more specific relationships are described between embodiments depicted in FIGS. 1-58 and embodiments depicted in FIGS. 59-93, and additionally between disclosed embodiments within FIGS. 1-58 individually. Such additional specifically described relationships are not limiting to other relationships not specifically described. One of skill in the art will recognize compatible embodiments between all of the disclosed examples herein, and any such compatible embodiments, in addition to any specific relationships described, are contemplated herein.

Figure 59:
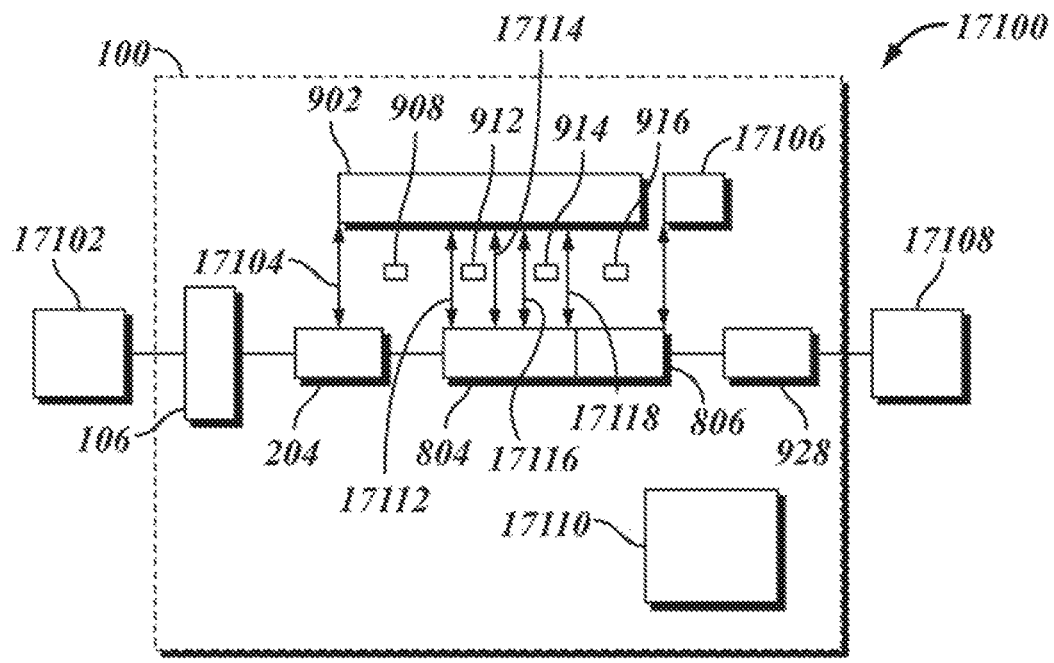
FIG. 59 is a schematic representation of a transmission having a controller.

Referencing FIG. 59, an example system 17100 is disclosed having a transmission 100, a prime mover 17102, a driveline 17108, and a controller 17110 for a transmission 100. The example system 17100 depicted schematically to illustrate relationships of certain elements of the system 17100, and the described relationships between elements and the selection of elements included are non-limiting examples. Additionally, the system 17100 may include additional elements not depicted, including, without limitation, any elements present in FIGS. 1-100 or otherwise described throughout the present disclosure. In certain embodiments, the transmission 100 may be a transmission compatible with one or more embodiments depicted in FIGS. 1-100 and/or described in the referencing sections thereto. Additionally or alternatively, the transmission 100 may be any type of torque transfer device understood in the art.

The example system 17100 includes the prime mover 17102, which may be any type of power initiation device as understood in the art. Examples include, without limitation, an internal combustion engine, a diesel engine, a gasoline engine, a natural gas engine, a turbine engine, a hydraulic pump, or other power source. In certain embodiments, the prime mover 17102 is an internal combustion engine associated with a vehicle (not shown), an internal combustion engine associated with an on-highway vehicle, an internal combustion engine associated with a heavy-duty application, and/or an internal combustion engine associated with an on-highway heavy-duty truck, such as a Class 8 truck or similar application classified under a different system than the United States (US) truck classification system. In certain embodiments, the prime mover 17102 provides requested torque for the application, which is multiplied according to selected parameters through the transmission 100, which may include reversing a direction of the torque (e.g. to reverse the movement direction of a vehicle). On-highway vehicle applications are subjected to a number of challenges and constraints for the system 17100, including at least: significant pressure on acquisition cost for the system (e.g. the capital cost of acquiring the parts of the system); significant pressure on operating cost of the system (e.g. costs for fuel consumption, repairs, maintenance, and/or down time); highly transient operation of the system (e.g. to enable desired acceleration or deceleration, to respond to rapidly changing on-highway conditions, to navigate road grades, and/or manage altitude conditions); and significant pressure to maintain system repeatability and consistency (e.g. to protect the subject driver experience so they can focus on driving safely instead of changes in the system response, to reduce driver fatigue from managing changing or unexpected system response, to improve driver comfort in operation such as smooth and desired response, to reduce noise emitted by the system, and/or to meet performance expectations of a driver, owner, or fleet operator). On-highway vehicle applications in the heavy duty truck space, and/or in the Class 8 truck space, include these challenges, and in some instances make these challenges even more acute—for example heavy duty truck operators and owners are experienced and invested consumers, and have high standards for measuring performance against these challenges, and pay close attention to performance against them; heavy duty trucks operate at high vehicle weights which can increase the difficulty in meeting these challenges; and heavy duty trucks operate at a high duty cycle (e.g. power throughput as a function of maximum power available) and for long hours, increasing the difficulty and consequences of meeting these challenges.

The example system 17100 includes a torque transfer path operatively coupling the prime mover 17102 to drive wheels, such that motive torque from the prime mover 17102 is transferred to the drive wheels. In the example system 17100, a downstream driveline 17108 receives output torque from the transmission 100, and the downstream driveline 17108 includes any further devices relative to the transmission 100, for example a driveline, a deep reduction device, a rear axle gear or differential gear, and/or the drive wheels. The components of the downstream driveline 17108 are non-limiting examples provided only for illustration.

The example system 17100 includes a clutch 106 that selectively decouples the prime mover 17102 from the transmission 100 torque path, for example by decoupling the prime mover 17102 from an input shaft 204. The example system 17100 further includes gear meshes 17104, 17112, 17114, 17116, 17118, and 17120. The gear meshes control torque transfer through the transmission 100, and the selection of engaged versus unengaged gear meshes, as well as the gear configurations of the gear meshes, define the torque transfer multiplication of the transmission 100, or the "gear" the transmission 100 is positioned in. In certain embodiments, one or more gear meshes may be configurable in an engaged position, rotationally coupling the respective shafts, and a neutral or unengaged position, wherein the gears of the gear mesh do not rotationally couple the respective shafts. In certain embodiments, a gear mesh may be engaged utilizing a gear coupler, which may or may not further include a synchronizer, engagement of an idler gear, or any gear mesh engagement understood in the art. In certain embodiments, a gear mesh may be disengaged or neutral by removal of the gear coupler, allowing respective gears to rotate freely on the respective mounted shaft, removal of a connecting idler gear, or the like. In certain embodiments, the gear meshes 17104, 17112, 17114, 17118, and 17120 are consistent with embodiments depicted herein, for example in the gear and shaft arrangement depicted in FIG. 9 and the referencing disclosure thereto. Any arrangement of gear meshes, including number of gear meshes in the system, is contemplated herein.

The example system includes a controller 17110, for example at least a portion of the controller 17110 may be included on a TCM 114. The controller 17110 includes and/or is in communication with a number of sensors and actuators throughout the system 17100. In certain embodiments, the controller 17110 includes and/or is in communication with a number of shift actuators 908, 912, 914, 916, for example to control the couplings of the gear meshes 17104, 17112, 17114, 17118, and 17120 into a selected configuration. In a further embodiment, the controller 17110 controls the shift actuators 908 utilizing two separate valves for each actuator, a first valve providing actuating force (e.g. pneumatic air pressure into a closed volume to urge a pneumatic piston in a selected direction) to engage the associated gear coupler to a gear mesh 17104, 17112, 17114, 17118, and 17120, and a second valve providing disengagement force (e.g. pneumatic air pressure into a second closed volume to urge the pneumatic piston in a second selected direction) to disengage the associated gear coupler from the gear mesh 17104, 17112, 17114, 17118, and 17120. In certain embodiments, a given valve may be a disengaging valve for one shift (e.g. shift actuator 908 "forward" disengages gear mesh 17112) and an engaging valve for a second shift (e.g. shift actuator 908 "forward" engages gear mesh 17104). Additionally or alternatively, the controller 17110 may engage a neutral position for one or more actuators 908, 912, 914, 916, for example by providing pressure from both sides of a pneumatic piston.

The example system 17100 includes a main shaft, such as a first main shaft portion 804 and/or a second main shaft portion 806, and an output shaft 926. The output shaft 926, in certain embodiments, is coupleable to the main shaft 804, 806 utilizing a gear set 17106, which may be a planetary gear arrangement (e.g. reference FIG. 31), or any other gear meshing arrangement to selectively couple the main shaft 804, 806 to the output shaft 926. In certain embodiments, the transmission 100 includes a countershaft 902 (or more than one countershaft), which performs torque transfer functions in the transmission 100.

In certain embodiments, the system 17100 includes one or more sensors to provide system operating parameters. The number and selection of sensors depends upon the parameters determined for the system 17100, and further depends upon the availability of information from outside the system, such as on a datalink (private or public, such as J1939, a vehicle area network, or the like), a network communication, or available on a portion of the controller 17110 that is outside the scope of the system 17100, but that provides parameters to the system 17100, such as storing parameters in a non-transient computer readable medium. Example and not-limiting sensors in the system 17100 (not shown), include speed sensors for one or more shafts (e.g. input shaft, output shaft, one or more countershafts, and/or the main shaft), a rail speed and/or rail position sensor (e.g. shift actuator position), an air supply pressure sensor, a TCM temperature sensor, a grade sensor (e.g. to provide vehicle grade information), an oil pressure sensor, a clutch position sensor, a solenoid temperature sensor (e.g. for one or more solenoids associated with actuators in the system), a vehicle mass sensor, a clutch temperature sensor, a service brake position sensor (e.g. on/off), a service brake pressure sensor (e.g. applied pressure and/or continuous position), an accelerator request sensor (e.g. accelerator pedal position), a prime mover torque sensor (e.g. engine torque at the flywheel or other location), and/or a prime move speed sensor. One or more of the described sensors may be a virtual sensor calculated from other parameters, and/or one or more of the described sensors may be out of scope of the system, with information, if utilized, passed to the controller 17110. Any or all of the listed sensors may not be present in certain embodiments of the system 17100, and in certain embodiments other sensors not listed may be present as described throughout the disclosure. Wherever a parameter is described and/or utilized in the present disclosure, the parameter may be provided by an appropriate sensor, or otherwise made available without a sensor in the system 17100.

Figure 60:
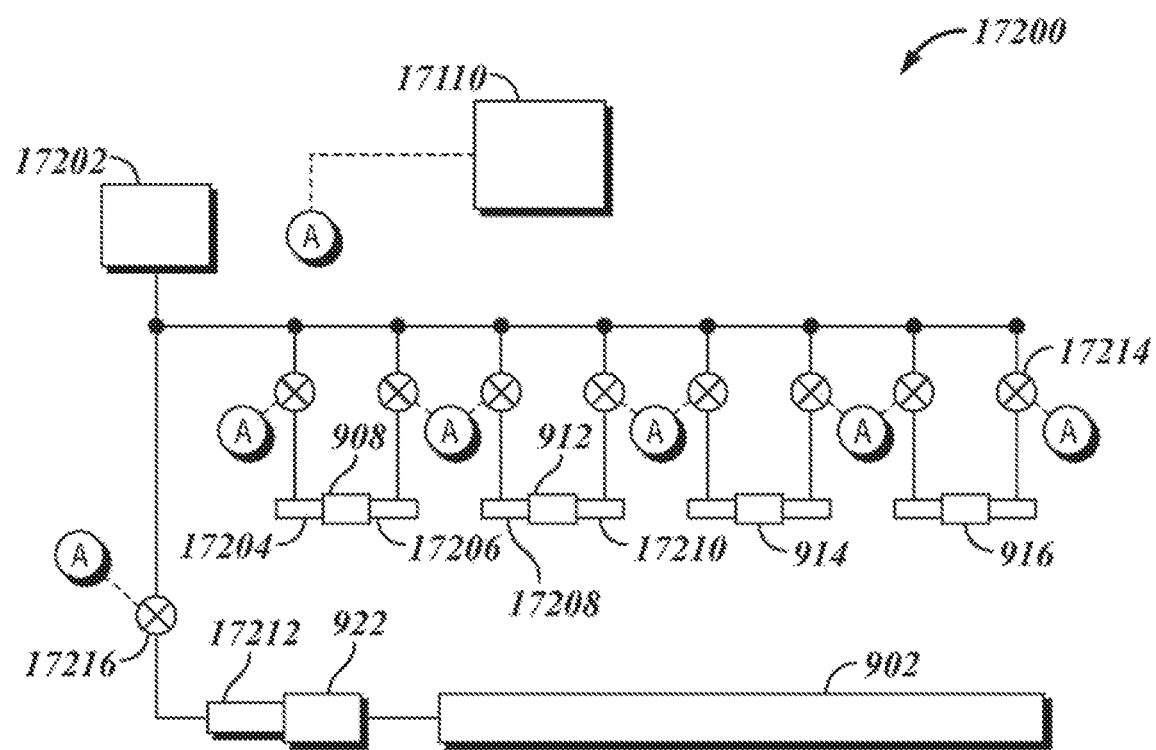
FIG. 60 is a schematic representation of a transmission having a controller.

Referencing FIG. 60, an example system 17200 is depicted having actuating hardware schematically depicted for a number of shift actuators 908, 912, 914, 916. Without limitation, the system 17200 is compatible with the system 17100, although the system 17200 may be implemented separately with any compatible transmission 100. The example system 17200 includes the controller 17110 operationally coupled to a number of actuators, including a number of shift actuator valves 17214 and a friction brake valve 17216. In the example of FIG. 60, each shift actuator 908, 912, 914, 916 includes a closed volume—e.g. 17204, 17206, 17208, and 17210 are referenced in FIG. 60—on each side of the respective shift actuator, for example where the shift actuator is a pneumatic piston responsive to pressure in the respective closed volume to urge the shift actuator in a direction such as engaging or disengaging of a gear mesh. For example, each shift actuator may be shift fork or claw associated with a gear coupler, whereupon the gear coupler engages or disengages the selected gear mesh. In the example of FIG. 60, two separate valves are associated with each shift actuator 908, 912, 914, 916 to allow independent control of each shift actuator 908, 912, 914, 916. Additionally, the friction brake 922 is operatively coupled to a closed volume 17212, such that pressure provided in the closed volume 17212 urges the friction brake 922 to engage a countershaft 902, thereby providing for a braking mechanism to slow and/or stop the countershaft 902. The example system 17200 includes an air pressure source 17202, whereby operation of the valves 17214, 17216 applies source air to the respective closed volume. In the embodiment of FIG. 60, the actuators are pneumatic, although in certain embodiments, aspects of the present disclosure are compatible with alternate actuators for one or more of the actuators, including without limitation pneumatic, hydraulic, and/or electrical actuators. An example system 17200 further includes the closed volumes 17204, 17206, 17208, 17210 as shift rails, providing a structure for the closed volume and for the shift actuator 908, 912, 914, 916 to travel in a controlled path. One or more rails may be shared, for example where actuators 908, 912, 914, 916 do not require independent control, although in certain embodiments each actuator is included on a separate shift rail. The example system 17200 provides for control of all shift actuators and the friction brake from a common air source 17202.

In certain embodiments, the valves 17214, 17216 herein for the shift actuators, the valve 17216 for the friction brake 922, and/or the valve 17302 (reference FIG. 61) are provided as binary valves—for example the valves having a position of fully open or fully closed. Binary valves have a number of advantages, including lower cost, high repeatability, simpler control, and simplified characterization of flow rate determination. However, binary valves provide for lower control capability than multiple-position valves (e.g. a valve having a discrete number of potential opening positions) and/or continuously capable position valves (e.g. valves having a continuous range between open and closed, and/or a sufficiently large number of potential values between open and closed to be considered similar to a continuously capable valve). Valves having multiple possible actuating positions are more expensive, and provide control complexities such as characterization of the flow rate through the valve—for example a model or look-up table, pressure drop measurement of the valve, and/or other complexities are generally introduced to provide realization of the capabilities of such valves. Embodiments disclosed herein may utilize any type of valve, and certain features included herein overcome the challenges of utilizing a lower cost and capability binary valve for one or more actuating valves, or for all of the actuating valves. In certain embodiments, one or more actuating valves, or all of the actuating valves, may be a higher capability valve, and certain features included herein are nevertheless beneficial for higher capability valves as will be apparent to one of skill in the art having the benefit of the present disclosure.

Figure 61:
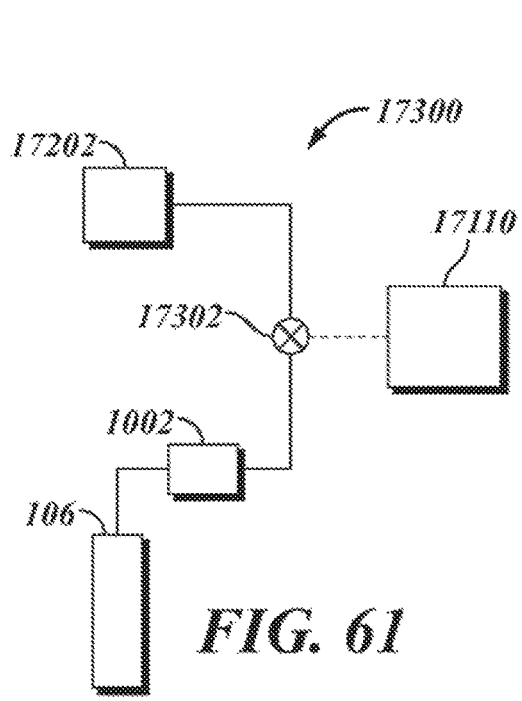
FIG. 61 is a schematic representation of a controller actuating a clutch.

Referencing FIG. 61, an example system 17300 depicts hardware schematically having actuating hardware for a clutch actuator 1002. The example system 17300 is compatible with the systems 17100, 17200, and in certain embodiments is illustrated separately to clarify the description. However, the system 17300 may be included on a transmission 100 having one or both of the systems 17100, 17200, and/or may be separately provided on a standalone system 17300. In the embodiment of FIG. 61, the controller 17110 is operatively coupled to a clutch actuator valve 17302, which couples the clutch actuator 1002 to an air source 17202, thereby urging the clutch actuator 1002 to open or close the clutch 106, depending upon the clutch logic, such as normally-open (e.g. disengaged) or normally-closed (e.g. engaged). In certain embodiments, the clutch actuator 1002 is a pneumatically operated clutch actuator 1002, which may have a near zero dead volume, and/or which may be a linear clutch actuator (e.g. reference FIG. 10 and the referencing description). The system 17300 is compatible with the system 17100, 17200, for example to provide all actuators for the clutch, shifting, and friction brake, with a common air source 17202. Further, the systems 17100, 17200, 17300 provide for a compact actuation system controllable by a centralized controller 17110, for example to provide for an integrated actuator housing 112, with independent control of each actuator in the system 17100, 17200, 17300.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

Figure 62:
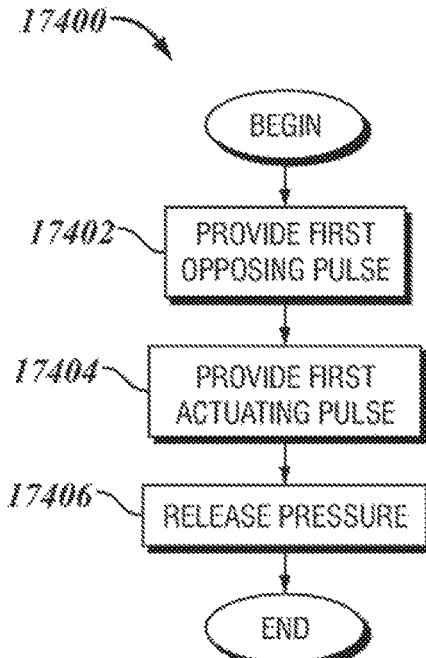
FIG. 62 is a schematic flow diagram to control a shift actuator.

Referencing FIG. 62, an example procedure 17400 includes an operation 17402 to provide a first opposing pulse, the first opposing pulse including a first predetermined amount of air above an ambient amount of air in a first closed volume, where pressure in the first closed volume opposes movement of a shift actuator in a shift direction. A predetermined amount of air above an ambient amount of air includes, without limitation, an amount of air estimated, predicted, or calibrated to produce a given pressure in a closed volume, and may be adjusted as the closed volume changes (e.g. in response to movement of an actuator such as a shift actuator, friction brake actuator, and/or clutch actuator). The pressure may be an indicated pressure (e.g. based on a system response, and not a measured pressure), a gauge pressure, and/or an absolute pressure. An ambient amount of air is a nominal amount of air, and may be an amount of air corresponding to actual ambient air pressure under the current operating conditions of the system, a normalized amount of air (e.g. correlated to sea level or another selected pressure), an amount of air present before an actuator begins movement, or any other nominal amount of air selected for the system.

The procedure 17400 further includes an operation to provide a first actuating pulse, the first actuating pulse including a second predetermined amount of air above an ambient amount of air in a second closed volume, where pressure in the second closed volume promotes movement of the shift actuator in the shift direction. In certain embodiments, the second predetermined amount of air is determined in response to a velocity of the shift actuator and a target velocity of the shift actuator. The determination of the second predetermined amount of air in response to the velocity of the shift actuator and the target velocity of the shift actuator may be open loop (e.g. calibrations of the second predetermined amount of air that in testing or modeling demonstrate performance according to the target velocity) and/or according to feedback such as a shift actuator velocity and/or position value tracked over time.

The operations 17402 and 17404 may be performed in any order, with the operation 17402 preceding the operation 170404, or the operation 17404 preceding the operation 17402. The dynamics of the shift actuator in response to actuating and opposing pressure, the desired achieved velocity of the shift actuator, and/or the differential pressure provided by the actuating pulse and the opposing pulse determine the timing and amounts of air provided by the first actuating pulse and the first opposing pulse.

The provision of the first opposing pulse allows for the first actuating pulse to move an actuator (e.g. a shift actuator on a rail) at a selected velocity, which may be higher than a controllable velocity with only an actuating pulse present, and/or further improves repeatability of the actuator movement. The procedure 17400 further includes an operation 17406 to release pressure in the first closed volume and the second closed volume in response to determining a shift completion event (e.g. upon determining an open loop schedule for pressure pulsing is complete, upon a shift rail position sensor detecting the shift actuator in the engaged position for a gear mesh, and/or upon determining that related shaft speeds have reached an expected speed ratio for the gear mesh). The operation 17406 to release pressure may include opening a vent valve (not shown), allowing pressure to decay, shutting off a source pressure valve (not shown) and opening actuator valves with the source pressure valve closed, and/or any other operations to release pressure in the closed volumes.

In certain embodiments, the operation 17404 to provide the first actuating pulse includes an operation to provide the first actuating pulse as two split pulses, where a first one of the two split pulses is smaller than a first one of the two pulses. The provision of the first actuating pulse as two split pulses improves repeatability of the shift actuation, and can be utilized to confirm movement of the shift actuator before targeting a shift actuator target velocity for engaging the shift. An example operation includes a second one of the two split pulses includes an amount of air substantially equal to the first predetermined amount of air. In the example the first one of the two pulses may not be sufficient to overcome the opposing pulse or to achieve a desired shift actuator velocity, but the net amount of the first one of the two pulses above the substantially equal opposing pulse and second one of the split actuating pulse provides the selected driving force for the shift actuator. The amount of air that is a substantially equal amount of air is determinable by the context and the configuration of the application of the shift rail actuator. For example, an amount of air having the same mass and/or the same number of moles, and amount of air provided by a similar actuation time of the valve actuators, and amount of air provided by similar actuation of the valve actuators but compensating for flow differences (e.g. effective flow areas between the valve providing the actuation pulse and the opposing pulse), and/or an amount of air compensated for the closed volumes on each side to provide a similar pressure on each side are all contemplated examples of substantially equal amounts of air. Additionally or alternatively, differences in the driving force required to move the shift actuator in the actuating or opposing direction may provide for differing air amounts that nevertheless provide similar driving forces in each direction, and are therefore such air amounts are substantially equal for the purpose of the present disclosure.

In certain embodiments, the first one of the two split pulses includes an amount such as: between one-tenth and one-fourth of a total amount of air provided by the two split pulses, less than 40% of a total amount of air provided by the two split pulses, less than 33% of a total amount of air provided by the two split pulses, less than 25% of a total amount of air provided by the two split pulses and/or less than 20% of a total amount of air provided by the two split pulses.

The described ratios between the first and second split portions of the first actuating pulse are non-limiting examples, and one of skill in the art, having the benefit of the disclosures herein and information ordinarily available when contemplating a particular system, can readily determine air amounts for the first actuating pulse, whether provided as two split pulses, and the first opposing pulse. Certain considerations in determining the first amount of air, the second amount of air, the splitting of the actuation pulse, and the amounts of the split actuation pulse include the volume of the system for each of the closed volumes (e.g. rail size, position, distance from actuating valve, etc.), the pressure of the air source, the dynamics of air pressure generation in the actuating or opposing portion of the rail (e.g. the valve flow dynamics, temperature of the system, delay times between commanding a valve and valve response, friction of the shift actuator in each direction, and/or the current position of the shift actuator). The current position of the shift actuator may affect at least the volume of the closed volume on the actuating or opposing side of the actuator, the dynamics of pressure generation in the closed volume, and/or the resistance of the shift actuator to movement (e.g. engaging detents or other features during travel, changing lubrication environment, and/or compressing or expanding a changing volume of air on each side of the shift actuator). It will be understood that corrections for these and other elements can be readily provided with basic system testing of the type ordinarily performed, through modeling and/or laboratory testing and calibration into the predetermined air amounts, and/or by providing for a feedback loop such as a rail position feedback, air pressure feedback, or similar measured parameter, and adjusting the pulses in real time to ensure desired behavior of the shift actuator.

An air pulse, as described herein, should be understood broadly. An air pulse includes the provision of a determined amount of air in a determined amount of time, a scheduled opening time for a valve, a feedback based air amount such as a pressure increase amount in a selected volume, and/or a number of moles or a mass of air to be provided, and the like. A pulse may be provided in a single actuation (e.g. open a valve for a predetermined period of time), as multiple actuations that combine to create an equivalent actuation to the air pulse, a predetermined amount of air specific to another parameter such as the changing volume of the closed volume, which may include additional air amounts to maintain the predetermined air amount, and/or a feedback based response of the actuator to correct for unmodeled factors or noise factors in the system, wherein further responses from the feedback are included as the air pulse. Additionally or alternatively, where a pulse is described herein, for example in single pulses or split pulses, as a pulse width modulated actuation of the valve, and or amounts of air provided over time, it is understood that a continuously modulated valve may be used with a shaped trajectory to provide the behavior described herein. For example, where a binary (on/off) valve is used with split pulses for the first actuating pulse, and where a first split portion is smaller than and precedes a larger second split portion, an embodiment includes at least two distinct pulses provided by a binary valve. Alternatively or additionally, embodiments that include a single shaped pulse providing a similar air over time characteristic (e.g. a low rate of air, with or without a gap preceding a higher rate of air) are also contemplated herein as two distinct notional pulses, even if the air provision is not completely stopped between pulses. Similarly, a first split portion may include a number of actuations to provide the first split portion amount of air in the first selected time frame, and a second split portion may include a distinct number of actuations to provide the second split portion amount of air in the second selected time frame. Any air pulse operations, and/or air amount operations described herein may be similarly replaced by such equivalent operations, although the description may describe specific air pulses for clarity of description.

In certain embodiments, the first opposing pulse is performed at least 100 milliseconds (msec) before the first actuating pulse. Additionally or alternatively, the first actuating pulse may be performed before the first opposing pulse, and/or the actuating and opposing pulse may be performed at the same time and/or overlap. For example, in certain embodiments, it may be desired that no two actuating valves are open at the same time (e.g. to provide for a predictable air source pressure), and a portion of each of the first opposing pulse and the first actuating pulse may be performed in alternating (in equal or non-equal increments) and overlapping fashion. In certain embodiments, more than one actuating valve may be opened at the same time, and the system may include an air source with sufficient air delivery that pressure effects on the multiple valves open can be ignored, and/or the system may include compensation for the multiple valves and the effect on the source air pressure at the transmission inlet, shift rail system inlet, and/or at individual actuating valves of the system. In certain embodiments, the first actuating pulse is performed within a 200 msec window.

Figure 63:
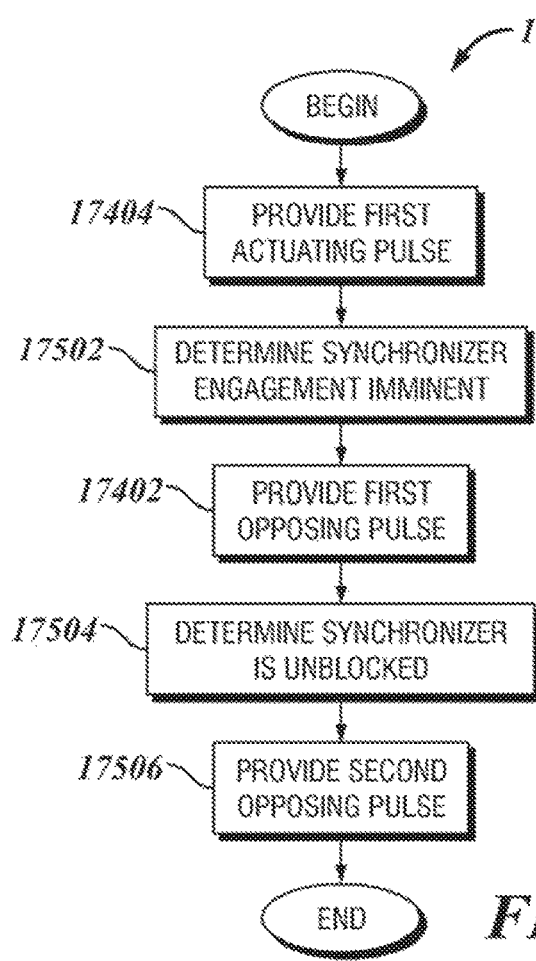
FIG. 63 is a schematic flow diagram to control a shift actuator.

Referencing FIG. 63, an example procedure 17500 includes an operation 17502 to determine that a synchronizer engagement is imminent, and the operation 17402 to provide the first opposing pulse is performed in response to the imminent synchronizer engagement. For example, the operation 17502 includes determining the imminent synchronizer engagement in response to a shift rail position value (e.g. from a shift rail position sensor), a time of the first actuating pulse being active, and/or a modeled rail response based upon the first actuating pulse (measured or open loop), an actuating valve position, and/or a pressure feedback in the shift rail closed volume on the actuating side. In certain embodiments, for example for a shift wherein the gear coupler does not have a synchronizer, the operation 17502 may be to determine a gear coupler engagement rather than a synchronizer engagement. The operations are otherwise similar for a synchronized or non-synchronized system for procedure 17500. The provision 17402 of the first opposing pulse before the synchronizer (or gear coupler) begins engagement allows for a controlled and/or selected engagement velocity of the shift actuator, reducing noise, part wear, and providing for smoother shifting. In certain embodiments, the shift actuator velocity is cut to 50% or more from a traversing velocity before the provision 17402 of the first opposing pulse. In embodiments where the first opposing pulse is provided before the first actuating pulse, the operation 17402 may include provision of second opposing pulse to slow the shift actuator before engagement. In certain embodiments, the shift actuator velocity is reduced to about 300 mm/sec, and/or to a value lower than 600 mm/sec, by the opposing pulse provided before the engagement. The velocity reduction amount is determined by the responsiveness of the actuators, the pressure of the air source, the ability to detect imminent engagement with high accuracy, precision, and time resolution, and similar parameters that will be understood to one of skill in the art. The selected velocity reduction depends upon the materials and required tolerances of the gear coupler and/or synchronizer, the desired life of parts involved, expected shift frequency, and time allotted to a shift event. Accordingly, one of skill in the art having the benefit of the disclosures herein and knowledge ordinarily available when contemplating a particular system, can select a desired shift actuator traverse velocity before engagement, and a desired imminent engagement reduction value, as required for the particular system, and select appropriate sensors or actuators to enable the desired shift actuator velocity and imminent engagement reduction value according to the principles described herein.

In certain embodiments, the procedure 17500 further includes an operation 17504 to determine that a synchronizer is in an unblocked condition. In certain embodiments, where the synchronizer engages and is bringing the shaft speeds together ("sitting on the block"), a time period elapses where the shift actuator does not progress as gear teeth are blocked from engaging as the shafts on each side of the gear mesh approach the same speed. When the shafts approach the same speed, the teeth are unblocked ("come off the block") and the shift actuator will progress to engage the gear. Example operations 17504 to determine that a synchronizer is in an unblocked condition include determining that a speed differential between engaging shafts is lower than an unblocking threshold value, determining that a speed differential between engaging shafts is within a predetermined unblocking range value, determining that a synchronizer engagement time value has elapsed (e.g. time on the block elapses), and/or determining that a shift actuator position value indicates the unblocking condition (e.g. shift actuator with applied pressure begins to move toward engagement again).

The example procedure 17500 further includes an operation 17506 to provide a second opposing pulse before or as the shift actuator moves after unblocking and into full engagement. In certain embodiments, the opposing resistance to the shift actuator drops dramatically when the synchronizer is unblocked, and can provide an undesired closing speed to full engagement. In certain embodiments, for example where a first opposing pulse is provided before the actuation pulse and/or before the opposing pulse provided in operation 17402, the opposing pulse provided in operation 17506 is a third opposing pulse.

In certain embodiments, any of the actuating pulses and/or opposing pulses are provided as a pulse-width-modulated (PWM) operation. A PWM operation, as disclosed herein, should be interpreted broadly and references any provision of air over multiple actuation events to provide a predetermined amount of air and/or an adjusted amount of air over a period of time, and/or to support another parameter in the system (e.g. a shift actuator velocity, a pressure value, or the like). A PWM operation ordinarily indicates a predetermined period of operation, with a selected duty cycle (e.g. "on-time" percentage of the actuator within the period, which can be varied to provide selected response), and such operations are contemplated herein as a PWM operation. Additionally or alternatively, a PWM operation as used herein includes an adjustment of the PWM period, for example, and without limitation, to support minimum or maximum actuator on-times where an otherwise indicated duty cycle may exceed the period and/or indicate a valve actuation on-time below a selected minimum on-time for the valve. Additionally, while PWM-type operations are ordinarily beneficial for binary actuation (e.g. an on-off actuator valve), PWM-type operations may similarly be provided by a continuously capable actuator (e.g. an actuator capable of providing multiple opening values, and/or a continuous range of opening values), for example, and without limitation, to support feedback on system response to added air amounts and allow for real-time adjustment of the predetermined air amounts. In certain embodiments, PWM-type operations allow for binary actuators to provide actuation approximating a continuous actuator, but PWM-type operations can provide benefits for actuators providing multiple opening vales and/or a continuous range of opening values according to the principles described herein.

Figure 64:
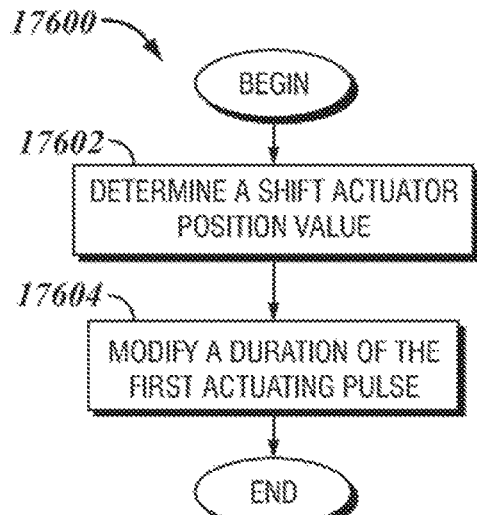
FIG. 64 is a schematic flow diagram to control a shift actuator.

Referencing FIG. 64, a procedure 17600 includes an operation 17602 to determine a shift actuator position value, and an operation 17604 to modify a duration of the first actuating pulse in response to the shift actuator position value. The operation 17604 includes changing the second predetermined amount of air, and/or modulating the first actuating pulse in response to the shift actuator position value (e.g. via a PWM operation or other modulation mechanism). Example and non-limiting shift actuator position values include: a quantitative position description of the shift actuator; a quantitative velocity description of the shift actuator; and/or a shift state description value corresponding to the shift actuator. Example and non-limiting shift state description values include a neutral position, a neutral departure position, a synchronizer engagement approach position; a synching position; a synchronizer unblock position; an engaged position; and/or a disengaging position. In certain embodiments, the determination of the shift state description value include utilizing a shift actuator position value to determine the shift state description, observing one or more system operating conditions that correlate to the shift state, and/or utilizing predetermined open loop timing values during shift operations to determine the shift state. Example and non-limiting system operating conditions that may correlate to one or more shift states include one or more shaft speeds in the system, a rate of change of one or more shaft speeds in the system, shift actuator response (e.g. movement rates, positions), a pressure value in the system (e.g. pressure on an actuating or opposing closed volume for the shift actuator), a rate of change of a pressure value in the system, an actuator position (e.g. providing air or not), and/or a source air pressure value. The operations of procedure 17600 may be utilized, without limitation, to perform or modify operations 17404 to provide the first actuating pulse, and/or may be provided as independent operations during a shift procedure.

An example procedure includes the operation 17404 to provide the first actuating pulse as a shaped air provision trajectory. For example, and without limitation, the shaped air provision trajectory includes an amount of air over time having a desired shape to the air provision, and the actuating valve provides the shaped air provision trajectory as a modulated valve operation, PWM valve operation, continuously capable valve operation over time, and/or operation from a valve having multiple air flow rate capabilities to create the air provision trajectory. In certain embodiments, the first actuating pulse includes at least one operation to open and close a binary pneumatic valve.

Figure 65:
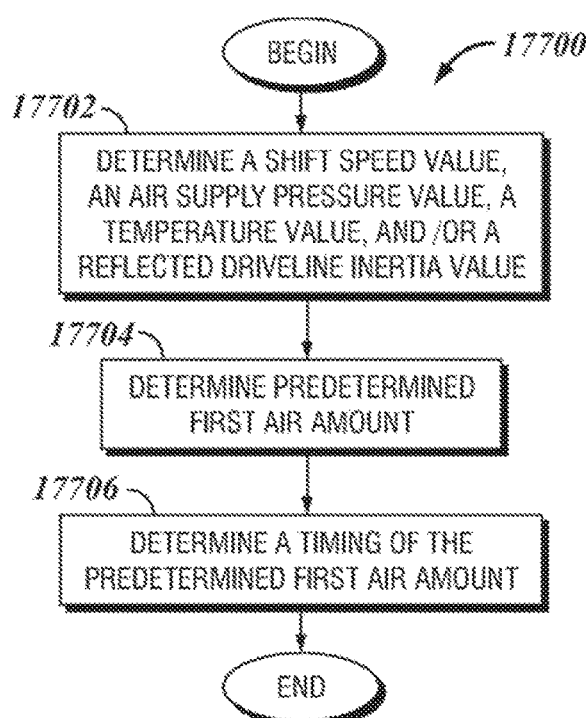
FIG. 65 is a schematic flow diagram to control a shift actuator.

Referencing FIG. 65, a procedure 17700 includes an operation 17702 to determine at least one shaft speed value, an air supply pressure value, at least one temperature value, and/or a reflected driveline inertia value. The example procedure 17700 further includes an operation 17704 to determine the predetermined first air amount in response to the at least one shaft speed value, the air supply pressure value, the at least one temperature value, and/or the reflected driveline inertia value. Additionally or alternatively, the example procedure 17700 further includes an operation 17706 to determine a timing of the predetermined first air amount in response to the at least one shaft speed value, the air supply pressure value, the at least one temperature value, and/or the reflected driveline inertia value. In certain embodiments, the procedure 17700 may be utilized, without limitation, to perform or modify operations 17402 to provide the first opposing pulse. The procedure 17700 determines, without limitation, an appropriate time and/or air amount for the opposing pulse to provide a selected velocity reduction in the shift actuator before engagement of the associated gear coupler with the gear mesh during a shift engagement. In certain embodiments, a shaft speed related to the gear mesh for engaging is utilized for the shaft speed, and the operations 17704, 17706 utilize the shaft speed to determine the predetermined first air amount and the timing of the first predetermined air amount. Additionally or alternatively, the operations 17704, 17706 utilize a temperature value to determine the predetermined first air amount and the timing of the first predetermined air amount. The shaft speed affects both the shift actuator velocity to reach the engagement position and/or the desired velocity to engage the gear mesh, and accordingly utilization of the shaft speed allows for compensation to provide desired engagement parameters. In certain embodiments, a temperature value in the system affects the shift actuator velocity—for example and without limitation affecting friction drag or other velocity affecting parameters (e.g. lubrication temperature, pressure response, and/or differential expansion of sliding parts)—and temperature compensation helps provide desired engagement parameters. The temperature value may be any temperature that at least partially correlates with a relevant temperature, and without limitation, TCM temperature, oil temperature, ambient temperature, and/or solenoid temperatures may be utilized for temperature compensation. In certain embodiments, a shaft speed related to the gear mesh is not available in the system (e.g. for a main shaft shift where main shaft speed is not available), and a compensated offset speed may be utilized. In one example, a main shaft speed is not available, and an output shaft speed correlated to the main shaft speed, for example utilizing an air supply pressure value as a compensating parameter, is utilized in the operations 17704, 17706.

In certain embodiments, the operations 17704, 17706 further include determining predetermined first air amount and/or the timing of the predetermined first air amount in response to the reflected driveline inertia value. Example and non-limiting values for the reflected driveline inertia include a perceived and/or effective inertia of the driveline. Example operations to determine the reflected driveline inertia include determining the reflected driveline inertia in response to a launch having a known torque value and an observed acceleration rate, and/or determining vehicle data from a datalink (e.g. vehicle mass, driveline configuration including one or more of a rear axle ratio, drive wheel radius, etc.). Additionally or alternatively, a reflected driveline inertia value may be estimated or assumed, and system responses observed to determine if the estimated or assumed reflected driveline inertia is higher, lower, or about equal to the actual reflected driveline inertia value. The reflected driveline inertia value affects the desired shift time, engagement forces, and transient behavior of the torque transfer path through the transmission, and accordingly the operations 17704, 17706 can be utilized, in certain embodiments, to provide for increased or decreased shift response time, and/or higher or lower shift actuator velocity at the gear mesh engagement.

In certain embodiments, the procedures 17600, 17700 to determine the first predetermined air amount, the second predetermined air amount, and/or a timing of the first predetermined air amount, include adjusting at least one of the first actuating pulse and/or the first opposing pulse in response to the shift actuator position value. In certain embodiments, the adjusting includes interrupting the first actuating pulse and/or the first opposing pulse to synchronize pressure decay in the first closed volume and the second closed volume. Additionally or alternatively, the adjusting includes interrupting the first actuating pulse and/or the first opposing pulse to coordinate pressure decay in the first closed volume and the second closed volume. Synchronizing pressure decay should be understood broadly, and includes at least timing the pressure decay in each volume such that the shift actuator is not disengaged from the gear, such that the shift actuator does not provide excessive engagement force to the gear coupler and/or synchronizer during pressure decay, and/or includes timing the pressure decay in each volume such that the pressure is reduced at about the same time (e.g. within about 1 second apart, within about 200 msec apart, and/or within about 100 msec). Coordinating pressure decay should be understood broadly, and includes at least providing for pressure decay in each volume in light of the pressure decay in the other volume, coordinating the pressure decay such that the shift actuator does not disengage the gear coupler and/or synchronizer during pressure decay, coordinating the pressure decay such that engagement and/or disengagement forces from the shift actuator are kept below a threshold value, and/or coordinating the pressure decay such that a pressure differential on the shift actuator is kept below a threshold value.

In certain embodiments, operation 17604 to modify the duration of the first actuation pulse includes modulating the first actuation pulse, and/or further includes reducing the second predetermined amount of air in response to the shift actuator position value being a shift state description value, and/or reducing the first actuating pulse in response to the shift state description value indicating a synching phase of the shift actuator (e.g. where a synchronizer is sitting on the block). In certain embodiments, reducing the first actuating pulse includes limiting an air pressure build-up in the second closed volume. The operation 17604 thereby reduces engagement forces on the synchronizer and/or gear mesh, reducing part wear and resulting in a smoother shifting operation.

Figure 66:
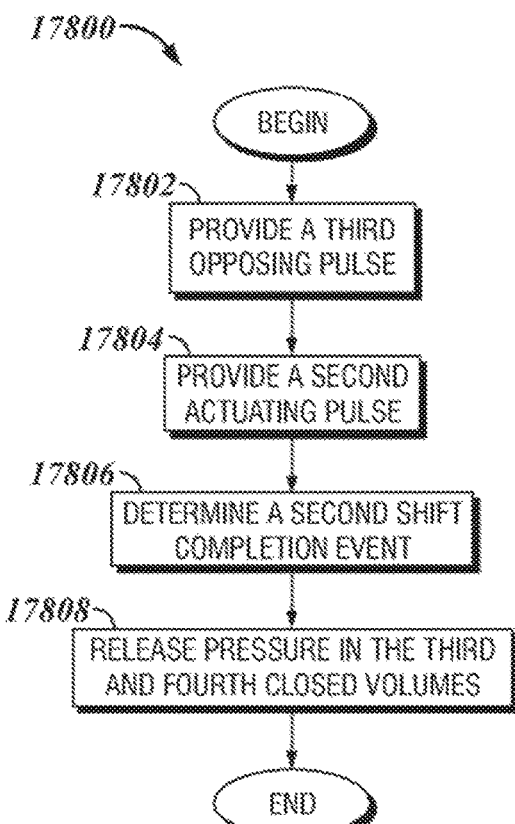
FIG. 66 is a schematic flow diagram to control a shift actuator.

Referencing FIG. 66, an example procedure 17800 includes an operation 17802 to provide a third opposing pulse, the third opposing pulse including a third predetermined amount of air above an ambient amount of air in a third closed volume, where pressure in the third closed volume opposes movement of a second shift actuator in a shift direction, an operation 17804 to provide a second actuating pulse, the second actuating pulse including a fourth predetermined amount of air above an ambient amount of air in a fourth closed volume, where pressure in the fourth closed volume promotes movement of the second shift actuator in the shift direction. The procedure 17800 further includes an operation 17806 to determine a second shift completion event, and an operation 17808 to release pressure in the third closed volume and the fourth closed volume in response the operation 17806 determining the second shift completion event. An example system includes the controller 17110 performing the procedure 17800 such that not more than one actuating valve is open simultaneously, for example performing a first shift event according to procedures 17400, 17500, 17600, 17700 before performing a second shift event according to procedure 17800, and/or interleaving shift events such that no two valves are open at the same time. Procedure 17800 is additionally modifiable according to any one of procedures 17500, 17600, 17700, and/or any other disclosures herein. Additionally or alternatively, more than one actuator valve may be opened at the same time, and operations herein modified to compensate for pressure changes, the air source 17202 capable of providing sufficient flow that pressure compensation is not necessary, and/or more than one separate air source 17202 provided in the system.

Figure 67:
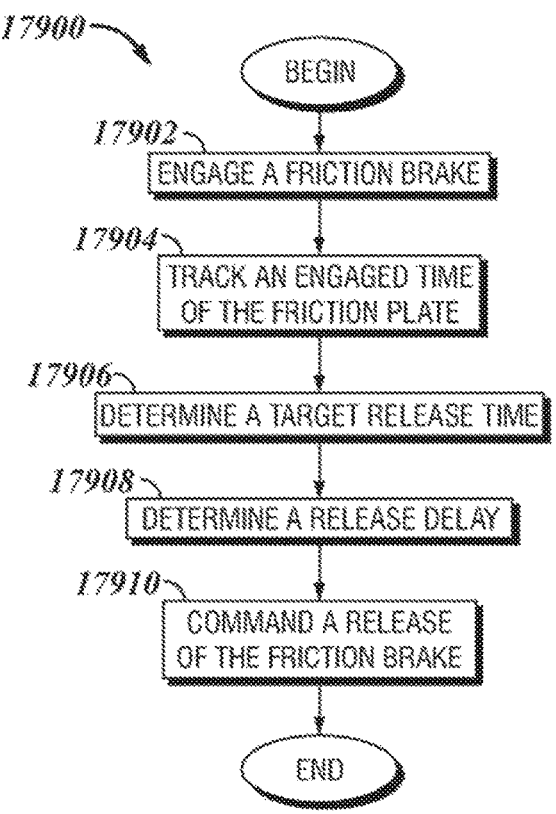
FIG. 67 is a schematic flow diagram to control a friction brake.

Referencing FIG. 67, an example procedure 17900 includes an operation 17902 to engage a friction brake to a countershaft of a transmission, an operation 17904 to track an engaged time of the friction brake, an operation 17906 to determine a target release time for the friction brake, an operation 17908 to determine a release delay for the friction brake in response to the engaged time, and an operation 17910 to command a release of the friction brake in response to the release delay and the target release time.

In certain embodiments, an engaged time of the friction brake provides for a build-up of pressure in the friction brake actuator closed volume 17212. Accordingly, a delay is exhibited after a command to disengage the friction brake is performed (e.g. the friction brake actuator valve is closed) before the friction brake disengages. In certain embodiments, the operation 17908 includes determining the release delay by determining a pressure decay value in a friction brake actuation volume, for example utilizing a model, open loop calibration, or other determination of pressure decay in response to friction brake on-time. In certain embodiments, a friction brake on-time exceeding a saturation value may result in a fixed relationship between the on-time and the release delay, and for on-time values below the saturation value, a relationship between the on-time and the release delay is calculated, calibrated, and/or included as a predetermined relationship in to the controller 17110. In certain embodiments, the operation 17908 includes determining a pressure in the friction brake actuation volume. In certain embodiments, the operation 17906 includes determining a speed differential between the countershaft and an engaging shaft, and determining the target release time in response to the speed differential, for example where the friction brake is utilized to bring the countershaft speed down to be close to the speed of the engaging shaft to provide for a quicker, smoother, and/or quieter shift event. Example and non-limiting engaging shafts include an output shaft, a main shaft, and/or an input shaft. In certain embodiments, the operation 17906 includes determining lumped driveline stiffness value, and determining the target release time further in response to the lumped driveline stiffness value. The lumped driveline stiffness value, without limitation, includes the dynamic torsional response of the driveline, and affects the dynamic response of the system (e.g. how fast the system will speed up or slow down) and/or the desired speed differential imposed for a shift engagement. Accordingly, the inclusion of driveline stiffness in the friction brake release allows for better control of the speed differential at engagement and/or quicker, smoother, and/or quieter shifting. In certain embodiments, the target gear ratio for engagement is included in determining the lumped driveline stiffness value. In certain embodiments, the operation 17906 includes determining the target release time further in response to the target gear ratio value, rather than including the target gear ratio value in the lumped driveline stiffness value—for example where the lumped driveline stiffness value is determined independently of the target gear ratio, and inclusion of the target gear ratio compensates the lumped driveline stiffness value without the target gear ratio. In certain embodiments, the operation 17906 includes determining a friction brake disengagement dynamic value, and determines the target release time further in response to the friction brake disengagement dynamic value. Example and non-limiting aspects of the friction brake disengagement dynamic value include the friction brake response of the return spring that disengages the friction brake (including wear or degradation thereof), compensation for temperature effects on friction brake disengagement and/or temperature effects shift actuator speeds and/or shaft speeds (e.g. slower responding parts in cold temperatures may provide for a shorter engagement of the friction brake during a shift, limiting unnecessary utilization of the friction brake and corresponding losses in efficiency and slower shifting). In certain embodiments, the operation 17906 includes determining a vehicle speed effect, and determining the target release time further in response to the vehicle speed effect. Example and non-limiting vehicle speed effects include a current vehicle speed, an estimated vehicle speed at a gear engagement time, a vehicle acceleration rate, and/or a vehicle deceleration rate. For example and without limitation, a vehicle in a accelerating or decelerating environment may result in changing shaft speeds, resulting in a distinct target speed for the countershaft from a nominal shift otherwise planned for current operating conditions, and the example controller 17110 responds by targeting a countershaft speed according to the speed target at the time of shift engagement, resulting in a greater or lesser engagement of the friction brake during the shift.

Figure 68:
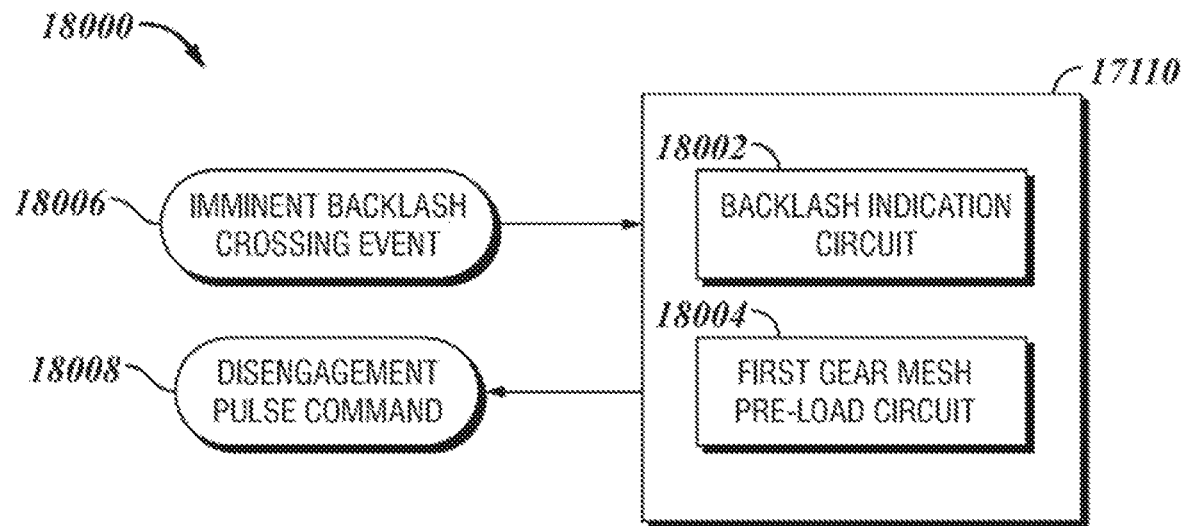
FIG. 68 is a schematic diagram of a controller to manage backlash.

Referencing FIG. 68, an example apparatus 18000, including the controller 17110 in the example of FIG. 68, includes a backlash indication circuit 18002 that identifies an imminent backlash crossing event 18006 at a first gear mesh. The apparatus 18000 further includes a means for reducing engagement force experienced by the first gear mesh in response to the backlash crossing event 18006.

Certain non-limiting examples of the means for reducing engagement force experienced by the first gear mesh in response to the backlash crossing event 18006 are described following. An example means for reducing engagement force experienced by the first gear mesh further includes the controller 17110 disengaging the first gear mesh during at least a portion of the backlash crossing event, for example by commanding a shift actuator to move a synchronizer and/or gear coupler to disengage the first gear mesh in response to the imminent backlash crossing event 18006. In certain embodiments, the controller 17110 provides a pre-loaded amount of air to the actuator(s) to position the shift actuator to a neutral position. The shift actuator may move the synchronizer and/or gear coupler to the neutral position, and/or the synchronizer and/or gear coupler may be locked in to the gear mesh until the backlash crossing event occurs, whereupon during the zero torque portion of the backlash crossing, the pre-loaded shift actuator will slide the synchronizer and/or gear coupler out of gear, preventing bounce, oscillation, and/or other undesirable behavior during the backlash crossing. Accordingly, the first gear mesh is thereby disengaged during at least a portion of the backlash event. Additionally or alternatively, the controller 17110 provides a command to disengage a clutch during at least a portion of the backlash crossing event, and/or to slip the clutch (e.g. reduce clutch engagement torque until the clutch is not in lock-up) during at least a portion of the backlash crossing event. The disengagement and/or slipping of the clutch mitigates the torsional forces experienced during the backlash event, allowing the gear mesh to settle on the other side of the backlash (e.g. from drive side to coast side engagement, or from coast side to drive side engagement) without experiencing negative consequences to smooth operation of the transmission 100, noticeable effects by the driver or operator, and/or mitigating these.

The example apparatus 18000 includes the backlash indication circuit 18002 identifying the imminent backlash crossing event 18006 by determining that a gear shift occurring at a second gear mesh is likely to induce the backlash crossing event at the first gear mesh. For example, in a shift of just a forward gear (e.g. at the input shaft, or a "splitter" shift), where the rearward gear is to remain in the same engagement after the shift, a backlash crossing event may occur at the rearward gear under certain operating conditions, which may be predicted according to the current side of the rearward gear mesh (e.g. coast side or drive side), the vehicle speed and acceleration, and/or the speeds of the input shaft, countershaft, and/or prime mover. The example backlash indication circuit 18002 determines the imminent backlash crossing event 18006 for the first gear mesh (rearward in the example) in response to the gear shift at the second gear mesh (forward gear mesh in the example). The example apparatus 18000 further includes a means for reducing engagement force experienced by the first gear mesh. Example and non-limiting means for reducing engagement force experienced by the first gear mesh include disengaging the first gear mesh during at least a portion of the gear shift—for example a first gear mesh pre-load circuit 18004 provides a disengagement pulse command 18008, where a shift actuator responsive to the disengagement pulse command 18008 disengages the first gear mesh during at least a portion of the gear shift. An example disengagement pulse command includes a fifth predetermined amount of air above an ambient amount of air in a fifth closed volume, and where pressure in the fifth closed volume promotes movement of the shift actuator in the disengagement direction. In certain embodiments, the disengagement pulse command 18008 further includes a sixth predetermined amount of air above an ambient amount of air in a sixth closed volume, where pressure in the sixth closed volume opposes movement of the shift actuator in the disengagement direction. In the example, the fifth closed volume and sixth closed volume are volumes on each side of a pneumatic piston comprising a portion of the shift actuator, and where first gear mesh pre-load circuit 18004 determines the fifth predetermined amount of air and the sixth predetermined amount of air such that the shift actuator is urged into a neutral position in response to a release of engagement force. In one example, engagement force is released during the backlash crossing event, eliminating or reducing oscillations, noise, and other negative effects of the backlash crossing event with the first gear mesh engaged. In certain embodiments, the time response of determining the imminent backlash crossing event 18006, providing the disengagement pulse command 18008, and/or response of the valve actuators providing the fifth predetermined air amount and/or sixth predetermined air amount, result in the disengagement of the first gear mesh on a subsequent backlash crossing event after a first backlash crossing event (e.g. on a "bounce" after the first backlash crossing). Even where the disengagement occurs after the first backlash crossing event, oscillations, noise, and other negative consequences of the backlash crossing are reduced.

An example apparatus 18000 includes the backlash indication circuit 18002 further identifying the imminent backlash crossing event 18006 by performing at least one operation such as: determining that an imminent rotational direction of the first gear mesh in a transmission is an opposite rotational direction to an established rotational direction of the first gear mesh, determining that a speed change between a first shaft comprising gears on one side of the first gear mesh and a second shaft comprising gears on an opposing side of the first gear mesh is likely to induce the backlash crossing event, determining that a gear shift occurring at a second gear mesh is likely to induce the backlash crossing event at the first gear mesh, determining that a transmission input torque value is at an imminent zero crossing event, and/or determining that a vehicle operating condition is likely to induce the backlash crossing event.

Figure 69:
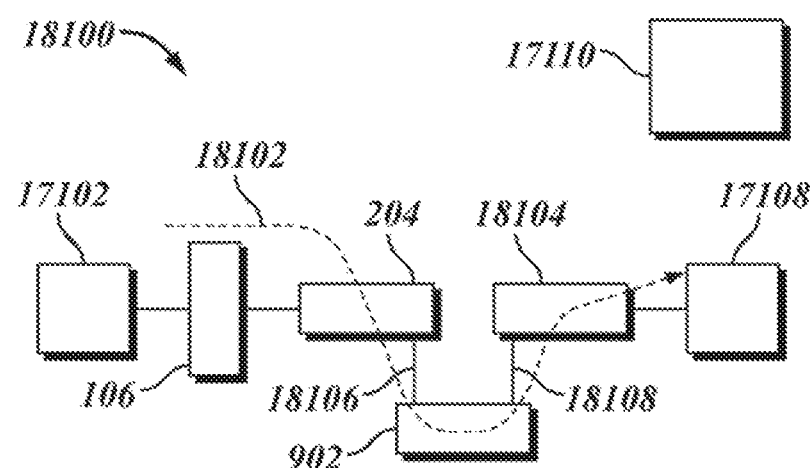
FIG. 69 is a schematic representation of a transmission having a controller.

Referencing FIG. 69, an example system 18100 is depicted schematically to illustrate interactions of certain aspects of the system 18100. The system 18100 includes and/or interacts with a prime mover 17102 providing motive torque. The system 18100 further includes a torque transfer path 18102 operatively coupling the motive torque to drive wheels 17108. The torque transfer path 18102 in the example system 18100 depicts certain aspects of a simplified torque transfer path 18102. The example torque transfer path 18102 includes a clutch 106 that selectively decouples the prime mover 17102 from an input shaft 204 of the torque transfer path 18102, where the input shaft 204 is operationally downstream of the clutch 106. The torque transfer path 18102 further includes a first gear mesh 18106 and a second gear mesh 18108, where each gear mesh 18106, 18108 includes an engaged and a neutral position, and where both gear meshes in the engaged position couple the input shaft 204 to the drive wheels 17108, and where either gear mesh 18106, 18108 in the neutral position decouples the input shaft 204 from the drive wheels 17108. The coupling depicted in the example system 18100 is through the countershaft 902, and a lumped main shaft/output shaft component 18104. However, other torque transfer paths are contemplated herein, and the system 18100 is not limited to the particular components defining the torque transfer path 18102. The system 18100 includes a first shift actuator (not shown) that selectively operates the first gear mesh 18106 between the engaged and neutral position, and a second shift actuator (not shown) that selectively operates the second gear mesh 18108 between the engaged and neutral position. It is understood that additional shift actuators may be present, for example where a gear mesh 18106, 18108 is accessible by more than one shift actuator. The system further includes a controller 17110 that performs certain operations to ensure that unintended vehicle motion is not experienced at the drive wheels 17108. More detailed descriptions of operations of the controller 17110 are set forth in the description referencing FIG. 70. The first and second gear meshes may be any gear meshes in the system 18100 where, when both gear meshes are intended to be disengaged, and at least one of the gear meshes is successfully disengaged, torque transfer from the prime mover 17102 to the drive wheels 17108 is prevented. In one example, even if one of the gear meshes is inadvertently engaged if intended to be disengaged (e.g. where one of the gear meshes has a failed position sensor erroneously reporting that the gear mesh is disengaged when it is actually engaged), torque transfer from the prime mover 17102 to the drive wheels 17108 is prevented. In certain embodiments, the first gear mesh and/or the second gear mesh may include more than one gear mesh—for example the first or second gear mesh may include: all gear meshes between the input shaft and the countershaft (splitter gears), all gear meshes between the countershaft and the main shaft (main box gears), or all gear meshes between the main shaft and the output shaft (range gears). In certain embodiments, a first one of these is the first gear mesh, and a second one of these is the second gear mesh.

Figure 70:
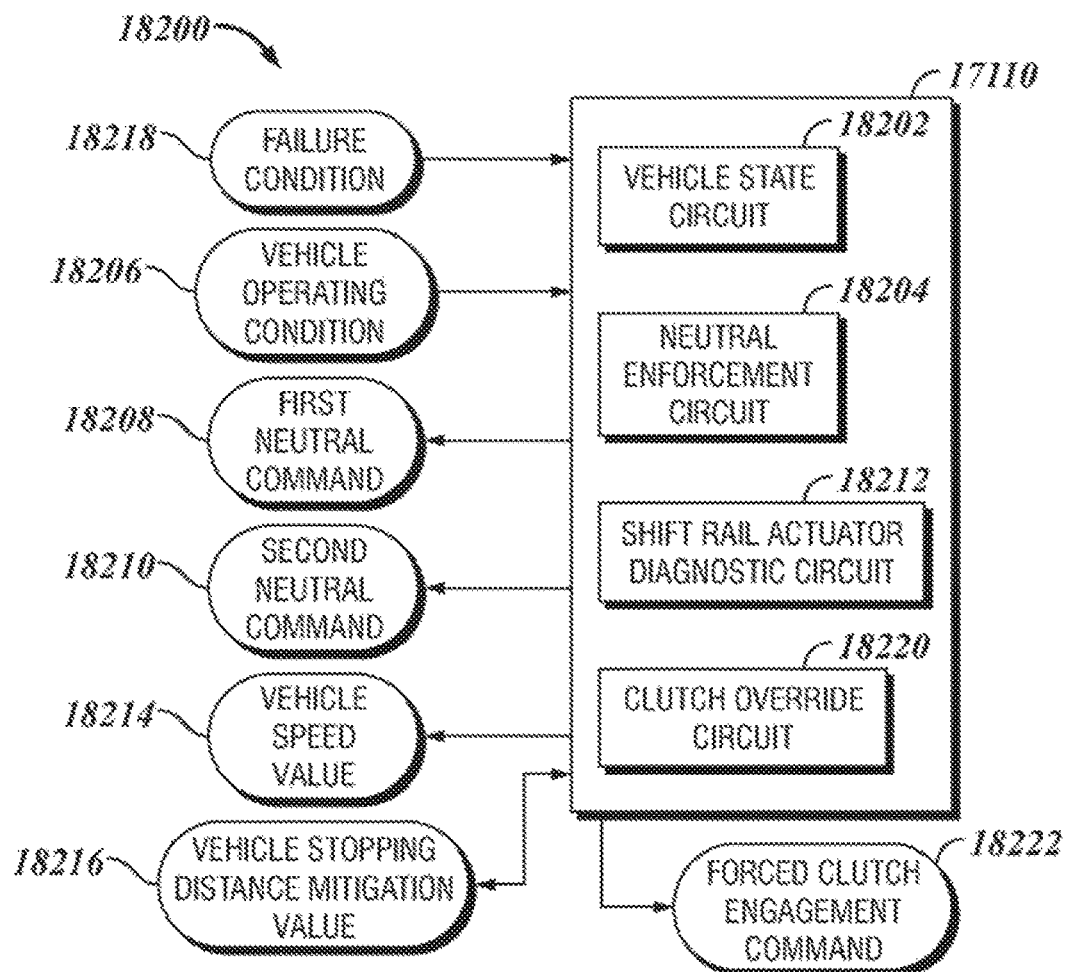
FIG. 70 is a schematic diagram of a controller for a transmission.

Referencing FIG. 70, a system 18200 includes a controller 17110 having a vehicle state circuit 18202 that interprets at least one vehicle operating condition 18206, a neutral enforcement circuit 18204 that provides a first neutral command 18208 to the first shift actuator and a second neutral command 18210 to the second shift actuator, in response to the vehicle operating condition indicating that vehicle motion is not intended. Example and non-limiting vehicle operating conditions 18206 include: an engine crank state value, a gear selection value, a vehicle idling state value, and/or a clutch calibration state value. For example, during engine cranking and/or certain gear selection value (e.g Neutral or Park), vehicle operating guidelines and/or regulations may indicate that vehicle movement, and/or transition of prime mover torque to the drive wheels, is not desired and/or not allowed. In certain embodiments, a vehicle idling condition may indicate that vehicle movement is not desired and/or not allowed. In certain embodiments, for example during a clutch calibration event to determine clutch torque to position parameters (reference FIG. 71 and the referencing description), the transmission 100 may be performing maneuvers wherein vehicle movement is not desired and/or not allowed. In certain embodiments, vehicle state circuit 18202 further determines the vehicle operating condition 18206 as a vehicle stopped condition, for example from a datalink state command, an operating condition of the vehicle, and/or one or more parameter values (vehicle speed, brake pedal position, brake pedal pressure, accelerator position or torque request, engagement of a vehicle state inconsistent with movement such as a hood switch, PTO device, or the like), and where the neutral enforcement circuit 18204 further provides the first neutral command 18208 and the second neutral command 18210 in response to the vehicle stopped condition. The provision of the first neutral command 18208 and the second neutral command 18210, and the response of the shift actuators to enforce two separate neutral positions in the transmission 100, prevents a single point failure in the transmission 100, such as a rail position sensor or stuck shift actuator, from allowing unintended vehicle motion.

The example system 18200 includes the controller 17110 further having a shift rail actuator diagnostic circuit 18212 that diagnoses proper operation of at least one shift rail position sensor (not shown) in response to a vehicle speed value 18214. The vehicle state circuit 18202 further interprets at least one failure condition 18218, and provides a vehicle stopping distance mitigation value 18216 in response to the at least one failure condition 18218. Example and non-limiting failure conditions 18218 include mission disabling failures wherein normal operations of the transmission 100 and/or vehicle systems are precluded, for example but not limited to a loss in ability to shift one or more gears, a loss in power to a primary controller, where a secondary controller is capable to operate the clutch, loss of a datalink or communication with the vehicle system and/or engine, or other catastrophic failure wherein control of the clutch 106 is maintained, but other control is lost. The controller 17110 further includes a clutch override circuit 18220 that provides a forced clutch engagement command 18222 in response to the vehicle stopping distance mitigation value 18216. The vehicle stopping distance mitigation value 18216 includes, without limitation, and indication that operations of the clutch to mitigate increased vehicle stopping distance resulting from the failure condition 18218 are to be performed. An example clutch override circuit 18220 further provides a forced clutch engagement command 18222 in response to the vehicle stopping distance mitigation value 18216 and further in response to at least one value such as: a motive torque value representative of the motive torque, an engine speed value representative of a speed of the prime mover, an accelerator position value representative of an accelerator pedal position, a service brake position value representative of a position of a service brake position, a vehicle speed value representative of a speed of the drive wheels, and/or a service brake diagnostic value. In certain embodiments, the forced clutch engagement command 18222 provides for engagement of the clutch when the vehicle speed, motive torque, accelerator position, service brake position, and/or vehicle speed are such that stopping distance is not increased by engagement of the clutch. For example, in conditions where engine braking or other operations will be able to reduce speed during clutch engagement, the forced clutch engagement command 18222 provides for clutch engagement. When conditions change such that clutch engagement may increase the stopping distance, for example when the engine idle governor is providing motive torque that overcomes other stopping forces, and/or other stopping forces without consideration to the service brake, the forced clutch engagement command 18222 indicates to open the clutch. In certain embodiments, the service brake may be in a faulted condition (e.g. service brake diagnostic value indicates that the service brake position is unknown), and accordingly the service brake logic can be adjusted accordingly—e.g. service brake position may be disregarded when the service brake is faulted, and/or the faulted service brake may be a failure condition 18218 according to the vehicle operating guidelines, settings of the vehicle and/or engine, and/or applicable regulations.

Figure 71:
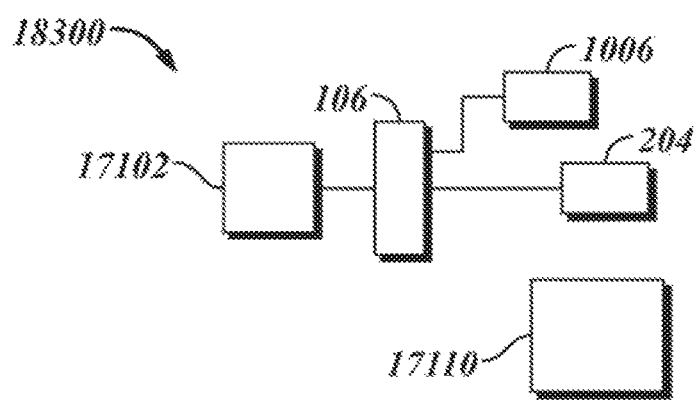
FIG. 71 is a schematic representation of a controller actuating a clutch.

Referencing FIG. 71, an example system 18300 includes a clutch 106 that selectively decouples a prime mover 17102 from an input shaft 204 of a transmission 100, a progressive actuator 1002 operationally coupled to the clutch 106, where a position of the progressive actuator 1002 corresponds to a position of the clutch 106. The system 18300 further includes a controller 17110 that provides a relationship between a position of the progressive actuator (and clutch) and a clutch torque value (e.g. engagement torque of the clutch). More detailed descriptions of the operations of the controller 17110 are provided in FIG. 72 and the disclosure referencing FIG. 72.

Figure 72:
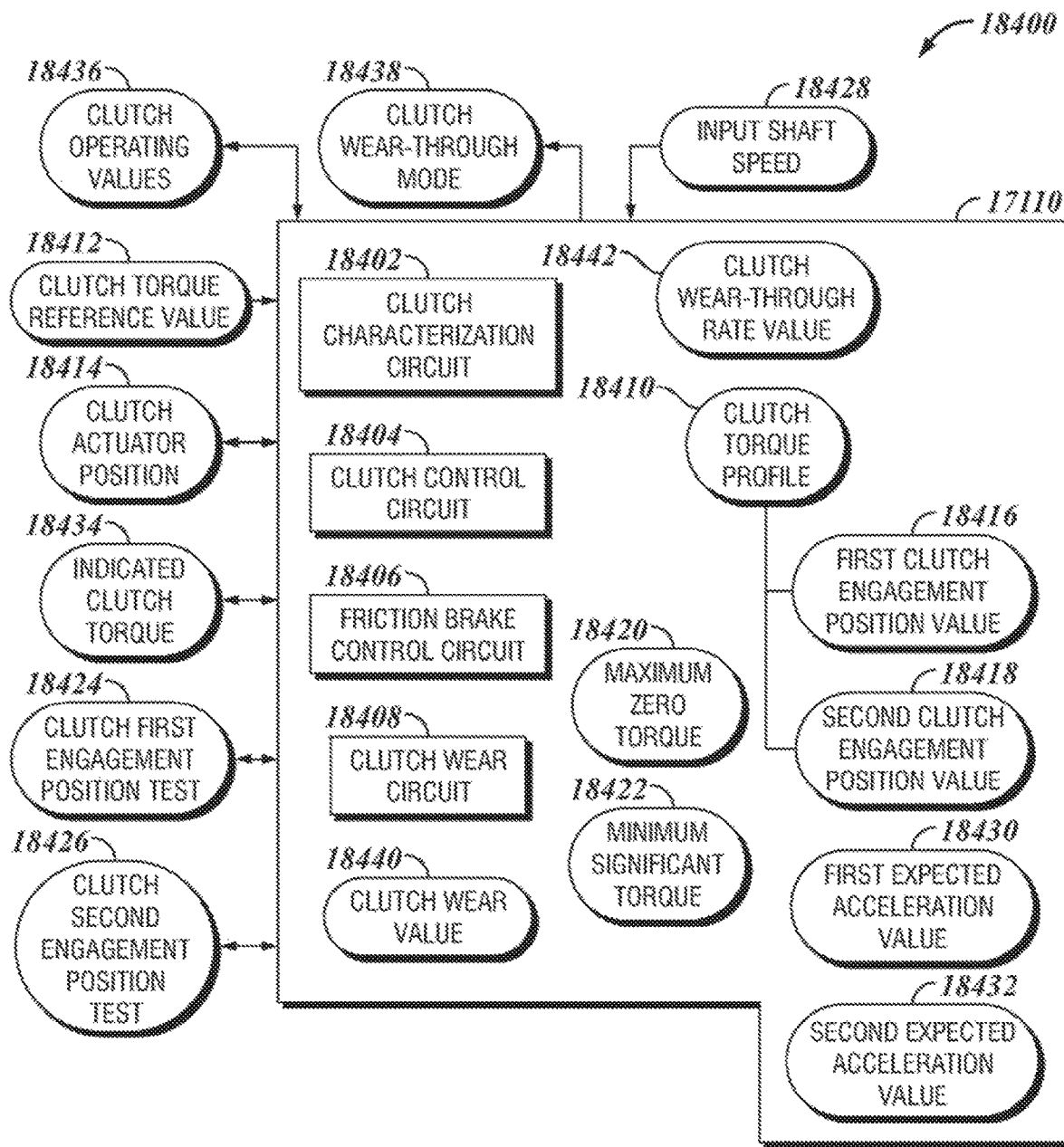
FIG. 72 is a schematic diagram of a controller for a transmission.

Referencing FIG. 72, an apparatus 18400 includes a controller 17110 including: a clutch characterization circuit 18402 that interprets a clutch torque profile 18410, the clutch torque profile 18410 providing a relation between a position of the clutch and a clutch torque value (e.g. an engagement torque of the clutch in response to a position of the clutch and/or a position of the progressive actuator). The apparatus 18400 further includes a clutch control circuit 18404 that commands a position of the progressive actuator in response to a clutch torque reference value 18412 and the clutch torque profile 18410. For example, an algorithm in the controller 17110 provides a clutch torque request as a clutch torque reference value 18412 to the clutch control circuit 18404. The clutch characterization circuit 18402 further interprets a position 18414 of the progressive actuator and an indicated clutch torque 18434, and updates the clutch torque profile 18410 in response to the position 18414 of the progressive actuator and the indicated clutch torque 18434.

The example apparatus 18400 includes the clutch torque profile 18410 including a first clutch engagement position value 18416, and where the clutch control circuit 18404 further utilizes the first clutch engagement position value 18416 as a maximum zero torque position 18420. For example, in response to receiving a zero clutch torque reference value 18412, and/or to receiving a "clutch disengaged" command, the clutch control circuit 18404 positions the clutch actuator at a position below that indicated by the maximum zero torque 18420. The example clutch characterization circuit 18402 further interprets the clutch torque profile 18410 by performing a clutch first engagement position test 18424.

The example apparatus 18400 includes the clutch torque profile 18410 including a second clutch engagement position value 18418, and where the clutch control circuit 18404 further utilizes the second clutch engagement position value 18418 as a minimum significant torque position 18422. For example, in response to receiving a non-zero clutch torque reference value 18412, and/or to receiving a "clutch engaged" command, the clutch control circuit 18404 positions the clutch actuator at a position equal to or greater than that indicated by the minimum significant torque 18422. The example clutch characterization circuit 18402 further interprets the clutch torque profile 18410 by performing a clutch second engagement position test 18426.

Figure 73:
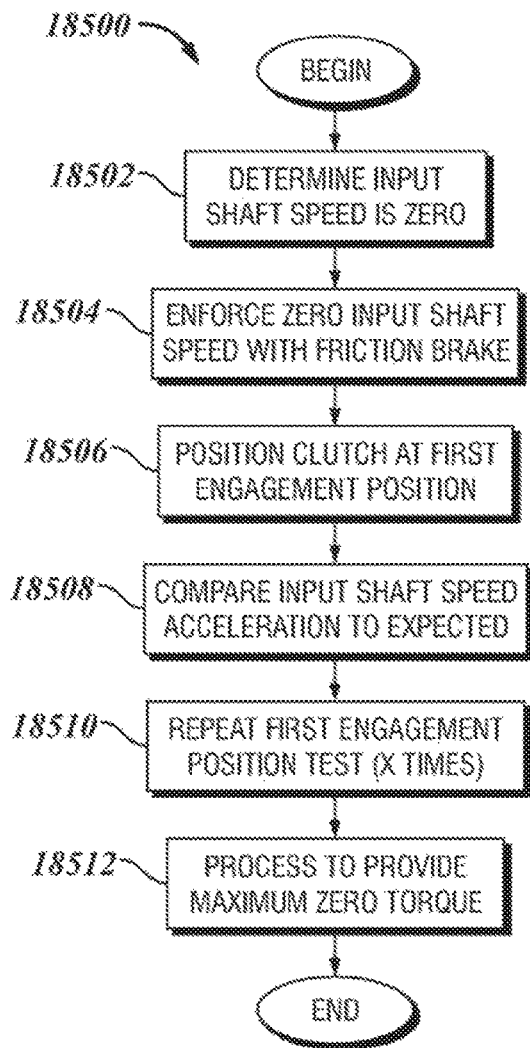
FIG. 73 is a schematic flow diagram to determine clutch control values.

Referencing FIG. 73, an example procedure 18500 to perform the clutch first engagement position test 18424 includes an operation 18502 to determine that an input shaft speed is zero, and if the input shaft speed is not zero, an operation 18504 to bring the input shaft speed to zero. The procedure 18500 further includes an operation 18506 (e.g. performed by the clutch control circuit 18404) to positioning the clutch at the first engagement position value 18416, and an operation 18508 to compare an acceleration of the input shaft speed 18428 to a first expected acceleration value 18430 of the input shaft speed to determine whether the selected first clutch engagement position value 18416 utilized in the test is consistent with the maximum zero torque value 18420—for example if an expected torque response is achieved, or if the torque response is greater (reduce the position value 18416 in a subsequent test) or lower (increase the position value 18416 in a subsequent test). The initial first clutch engagement position value 18416 utilized may be a calibrated value, an expected value, a value adjusted according to a clutch wear value 18440, a currently utilized first clutch engagement position value 18416, a currently utilized maximum zero torque value 18420, and/or a value selected according to a most recent successful completion of the procedure 18500. In certain embodiments, the procedure 18500 includes an operation 18510 to repeat the clutch first engagement test a number of times (e.g. 2 times, 3 times, up to 10 times, and/or as many times as possible in an allotted time to perform). Example and non-limiting examples include performing the test during a cranking event, during an idling event, and/or during a vehicle launch event. The procedure 18500 further includes an operation 18512 to process the first clutch engagement position value 18416 to provide the maximum zero torque value 18420. Example and non-limiting operations 18512 include using a most repeatable value of the position value 18416, an average of several position values 18416, a most reliable position value 18416 (e.g. test conditions were clean during the test), and/or incrementing or decrementing a previous maximum zero torque value 18420 in a direction indicated by the updated positon value 18416 (e.g. to limit a rate of change of the maximum zero torque value 18420 for control or rationality purposes). In certain embodiments, the apparatus 18400 includes a friction brake control circuit 18406 responsive to commands from the clutch characterization circuit 18402 to support operations of the procedure 18500, such as operation 18504 to stop the input shaft. In certain embodiments, the clutch control circuit 18404 is responsive to commands from the clutch characterization circuit 18402 to control the clutch actuator position 18414 during operations of the procedure 18500.

Figure 74:
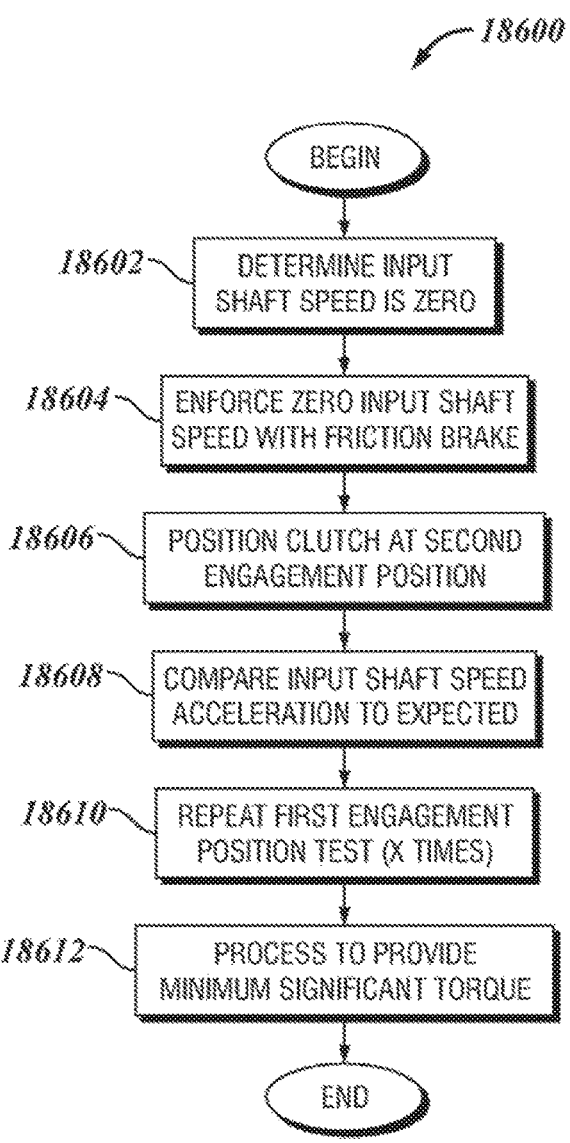
FIG. 74 is a schematic flow diagram to determine clutch control values.

Referencing FIG. 74, an example procedure 18600 to perform the clutch second engagement position test 18426 includes an operation 18602 to determine that an input shaft speed is zero, and if the input shaft speed is not zero, an operation 18604 to bring the input shaft speed to zero. The procedure 18600 further includes an operation 18606 (e.g. performed by the clutch control circuit 18404) to positioning the clutch at the second engagement position value 18418, and an operation 18608 to compare an acceleration of the input shaft speed 18428 to a second expected acceleration value 18432 of the input shaft speed to determine whether the selected second clutch engagement position value 18418 utilized in the test is consistent with the minimum significant torque value 18422—for example if an expected torque response is achieved, or if the torque response is greater (reduce the position value 18418 in a subsequent test) or lower (increase the position value 18418 in a subsequent test). The initial second clutch engagement position value 18418 utilized may be a calibrated value, an expected value, a value adjusted according to a clutch wear value 18440, a currently utilized second clutch engagement position value 18418, a currently utilized minimum significant torque value 18422, and/or a value selected according to a most recent successful completion of the procedure 18600. In certain embodiments, the procedure 18600 includes an operation 18610 to repeat the clutch second engagement test a number of times (e.g. 2 times, 3 times, up to 10 times, and/or as many times as possible in an allotted time to perform). Example and non-limiting examples include performing the test during a cranking event, during an idling event, and/or during a vehicle launch event. The procedure 18600 further includes an operation 18612 to process the second clutch engagement position value 18418 to provide the minimum significant torque value 18422. Example and non-limiting operations 18612 include using a most repeatable value of the position value 18418, an average of several position values 18418, a most reliable position value 18418 (e.g. test conditions were clean during the test), and/or incrementing or decrementing a previous minimum significant torque value 18422 in a direction indicated by the updated positon value 18418 (e.g. to limit a rate of change of the minimum significant torque value 18422 for control or rationality purposes). In certain embodiments, the apparatus 18400 includes a friction brake control circuit 18406 responsive to commands from the clutch characterization circuit 18402 to support operations of the procedure 18600, such as operation 18604 to stop the input shaft. In certain embodiments, the clutch control circuit 18404 is responsive to commands from the clutch characterization circuit 18402 to control the clutch actuator position 18414 during operations of the procedure 18600.

Figure 75:
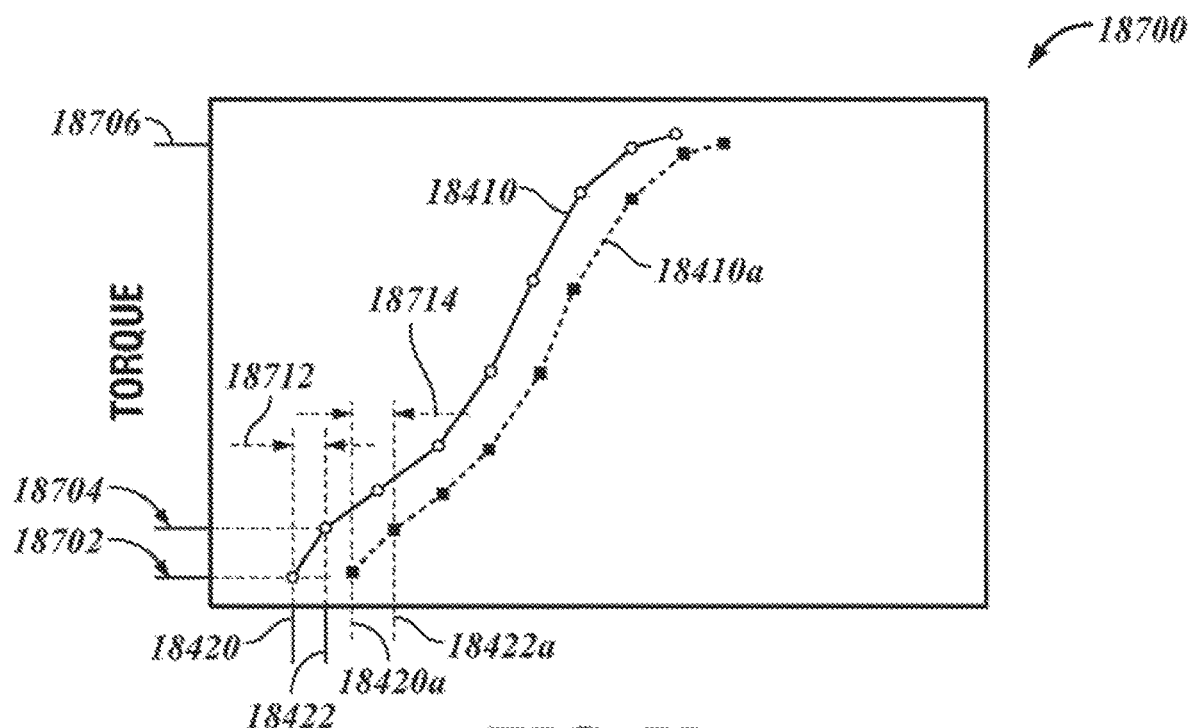
FIG. 75 is an illustration of example clutch torque profiles.

Referencing FIG. 75, an illustration 18700 depicts an example clutch torque profile 18410 and an example updated clutch torque profile 18410a. In the illustration 18700, a first maximum zero torque value 18420 is depicted (defined as a clutch position 18420 corresponding to a maximum zero torque 18702 in the example), and a first minimum significant torque value 18422 (defined as a clutch position 18422 corresponding to a minimum significant torque 18704 in the example). In the illustration 18700, the first maximum zero torque value 18420, the first minimum significant torque value 18422, and the corresponding clutch torque profile 18410 represent a clutch torque profile 18410 at a first point in time. The clutch torque profile 18410 in the example is a 2-D lookup table of a plurality of torque-position points, with linear interpolation between points. However a clutch torque profile 18410 may include any representation and/or number of points, including a correlating equation or the like. Between the first maximum zero torque value 18420 and the first minimum significant torque value 18422, the clutch torque profile 18410 is depicted as linearly interpolating between the position values. However, the torque correlation between the first maximum zero torque value 18420 and the first minimum significant torque value 18422 may alternatively be held at one or the other of the first maximum zero torque value 18420 and the first minimum significant torque value 18422, for example to ensure that a positive torque request utilized a value greater than the first minimum significant torque value 18422, to ensure that a low or zero torque request utilized a value lower than the maximum zero torque value 18420, or for any other considerations. The illustration 18700 further depicts a maximum clutch torque value 18706, for example a maximum possible torque for the clutch, a torque value which, if it is achievable, the clutch is considered to be properly functioning, and/or a torque value including a maximum value of a given clutch torque profile 18410, 18410a.

The illustration 18700 further includes a second maximum zero torque value 18420a, for example as determined in procedure 18500 at a second point in time, and a second minimum zero torque value 18422a, for example as determined in procedure 18600 at the second point in time. In the example 18700, it is noted, for illustrative purposes, that the minimum zero torque value 18422 has not shifted 18714 as greatly as the maximum zero torque value 18420 shift 18712. In the illustration 18700, the second clutch torque profile 18410a above the second minimum significant torque value 18422a is shifted an amount equal to the shift 18714—e.g. the higher torque engagement points have been shifted in position space by the distance of the shift 18714 in the minimum significant torque value, and the shape of the curve in the higher torque engagement points has been held constant. In certain embodiments, where information correlating to the clutch position and torque for higher engagement points is available, the change in the clutch torque profile 18410 can be more complex, and/or informed by such information. In certain embodiments, the shape of the clutch torque profile 18410 at higher engagement points can be informed and updated by the clutch wear value 18440, and/or by high torque clutch engagement opportunities presented according to vehicle operating conditions and expected behaviors providing an indicated clutch torque 18434 for those high torque clutch engagement positions.

In certain embodiments, the clutch characterization circuit 18402 further determines that the clutch is operating in a wear-through mode 18438 in response to at least one of the first engagement position value 18416 and the second engagement position value 18418 changing at a rate greater than a clutch wear-through rate value 18442, and/or a clutch wear circuit 18408 determining a clutch wear value 18440, and where the clutch wear value 18440 exceeds a wear-through threshold value. An example clutch wear circuit 18408 determines the clutch wear value 18440 in response to clutch operating values 18436, such as a clutch temperature value, a clutch power throughput value, and/or a clutch slip condition. In certain embodiments, the clutch wear circuit 18408 increments a wear counter in response to the clutch temperature, the clutch power throughput, and/or the clutch slip condition. In certain embodiments, the clutch power and slip condition exhibit a first response to clutch wear, and accordingly a first slope of wear below a high wear temperature line, and exhibit a second response to clutch wear, and accordingly a second slope of wear (higher than the first slope) at or above the high wear temperature line. The high wear temperature line depends upon the materials of the clutch, and is determinable with simple wear testing of the type ordinarily performed on a contemplated system given a clutch configuration with a known type.

Figure 76:
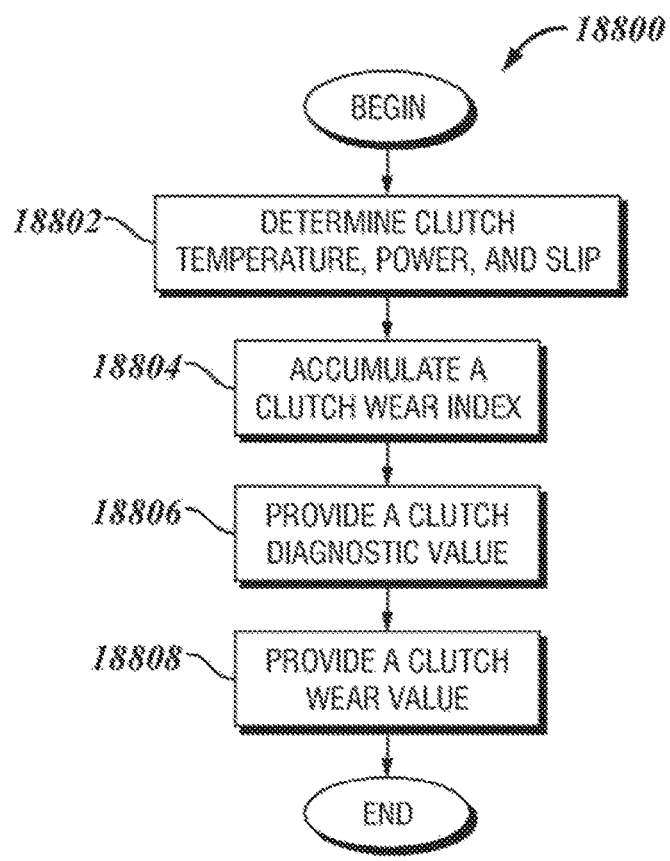
FIG. 76 is a schematic flow diagram to determine clutch wear.
Figure 77:
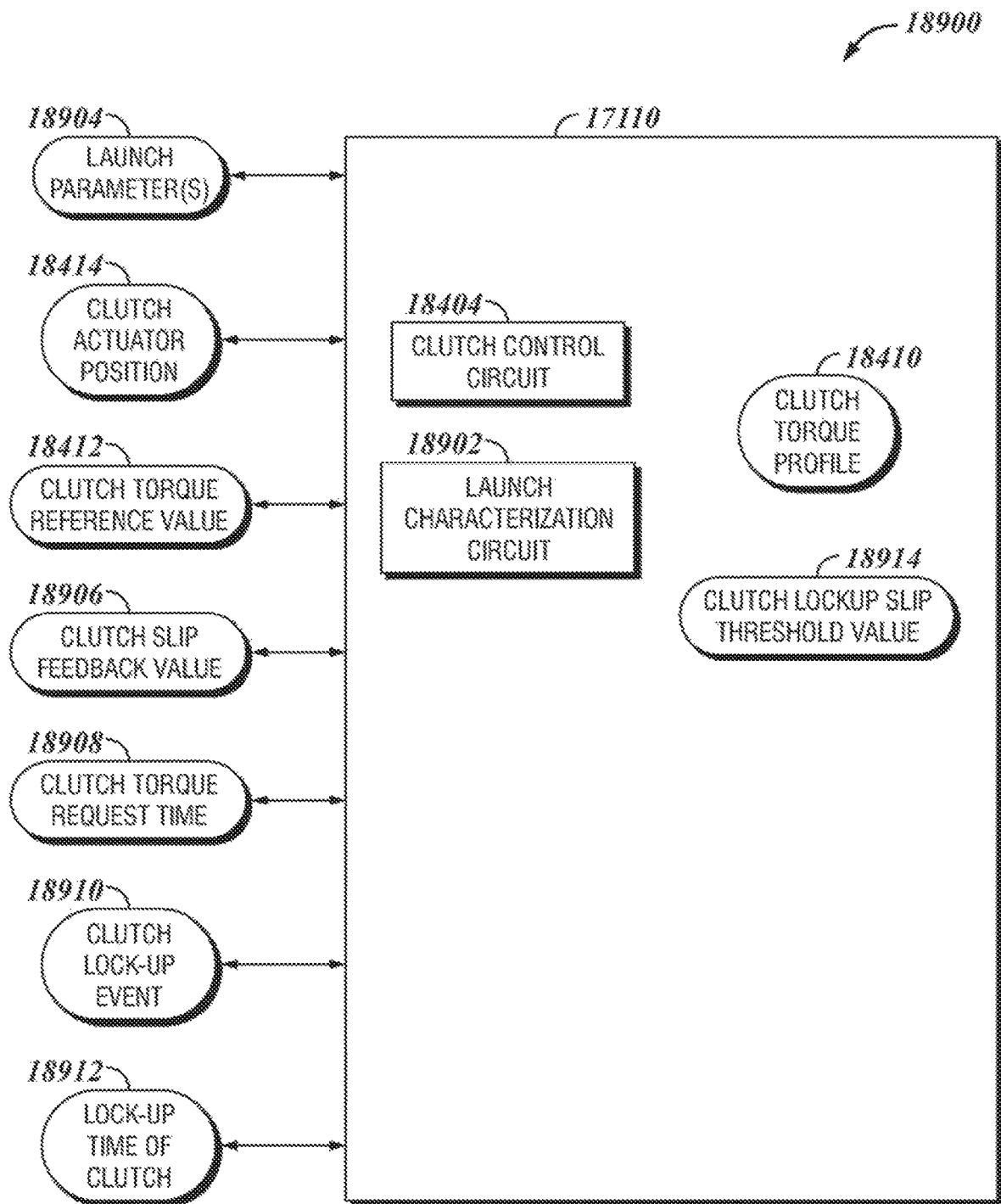
FIG. 77 is a schematic flow diagram of a controller for a transmission.

Referencing FIG. 76, an example procedure 18800 to determine clutch wear includes an operation 18802 to determine a clutch temperature value, a clutch power throughput value, and a clutch slip condition. The procedure 18800 further includes an operation 18804 to accumulate a clutch wear index determined in response to the clutch temperature value, the clutch power throughput value, and the clutch slip condition. In certain embodiments, the clutch wear index accumulates linearly with clutch power throughput, linearly with clutch slip condition (e.g. proportional to a slipping rate) and/or accumulates at zero or a defined low accumulation rate with zero slip, and accumulates non-linearly with temperature, including a non-linear function with temperature, and/or a first linear function below a high wear temperature value and at a second higher slope linear function above the high wear temperature line. The clutch temperature value may be a sensed temperature value (e.g. an optical temperature sensor, or any other temperature determination known in the art), and/or may be a modeled temperature and/or virtual sensor based temperature.

The example procedure 18800 further includes an operation 18806 to provide a clutch diagnostic value in response to the clutch wear index. Example and non-limiting clutch wear values includes providing a clutch wear fault value (e.g. failed, passed, worn, suspect, etc.), incrementing a clutch wear fault value (e.g. incrementing a fault counter in response to the wear index, and/or triggering a fault when the fault counter exceeds a threshold value), communicating the clutch diagnostic value to a data link (e.g. to provide the wear indicator to a fleet or service personnel, to provide the wear indicator to another aspect of a system for consideration—e.g. an engine, vehicle, route management device, etc.), and/or providing the clutch diagnostic value to a non-transient memory location accessible to a service tool. The clutch wear diagnostic value may light a dashboard lamp or provide other notification, or may remain available on a controller 17110 to be accessible upon request or in a fault snapshot. In certain embodiments, the procedure 18800 includes an operation 18808 to provide the clutch wear index and/or a clutch wear value 18440 to the clutch characterization circuit 18402 and utilized in determining the clutch torque profile 18410.

Referencing FIG. 71, an example system 18300 includes a clutch 106 that selectively decouples a prime mover 17102 from an input shaft 204 of a transmission, a progressive actuator 1002 operationally coupled to the clutch, where a position of the progressive actuator 1002 corresponds to a position of the clutch 106, and a means for providing a consistent lock-up time of the clutch. The lock-up time of the clutch includes a time commencing with a clutch torque request time 18908 and ending with a clutch lock-up event 18910.

Certain non-limiting examples of the means for providing a consistent lock-up time 18912 of the clutch are described following. Referencing FIG. 77, an apparatus 18900 includes a controller 17110 having a clutch control circuit 18404, where the clutch control circuit 18404 commands a position 18414 of the progressive actuator in response to a clutch torque reference value 18412 and the clutch torque profile 18410 to achieve the consistent lock-up time 18912 of the clutch. In certain embodiments, the progressive actuator includes a linear clutch actuator, and/or a pneumatic actuator having a near zero dead air volume.

An example apparatus 18900 to provide the consistent lock-up time 18912 of the clutch further includes the controller 17110 having a launch characterization circuit 18902, where the launch characterization circuit 18902 interprets at least one launch parameter 18904 such as: a vehicle grade value, a vehicle mass value, and/or a driveline configuration value. Example and non-limiting driveline configuration values include a target engagement gear description, a reflected driveline inertia value, and/or a vehicle speed value. An example apparatus 18900 further includes the clutch control circuit 18404 further commanding the position 18414 of the progressive actuator in response to the at least one launch parameter 18904 to achieve the consistent lock-up time 18912 of the clutch. In certain embodiments, the clutch control circuit further 18404 further commands the position 18414 of the progressive actuator in response to a clutch slip feedback value 18906. An example system further includes the clutch torque request time 18908 including at least one request condition such as: a service brake pedal release event, a service brake pedal decrease event, a gear engagement request event, and/or a prime mover torque increase event. In certain embodiments, the clutch lock-up time 18912 is measured from the clutch torque request time 18908 to the clutch lock-up event 18910. In certain embodiments, the clutch lock-up event 18910 includes a clutch slip value 18906 being lower than a clutch lock-up slip threshold value 18914.

In certain embodiments, the controller 17110 includes the clutch control circuit 18404 further providing commanding the position 18414 of the progressive actuator to maintain the clutch slip feedback value 18906 between a slip low threshold value and a slip high threshold value. In certain embodiments, the slip low threshold value and the slip high threshold value are a rate of change of the clutch slip, such that clutch slip is reduced within a controlled rate of change to provide a smooth transition to lock-up. In certain embodiments, the rate of change of the clutch slip is reduced at a rate to achieve the consistent lock-up time 18912 of the clutch. In certain embodiments, the variations in the rate of change of the clutch slip induced by input shaft oscillations are compensated—for example by applying a filter on the input shaft speed value (used in determining the clutch slip feedback value 18906, in certain embodiments) that removes the oscillation frequency component from the input shaft speed. An example filter includes a notch filter at a selected range of frequencies, which may be determined according to known characteristics of the input shaft, and/or determined by a frequency analysis of the input shaft speed (e.g. a fast-Fourier transform, or the like) to determine which frequencies the oscillation is affecting In certain embodiments, the clutch control circuit further includes enhanced response to an error value such as a difference between the rate of change of the clutch slip value and a target rate of change, and/or being outside the slip low threshold value and/or slip high threshold value. In certain embodiments, enhanced response can include proportional control and/or gain scheduling of clutch torque commanded in response to the error value.

Figure 78:
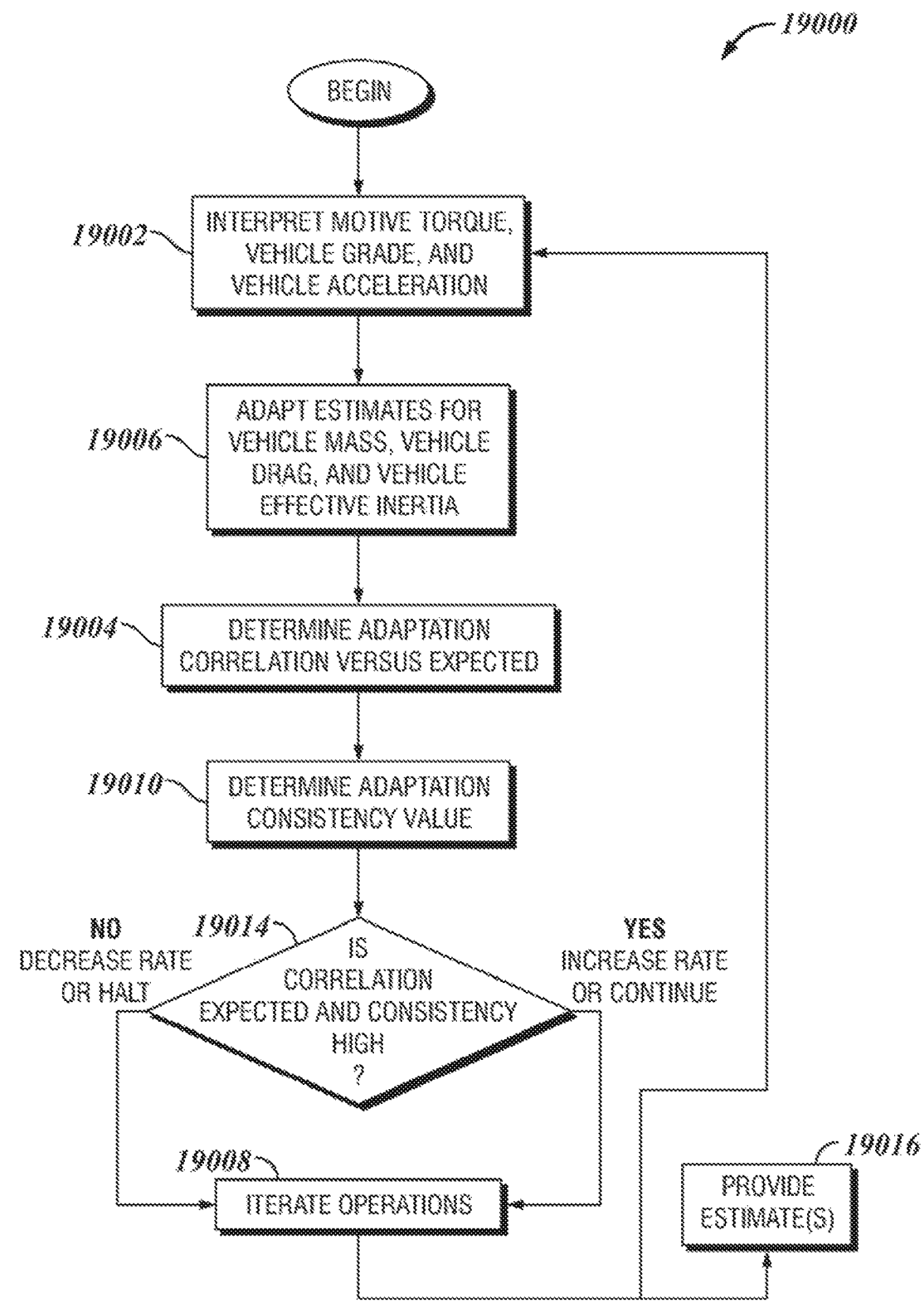
FIG. 78 is a schematic flow diagram to determine a vehicle mass.

Referencing FIG. 78, an example procedure 19000 to determine a vehicle mass value includes an operation 19002 to interpret a motive torque value, a vehicle grade value, and a vehicle acceleration value. The procedure 19000 further includes an operation 19004 to determine three correlations: a first correlation between the motive torque value and the vehicle grade value; a second correlation between the motive torque value and the vehicle acceleration value; and a third correlation between the vehicle grade value and the vehicle acceleration value. The procedure 19000 further includes an operation 19006 to adapt an estimated vehicle mass value, an estimated vehicle drag value, and an estimated vehicle effective inertia value in response to the three correlations. In certain embodiments, the vehicle mass value is an estimate of the vehicle mass (e.g. current mass—as the procedure 19000 in certain embodiments is responsive to the current vehicle mass), and the vehicle effective inertia value is a description of the inertia of the powertrain (e.g. engine, transmission, and/or driveline components) and may include torque input to get the driveline up to speed, starting inertia, and/or acceleration inertia (e.g. contributions to acceleration in response to acceleration or deceleration of the driveline. In certain embodiments, the vehicle drag value includes air resistance, internal friction, and/or rolling resistance. In certain embodiments, lumped values are used to estimate the vehicle mass value, the estimated vehicle drag value, and the vehicle effective inertia value. In certain embodiments, initial estimates are utilized, and the adapting operation 19006 includes utilizing observed current (or recently stored history) vehicle conditions (acceleration, speed, and contributions from traversing a grade) to identify the net forces and anticipated acceleration (e.g. according to F=MA), and to increment the vehicle mass value, the vehicle drag value, and the vehicle effective inertia value in a manner to fit the observed current vehicle conditions. The procedure 19000 further includes an operation 19010 to determine an adaptation consistency value, and in response to the adaptation consistency value, to adjust an adaptation rate of the adapting 19006, and an operation 19008 to iteratively perform the preceding operations (19002, 19004, 19006, 19010, 19014) to provide an updated estimated vehicle mass value. Other estimates, such as the vehicle effective inertia value and/or the estimated vehicle drag value, may be updated in conjunction with the estimated vehicle mass value. In certain embodiments, the adapting 19006 includes performing the adapting at operating conditions where parameters can be isolated—for example at vehicle launch, acceleration or deceleration on a level grade, and/or steady climbing or coasting on a grade. However, the adapting 19006 may be performed at any vehicle operating conditions.

In certain embodiments, the procedure 19000 further includes the adapting 19006 slowing and/or halting the adapting of the estimated values in response to an operation 19004 determining the first correlation, the second correlation, and the third correlation having an unexpected correlation configuration. Example unexpected correlation includes a negative correlation for the first correlation and/or the second correlation, and/or a positive correlation for the third correlation. For example, a relationship between the torque and grade is expected to be positive and linear, a relationship between the torque and acceleration is expected to be positive and linear, and a relationship between grade and acceleration is expected to be negative and linear. An example operation 19006 includes adapting by increasing or continuing adapting the estimated values in response the operation 19004 determining the first correlation, the second correlation, and the third correlation have an expected correlation configuration. For example, where the correlations continue to have an expected relationship, it is anticipated that the adapting will converge on correct estimates for the vehicle mass value, the vehicle drag value, and the vehicle effective inertia value, and the adapting is continued or the step size is increased. Where the correlations do not have the expected relationship, it is not anticipated that the adapting will converge on correct estimates for the vehicle mass value, the vehicle drag value, and the vehicle effective inertia value, and the adapting is halted or the step size is decreased.

The procedure 19000 further includes an operation 19010 to adjust the adaptation rate in operation 19006 in response to the estimates changing monotonically and/or holding at a consistent value. For example, where the adaptation operation 19006 continues to move at least one estimate in the same direction, with the other estimates also continuing to move in a same direction and/or being held constant, the adaptation 19006 is anticipated to be moving correctly, and to be farther from the correct estimates. Where the adaptation 19006 experiences a change in direction for one or more estimates, the adaptation is expected to be close to the correct converged value. In certain embodiments, the adaptation 19006 is further responsive to a linearity of the correlations, and the linearity of the correlations, in addition to the sign of the correlations (e.g. positive for torque-grade and torque-acceleration, and negative for grade-acceleration), is anticipated to be a measure of the likelihood of successful convergence of the estimates to correct values. Accordingly, where correlations are linear, the operation 19006 increases or holds the step sizes, and where one or more correlations are non-linear, the operation 19006 decreases step sizes and/or halts adaptation 19006 until linearity is restored. In certain embodiments, the operation to 19010 to adjust the adaptation rate is performed in response to a changing the direction of an estimate being a change greater than a threshold change value. In certain embodiments, the procedure 19000 includes an operation 19014 to implement the adaptation step size change in response to the performance against expectations of the correlations and the consistency of the estimate changes. The example procedure 19000 includes an operation 19016 to provide estimates, including at least a vehicle mass estimate, to other aspects of a controller 17110. In certain embodiments, the procedure 19000 continues indefinitely, to remain responsive to changes in vehicle mass. In certain embodiments, the procedure 19000 includes both providing estimates 19016 and iterating the operations 19002, 19004, 19006, 19010, 19014. In certain embodiments, the procedure 19000 halts after converging, and/or halts for a given operation cycle (e.g. a trip or drive cycle) after converging, and is performed again for a next operation cycle.

Figure 79:
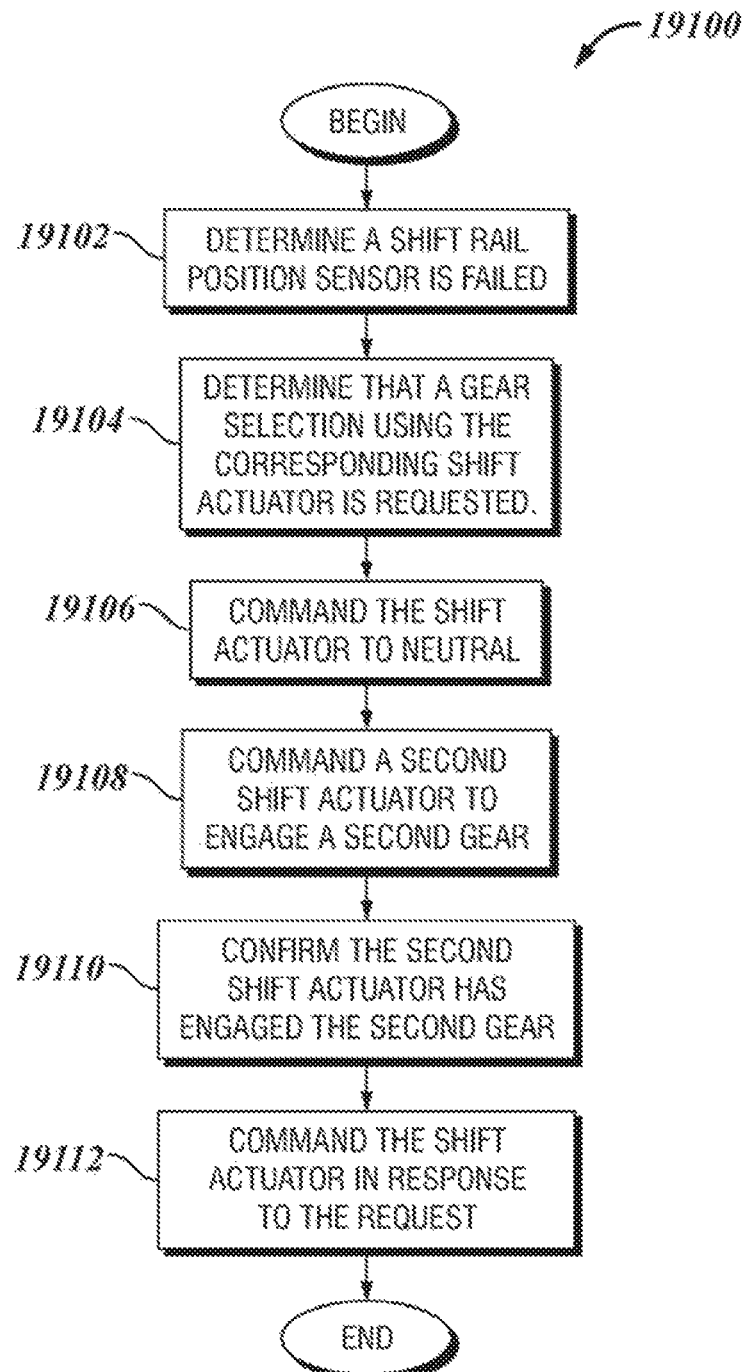
FIG. 79 is a schematic flow diagram to shift with a failed position sensor.

Referencing FIG. 79, an example procedure 19100 includes an operation 19102 to determine that a shift rail position sensor corresponding to a shift actuator controlling a reverse gear is failed. The procedure 19100 further includes an operation 19104 to determine that a gear selection is active requesting and/or requiring operations of the shift actuator, and in response to the gear selection and the failed shift rail position sensor, performing operations, in order: an operation 19106 to command the shift actuator to a neutral position, an operation 19108 to confirm the neutral position by commanding a second shift actuator to engage a second gear, where the second shift actuator is not capable of engaging the second gear unless the shift actuator is in the neutral position, and an operation 19108 to confirm the second shift actuator has engaged the second gear, and an operation 19110 to command the shift actuator into the gear position in response to the gear selection. In certain embodiments, the procedure 19100 includes performing the operations 19104, 19106, 19108, 19110 each time the shift actuator controlling the reverse gear is utilized.

The example procedure 19100 includes the operation 19102 to determine the shift rail position sensor is failed by determining the shift rail position sensor is failed out of range. In certain embodiments, a sensor failed out of range is readily detectable according to the electrical characteristics of the sensor—for example where a sensor is shorted to ground, shorted to high voltage, and/or providing a voltage value, A/D bit count, or other value that is outside the range of acceptable values for the sensor.

Figure 80:
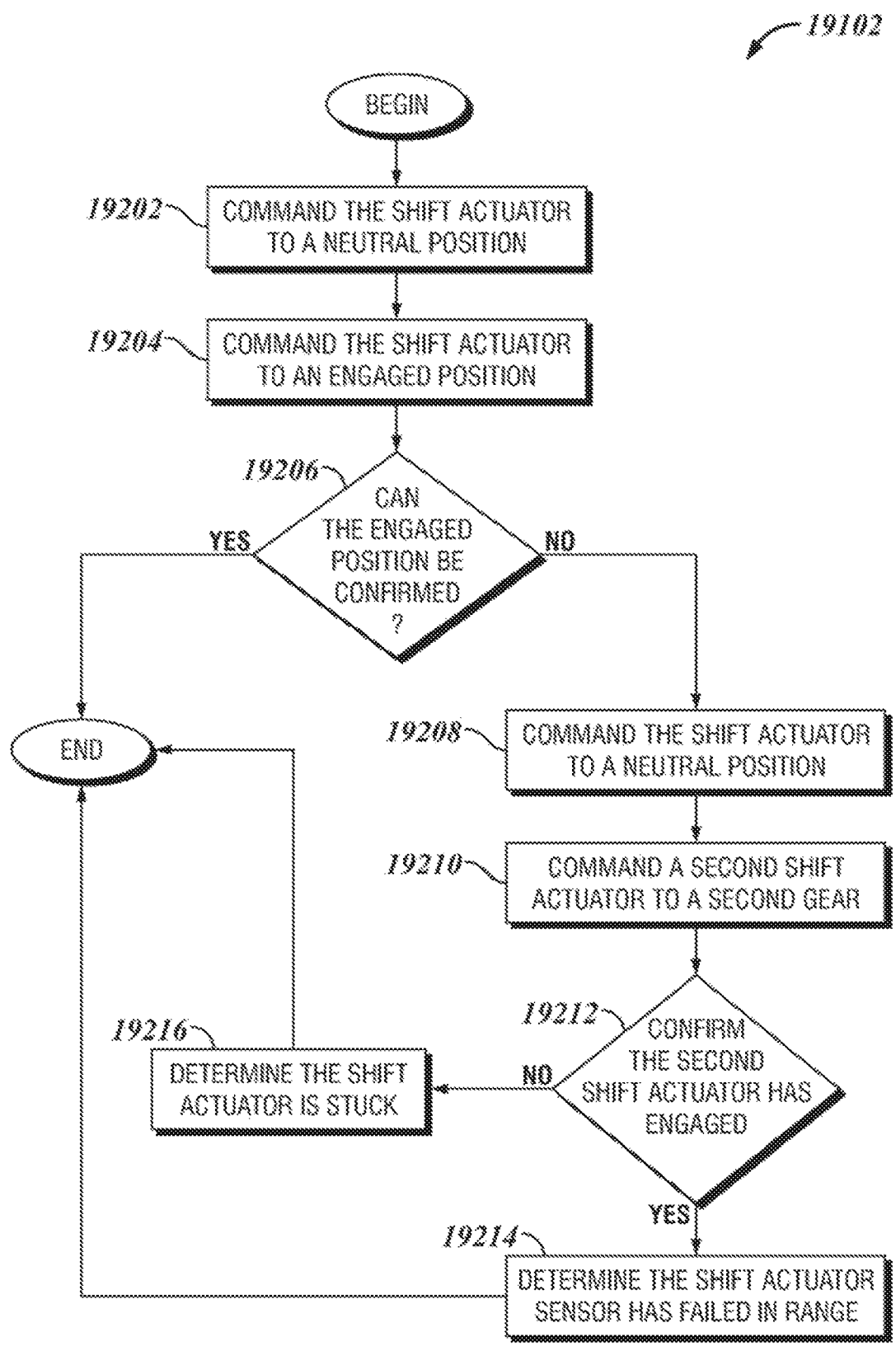
FIG. 80 is a schematic flow diagram to diagnose a position sensor.

In certain embodiments, referencing FIG. 80, an operation 19102 to determine the shift rail position sensor is failed includes determining the shift rail position sensor is failed in range, for example where the sensor is providing a valid value, but the value does not appear to match the position of the shift actuator. The operation 19102 includes an operation 19202 to command the shift actuator to the neutral position, an operation 1904 to command the shift actuator to an engaged position, and an operation 19206 to determine if the shift actuator engaged position is detected by the sensor. In response to the operation 1906 indicating the shift actuator engaged position is not detected, the operation 19102 includes an operation 19208 to command the shift actuator to the neutral position, an operation 19210 to command a second shift actuator to engage a second gear, where the second shift actuator is not capable of engaging the second gear unless the shift actuator is in the neutral positon, and an operation 19212 to confirm the second shift actuator has engaged the second gear. The operation 19102 further includes an operation 19214 to determine the shift rail position sensor is failed in range in response to the neutral position being confirmed, and an operation 19216 to determine a shift rail operated by the shift actuator is stuck in response to the neutral position not being confirmed. The procedure 19100 and operation 19102 thereby provide a mechanism to continue to operate a shift actuator having an out of range failed sensor, provide a mechanism to identify a failed sensor in response to an in range failure without the provision of redundant or additional sensors, provide a mechanism to respond to a shift actuator in an unexpected position (e.g. neutral) at a start-up time, and provide a mechanism to avoid unintended movement in a wrong direction (e.g. forward or reverse) with a failed shift actuator position sensor.

Figure 81:
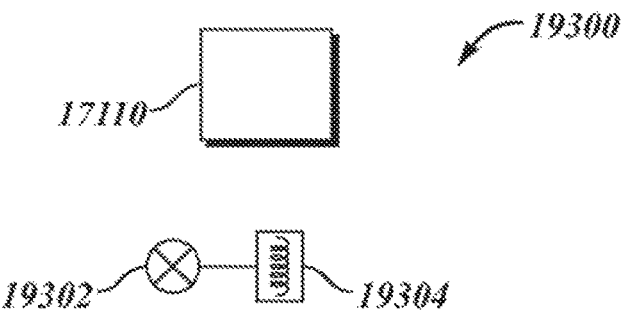
FIG. 81 is a schematic representation of a controller operating an actuator.
Figure 82:
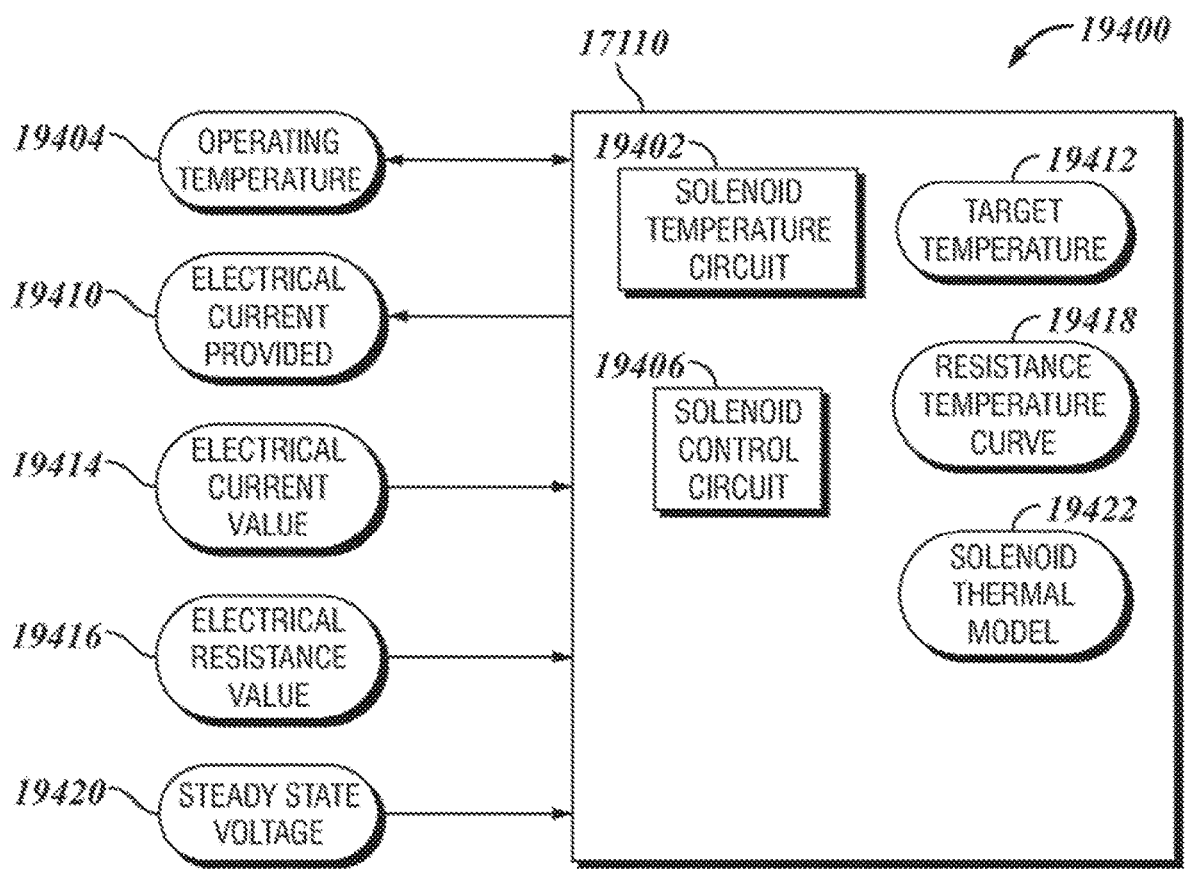
FIG. 82 is a schematic diagram of a controller operating an actuator.

Referencing FIG. 81, an example system 19300 includes a transmission 100 having a solenoid operated actuator 19302, and a controller 17110 that operates the solenoid 19304 within a temperature limit of the solenoid 19304. Further details of operations of the controller 17110 are described in relation to FIG. 82 following. Referencing FIG. 82, an apparatus 19400 includes the controller 17110 including a solenoid temperature circuit 19402 that determines an operating temperature 19404 of the solenoid, a solenoid control circuit 19406 that operates the solenoid in response to the operating temperature 19404 of the solenoid, and where the solenoid control circuit 19406 operates the solenoid 19304 by providing an electrical current 19410 to the solenoid 19304, such that a target temperature 19412 of the solenoid 19304 is not exceeded.

In certain embodiments, the solenoid temperature circuit 19402 determines the operating temperature 19404 of the solenoid according to a determination of the solenoid temperature in response to an electrical current value 19414 of the solenoid and an electrical resistance value 19416 of the solenoid. The electrical current value 19414 of the solenoid is a determined current value of the solenoid 19304, and may differ from the electrical current 19410 commanded or provided to the solenoid 19304, especially in transient operation and/or where the solenoid temperature is elevated and/or where the solenoid 19304 is degraded or aged. For example, the solenoid control circuit 19406, in certain embodiments, provides the electrical current 19410 by providing a voltage to the solenoid 19304 (e.g. system voltage, a TCM output voltage, and/or a PWM scheduled voltage) according to the electrical current 19410 planned for the solenoid 19304, and the solenoid 19304 specific electrical characteristics may exhibit an electrical current value 19414 that differs from the electrical current 19410 planned. In certain embodiments, the solenoid control circuit 19406 provides the electrical current 19410 to the solenoid 19304 such that the electrical current 19410 is achieved (within the voltage limits of the TCM voltage output), for example by feedback on a measured current value and response on the TCM voltage output (which may be variable and/or adjusted in a PWM manner, which may be filtered to provide a steady or pseudo-steady voltage to the solenoid 19304), and accordingly in steady state the electrical current 19410 commanded will be achieved for such embodiments. Additionally or alternatively, the solenoid 19304 in certain embodiments includes a coil having inductive properties, and the voltage from the solenoid 19304 may exhibit dynamic voltage (and therefore current) behavior. Accordingly, in certain embodiments, the solenoid temperature circuit 19402 in certain embodiments may determine the operating temperature 19404 of the solenoid in response to a dynamic characteristic of the solenoid, such as a voltage rise characteristic, an RMS voltage exhibited by the solenoid over a predetermined time period (e.g. over a time window beginning at a predetermined time after activation and ending at a predetermined time later), according to a time characteristic at which a specified voltage is reached, and/or according to a time characteristic at which a specified voltage increase is achieved (e.g. the time from 3.0 V to 5.0 V, the time from 1.0 V to 5.2 V, and/or any other voltage window). In certain embodiments, the solenoid temperature circuit 19402 determines the solenoid temperature in response to a steady state voltage 19420 achieved by the solenoid. Any operations to determine the operating temperature 19404 of the solenoid 19304 are contemplated herein. In certain embodiments, the solenoid 19304 exhibits a resistance response to temperature, for example according to a known characteristic of the metal in the solenoid coil (e.g. similar to a thermistor or resistance temperature detector used as a temperature sensor). In certain embodiments, a resistance-temperature curve 19418 is calibrated and stored on the controller 17110 and accessible to the solenoid temperature circuit 19402.

In certain embodiments, the solenoid temperature circuit 19402 further determines the operating temperature 19404 of the solenoid in response to an electrical current value 19414 of the solenoid and an electrical resistance value 19416 of the solenoid. In certain embodiments, one or both of the electrical current value 19414 and the electrical resistance value 19416 may be calculated or measured by the solenoid temperature circuit 19402. In certain embodiments, the solenoid temperature circuit 19402 determines the voltage drop across the solenoid 19304—for example at a voltage high and ground pin on the TCM, and in certain further embodiments the solenoid temperature circuit 19402 determines a current across the solenoid, for example with a solid state current meter in the voltage provision circuit to the solenoid 19304. Any other structures and/or operations to determine the electrical current value 19414 and the electrical resistance value 19416 of the solenoid 19304 are contemplated herein. In certain embodiments, the solenoid temperature circuit 19402 further determines the operating temperature 19404 of the solenoid in response to a thermal model 19422 of the solenoid, for example including a cooldown estimate of the solenoid 19302 to provide an estimated temperature of the solenoid 19302 when active voltage is not being provided to the solenoid 19302. In certain embodiments, the voltage provided to the solenoid may be varied to assist in determining the operating temperature 19404 of the solenoid, for example to provide a voltage value that is at a known temperature determination point for the solenoid, and/or to move the current determination value of the solenoid into a higher resolution area of the resistance-temperature curve 194118.

In certain embodiments, the system includes the solenoid operated actuator 19302 having a reduced nominal capability solenoid 19304. For example, and without limitation, the reduced nominal capability solenoid 19304 includes a cheaper material on the solenoid coil (e.g. that may exhibit increased temperature response and/or that also improves detection of the solenoid temperature), a smaller sized solenoid relative to a nominal solenoid (e.g. where a higher current throughput is enabled by temperature management allowing for reduced amount of coil materials, and/or the solenoid can be operated more often and for longer periods than a nominally designed solenoid, also allowing for a reduced amount of coil materials, and/or allowing for a smaller solenoid footprint—e.g. due to a smaller housing, more challenging heat transfer environment to the coil, and/or less mass of material and/or cheaper materials having a lower heat capacity to provide a reduced heat sink for the solenoid). Each of the described capability reductions in the solenoid can reduce costs of the solenoid and/or reduce the physical space required by the solenoid, and one or more of the capability reductions is enabled by active thermal management of the solenoid by the apparatus 19400. In certain embodiments, the solenoid control circuit 19406 further operates in response to the operating temperature 19404 of the solenoid and the target temperature 19412 of the solenoid by modulating at least one parameter such as: a voltage provided to the solenoid, a cooldown time for the solenoid, and/or a duty cycle of the solenoid. Example and non-limiting duty cycles include changing a PWM characteristic of the solenoid (e.g. changing a period, frequency, and/or on-time width of the valve actuator 19302 providing air to the clutch, a shift actuator, or the friction brake), adjusting a shift event to avoid utilization of the actuator 19302 (e.g. delaying or adjusting a target gear ratio, or adjusting a friction brake utilization during a shift, to enable the solenoid 19304 to cool down).

Figure 83:
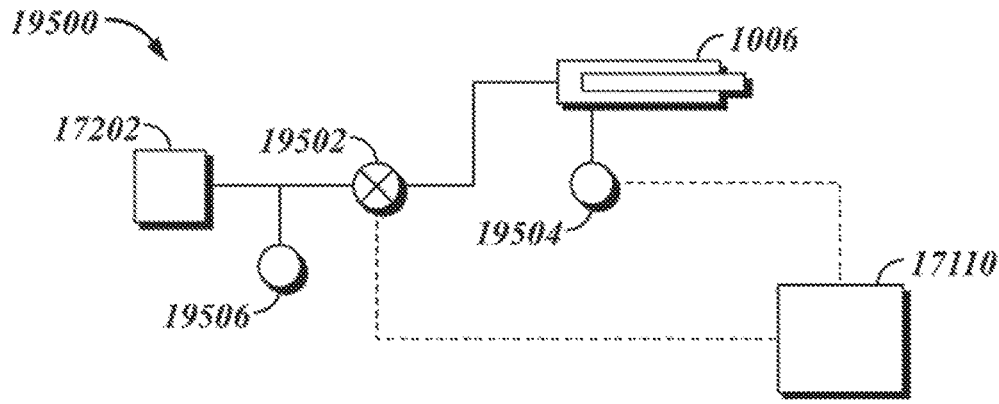
FIG. 83 is a schematic representation of a controller detecting an actuator leak.

Referencing FIG. 83, an example system 19500 includes a transmission 100 having a pneumatic clutch actuator 1002, for example operated by a valve 19502 coupling the clutch actuator 1002 to an air source a clutch position sensor 19504 configured to provide a clutch actuator position value 19610 (reference FIG. 84), and a controller 17110 the determines whether a clutch actuator leak is present. Further details of operations of the controller 17110 are provided in the description referencing FIG. 84 following.

Figure 84:
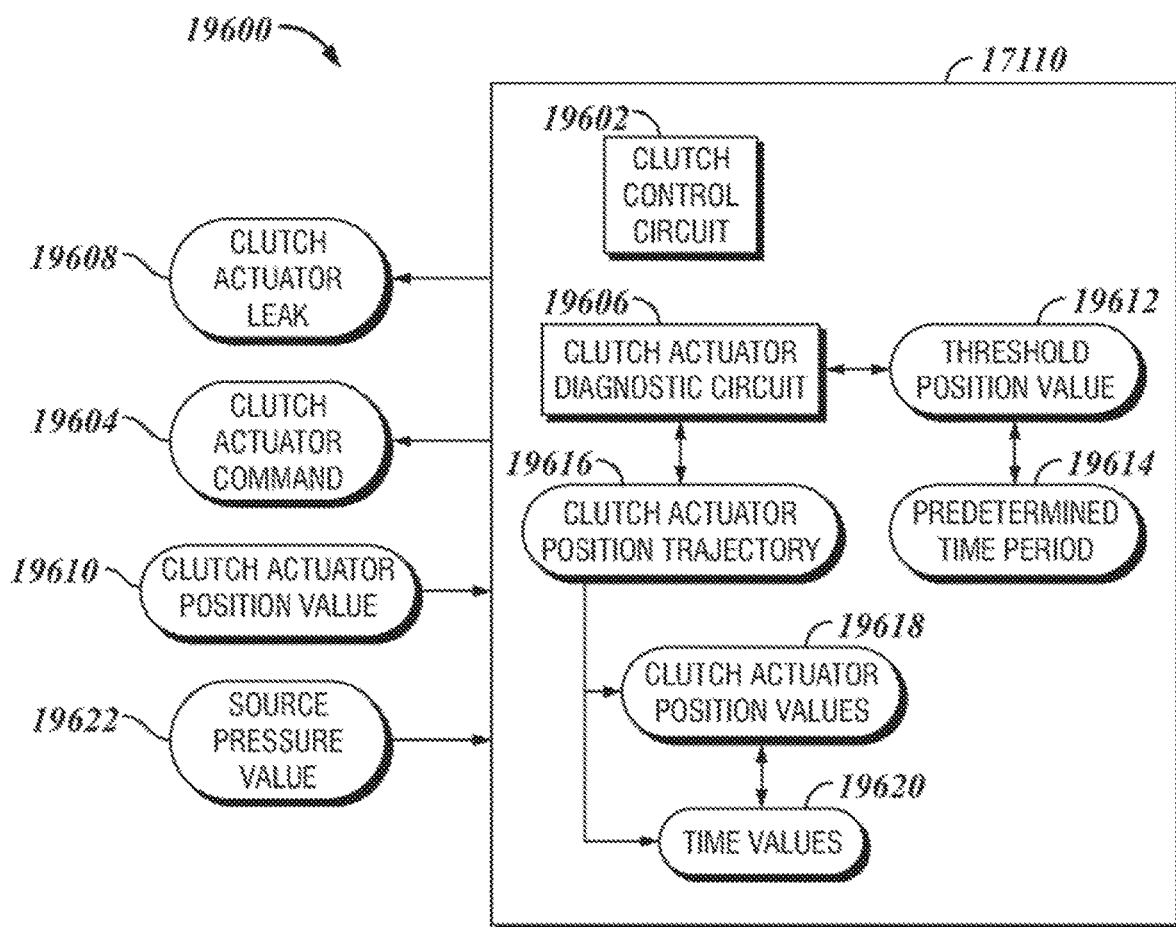
FIG. 84 is a schematic diagram of a controller for a transmission.

Referencing FIG. 84, an apparatus 19600 includes a controller 17110 having a clutch control circuit 19602 that provides a clutch actuator command 19604, where the pneumatic clutch actuator 1002 is responsive to the clutch actuator command 19604. The controller 17110 further includes a clutch actuator diagnostic circuit 19606 that determines that a clutch actuator leak 19608 is present in response to the clutch actuator command 19604 and the clutch actuator position value 19610. The example controller 17110 further includes the clutch actuator diagnostic circuit 19606 determining the clutch actuator leak 19608 is present in response to the clutch actuator position value 19610 being below a threshold position value 19612 for a predetermined time period 19614 after the clutch actuator command 19604 is active. In certain embodiments, the clutch actuator diagnostic circuit 19606 further determines the clutch actuator leak 19608 is present in response to the clutch actuator position value 19612 being below a clutch actuator position trajectory value 19616, the clutch actuator position trajectory value 19616 including a number of clutch actuator position values 19618 corresponding to a number of time values 19620. In certain embodiments, the clutch actuator diagnostic circuit 19606 determines the clutch actuator leak 19608 is present in response to the clutch actuator position value 19610 failing to match any one or more, or all, of the clutch actuator position trajectory values 19616; determines the clutch actuator leak 19608 is present in response to the clutch actuator position value 19610 meeting or exceeding any one or more, or all, of the clutch actuator position trajectory values 19616; and/or determines a clutch actuator leak 19608 is suspected in response to the clutch actuator position value 19610 failing to match some of the clutch actuator position trajectory values 19616. In certain embodiments, in response to the clutch actuator leak 19608 being TRUE or FALSE, and/or a suspected clutch actuator leak 19608, the clutch actuator diagnostic circuit 19606 may set a fault code, provide the leak or suspected leak to other aspects of the controller 17110, increment or decrement a fault code, communicate the leak value to a service component (not shown—e.g. a maintenance location, a service location, and/or a fleet agent), and/or store a value indicating the leak value in non-transient memory where the stored value is accessible to a service tool.

In certain embodiments, the controller 11710 further includes a source pressure sensor 19506 (reference FIG. 83) configured to provide a source pressure value 19622, and where the clutch actuator diagnostic circuit 19606 further determining the clutch actuator leak 19608 is present in response to the source pressure value 19622. In certain embodiments, the clutch actuator threshold position value 19612 and predetermined time period 19614 are determined according to a properly operating clutch actuator and/or a known failed clutch actuator. In certain embodiments, the clutch actuator position trajectory value 19616, including the number of clutch actuator position values 19618 corresponding to a number of time values 19620 are determined according to a properly operating clutch actuator and/or a known failed clutch actuator. In certain embodiments, the clutch actuator diagnostic circuit 19606 further determines the clutch actuator leak 19608 is present in response to the source pressure value 19622 by adjusting one or more of the values 19612, 19614, 19616, 19618, 19620, for example increasing a time or decreasing a distance expectation in response to a low source pressure value 19622, and/or decreasing a time or increasing a distance expectation in response to a high source pressure value 19622.

Figure 85:
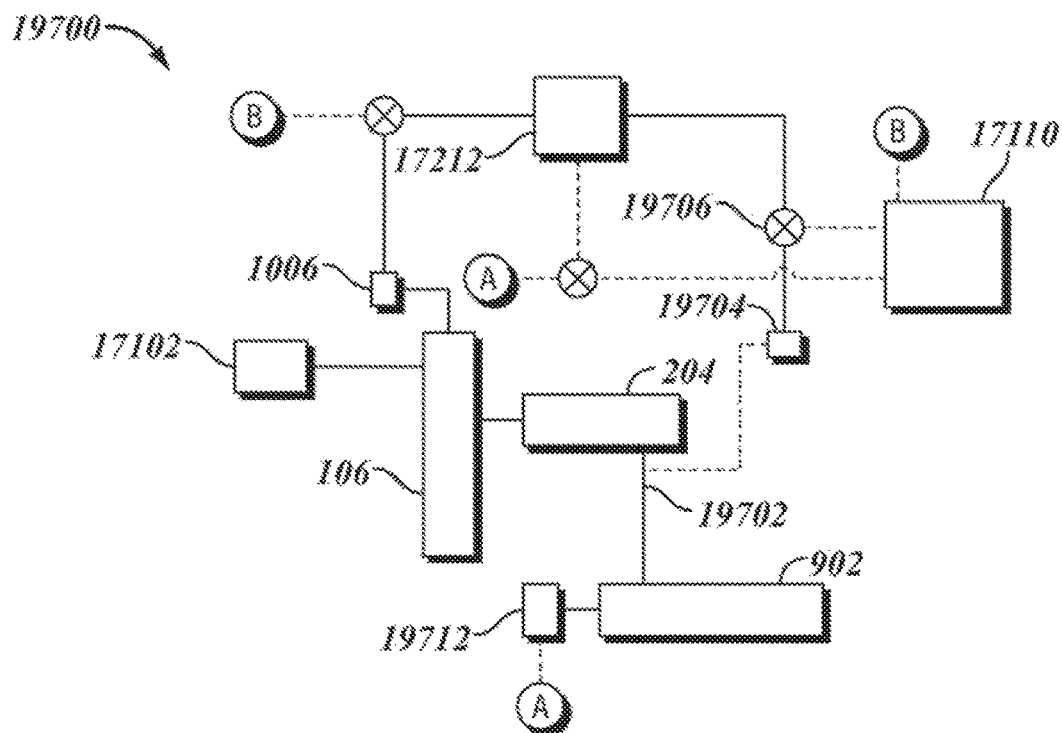
FIG. 85 is a schematic representation of a controller for a transmission.

Referencing FIG. 85, an example system 19700 further includes a transmission 100 having at least one gear mesh 19702 operatively coupled by a shift actuator, and a controller 17110 that mitigates or clears a tooth butt event 19806 (reference FIG. 86) of the gear mesh 19702 and shift actuator 19704. The example system 19700 further includes actuating valves 19706 that control a clutch actuator 1002, a friction brake 19712, and/or the shift actuator 19704. The illustrative components to provide pneumatic control of the clutch actuator 1002, friction brake 19712, and/or shift actuator 19704 utilizing an air source 17202 are non-limiting, and any actuation devices and scheme are contemplated herein. The gear mesh 19702 is depicted for purposes of illustration as the countershaft to input shaft gear mesh, however any gear mesh in the transmission 100, and related shift actuator and/or gear coupler or synchronizer, is contemplated herein. Further details of operations of the controller 17110 are described following in the description referencing FIG. 86.

Figure 86:
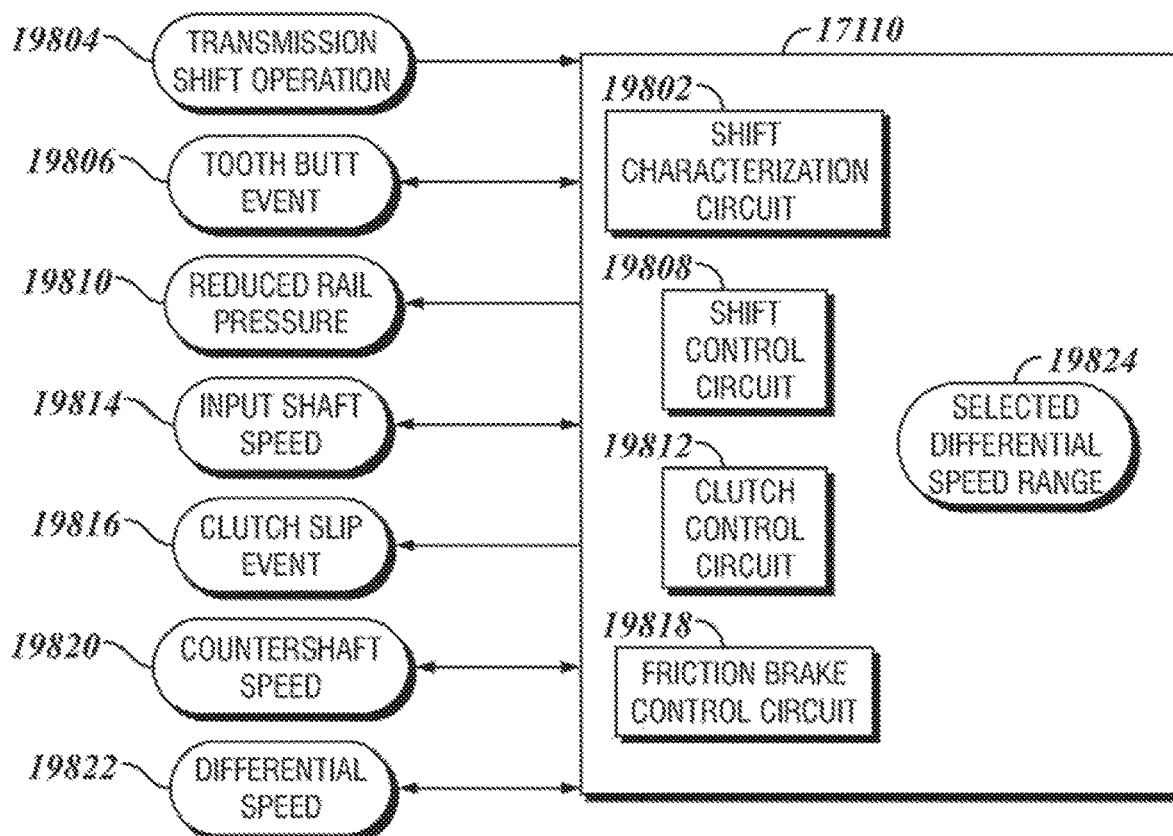
FIG. 86 is a schematic diagram of a controller mitigating a tooth butt event.
Figure 87:
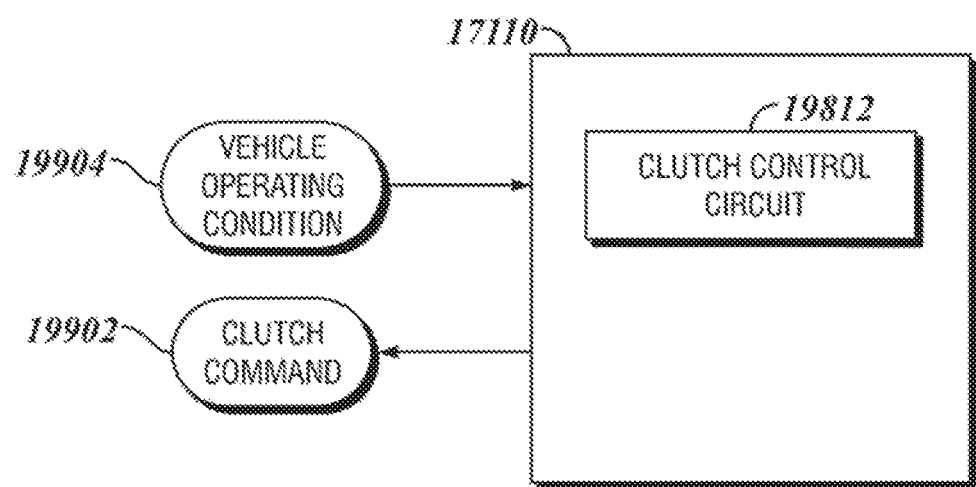
FIG. 87 is a schematic diagram of a controller operating a clutch.

Referencing FIG. 86, an apparatus 19800 includes a controller 17110 having a shift characterization circuit 19802 that determines that a transmission shift operation 19804 is experiencing a tooth butt event 19806. An example operation to determine the tooth butt event 19806 include a shift engagement time exceeding a threshold time value, a maintained difference in speeds between shafts operationally coupled to the gear mesh, and/or an amount of time a synchronizer is sitting on the block exceeding a threshold time. An example controller 17110 further includes a shift control circuit 19808, where the shift control circuit 19808 provides a reduced rail pressure 19810 in a shift rail during at least a portion of the tooth butt event, for example by the controller 17110 limiting operations of an air supply valve 19706 to limit engagement pressure of the shift actuator. Accordingly, noise of the shift event, and/or damage or progressive damage to the shift actuator 19704 and/or gear mesh 19702 are thereby limited. An example controller 17110 includes a clutch control circuit 19812, where the clutch control circuit 19812 modulates an input shaft speed 19814 in response to the tooth butt event 19806. An example clutch control circuit 19812 modulates the input shaft speed 19814 by commanding a clutch slip event 19816 in response to the tooth butt event 19806, thereby disturbing the input shaft 204 and inducing a modulation in the input shaft speed 19814, and assisting in clearing the tooth butt event 19806 condition. An example controller 17110 includes a friction brake control circuit 19818, where the friction brake control circuit 19818 modulates a countershaft speed 19820 in response to the tooth butt event 19806, for example by briefly engaging a friction brake 19712. An example controller 17110 clears the tooth butt event by controlling a differential speed 19822 between shafts operationally coupled to the gear mesh to a selected differential speed range 19824. The controller 17110 utilizes any actuator in the system 19700 to implement the differential speed control 19822, including at least the clutch actuator 1002, the friction brake 19712, and/or a command to the prime mover 17102 for a torque pulse (not shown), which may be coordinated with control of the clutch actuator 1002. Example and non-limiting values for the selected differential speed range 19824 include at least one speed range value such as: less than a 200 rpm difference; less than a 100 rpm difference; less than a 50 rpm difference; about a 50 rpm difference; between 10 rpm and 100 rpm difference; between 10 rpm and 200 rpm difference; and/or between 10 rpm and 50 rpm difference.

Referencing FIG. 85, an example system 19700 includes a clutch 106 that selectively decouples a prime mover 17102 from an input shaft 204 of a transmission, a progressive actuator 1002 operationally coupled to the clutch 106, and where a position of the progressive actuator 1002 corresponds to a position of the clutch 106. The system 19700 further includes a controller 17110 that disengages the clutch 106 to provide a reduced driveline oscillation, improved driver comfort, and/or reduced part wear. Further details of operations of the controller 17110 are described in the description referencing FIG. 87 following. Referencing FIG.

87, a controller 17110 includes a clutch control circuit 19812 that modulates a clutch command 19902 in response to at least one vehicle operating condition 19904, and where the progressive actuator 1002 is responsive to the clutch command 19902. Example and non-limiting vehicle operating conditions 19904 include a service brake position value, a service brake pressure value, a differential speed value between two shafts in a transmission including the clutch 106 and progressive actuator 1002, and/or an engine torque value. In certain embodiments, a depressed service brake, and/or strongly depressed service brake, can cause vehicle deceleration such that a sudden or a nominal clutch disengagement (nominal being a selected clutch disengagement rate in the absence of selected vehicle operating conditions 19904 having values that cause transmission transients in response to a clutch disengagement) can result in oscillation of transmission components, causing noise, part wear, and/or oscillations that affect the driveline and drive wheels resulting in unexpected behavior, lurching, or other negative events that cause driver discomfort. In certain embodiments, differential speed values between shafts in a transmission can cause oscillation upon decoupling from the prime mover, and/or a torque transient in the prime mover can cause oscillation in transmission components while still coupled to the transmission. In certain embodiments, the clutch control circuit 19812 modulates the clutch command 19902 to provide a selected clutch slip amount to prevent or mitigate the transient response of the transmission components. In certain embodiments, the clutch slip amount is provided in response to the strength of the expected transient, and/or provided to allow smooth transition of transmission components between the starting state and the ending state after the transition.

Figure 88:
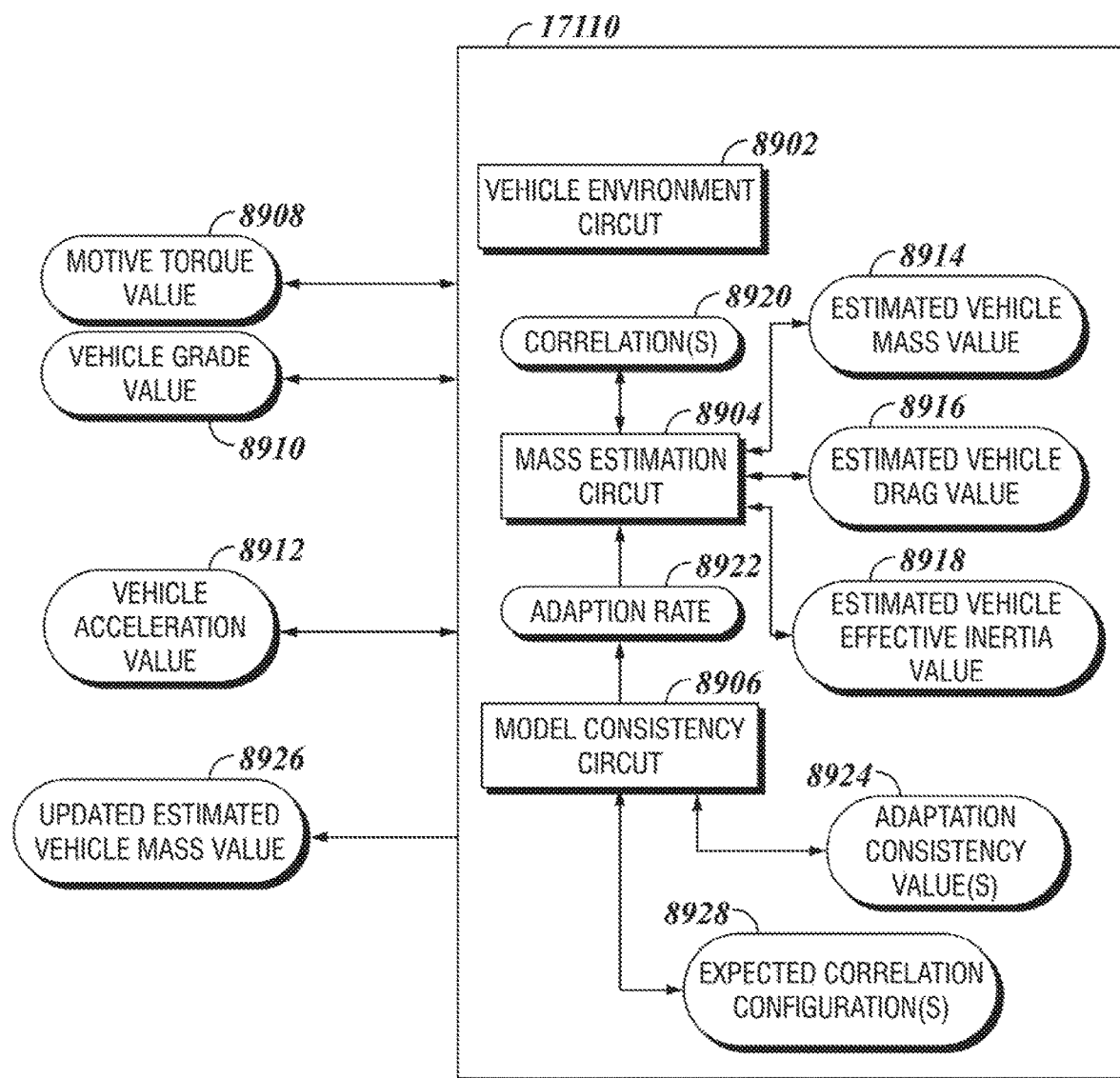
FIG. 88 is a schematic diagram of a controller estimating system parameters.

Referencing FIG. 88, an example controller 17110 includes a vehicle environment circuit 8902 that performs an operation a) to interpret a motive torque value 8908, a vehicle grade value 8910, and a vehicle acceleration value 8912. The example controller 17110 further includes a mass estimation circuit 8904 that performs an operation b) to determine a first correlation (e.g., one of correlations 8920) such as a first correlation 8920 between the motive torque value 8908 and the vehicle grade value 8910. Example and non-limiting operations to determine a correlation 8920 include determining whether the estimated values move together (e.g. increase or decrease together), the consistency of any such movement, the rate of change of any such movement, and/or the character of such movement (e.g. whether the correlated movement is linear). The example mass estimation circuit 8904 further determines a second correlation (e.g., one of correlations 8920) between the motive torque value 8908 and the vehicle acceleration value 8912, and a third correlation (e.g., one of correlations 8920) between the vehicle grade value and the vehicle acceleration value. The example mass estimation circuit 8904 further performs an operation c) to adapt an estimated vehicle mass value 8914, an estimated vehicle drag value 8916, and an estimated vehicle effective inertia value 8918 in response to the first correlation 8920, the second correlation 8920, and the third correlation 8920.

The example controller 17110 further includes a model consistency circuit 8906 that performs an operation d) to determine an adaptation consistency value 8924, and in response to the adaptation consistency value 8924, to adjust an adaptation rate 8922 of the adapting. The vehicle environment circuit 8902, the mass estimation circuit 8904, and the model consistency circuits 8906 further iteratively perform operations a), b), c), and d) to provide an updated estimated vehicle mass value 8926. In certain embodiments, a launch characterization circuit 18902 (e.g., see the disclosure referencing FIG. 77) interprets the updated estimated vehicle mass value 8926 as one of the at least one launch parameters 18904.

An example model consistency circuit 8906 further performs the operation c) to slow or halt an adapting the estimated values in response to the first correlation 8920, the second correlation 8920, and/or the third correlation 8920 having an unexpected correlation configuration (e.g., correlation configuration does not match the expected correlation configuration 8928), and/or increases the adapting rate 8922 or continues the adapting the estimated values 8914, 8916, 8918 in response to the first correlation 8920, the second correlation 8920, and/or the third correlation 8920 having an expected correlation configuration 8928. An example expected correlation configuration 8928 includes a correlation such as: a positive correlation for the first correlation 8920 and the second correlation 8920 (e.g., one or both of the first correlation and the second correlation 8920 indicate the correlated parameters increase or decrease together), and a negative correlation for the third correlation 8920 (e.g., the correlated parameters move in opposing directions). Additionally or alternatively, an expected correlation configuration 8928 includes a linearity value corresponding to one or more of the first correlation 8920, the second correlation 8920, and the third correlation 8920. An example unexpected correlation configuration includes at least one correlation such as: a negative correlation for the first correlation 8920 or the second correlation 8920; a positive correlation for the third correlation 8920; and/or a non-linear correlation corresponding to any one or more of the first correlation 8920, the second correlation 8920, and the third correlation 8920. An example model consistency circuit 8906 further performs the operation c) to adjust the adaptation rate 8922 by increasing or holding an adjustment step size (e.g., as the adaptation rate 8922) in at least one of the estimated vehicle mass value 8914, the estimated vehicle effective inertia value 8918, or the estimated vehicle drag value 8916 in response to: an adaptation result such as monotonically changing each estimated value 8914, 8916, 8918; and/or monotonically changing at least one of the estimated values 8914, 8916, 8918 and holding the other estimated values at a same value 8914, 8916, 8918. An example model consistency circuit 8906 further performs the operation c) to adjust the adaptation rate 8922 by: decreasing an adjustment step size in at least one of the estimated vehicle mass value 8914, the estimated vehicle effective inertia value 8918, or the estimated vehicle drag value 8916 in response to: changing a direction of adaptation in at least one of the estimated values 8914, 8916, 8918. A determination that an estimate is being held at a same value includes, in certain embodiments, a determination that a value has changed below a threshold amount (e.g. vehicle mass estimate 8914 decreasing by a small amount may be interpreted as no change), and/or a determination that a value is changing at a rate that is lower than a threshold (e.g. vehicle mass estimate 8914 increasing lower than a given amount per unit time, per execution cycle, and/or per trip may be interpreted as no change). In certain embodiments, estimates 8914, 8916, 8918 may be subjected to filtering, debouncing (e.g. ignoring and/or limiting outlying or high change rate determinations), hysteresis (e.g., determining that a direction change in the estimate has not occurred at a varying threshold when changing directions, and/or at a different threshold for increasing versus decreasing).

Figure 89:
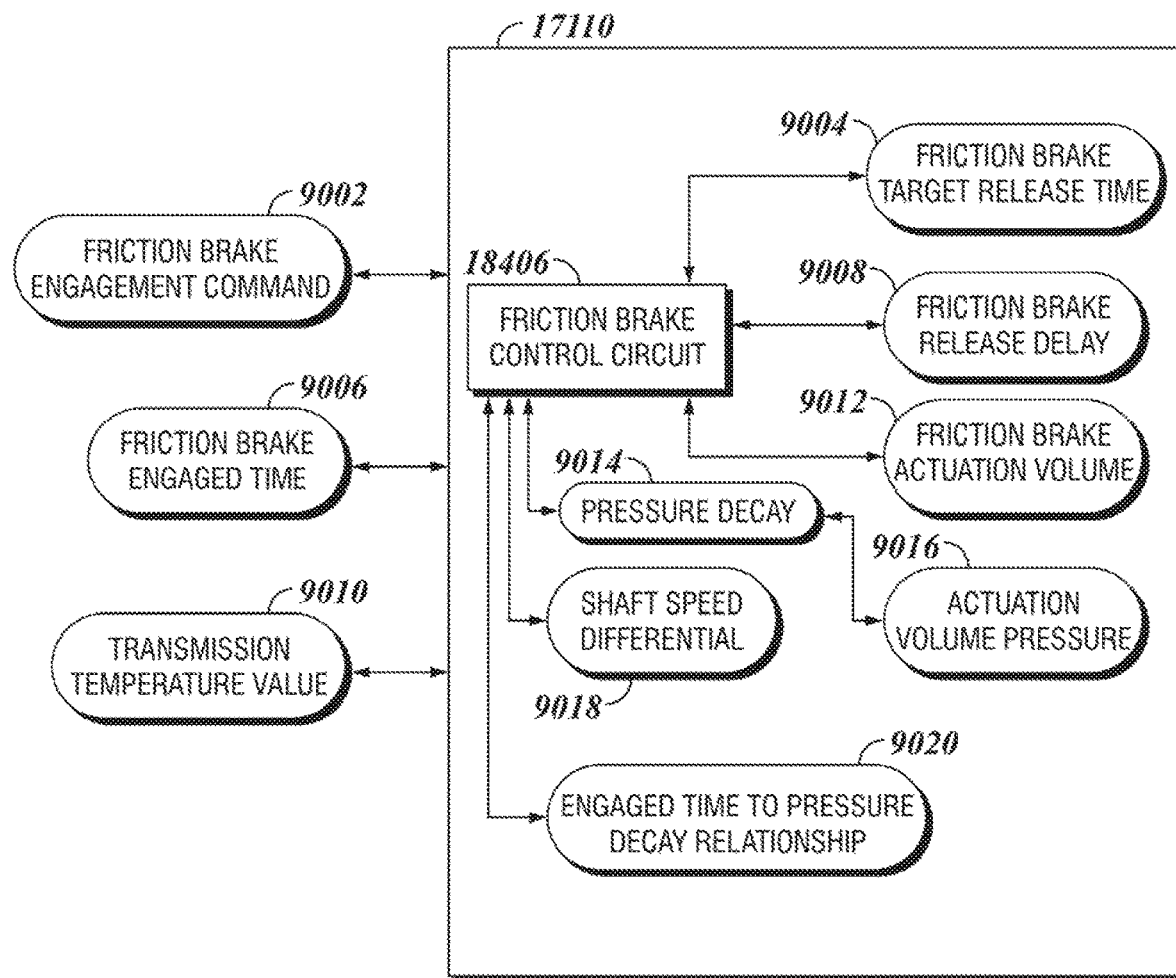
FIG. 89 is a schematic diagram of a controller operating a friction brake.

Referencing FIG. 89, an example controller 17110 includes a friction brake control circuit 18406 that provides a friction brake engagement command 9002. In certain embodiments, a transmission 100 includes a friction brake responsive to the friction brake engagement command 9002 to engage a countershaft. An example friction brake control circuit 18406 further tracks an engaged time 9006 of the friction brake and determines a target release time 9004 for the friction brake, determines a release delay 9008 for the friction brake in response to the engaged time 9006, and commands (e.g. utilizing friction brake engagement command 9002) a release of the friction brake in response to the release delay 9008 and the target release time 9004. An example friction brake control circuit 18406 further determines the target release time 9004 and/or the release delay 9008 in response to a transmission temperature value 9010. For example, the longer the friction brake is engaged, in certain configurations, the greater the time it takes for the friction brake to disengage after an actuator releases the friction brake—for example due to a greater pressure in a friction brake actuating volume 9012 and/or due to other system dynamics. In certain embodiments, the temperature affects the pressure decay and other system dynamics, and utilization of a temperature compensation can improve the accuracy of the friction brake disengagement, resulting in improved correspondence between planned and actual friction brake control of countershaft speed. Any temperature in a system can be utilized to compensate the friction brake control, although temperatures more closely related to the friction brake components and/or friction brake actuating volume 9012 provide, in certain embodiments, improved accuracy and precision of the compensation. Accordingly, the transmission temperature value 9010 includes, without limitation, a transmission oil temperature, a transmission coolant temperature (where present), an ambient temperature, an actuator temperature, and/or any temperature such as from a sensor positioned in proximity to the friction brake, countershaft, and/or friction brake actuating volume 9012.

An example friction brake control circuit 18406 further determines the release delay 9008 by determining a pressure decay value 9014 in a friction brake actuating volume 9012. In certain embodiments, the friction brake control circuit 18406 determines the pressure decay value 9014 by determining a pressure in the friction brake actuating volume 9012, which may be measured, modeled, and/or estimated. An example friction brake control circuit 18406 further determines the pressure decay value 9014 by utilizing a pre-determined relationship 9020 between engaged time 9006 and pressure decay in the friction brake actuating volume 9012. An example friction brake control circuit 18406 determines a speed differential 9018 between the countershaft and an engaging shaft, and determines the target release time 9004 further in response to the speed differential 9018—for example to slow the countershaft a scheduled amount during a shift, diagnostic, or other operation. Example and non-limiting engaging shafts include an output shaft, a main shaft, and/or an input shaft.

Figure 90:
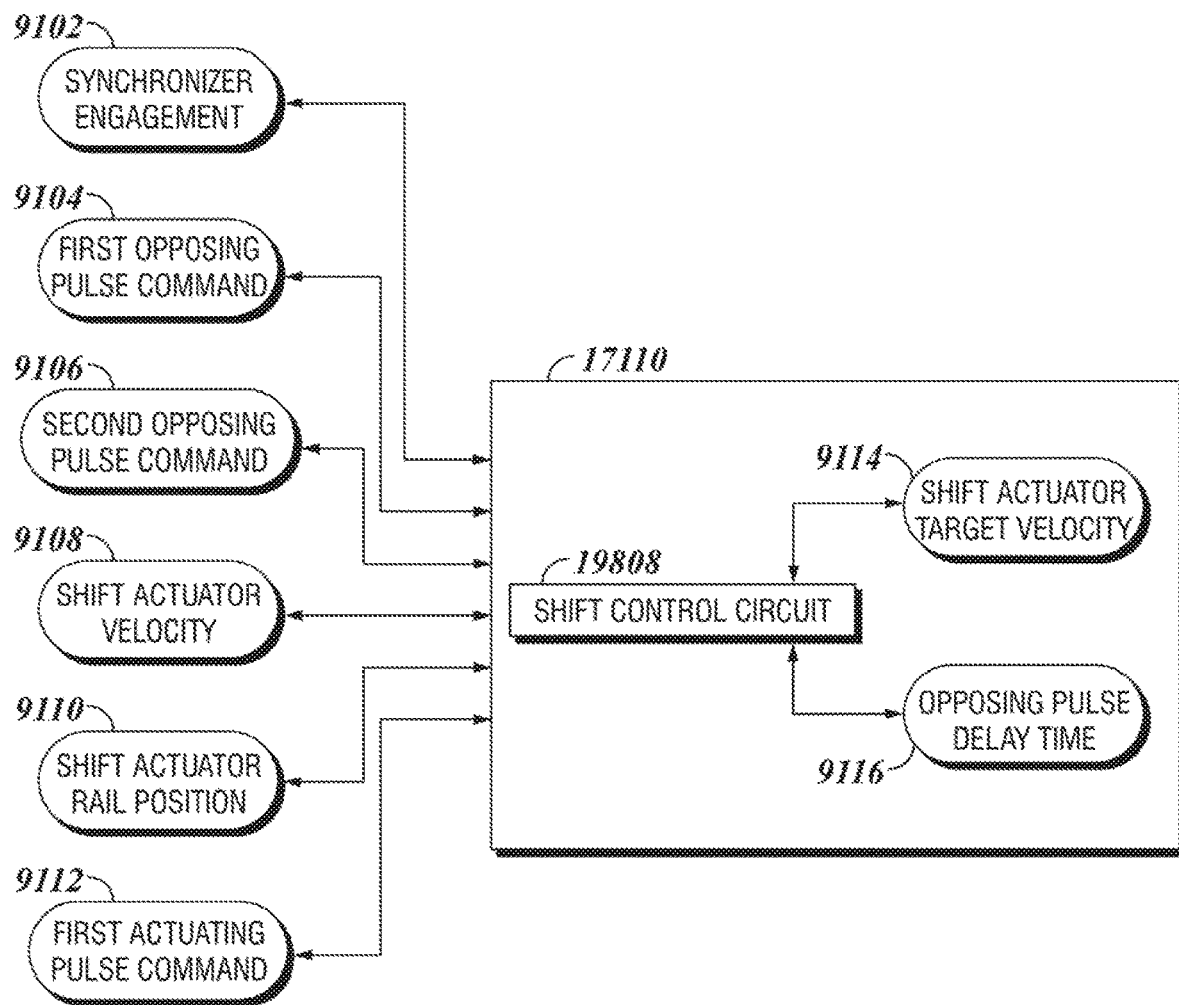
FIG. 90 is a schematic diagram of a controller operating a shift actuator.

Referencing FIG. 90, an example controller 17110 includes a shift control circuit 19808 that determines that a synchronizer engagement 9102 is imminent, for example in accordance with a shift actuator rail position 9110, shift actuator rail velocity 9108, and/or in response to a timing of the shift actuator (e.g. a time after actuation is commanded, and/or a timing after the shift actuator disengages from a previously engaged gear). The example shift control circuit 19808 provides a first opposing pulse command 9104 and/or a second opposing pulse command 9106 (e.g., where a first opposing pulse command 9104 was previously provided to control a shift rail actuator velocity 9108) in response to the imminent synchronizer engagement 9102. The example operations of the shift control circuit 19808 provide for improved wear on the synchronizer, controlled engagement force of the synchronizer, reduced noise of shifts in a transmission 100, and/or provide for increased velocity of the shift actuator during a shift while controlling synchronization forces. An example shift control circuit 19808 further provides the one of the first opposing pulse command 9104 and/or a second opposing pulse command 9106 further in response to a velocity 9108 of the shift actuator and a target velocity 9114 of the shift actuator, for example to control the velocity 9108 to or toward the target velocity 9114.

An example shift control circuit 19808 further provides a first opposing pulse command 9104 after the first actuating pulse command 9112, and further in response to an expiration of a predetermined opposing pulse delay time 9116. In certain embodiments, a first opposing pulse command 9104 is provided at a delay time 9116 after the first actuating pulse command 9112 is provided, and/or at a delay time 9116 after disengagement of the shift actuator occurs from a previously engaged gear. An example shift control circuit 19808 further interrupts the first opposing pulse command 9104 in response to a shift actuator rail position 9110, for example to provide a scheduled amount of opposition to the shift actuator. In certain embodiments, the pulse timing (e.g., the start of the pulse) of the first and/or second opposing pulse commands 9104, 9106 are timed (e.g. after a shift request, an actuating pulse command 9112, and/or disengagement), and the completion or pulse width of the opposing pulse commands 9104, 9106 are based on shift actuator position 9110 and/or velocity 9108.

Figure 91:
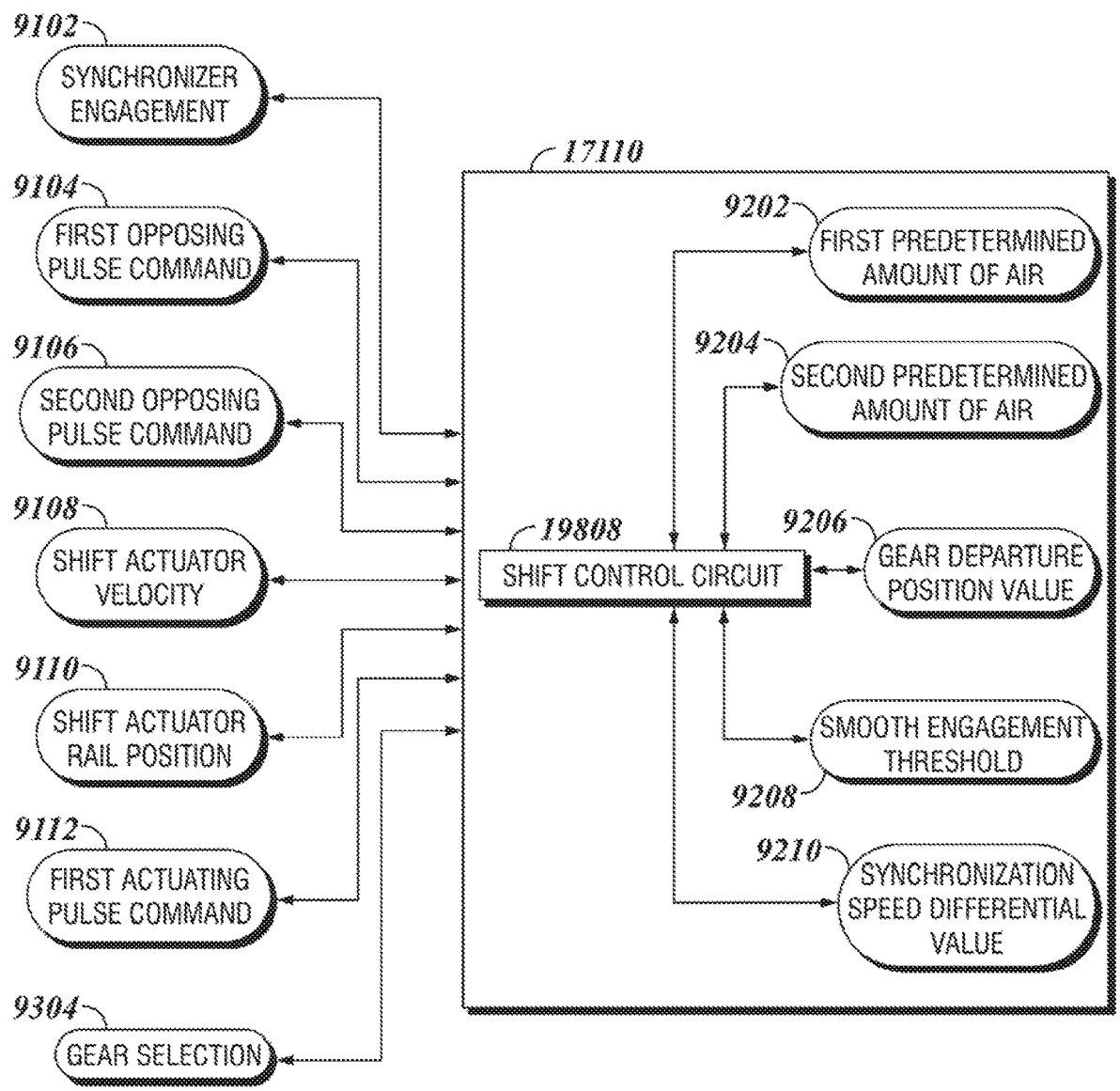
FIG. 91 is a schematic diagram of a controller operating a shift actuator.

Referencing FIG. 91, an example controller 17110 includes a shift control circuit 19808 that provides a first opposing pulse (e.g. by providing a first opposing pulse command 9104), the first opposing pulse including a first predetermined amount of air 9202 above an ambient amount of air in a first closed volume, where pressure in the first closed volume opposes movement of a shift actuator in a shift direction. The example shift control circuit 19808 a first actuating pulse (e.g. by providing a first actuating pulse command 9112), the first actuating pulse including a second predetermined amount of air 9204 above an ambient amount of air in a second closed volume, where pressure in the second closed volume promotes movement of the shift actuator in the shift direction. The example shift control circuit 19808 further releases pressure in the first closed volume and the second closed volume in response to determining a shift completion event. The shift control circuit 19808 provides the first opposing pulse command 9104 before, after, or simultaneously with the first actuating pulse command 9112, depending upon the desired dynamic response of the shift actuator. In certain embodiments, the shift control circuit 19808 provides the second opposing pulse command 9106 in response to the shift actuator approaching a synchronization position (e.g. to control engagement velocity and/or force) and/or provides an additional opposing pulse command (the second 9106 or a subsequent opposing pulse command) as the shift actuator engages (e.g., as the synchronizer comes off the block). The description including predetermined amounts of air includes determining the amounts of air in response to system conditions before commanding the pulses (e.g., shaft speeds, shift timing, temperatures in the system, effects of wear on components, etc.) and/or may further modulate the pulse commands during the providing of the commands, including schedule modulation (e.g., a PWM to provide less than full actuation pressure, and/or in response to feedback of shift actuator position 9110 and/or velocity 9108). The shift control circuit 19808 provides, in certain embodiments, any number of opposing and/or actuating pulse commands. In certain embodiments, the shift control circuit 19808 releases pressure from the opposing and/or actuating sides to coordinate pressure decay in the opposing and actuating sides— for example to control forces that engage the gear and/or to avoid disengaging the gear after the shift event is completed.

An example shift control circuit 19808 further modulates the first actuating pulse command 9112 in response to a previously determined gear departure position value 9206— for example and observed shift rail position value whereupon the shift actuator has disengaged from the currently engaged gear at the start of a shift. In certain embodiments, the modulating includes providing the first actuating pulse command 9112 as a full open command (e.g., full actuation) in response to a position 9110 of the shift actuator being on an engaged side of the gear departure position value 9206, and additionally or alternatively includes providing the first actuating pulse command 9112 as a pulse-width modulated (PWM) command and/or as a reduced actuation command in response to the position 9110 of the shift actuator approaching and/or exceeding the gear departure position value 9206. The gear departure position value 9206 can vary due to part-to-part variations and stackup, and additionally can change over time due to wear and/or service events. Accordingly, in certain embodiments, the shift control circuit 19808 additionally observes actual gear departure (e.g., by observing shift rail position 9110 and/or velocity 9108), and updates the gear departure position value 9206 in response to the observation. The updating may be filtered, rate limited, debounced, and/or subjected to other rationalization techniques. In certain embodiments, where a large change is detected, the change may be implemented more quickly, ignored, and/or changed quickly after several observations confirm the updated value. In certain embodiments, the shift control circuit 19808 performs a calibration test whereupon the shift actuator engages and disengages the gear multiple times to determine the departure position. Such calibration operations may be performed when vehicle operating conditions allow (e.g., another gear mesh in the system is enforcing a neutral position and/or the vehicle is not moving) and/or in response to a specified command such as from a service tool, as part of a service event, and/or at a time of manufacture or reconditioning.

An example shift control circuit 19808 further interprets a synchronization speed differential value 9210 for a currently requested shift including a selected gear ratio (e.g., gear selection 9304). The example shift control circuit 19808, in response to the final gear mesh engagement speed differential value 9210 (e.g., the speed differential at an intended gear mesh engagement) exceeding a smooth engagement threshold 9208, changes the currently requested shift to a changed gear ratio (e.g., updating the gear selection 9304), where the changed gear ratio includes a second synchronization speed differential value 9210 lower than the smooth engagement threshold 9208. For example, during a shift, operating conditions may change the predicted speed of shafts in the transmission 100 (e.g., a vehicle acceleration or deceleration during the shift, a change in a shaft speed from friction brake engagement, etc.), such that an originally intended gear selection 9304 has a higher speed differential than planned. In certain embodiments, the shift control circuit 19808 updates the gear selection 9304 before the shift commences (e.g., operator and/or nominal controls select a gear that is not predicted to result in a smooth shift based on the current operating conditions), and/or after the shift actuator has disengaged a prior engaged gear (e.g., a mid-shift gear selection 9304 change).

Figure 92:
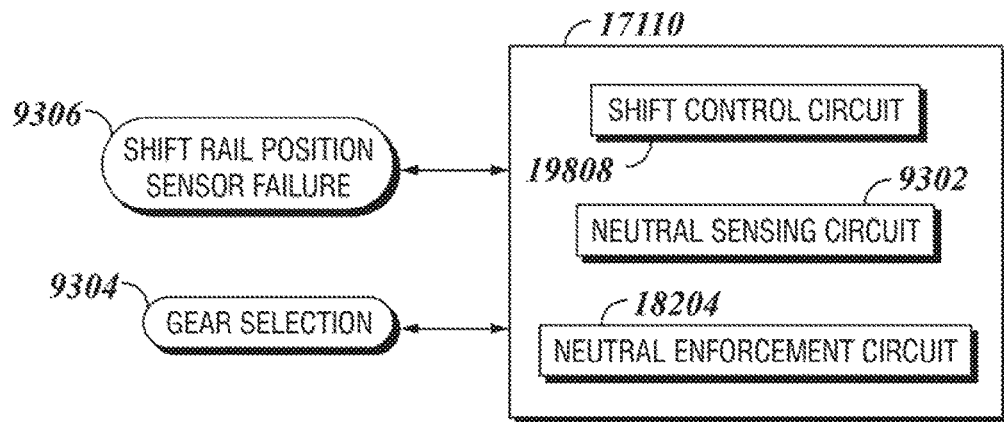
FIG. 92 is a schematic diagram of a controller operating a shift actuator.

Referencing FIG. 92 an example controller 17110 includes a neutral sensing circuit 9302 structured to determine a shift rail position sensor failure 9306 indicating that a shift rail position sensor corresponding to a shift actuator controlling a reverse gear is failed, and that a gear selection 9304 is active requiring operations of the shift actuator. The example controller 17110 further includes a neutral enforcement circuit 18204 that, in response to the gear selection 9304 and the shift rail position sensor failure 9306, performs in order: commanding the shift actuator to a neutral position, confirming the neutral position by commanding a second shift actuator to engage a second gear, where the second shift actuator is not capable of engaging the second gear unless the shift actuator is in the neutral position, and confirming the second shift actuator has engaged the second gear. The example controller 17110 further includes a shift control circuit 19808 to command the command the shift actuator into the gear position in response to the gear selection 9304 after the neutral position is confirmed.

Figure 93:
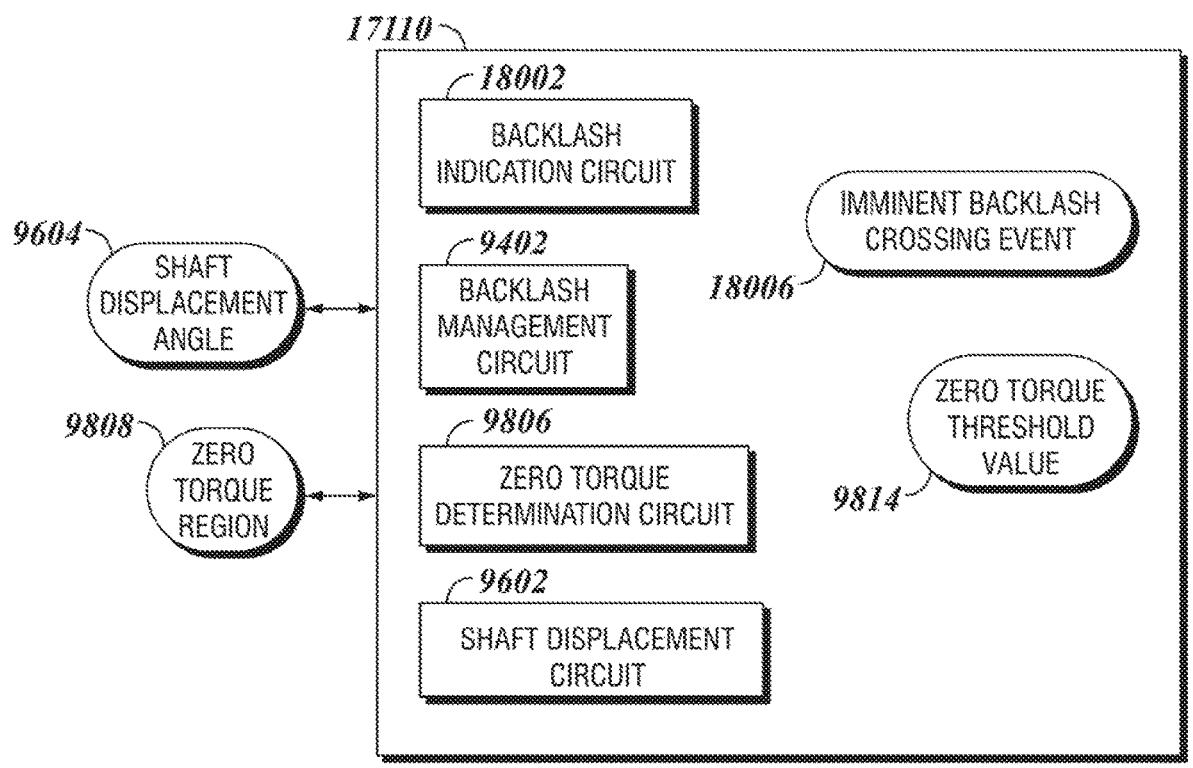
FIG. 93 is a schematic diagram of a controller mitigating a backlash event.

Referencing FIG. 93, an example controller 17110 includes a backlash indication circuit 18002 that identifies an imminent backlash crossing event 18006 at a first gear mesh, and a backlash management circuit 9402 that reduces engagement force experienced by the first gear mesh in response to receiving a backlash crossing indication event 18006 from the backlash indication circuit 18002. The example controller 17110 further includes a shaft displacement circuit 9602 that interprets a shaft displacement angle 9604, the shaft displacement angle 9604 including an angle value representative of a rotational displacement difference between at least two shafts of a transmission. The example controller 17110 further includes a zero torque determination circuit 9806 that determines the transmission is operating in a zero torque region 9808 in response to the shaft displacement angle 9604 including a difference value below a zero torque threshold value 9814, and where the backlash indication circuit 18002 further identifies the imminent backlash crossing event 18006 in response to the transmission operating in the zero torque region 9808. Example operations of the backlash indication circuit 18002 to identify the imminent backlash crossing event 18006 include operations such as: determining that an imminent rotational direction of the first gear mesh in a transmission is an opposite rotational direction to an established rotational direction of the first gear mesh; determining that a speed change between a first shaft comprising gears on one side of the first gear mesh and a second shaft comprising gears on an opposing side of the first gear mesh is likely to induce the backlash crossing event; determining that a gear shift occurring at a second gear mesh is likely to induce the backlash crossing event at the first gear mesh; determining that a transmission input torque value indicates an imminent zero crossing event; and/or determining that a vehicle operating condition is likely to induce the backlash crossing event. An example backlash management circuit 9402 further manages backlash by performing an operation such as disengaging the first gear mesh during at least a portion of the backlash crossing event; disengaging a clutch during at least a portion of the backlash crossing event; and/or slipping a clutch during at least a portion of the backlash crossing event. An example backlash indication circuit 18002 identifies the imminent backlash crossing event 18006 by determining that a gear shift occurring at a second gear mesh is likely to induce the backlash crossing event 18006 at the first gear mesh, where the backlash management circuit 9402 further performs a disengagement of the first gear mesh during at least of portion of the gear shift.

In embodiments, an automated truck transmission is provided, using a plurality of high speed countershafts that are configured to be mechanically coupled to the main drive shaft by a plurality of gears when the transmission is in gear and at least one set of drive gears having teeth with substantially flat tops to improve at least one of noise and efficiency. In embodiments, an automated truck transmission is provided, using a plurality of high speed countershafts that are configured to be mechanically coupled to the main drive shaft by a plurality of gears when the transmission is in gear and an integrated mechanical assembly with a common air supply for both shift actuation and clutch actuation for the transmission.

In embodiments, an automated truck transmission is provided, using a plurality of high speed countershafts that are configured to be mechanically coupled to the main drive shaft by a plurality of gears when the transmission is in gear and a having at least one helical gear set to reduce noise.

In embodiments, an automated truck transmission is provided, using a plurality of high speed countershafts that are configured to be mechanically coupled to the main drive shaft by a plurality of gears when the transmission is in gear, where the gears have teeth that are configured to engage with a sliding velocity of engagement that provides high efficiency.

In embodiments, an automated truck transmission is provided, using a plurality of high speed countershafts that are configured to be mechanically coupled to the main drive shaft by a plurality of gears when the transmission is in gear and having enclosure bearings and gear sets configured to reduce noise from the transmission.

In embodiments, an automated truck transmission is provided, using a plurality of high speed countershafts that are configured to be mechanically coupled to the main drive shaft by a plurality of gears when the transmission is in gear and having a mechanically and electrically integrated assembly configured to be mounted on the transmission, wherein the assembly provides gear shift actuation and clutch actuation.

In embodiments, an automated truck transmission is provided, using a plurality of high speed countershafts that are configured to be mechanically coupled to the main drive shaft by a plurality of gears when the transmission is in gear and having wormwheel-ground gear teeth having a tooth profile that is designed to provide efficient interaction of the gears.

In embodiments, an automated truck transmission is provided, using a plurality of high speed countershafts that are configured to be mechanically coupled to the main drive shaft by a plurality of gears when the transmission is in gear and having three gear systems having three, three and two modes of engagement respectively for providing an 18 speed transmission.

In embodiments, an automated truck transmission is provided, using a plurality of high speed countershafts that are configured to be mechanically coupled to the main drive shaft by a plurality of gears when the transmission is in gear and having a three-by-three-by-two gear set architecture.

In embodiments, an automated truck transmission is provided, using a plurality of high speed countershafts that are configured to be mechanically coupled to the main drive shaft by a plurality of gears when the transmission is in gear; low contact ratio gears; bearings to reduce the impact of thrust loads on efficiency; and a low loss lubrication system.

In embodiments, an automated truck transmission is provided, using a plurality of high speed countershafts that are configured to be mechanically coupled to the main drive shaft by a plurality of gears when the transmission is in gear and having an integrated assembly that includes a linear clutch actuator, at least one position sensor, and valve banks for gear shift and clutch actuation.

In embodiments, an automated truck transmission is provided, using a plurality of high speed countershafts that are configured to be mechanically coupled to the main drive shaft by a plurality of gears when the transmission is in gear and having a pneumatic, linear clutch actuation system that is configured to hold substantially no volume of unused air.

In embodiments, an automated truck transmission is provided, using a plurality of high speed countershafts that are configured to be mechanically coupled to the main drive shaft by a plurality of gears when the transmission is in gear and having at least one power take-off (PTO) interface that has an aluminum enclosure and a gear set that is optimized for a specified use of the PTO.

In embodiments, an automated truck transmission may have various enclosures, such as for separating various gear boxes, such as in a 3×2×2 gear box architecture. The enclosures may have bearings, and in embodiments, the enclosure bearings may be configured to be isolated from the thrust loads of the transmission. For example, in embodiments an automatic truck transmission architecture is provided where one or more of the enclosure bearings take radial separating loads, and the thrust reaction loads are substantially deployed on other bearings (not the enclosure bearings).

In embodiments, an automatic truck transmission architecture is provided wherein enclosure bearings take radial separating loads, wherein thrust reaction loads are deployed on other bearings and a common air supply that is used for gear shift actuation and for clutch actuation for the transmission.

In embodiments, an automatic truck transmission architecture is provided wherein enclosure bearings take radial separating loads, wherein thrust reaction loads are deployed on other bearings and wherein the automated truck transmission has at least one set of drive gears having teeth with substantially flat tops to improve at least one of noise and efficiency.

In embodiments, an automatic truck transmission architecture is provided wherein enclosure bearings take radial separating loads, wherein thrust reaction loads are deployed on other bearings and wherein a helical gear set is provided to reduce noise.

In embodiments, an automatic truck transmission architecture is provided wherein enclosure bearings take radial separating loads, wherein thrust reaction loads are deployed on other bearings and wherein the transmission has wormwheel-ground gear teeth having a tooth profile that is designed to provide efficient interaction of the gears.

In embodiments, an automatic truck transmission architecture is provided wherein enclosure bearings take radial separating loads, wherein thrust reaction loads are deployed on other bearings and wherein the transmission has three gear systems having three, three and two modes of engagement respectively for providing an 18 speed transmission.

In embodiments, an automatic truck transmission architecture is provided wherein enclosure bearings take radial separating loads, wherein thrust reaction loads are deployed on other bearings and wherein the transmission has a three-by-three-by-two gear set architecture.

In embodiments, an automatic truck transmission architecture is provided having enclosure bearings that take radial separating loads, having thrust reaction loads that are deployed on other bearings and having a pneumatic, linear clutch actuation system that is configured to hold substantially no volume of unused air.

In embodiments, an automatic truck transmission architecture is provided having enclosure bearings that take radial separating loads, having thrust reaction loads that are deployed on other bearings and having a plurality of power take-off (PTO) interfaces.

In embodiments, an automated truck transmission is provided, having at least one set of drive gears that has teeth with substantially flat tops to improve at least one of noise and efficiency and having an integrated mechanical assembly with a common air supply for both shift actuation and clutch actuation for the transmission.

In embodiments, an automated truck transmission is provided, wherein at least one set of drive gears has teeth with substantially flat tops to improve at least one of noise and efficiency and wherein a helical gear set is provided to reduce noise.

In embodiments, an automated truck transmission is provided, wherein at least one set of drive gears has teeth with substantially flat tops configured to engage with a sliding velocity of engagement that provides high efficiency.

In embodiments, an automated truck transmission is provided, wherein at least one set of drive gears has teeth with substantially flat tops to improve at least one of noise and efficiency and wherein enclosure bearings and gear sets are configured to reduce noise from the transmission.

In embodiments, an automated truck transmission is provided, wherein at least one set of drive gears has teeth with substantially flat tops to improve at least one of noise and efficiency and wherein the transmission has a mechanically and electrically integrated assembly configured to be mounted on the transmission, wherein the assembly provides gear shift actuation and clutch actuation.

In embodiments, an automated truck transmission is provided, wherein at least one set of drive gears has teeth with substantially flat tops to improve at least one of noise and efficiency and wormwheel-ground gear teeth having a tooth profile that is designed to provide efficient interaction of the gears.

In embodiments, an automated truck transmission is provided, wherein at least one set of drive gears has teeth with substantially flat tops to improve at least one of noise and efficiency and wherein the transmission has three gear systems having three, three and two modes of engagement respectively for providing an 18 speed transmission.

In embodiments, an automated truck transmission is provided, wherein at least one set of drive gears has teeth with substantially flat tops to improve at least one of noise and efficiency of at least one gear set in a three-by-three-by-two gear set architecture.

In embodiments, an automated truck transmission is provided, wherein at least one set of drive gears has teeth with substantially flat tops to improve at least one of noise and efficiency and wherein the transmission has low contact ratio gears, bearings to reduce the impact of thrust loads on efficiency and a low loss lubrication system.

In embodiments, an automated truck transmission is provided, wherein at least one set of drive gears has teeth with substantially flat tops to improve at least one of noise and efficiency and wherein the transmission has a linear clutch actuator that is integrated with the shift actuation system for the transmission.

In embodiments, an automated truck transmission is provided, wherein at least one set of drive gears has teeth with substantially flat tops to improve at least one of noise and efficiency and wherein the transmission has a hoseless pneumatic actuation system for at least one of clutch actuation and gear shift actuation.

In embodiments, an automated truck transmission is provided, wherein at least one set of drive gears has teeth with substantially flat tops to improve at least one of noise and efficiency and wherein the transmission has a centralized actuation system wherein the same assembly provides clutch actuation and gear shift actuation.

In embodiments, an automated truck transmission is provided, wherein at least one set of drive gears has teeth with substantially flat tops to improve at least one of noise and efficiency and wherein the transmission has a pneumatic, linear clutch actuation system that is configured to hold substantially no volume of unused air.

In embodiments, an automated truck transmission is provided having an integrated mechanical assembly with a common air supply that is used for both gear shift actuation and clutch actuation and three gear systems having three, three and two modes of engagement respectively for providing an 18 speed transmission.

In embodiments, an automated truck transmission is provided having an integrated mechanical assembly with a common air supply that is used for both gear shift actuation and clutch actuation and having a three-by-three-by-two gear set architecture.

In embodiments, an automated truck transmission is provided having an integrated mechanical assembly with a common air supply that is used for both gear shift actuation and clutch actuation and having low contact ratio gears, bearings to reduce the impact of thrust loads on efficiency and a low loss lubrication system.

Various embodiments disclosed herein may include an aluminum automated truck transmission, wherein a helical gear is used for at least one gear set of the transmission to reduce noise from the transmission. A helical gear set may be used in combination with various other methods, systems and components of an automated truck transmission disclosed throughout this disclosure, including the following.

In embodiments, an aluminum automated truck transmission is provided, having a helical gear as set as at least one gear set of the transmission to reduce noise from the transmission and having a set of substantially circular gears with teeth that are configured to engage with a sliding velocity of engagement that provides high efficiency.

In embodiments, an aluminum automated truck transmission is provided, having a helical gear as set as at least one gear set of the transmission to reduce noise from the transmission and having enclosure bearings and gear sets configured to reduce noise from the transmission.

In embodiments, an aluminum automated truck transmission is provided, having a helical gear as set as at least one gear set of the transmission to reduce noise from the transmission and having a mechanically and electrically integrated assembly configured to be mounted on the transmission, wherein the assembly provides gear shift actuation and clutch actuation.

In embodiments, an aluminum automated truck transmission is provided, having a helical gear as set as at least one gear set of the transmission to reduce noise from the transmission and having wormwheel-ground gear teeth having a tooth profile that is designed to provide efficient interaction of the gears.

In embodiments, an aluminum automated truck transmission is provided, having a helical gear as set as at least one gear set of the transmission to reduce noise from the transmission and having three gear systems having three, three and two modes of engagement respectively for providing an 18 speed transmission.

In embodiments, an aluminum automated truck transmission is provided, having a helical gear as set as at least one gear set of the transmission to reduce noise from the transmission and having a three-by-three-by-two gear set architecture.

In embodiments, an aluminum automated truck transmission is provided, having a helical gear as set as at least one gear set of the transmission to reduce noise from the transmission and having low contact ratio gears, bearings to reduce the impact of thrust loads on efficiency and a low loss lubrication system.

In embodiments, an aluminum automated truck transmission is provided, having a helical gear as set as at least one gear set of the transmission to reduce noise from the transmission and having a linear clutch actuator that is integrated with the shift actuation system for the transmission.

In embodiments, an aluminum automated truck transmission is provided, having a helical gear as set as at least one gear set of the transmission to reduce noise from the transmission and having an integrated assembly that includes a linear clutch actuator, at least one position sensor, and valve banks for gear shift and clutch actuation.

In embodiments, an aluminum automated truck transmission is provided, having a helical gear as set as at least one gear set of the transmission to reduce noise from the transmission and having a hoseless pneumatic actuation system for at least one of clutch actuation and gear shift actuation.

In embodiments, an aluminum automated truck transmission is provided, having a helical gear as set as at least one gear set of the transmission to reduce noise from the transmission and having a gear system configured to have bearings accept thrust loads to improve engine efficiency.

In embodiments, an aluminum automated truck transmission is provided, having a helical gear as set as at least one gear set of the transmission to reduce noise from the transmission and having a centralized actuation system wherein the same assembly provides clutch actuation and gear shift actuation.

In embodiments, an aluminum automated truck transmission is provided, having a helical gear as set as at least one gear set of the transmission to reduce noise from the transmission and having a pneumatic, linear clutch actuation system that is configured to hold substantially no volume of unused air.

In embodiments, an aluminum automated truck transmission is provided, having a helical gear as set as at least one gear set of the transmission to reduce noise from the transmission and having a plurality of power take-off (PTO) interfaces.

In embodiments, an aluminum automated truck transmission is provided, having a helical gear as set as at least one gear set of the transmission to reduce noise from the transmission and having at least one power take-off (PTO) interface that has an aluminum enclosure and a gear set that is optimized for a specified use of the PTO.

In embodiments, an automated truck transmission is provided, wherein the gear set comprises a plurality of substantially circular gears having teeth that are configured to engaged during at least one operating mode of the automated truck transmission, configuring the shape of the teeth of the gears based on the sliding velocity of engagement of the teeth top provide improved efficiency of the automated truck transmission. Embodiments with gear teeth optimized based on sliding velocity may be used in combination with various other methods, systems and components of an overall architecture for an efficient, low noise transmission, including as follows.

Embodiments of the present disclosure include ones for a die cast aluminum automatic truck transmission is provided, wherein the enclosure bearings and gear sets are configured to reduce noise from the transmission. Such a noise-reduced configuration can be used in combination with other methods, systems and components of an automatic truck transmission architecture as described throughout the present disclosure.

In embodiments, a die cast aluminum automatic truck transmission is provided, having enclosure bearings and gear sets configured to reduce noise from the transmission and having low contact ratio gears, bearings to reduce the impact of thrust loads on efficiency and a low loss lubrication system.

In embodiments, a die cast aluminum automatic truck transmission is provided, having enclosure bearings and gear sets configured to reduce noise from the transmission and having a linear clutch actuator that is integrated with the shift actuation system for the transmission.

In embodiments, a die cast aluminum automatic truck transmission is provided, having enclosure bearings and gear sets configured to reduce noise from the transmission and having an integrated assembly that includes a linear clutch actuator, at least one position sensor, and valve banks for gear shift and clutch actuation.

In embodiments, a die cast aluminum automatic truck transmission is provided, having enclosure bearings and gear sets configured to reduce noise from the transmission and having a gear system configured to have bearings accept thrust loads to improve engine efficiency.

In embodiments, a die cast aluminum automatic truck transmission is provided, having enclosure bearings and gear sets configured to reduce noise from the transmission and having a centralized actuation system wherein the same assembly provides clutch actuation and gear shift actuation.

In embodiments, an automated truck transmission is provided, wherein the bearings for the gears are configured to reduce or cancel thrust loads when the drive shaft is engaged. Such an architecture may be used in combination with various other methods, systems and components described throughout this disclosure, including as follows.

In embodiments, an automated truck transmission is provided having a gear system configured to having bearings accept thrust loads to improve engine efficiency and having a centralized actuation system wherein the same assembly provides clutch actuation and gear shift actuation.

In embodiments, an automated truck transmission is provided having a gear system configured to having bearings accept thrust loads to improve engine efficiency and having a pneumatic, linear clutch actuation system that is configured to hold substantially no volume of unused air.

In embodiments, an automated truck transmission is provided having a gear system configured to having bearings accept thrust loads to improve engine efficiency and having a plurality of power take-off (PTO) interfaces.

In embodiments, an automated truck transmission is provided having a gear system configured to having bearings accept thrust loads to improve engine efficiency and having at least one power take-off (PTO) interface that has an aluminum enclosure and a gear set that is optimized for a specified use of the PTO.

In embodiments, an automated truck transmission is provided, wherein the transmission has a plurality of power take-off (PTO) interfaces. Such an architecture may be used in combination with various other methods, systems and components described throughout this disclosure, including as follows. In embodiments, an automated truck transmission is provided having a plurality of power take-off (PTO) interfaces and having at least one power take-off (PTO) interface that has an aluminum enclosure and a gear set that is optimized for a specified use of the PTO.

In embodiments, an automated truck transmission is provided, wherein the transmission has at least one power take-off (PTO) interface with an aluminum enclosure and an optimized gear set. Such an architecture may be used in combination with various other methods, systems and components described throughout this disclosure.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and systems described are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method, comprising:
   providing a first opposing pulse in a first closed volume that opposes movement of a progressive actuator of a transmission in a shift direction;
   providing a first actuating pulse in a second closed volume that promotes movement of the progressive actuator in the shift direction;
   determining a shift completion event that releases pressure in the first and second closed volumes; and
   commanding a position of the progressive actuator operationally coupled to a clutch based at least in part on an interpreted clutch torque profile that is interpreted by performing a clutch engagement position test.

2. The method of claim 1, wherein performing the clutch engagement position test further comprises commanding a friction brake to bring an input shaft speed to zero.

3. The method of claim 2, further comprising:
   interpreting, by a vehicle state logic, at least one vehicle operating condition; and
   providing, by a neutral enforcement logic, a first neutral command to the progressive actuator and a second neutral command to the progressive actuator, in response to the at least one vehicle operating condition indicating that vehicle motion is not intended;
   wherein the progressive actuator is responsive to selectively decouple a first gear mesh based on the first neutral command and a second gear mesh based on the second neutral command, wherein both gear meshes in the engaged position couple the input shaft of the transmission to drive wheels of a vehicle including the transmission, and wherein either gear mesh in a neutral position decouples the input shaft from the drive wheels.

4. The method of claim 1, further comprising providing, by a launch characterization logic, an iteratively derived estimated vehicle mass value.

5. The method of claim 4, wherein the iteratively derived estimated vehicle mass value is based at least in part on adjusting, by a model consistency logic, an adaptation rate of operations of a vehicle environment logic and a mass estimation logic.

6. The method of claim 5, wherein the vehicle environment logic is configured to provide interpretations of a motive torque value, a vehicle grade value, and a vehicle acceleration value.

7. The method of claim 6, further wherein a mass estimation logic is configured to:
 determine a plurality of correlations between the interpretations of the vehicle environment logic; and
 determine adaptations of an estimated vehicle drag value and an estimated vehicle effective inertia based on at least the plurality of determined correlations.

8. A computer product in a non-transitory memory, wherein the computer product configures a processor, when implemented from the memory, to:
 provide a first opposing pulse in a first closed volume that opposes movement of a progressive actuator of a transmission in a shift direction;
 provide a first actuating pulse in a second closed volume that promotes movement of the progressive actuator in the shift direction;
 determine a shift completion event that releases pressure in the first and second closed volumes; and
 command a position of the progressive actuator operationally coupled to a clutch based at least in part on an interpreted clutch torque profile that is interpreted by performing a clutch engagement position test.

9. The computer product of claim 8, wherein the clutch engagement position test comprises commanding a friction brake to bring an input shaft speed to zero.

10. The computer product of claim 9, wherein the processor is furthered configured to:
 interpret at least one vehicle operating condition; and
 provide a first neutral command to the progressive actuator and a second neutral command to the progressive actuator, in response to the at least one vehicle operating condition indicating that vehicle motion is not intended;
 wherein the progressive actuator is responsive to selectively decouple a first gear mesh based on the first neutral command and a second gear mesh based on the second neutral command, wherein both gear meshes in the engaged position couple the input shaft of the transmission to drive wheels of a vehicle including the transmission, and wherein either gear mesh in a neutral position decouples the input shaft from the drive wheels.

11. The computer product of claim 8, wherein the processor is furthered configured to:
 provide an iteratively derived estimated vehicle mass value that is based at least in part on adjusting an adaptation rate of operations of a vehicle environment logic and a mass estimation logic.

12. The computer product of claim 11, wherein the vehicle environment logic is configured to provide interpretations of a motive torque value, a vehicle grade value, and a vehicle acceleration value.

13. The computer product of claim 11, further wherein a mass estimation logic is configured to:
 determine a plurality of correlations between the interpretations of the vehicle environment logic; and
 determine adaptations of an estimated vehicle drag value and an estimated vehicle effective inertia based on at least the plurality of determined correlations.

* * * * *